United States Patent
Kodama et al.

(10) Patent No.: US 11,440,404 B2
(45) Date of Patent: Sep. 13, 2022

(54) PEDAL ACTUATOR OF VEHICLE AUTOMATED DRIVING DEVICE

(71) Applicant: MEIDENSHA CORPORATION, Tokyo (JP)

(72) Inventors: Akihiko Kodama, Ota (JP); Nobuo Okazaki, Hachioji (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/442,313

(22) PCT Filed: Mar. 19, 2020

(86) PCT No.: PCT/JP2020/012300
§ 371 (c)(1),
(2) Date: Sep. 23, 2021

(87) PCT Pub. No.: WO2020/196264
PCT Pub. Date: Oct. 1, 2020

(65) Prior Publication Data
US 2022/0090656 A1   Mar. 24, 2022

(30) Foreign Application Priority Data

Mar. 25, 2019   (JP) ............................. JP2019-057017

(51) Int. Cl.
*B60K 26/02*   (2006.01)
*G01M 17/007*   (2006.01)
(Continued)

(52) U.S. Cl.
CPC ................ *B60K 26/02* (2013.01); *B60T 7/16* (2013.01); *B60K 2026/027* (2013.01); *F16H 19/04* (2013.01); *G01M 17/007* (2013.01)

(58) Field of Classification Search
CPC .............. B60K 26/02; B60K 2026/024; B60K 2026/026; B60K 2026/027; G05G 1/36;
(Continued)

(56) References Cited

U.S. PATENT DOCUMENTS

| 4,742,720 A | 5/1988 | Storck |
| 5,012,689 A * | 5/1991 | Smith ................... B60W 30/18<br>200/317 |

(Continued)

FOREIGN PATENT DOCUMENTS

| CN | 104122101 A | 10/2014 |
| DE | 10 2018 111 464 A1 | 11/2018 |

(Continued)

OTHER PUBLICATIONS

U.S. Appl. No. 17/441,835, filed Sep. 22, 2021, Kodama et al.
(Continued)

*Primary Examiner* — Adam D Rogers
(74) *Attorney, Agent, or Firm* — Foley & Lardner LLP

(57) ABSTRACT

A pedal actuator support bracket (61C) is provided at a front end portion of a frame (11) supported at a driver's seat of a vehicle. An actuator housing (78) is provided so that a base end side of the actuator housing (78) is supported by the pedal actuator support bracket (61C) so as to be able to pivot upward and downward relative to the pedal actuator support bracket (61C). A rack shaft (80) protrudes from a top end side of the actuator housing (78) and moves forward and backward along a longitudinal direction of the actuator housing (78). A pivotal plate (87) is connected to a top end of the rack shaft (80) so as to be able to pivot upward and downward and placed on a pressing surface of a clutch pedal (47) so as to overlap this pressing surface and fixed to the clutch pedal (47).

4 Claims, 88 Drawing Sheets

(51) Int. Cl.
  *B60T 7/12* (2006.01)
  *B60T 7/16* (2006.01)
  *F16H 19/04* (2006.01)

(58) Field of Classification Search
  CPC ........ G05G 1/54; G01M 17/007; F16H 19/04; B60T 7/16
  See application file for complete search history.

(56) References Cited

U.S. PATENT DOCUMENTS

| | | | |
|---|---|---|---|
| 5,172,589 | A | 12/1992 | Witt |
| 5,363,027 | A | 11/1994 | Noguchi |
| 5,372,035 | A | 12/1994 | Ogawa et al. |
| 5,388,476 | A | 2/1995 | Harger et al. |
| 5,394,743 | A * | 3/1995 | Noguchi ............... G01M 13/02 701/1 |
| 5,415,034 | A * | 5/1995 | Nishikawa ........ G01M 17/0074 73/115.01 |
| 5,821,718 | A | 10/1998 | Shaffer et al. |
| 5,835,867 | A | 11/1998 | Froelich et al. |
| 5,865,266 | A | 2/1999 | Froelich et al. |
| 5,991,674 | A | 11/1999 | Froelich et al. |
| 6,073,508 | A | 6/2000 | Vitous et al. |
| 6,112,608 | A | 9/2000 | Spravsow et al. |
| 6,141,603 | A | 10/2000 | Greenhill |
| 7,444,897 | B2 | 11/2008 | Komine et al. |
| 7,628,239 | B1 | 12/2009 | Louie et al. |
| 7,708,330 | B2 | 5/2010 | Staehle |
| 8,255,093 | B2 | 8/2012 | Layton et al. |
| 8,615,334 | B2 | 12/2013 | Ewert |
| 9,823,685 | B2 | 11/2017 | Bledsoe et al. |
| 9,844,880 | B1 | 12/2017 | Takach |
| 10,112,550 | B2 | 10/2018 | Nickel et al. |
| 10,379,007 | B2 | 8/2019 | Perrone et al. |
| 10,613,544 | B2 * | 4/2020 | Guterman ............ G05D 1/0246 |
| 10,994,664 | B2 | 5/2021 | Matsubara et al. |
| 11,162,871 | B2 | 11/2021 | Preston et al. |
| 2010/0057274 | A1 | 3/2010 | Layton et al. |
| 2011/0029133 | A1 | 2/2011 | Okazaki et al. |
| 2015/0053026 | A1 | 2/2015 | Otsuki |
| 2018/0001832 | A1 | 1/2018 | Nickel et al. |
| 2020/0001838 | A1 * | 1/2020 | Hurd ..................... G05G 1/38 |
| 2020/0041385 | A1 | 2/2020 | Perrone et al. |
| 2022/0088769 | A1 * | 3/2022 | Kodama ................. B25J 9/023 |
| 2022/0089101 | A1 * | 3/2022 | Kodama ................. B60R 11/04 |
| 2022/0090986 | A1 * | 3/2022 | Kodama ............... G01M 17/06 |
| 2022/0090987 | A1 * | 3/2022 | Kodama ............. G01M 17/007 |
| 2022/0090988 | A1 * | 3/2022 | Kodama ............... G01M 17/06 |

FOREIGN PATENT DOCUMENTS

| | | | | |
|---|---|---|---|---|
| EP | 1 387 160 | A3 | 1/2006 | |
| EP | 2 397 833 | A3 | 7/2015 | |
| FR | 2793204 | A1 * | 11/2000 | .............. G05G 7/02 |
| JP | 03-146841 | A | 6/1991 | |
| JP | 07-029442 | U | 6/1995 | |
| JP | 07-036034 | U | 7/1995 | |
| JP | 08-043266 | | 2/1996 | |
| JP | 2602122 | B2 | 4/1997 | |
| JP | 09-152388 | A | 6/1997 | |
| JP | 2871472 | B2 | 3/1999 | |
| JP | 2000-352548 | A | 12/2000 | |
| JP | 2003-014587 | A | 1/2003 | |
| JP | 2003-014588 | A | 1/2003 | |
| JP | 2003-098046 | A | 4/2003 | |
| JP | 2004-361369 | A | 12/2004 | |
| JP | 2005-003591 | A | 1/2005 | |
| JP | 2010-91519 | A | 4/2010 | |
| JP | 2010-164314 | A | 7/2010 | |
| JP | 2010-175297 | A | 8/2010 | |
| JP | 2013-228344 | A | 11/2013 | |
| JP | 2020159757 | A * | 10/2020 | |
| KR | 970001978 | Y1 * | 3/1997 | |
| WO | WO-2020196259 | A1 * | 10/2020 | .......... G01M 17/007 |
| WO | WO-2020196260 | A1 * | 10/2020 | .......... G01M 17/007 |
| WO | WO-2020196261 | A * | 10/2020 | .......... G01M 17/007 |
| WO | WO-2020196262 | A1 * | 10/2020 | .......... G01M 17/007 |
| WO | WO-2020196263 | A1 * | 10/2020 | .......... G01M 17/007 |
| WO | WO-2021187106 | A1 * | 9/2021 | .......... G01M 17/007 |
| WO | WO-2021187107 | A1 * | 9/2021 | .......... G01M 17/007 |
| WO | WO-2021187108 | A1 * | 9/2021 | .......... G01M 17/007 |

OTHER PUBLICATIONS

U.S. Appl. No. 17/441,851, filed Sep. 22, 2021, Kodama et al.
U.S. Appl. No. 17/441,896, filed Sep. 22, 2021, Kodama et al.
U.S. Appl. No. 17/442,254, filed Sep. 23, 2021, Kodama et al.
U.S. Appl. No. 17/442,299, filed Sep. 23, 2021, Kodama et al.
USPTO Notice of Allowance, U.S. Appl. No. 17/441,851, dated Feb. 16, 2022, 12 pages.
USPTO Office Action, U.S. Appl. No. 17/441,835, dated Jan. 24, 2022, 10 pages.
USPTO Office Action, U.S. Appl. No. 17/441,896, dated Feb. 15, 2022, 12 pages.
USPTO Office Action, U.S. Appl. No. 17/442,254, dated Feb. 7, 2022, 10 pages.
USPTO Office Action, U.S. Appl. No. 17/442,299, dated Jan. 28, 2022, 10 pages.

* cited by examiner

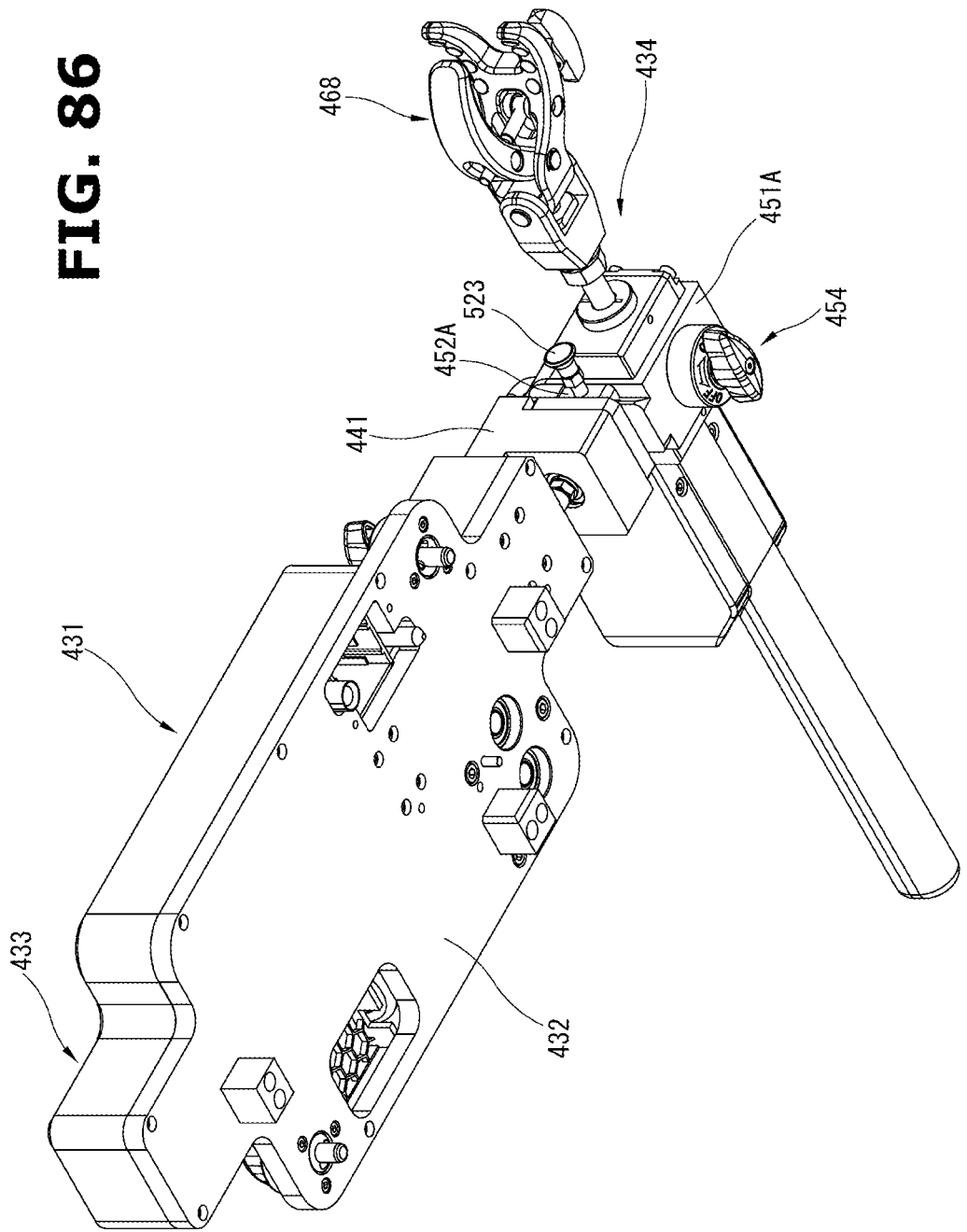

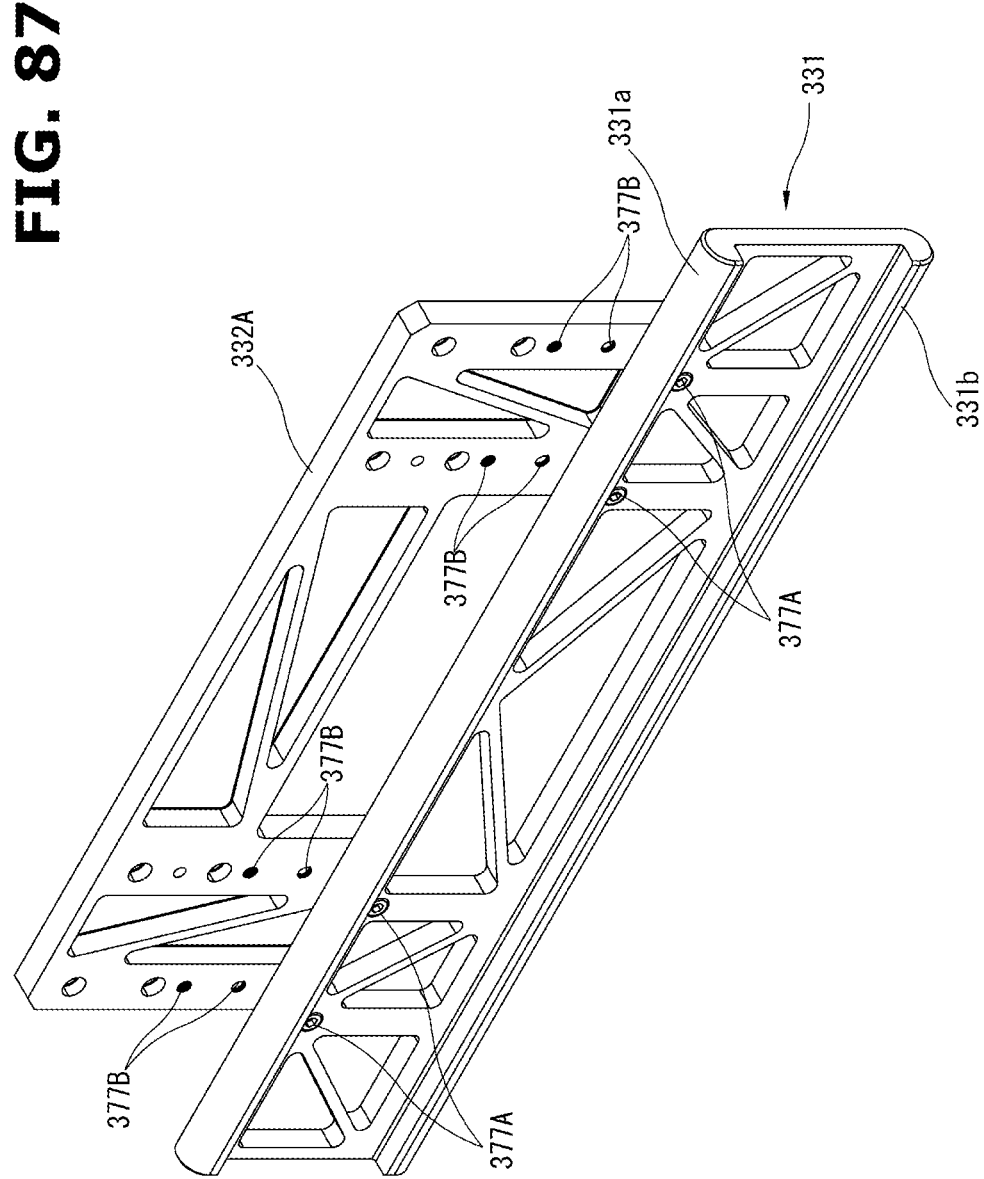

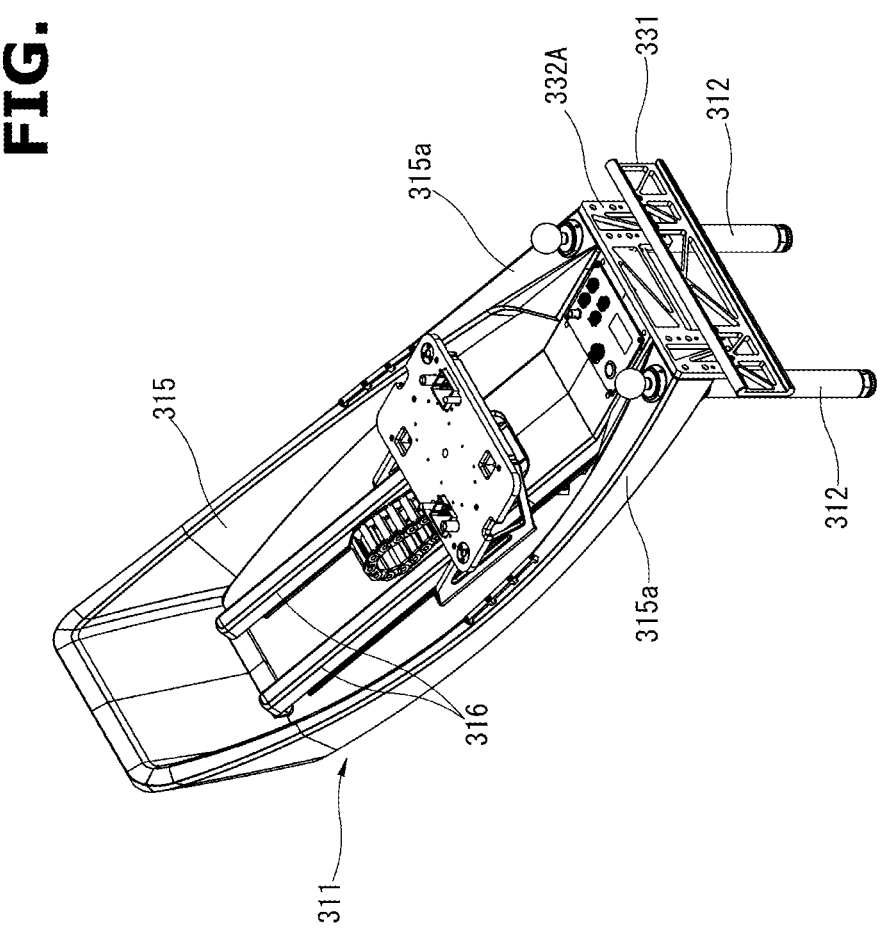

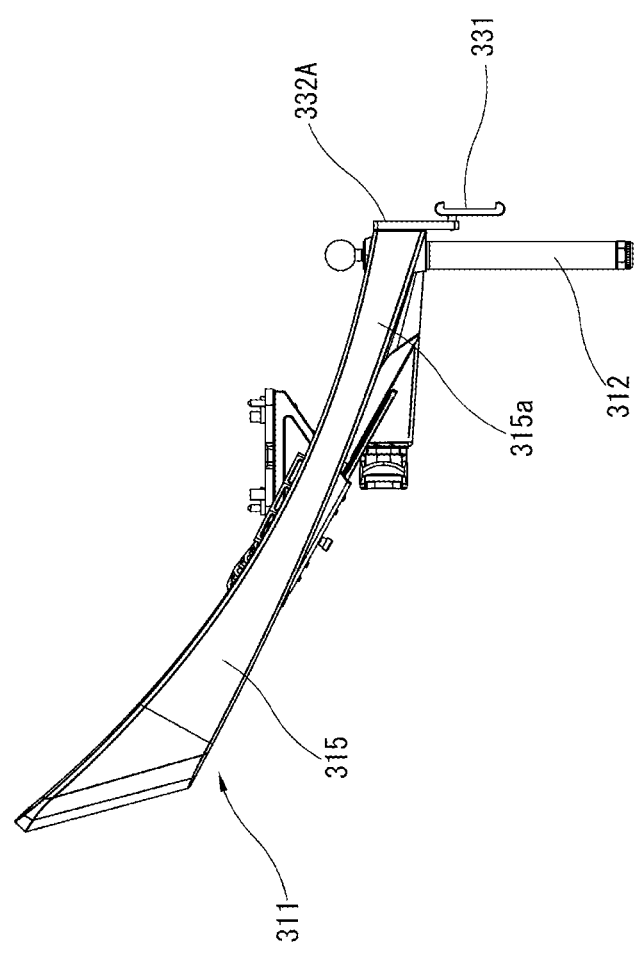

PEDAL ACTUATOR OF VEHICLE AUTOMATED DRIVING DEVICE

TECHNICAL FIELD

The present invention relates to a pedal actuator of an automatic vehicle driving device.

BACKGROUND ART

When carrying out a running test of a vehicle on a chassis dynamometer, an automatic vehicle driving device that performs a pedal operation and a shift-lever operation of the vehicle in place of a driver is generally used.

For instance, Patent Document 1 discloses an automatic vehicle driving device whose pedal actuator presses a pedal of a vehicle.

The pedal actuator of Patent Document 1 is supported by a support frame so that a top end portion of the pedal actuator can move (pivot) upward and downward, then good contact between the top end portion of the pedal actuator and the pedal can be maintained.

However, Patent Document 1 does not take account of a case where a stroke of the pedal pressed by the pedal actuator is large. For instance, in a case where the pedal considerably moves along an arc with a certain supporting point being a center, an inclination or a gradient of a pedal surface also considerably changes.

Because of this, in the case of the pedal actuator of Patent Document 1, there is a risk that when the stroke of the pedal is large, the top end portion of the pedal actuator cannot follow the inclination of the pedal surface then the top end portion of the pedal actuator will fall off the pedal surface.

That is, in the case of the automatic vehicle driving device of Patent Document 1, there is still room for improvement to surely perform a pressing operation of the pedal whose stroke is large.

CITATION LIST

Patent Document

Patent Document 1: Japanese Unexamined Patent Application Publication No. H08-043266 (JPH0843266)

SUMMARY OF THE INVENTION

A pedal actuator of an automatic vehicle driving device according to the present invention comprises: a pedal actuator support bracket provided at a front end portion of a frame supported at a driver's seat of a vehicle; an actuator housing whose base end side is supported by the pedal actuator support bracket so as to be able to pivot upward and downward relative to the pedal actuator support bracket; an actuator rod protruding from a top end side of the actuator housing and moving forward and backward along a longitudinal direction of the actuator housing; and a pivotal plate connected to a top end of the actuator rod so as to be able to pivot upward and downward and placed on a pressing surface of a pedal so as to overlap the pressing surface of the pedal and fixed to the pedal.

As a preferable aspect of the present invention, the pedal actuator further comprises: a link arm whose one end is pivotably linked with the pedal actuator support bracket and whose other end fixedly supports the actuator housing at a predetermined angle, and the link arm is structured to allow adjustment of an angle between the link arm and the actuator housing, and an extension line of the actuator rod passes above the pedal actuator support bracket.

As a preferable aspect of the present invention, the pedal actuator further comprises: a slide bracket connected to the other end of the link arm and slidably fixed to the actuator housing; and a fixing screw fixing the slide bracket to the actuator housing.

As a preferable aspect of the present invention, the pedal actuator further comprises a height adjustment mechanism that can variably adjust a height position of the pedal actuator support bracket with respect to the frame.

As a preferable aspect of the present invention, the height adjustment mechanism has a rail supporting bracket plate fixed to the front end portion of the frame; and a pedal actuator support slide rail to which the pedal actuator support bracket is mounted, and the rail supporting bracket plate is structured so that the pedal actuator support slide rail can be fixed to positions of different height.

According to the present invention, since an angle change of the actuator housing is allowed, the pedal actuator can surely press the pedal to a limit of a stroke even if the stroke of the actuator rod becomes large.

BRIEF DESCRIPTION OF THE DRAWINGS

FIG. 86 is a perspective view, viewed from below, of the transmission actuator unit provided with the supporting part of the modified example.

FIG. 87 is a perspective view showing a modified example of the slide rail allowing height adjustment of the pedal actuator.

FIG. 88 is a perspective view of the frame provided with the slide rail of the modified example.

FIG. 89 is a side view of the frame provided with the slide rail of the modified example.

EMBODIMENTS FOR CARRYING OUT THE INVENTION

Embodiments of the present invention will be described in detail below with reference to the drawings.

[General Configuration of Automatic Vehicle Driving Device 1 of First Embodiment]

Figure 5:
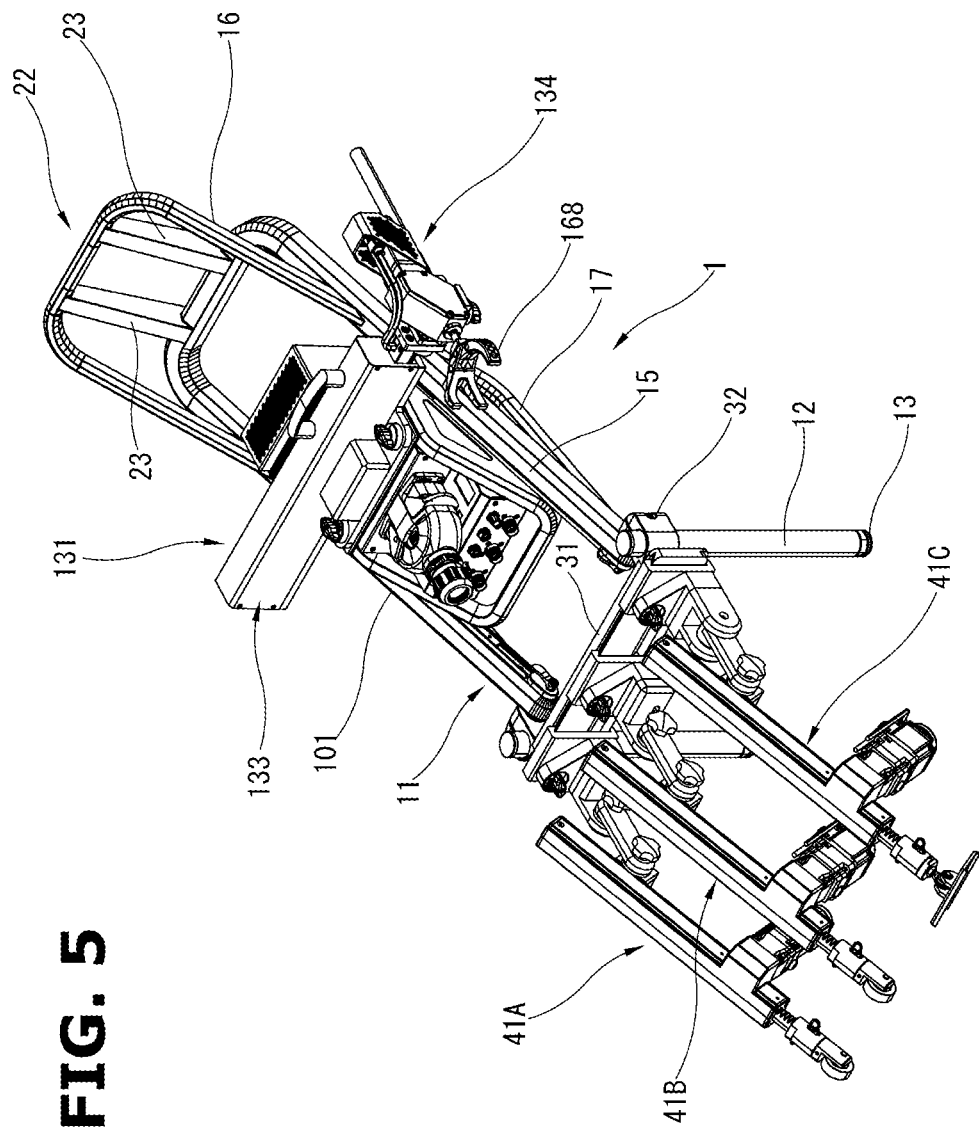
FIG. 5 is a perspective view of the automatic vehicle driving device.
Figure 6:
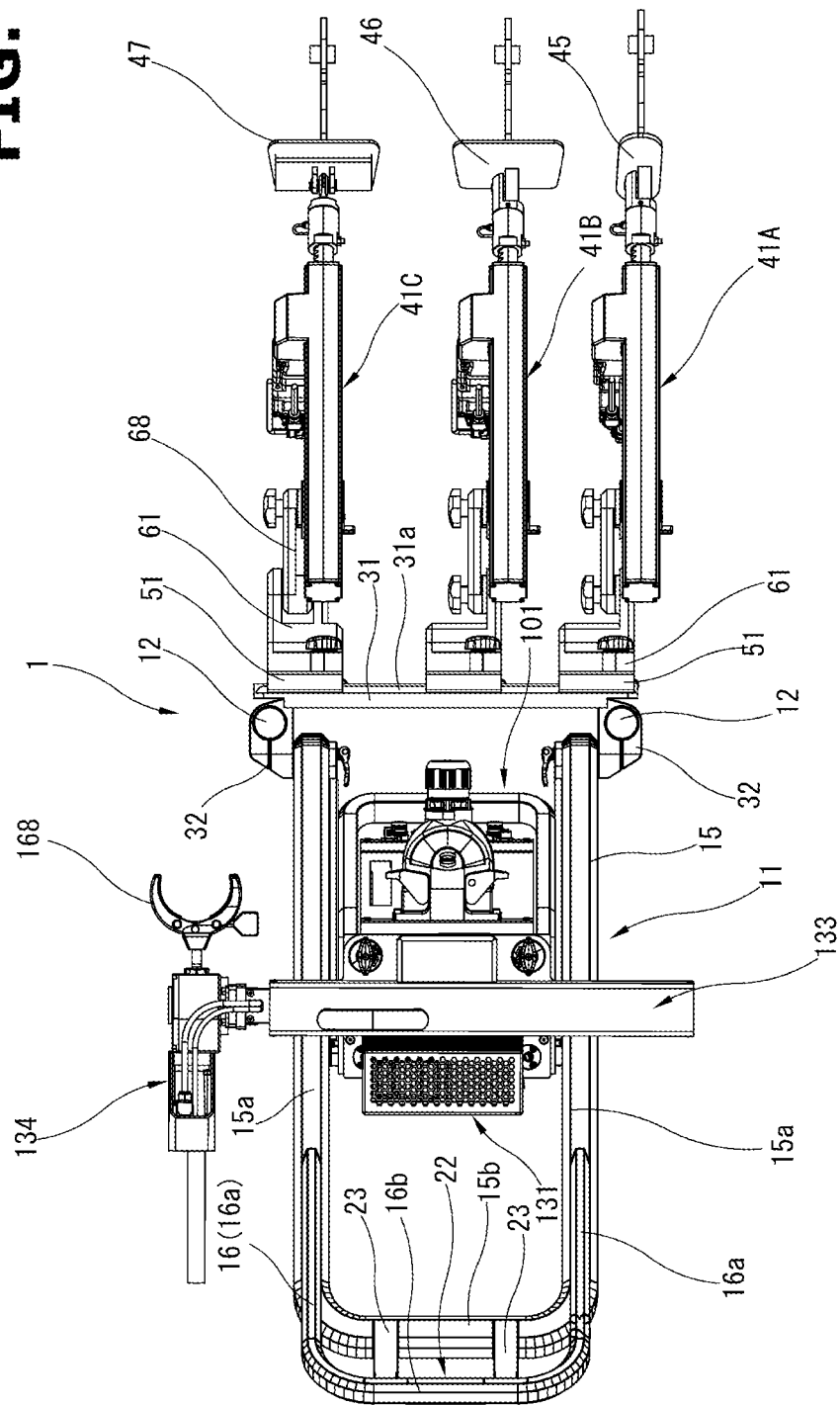
FIG. 6 is a top view of the automatic vehicle driving device.

FIGS. 1 to 4 show a state in which an automatic vehicle driving device 1 according to the present invention is mounted above a driver's seat 2 of a vehicle. FIGS. 5 and 6 show the automatic vehicle driving device 1 in its entirety with the device 1 dismounted from the vehicle. This automatic vehicle driving device 1 is used when carrying out a running test of the vehicle on a chassis dynamometer (not shown). The automatic vehicle driving device 1 performs a pedal operation of an accelerator pedal etc. and a shift-lever operation of a transmission by signals from an external controller placed outside the vehicle.

Here, as described later, the automatic vehicle driving device 1 of the present embodiment can be used for a vehicle with a manual transmission having a clutch pedal and for a vehicle with an automatic transmission having no clutch pedal. Further, the automatic vehicle driving device 1 of the present embodiment can be applied to both of the so-called right-hand drive vehicle in which the driver's seat is on a right side of the vehicle and the shift-lever operation is done by driver's left hand and the so-called left-hand drive vehicle in which the driver's seat is on a left side of the vehicle and the shift-lever operation is done by driver's right hand. The embodiment shown in FIGS. 1 to 6 illustrate an example of a configuration of the automatic vehicle driving device 1 applied to the right-hand drive vehicle with the manual transmission having an accelerator pedal 45, a brake pedal 46 and a clutch pedal 47.

The driver's seat 2 is supported on a vehicle body floor 6 (see FIG. 3) through a fore-and-aft slide mechanism and an up-and-down movement mechanism (both not shown). The driver's seat 2 has a seat cushion 3 forming a seat surface on which a driver is seated, a seat back 4 supporting driver's back and a headrest 5 supporting driver's head. The seat back 4 generally has the so-called reclining mechanism that allows adjustment of a tilt angle of the seat back 4 with respect to the seat cushion 3.

The automatic vehicle driving device 1 is configured mainly from a frame 11 extending obliquely or slantingly downward from a vicinity of an upper end part of the seat back 4 toward a vehicle front side, a pair of legs 12 positioned at a front end of the frame 11 and extending downward along a front end of the seat cushion 3, three pedal actuators 41 extending from the front end of the frame 11 to the vehicle front side and operating the three pedals 45, 46 and 47 respectively, a connection box unit 101 supported with the connection box unit 101 floating from the seat cushion 3 and the seat back 4 in the middle of the frame 11 and a transmission actuator unit 131 mounted on an upper surface of the connection box unit 101.

Figure 2:
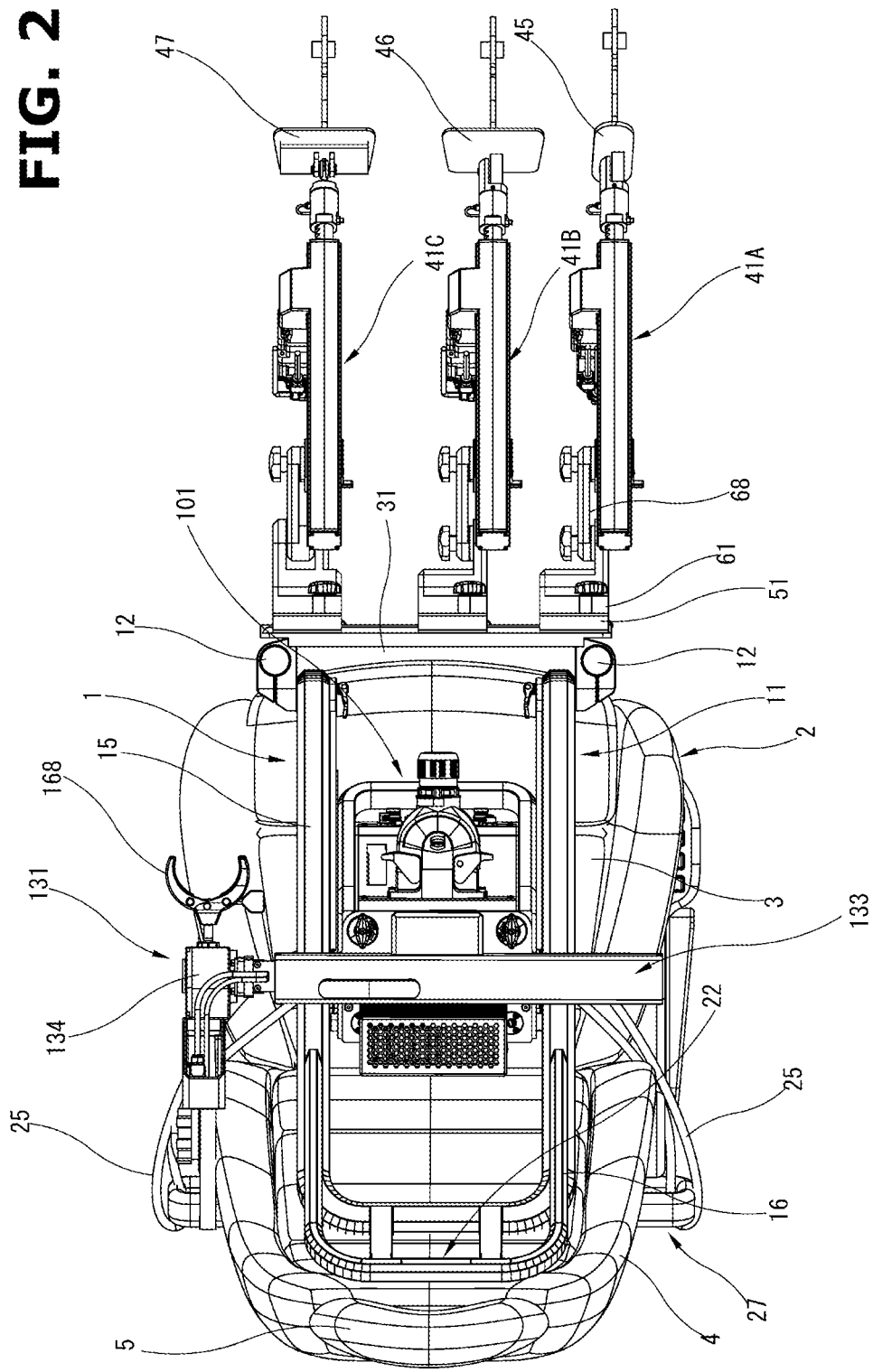
FIG. 2 is a top view showing the state in which the automatic vehicle driving device is mounted on the driver's seat.
Figure 4:
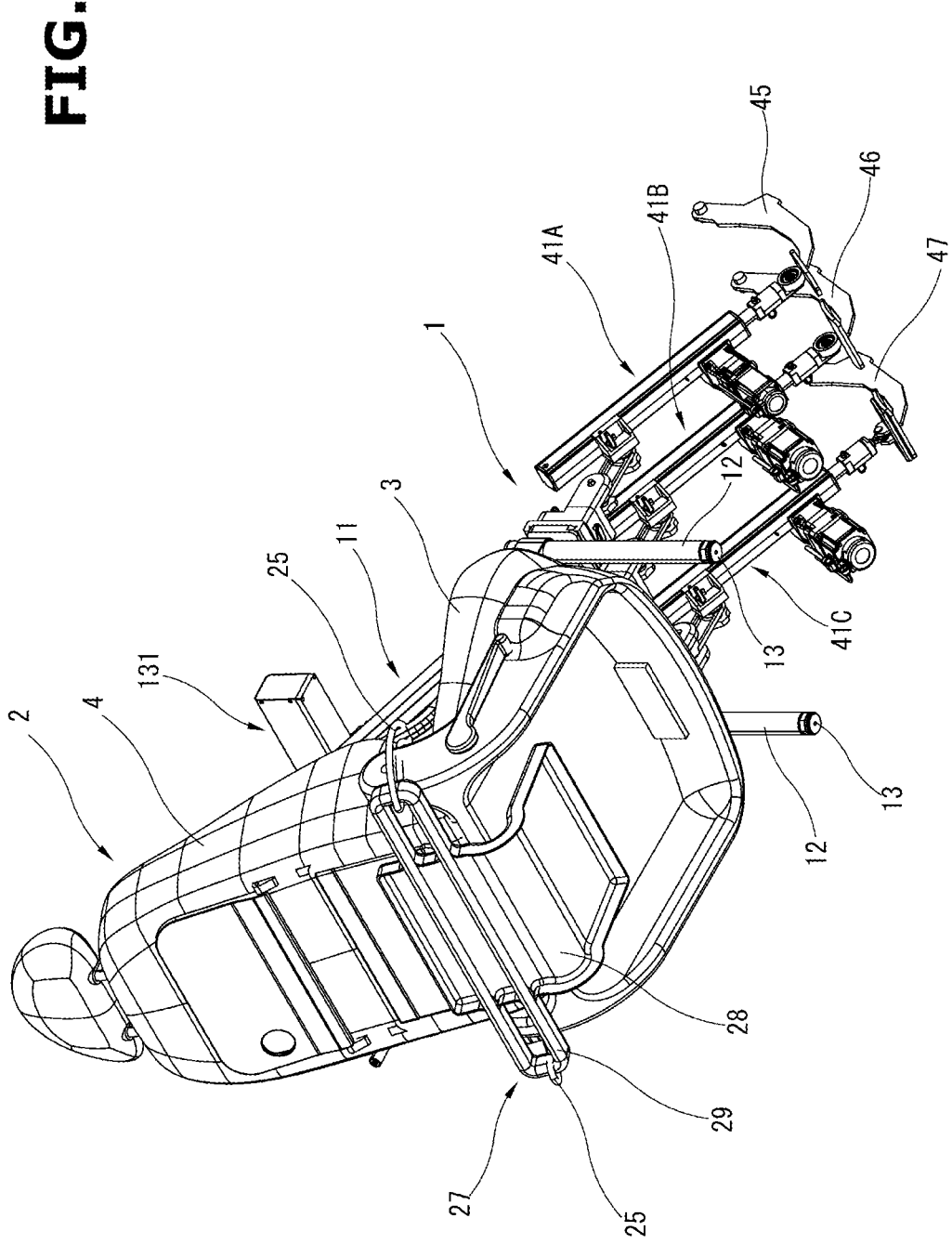
FIG. 4 is a perspective view, viewed from below, showing the state in which the automatic vehicle driving device is mounted on the driver's seat.

As the pedal actuators 41, they are an accelerator pedal actuator 41A that operates the accelerator pedal 45, a brake pedal actuator 41B that operates the brake pedal 46 and a clutch pedal actuator 41C that operates the clutch pedal 47 (see FIGS. 2 and 4). Although these three pedal actuators 41 could have exactly the same structure, in the present embodiment, by taking into account the fact that the clutch pedal 47 moves along an arc and its stroke (a depressing operation amount) is relatively large, the clutch pedal actuator 41C is different from the other two pedal actuators 41A and 41B in details of structure. The accelerator pedal actuator 41A, and the brake pedal actuator 41B have substantially the same structure. Here, since a basic structure is common to the three pedal actuators 41, when there is no need to distinguish the three pedal actuators 41A, 41B and 41C, they are collectively called the pedal actuators 41.

The connection box unit 101 forms a connection unit between a variety of actuators etc. and a variety of sensors etc. provided at the automatic vehicle driving device 1 and a cable (including a power supply system and a signal system) drawn into the vehicle from the external controller placed outside the vehicle. Further, this connection box unit 101 also serves as a supporting stage of the transmission actuator unit 131.

The transmission actuator unit 131 is a unit that operates a shift lever, which is placed, in the example shown in the drawings, on a left side of the driver's seat 2. The transmission actuator unit 131 has a configuration in which a selecting actuator 133 that performs an operation (the so-called selecting operation) of the shift lever along a vehicle width direction and a shifting actuator 134 that performs an operation (the so-called shifting operation) of the shift lever along a vehicle longitudinal direction are combined. More specifically, the transmission actuator unit 131 has a grip hand 168 gripping a substantially spherical knob or grip of a head (not shown) of the shift lever, and this grip hand 168 moves forward and backward by a motion of the shifting actuator 134, and also the shifting actuator 134 moves as a whole along the vehicle width direction by a motion of the selecting actuator 133, then both of the selecting operation and the shifting operation are realized.

The automatic vehicle driving device 1 mounted above the driver's seat 2 of the vehicle is fixed to the vehicle by being drawn (or pulled) obliquely downward in a rear direction by a belt(s) 25 at both right and left sides of the driver's seat 2. More specifically, a seat support 27 having rigidity is provided at a rear end of the seat cushion 3 to protect the driver's seat 2 from damage, and the belts 25 are fastened (attached) to both ends of a laterally long narrow ring portion 29. The seat support 27 has a plate portion 28 extending, like a substantially L-shape, from the rear end of the seat cushion 3 to a lower end of the seat back 4, and is attached to a rear side of the driver's seat 2 such that the plate portion 28 is inserted from the rear side of the driver's seat 2 (i.e. from a rear seat side of the vehicle) along a lower surface of the driver's seat 2 (see FIG. 4). It is noted that each of right and left ends of the belt 25 is formed into a loop shape through a general-purpose belt tightening device (the so-called load tightening device), and a tightening operation is done by this belt tightening device. As described later, in a state in which the automatic vehicle driving device 1 is tightened and fixed with the belts 25, lower ends of the legs 12 abut against the vehicle body floor 6 and an upper end of the frame 11 abuts against an upper portion of the seat back 4.

Next, each part forming the automatic vehicle driving device 1 will be described in detail.

[Configurations of Frame 11 and Leg 12]

FIGS. 7 to 10 show configurations or structures of the frame 11 and the leg 12. The frame 11 is formed into a hollow pipe shape using e.g. carbon fiber reinforced plastics (CFRP). The frame 11 has a main frame 15, a sub frame 16, belt linkage beams 17 and a pair of ribs 23, and these are partly formed as integral parts. More specifically, some parts are separately molded, and these molded parts are connected together as an integral frame.

The main frame 15 has a substantially U-shape in plan view (or top view, viewed from an upper side of the vehicle, as shown in FIG. 6). That is, the main frame 15 has a pair of straight main beams 15a located parallel to each other and a lateral beam 15b extending along a horizontal direction and connecting upper ends of the pair of main beams 15a. In a vehicle-mounted state, as an attitude of the main frame 15, the lateral beam 15b abuts against the upper portion of the seat back 4, and the main beams 15a linearly extend obliquely downward from this abutting portion of the lateral beam 15b toward the front end of the seat cushion 3.

Likewise, the sub frame 16 has a substantially U-shape in plan view, and has a pair of straight sub beams 16a located parallel to each other and a lateral beam 16b extending along the horizontal direction and connecting upper ends of the pair of sub beams 16a. The sub frame 16 is formed so as to extend obliquely upward from the main frame 15 at an upper half of the main frame 15. In other words, the sub beams 16a branch off obliquely upward from the main beams 15a. The lateral beam 16b of the sub frame 16 is located above the lateral beam 15b of the main frame 15 (more specifically, the lateral beam 16b of the sub frame 16 is located at a slightly rear side with respect to the lateral beam 15b of the main frame 15), and these lateral beams 15b and 16b are parallel to each other. Then, these lateral beams 15b and 16b are connected through the pair of columnar ribs 23 that extend in a vertical direction. The pair of ribs 23 are arranged parallel to each other.

The lateral beams 15b and 16b and the pair of ribs 23 form a seat back abutting part 22 that abuts against the vicinity of the upper end part of the seat back 4 in the vehicle-mounted state. That is, one plane (or one flat surface) is defined by the lateral beams 15b and 16b and the pair of ribs 23 which are located along four sides of a rectangle, and four sides surrounding this plane widely abut against the seat back 4. Here, the plane defined by the lateral beams 15b and 16b and the pair of ribs 23 slants or inclines so as to correspond to a basic tilt angle of the seat back 4 in the vehicle.

The seat back 4 generally has an upper pad portion 4a and a lower pad portion 4b whose inside materials (also whose hardness) are different from each other. A basic size (dimensions) of each part of the main frame 15 is set so that the lateral beam 15b of the main frame 15 is positioned along seams 4c of a seat skin which define a boundary between the upper pad portion 4a and the lower pad portion 4b (see FIG. 9). Although a concrete configuration of the seat back 4 is different depending on vehicle types as a matter of course, in many cases, a position of the boundary between the upper pad portion 4a and the lower pad portion 4b is almost fixed. Since the seams 4c are relatively recessed, by mounting the automatic vehicle driving device 1 (the frame 11) in the vehicle with the lateral beam 15b of the main frame 15 being aligned with this position of the seams 4c, positioning of the automatic vehicle driving device 1 is facilitated, and also an attitude of the frame 11 becomes stable. Here, as a matter of course, the automatic vehicle driving device 1 can be mounted regardless of the position of the seams 4c depending on the vehicle types.

Figure 3:
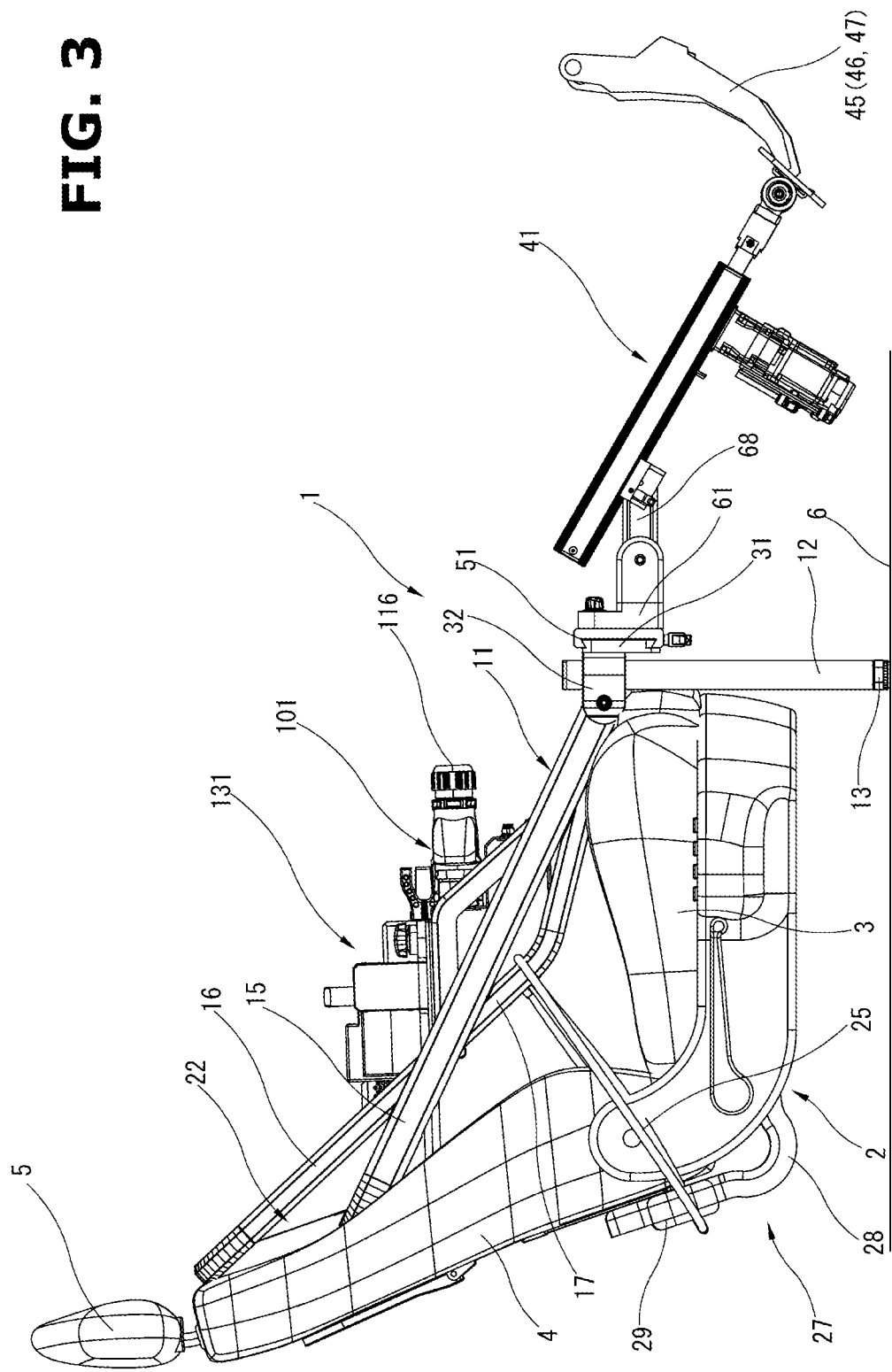
FIG. 3 is a side view showing the state in which the automatic vehicle driving device is mounted on the driver's seat.
Figure 10:
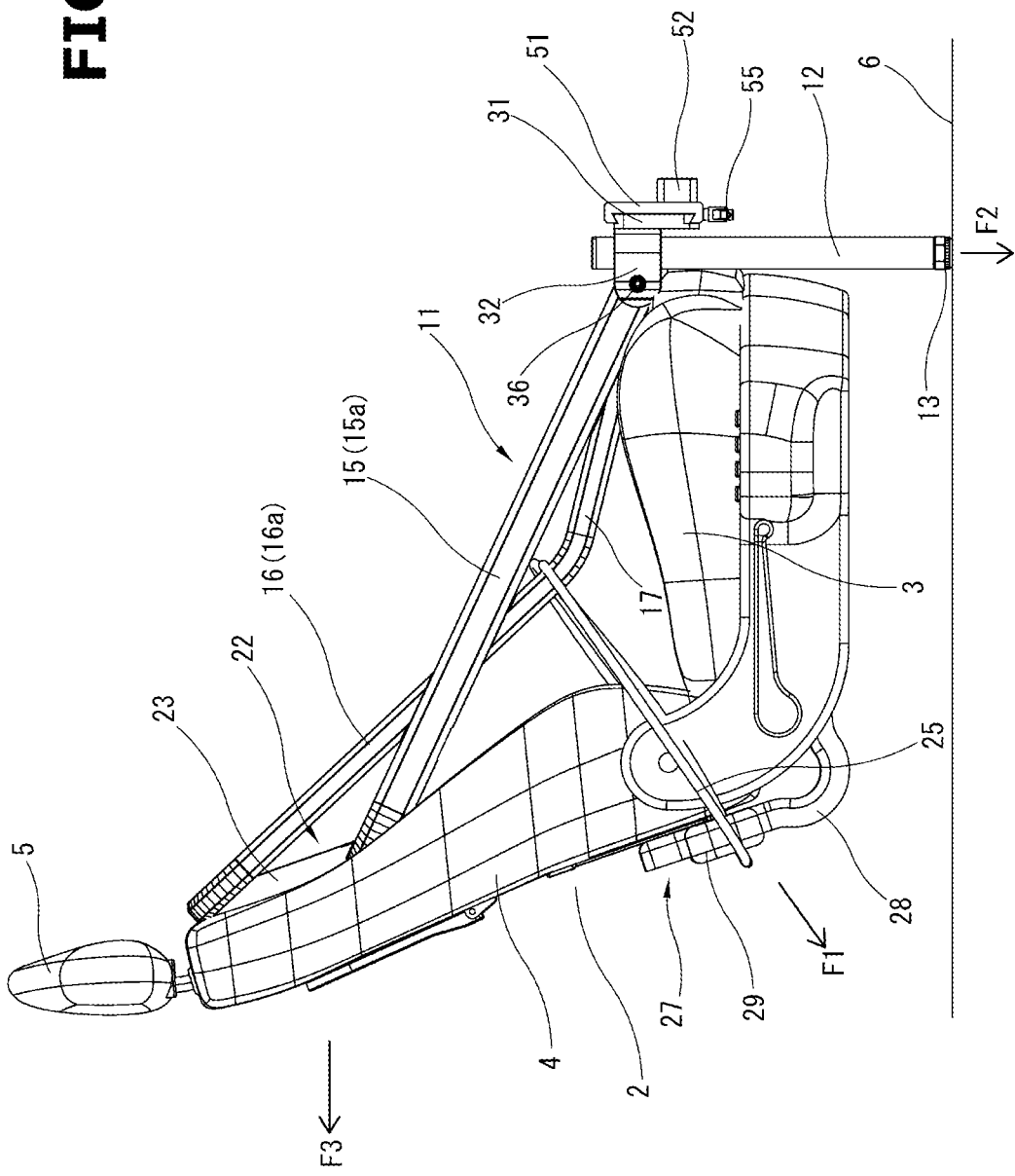
FIG. 10 is a side view showing the state in which the frame is mounted on the driver's seat.

The belt linkage beams 17 are beams which the above respective fixing belts 25 are linked to or engaged with. Each of the belt linkage beams 17 is bent or curved so as to form a triangular shape whose vertex angle is an obtuse angle in side view (viewed from a vehicle side, as shown in FIG. 3), and is formed integrally with the main beam 15a so as to protrude downward in the middle of the main beam 15a. As shown in FIGS. 3 and 10 etc., the belts 25 are wound around the respective belt linkage beams 17 through openings that are formed between the belt linkage beams 17 and the main beams 15a. A portion of the vertex angle of the belt linkage beam 17 where the belt 25 contacts is bent or curved to form a gentle curved shape.

The sub beam 16a of the sub frame 16 and the belt linkage beam 17 vertically overlap the main beam 15a in plan view (see FIG. 6). That is, three of the main beam 15a, the sub beam 16a and the belt linkage beam 17 are arranged on a plane extending in the vertical direction. Further, each of the main frame 15, the sub frame 16 and the belt linkage beam 17 has an octagonal hollow shape in cross section which is like a shape formed by chamfering four corners of a rectangle. A size of a cross section of the main frame 15 is greater than those of the sub frame 16 and the belt linkage beam 17. That is, the main frame 15 has a hollow pipe whose diameter is greater than those of the sub frame 16 and the belt linkage beam 17.

Figure 7:
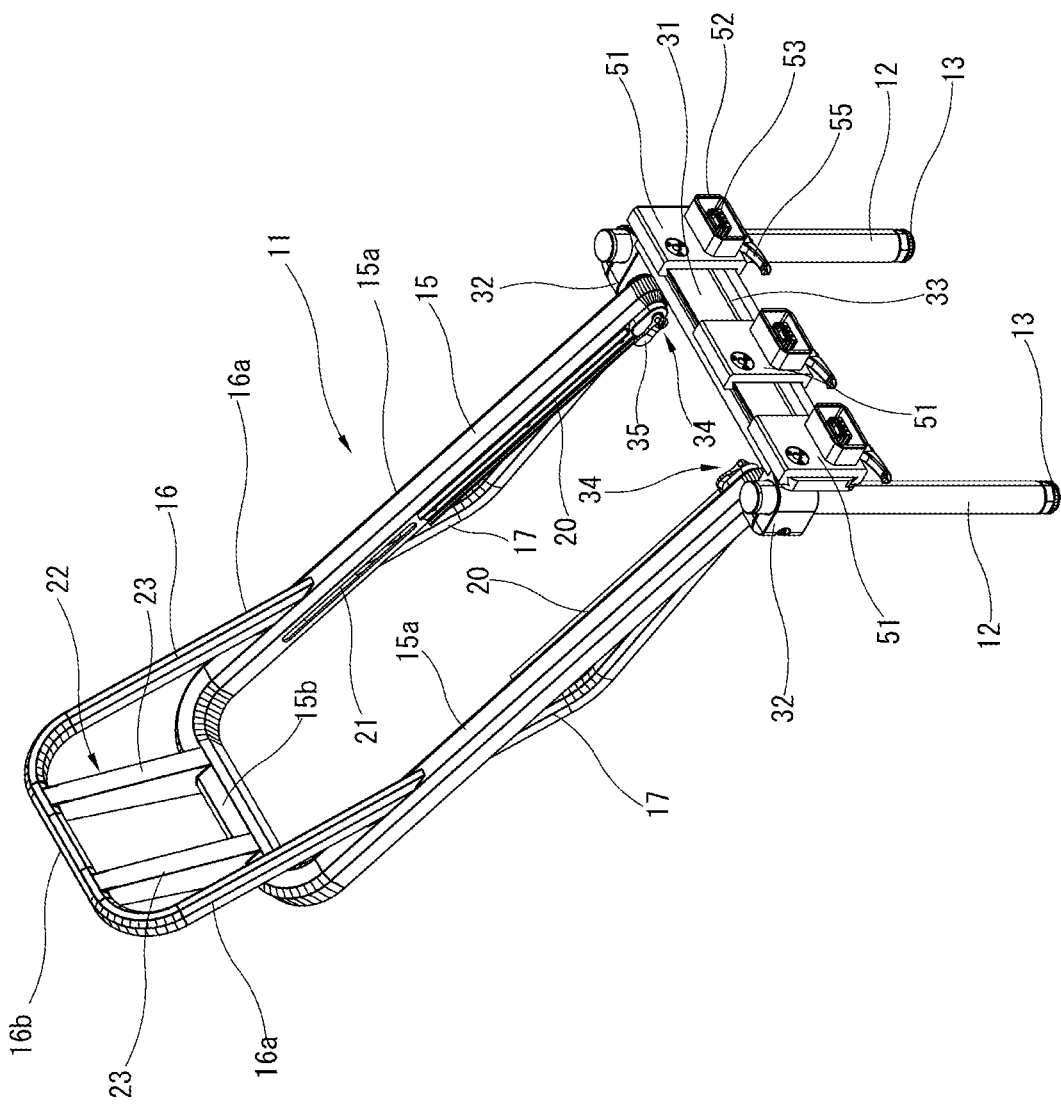
FIG. 7 is a perspective view of a frame and legs.
Figure 8:
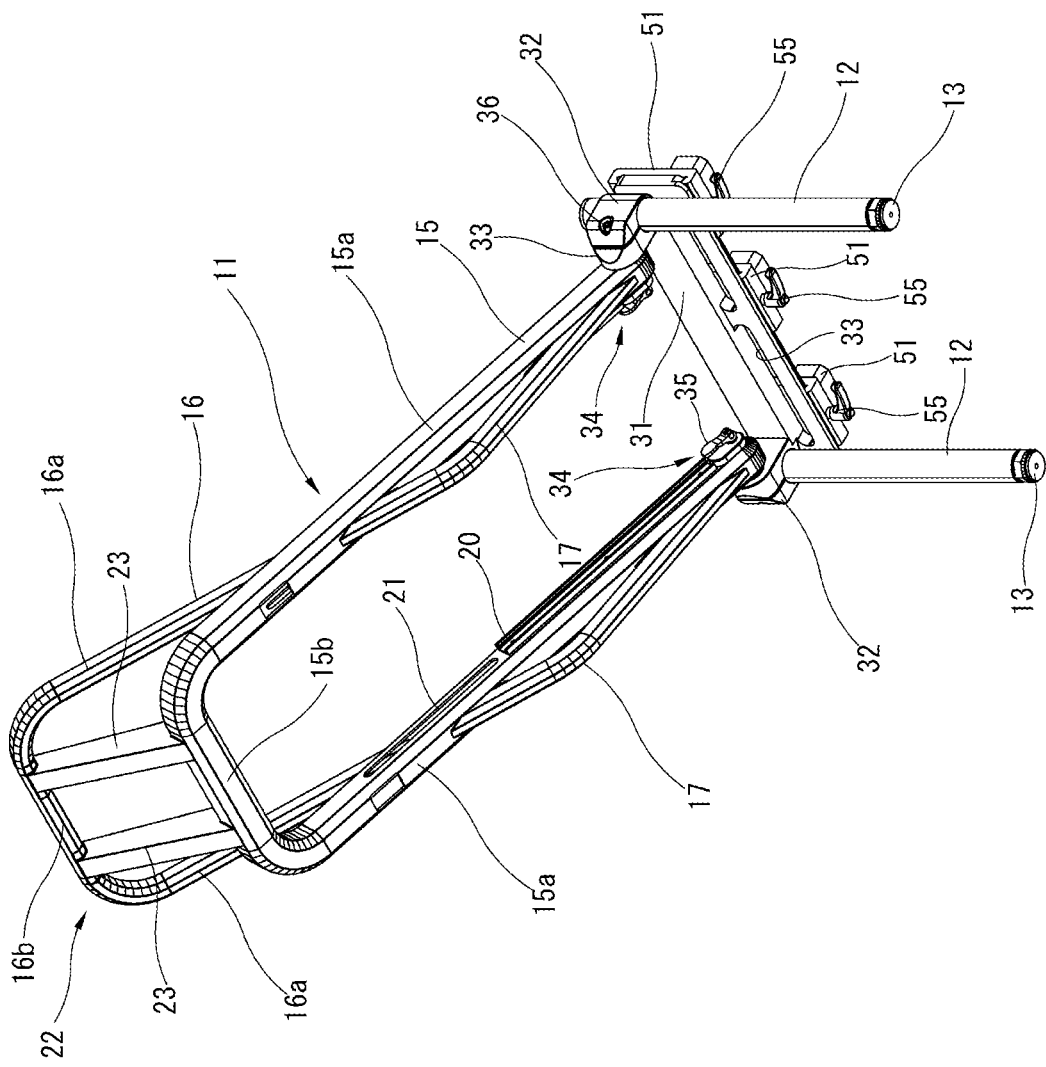
FIG. 8 is a perspective view, viewed from below, of the frame and the legs.

As shown in FIGS. 7 and 8, guide rails 20 and guide slits 21 for slidably guiding the connection box unit 101, which will be described later, are provided at both inner side surfaces of the pair of main beams 15a. The channel-shaped guide rail 20 is attached throughout a lower half of the main beam 15a so as to extend along the main beam 15a. The guide slit 21 is formed from a vicinity of an upper end of the guide rail 20 to a vicinity of a connecting portion with the sub beam 16a so as to be aligned straight with the guide rail 20.

The main beam 15a formed as the hollow pipe is molded into a round closed shape at a lower end (a front end), which is on an open end side of the U-shape, of the main frame 15. Each cylindrical leg 12 is then fixed to a lower end portion of this main beam 15a through a leg bracket 32. The leg bracket 32 is a kind of clamp formed into a substantially U-shape in plan view. The leg brackets 32 are provided at positions on outer sides of the pair of main beams 15a. Lock levers 35 of lock mechanisms 34 to clamp or tighten the leg brackets 32 are provided on inner sides of the pair of main beams 15a. A lock pin 36 of each lock mechanism 34 penetrates the main beam 15a and is engaged with the leg bracket 32. By tightening the lock mechanisms 34, the cylindrical legs 12 are fixed to the leg brackets 32, and also the leg brackets 32 are fixed to the main beams 15a. In other words, in a state in which the lock mechanisms 34 are loosened, an angle (an angle with the lock pin 36 being a center) of each leg 12 with respect to the main beam 15a is adjustable, and a vertical fixing position of each leg 12 with respect to the leg bracket 32 is adjustable. Basically, the legs 12 are assembled with an upper end of each cylindrical leg 12 slightly protruding upward from an upper surface of the leg bracket 32.

In the shown embodiment, each of the legs 12 is provided, at a lower end thereof, with a height adjustment screw 13. Then, fine adjustment is possible so that the legs 12 surely abut against the vehicle body floor 6 in the vehicle-mounted state.

The pair of leg brackets 32 are coupled together through a pedal actuator support slide rail 31 extending in the vehicle width direction. This slide rail 31 has a long narrow rectangular plate shape, and is fixed to front surfaces of the leg brackets 32 so as to face toward the vehicle front side. In other words, the leg brackets 32 are fixed to a back surface at both end portions of the plate-shaped slide rail 31 extending in the vehicle width direction. The slide rail 31 is made of metal material in order to have sufficient rigidity. The open end of the substantially U-shape of the main frame 15 is closed by this slide rail 31. That is, as shown in FIG. 6, a closed rectangle in plan view is formed by the frame 11 and the slide rail 31.

The slide rail 31 has, at upper and lower edges on a front surface side thereof, guide surfaces 31a each having a grooved V-shape cross section. The slide rail 31 slidably supports pedal actuator supports 51 that engage with these guide surfaces 31a. In the example shown in FIGS. 7 to 10, three pedal actuator supports 51 are provided so as to correspond to the three pedal actuators 41 (the accelerator pedal actuator 41A, the brake pedal actuator 41B and the clutch pedal actuator 41C). Details of the pedal actuator support 51 will be described later. The slide rail 31 is provided with a slit 33 which a cable (not shown) drawn out from a back surface side of each pedal actuator support 51 passes through.

Figure 9:
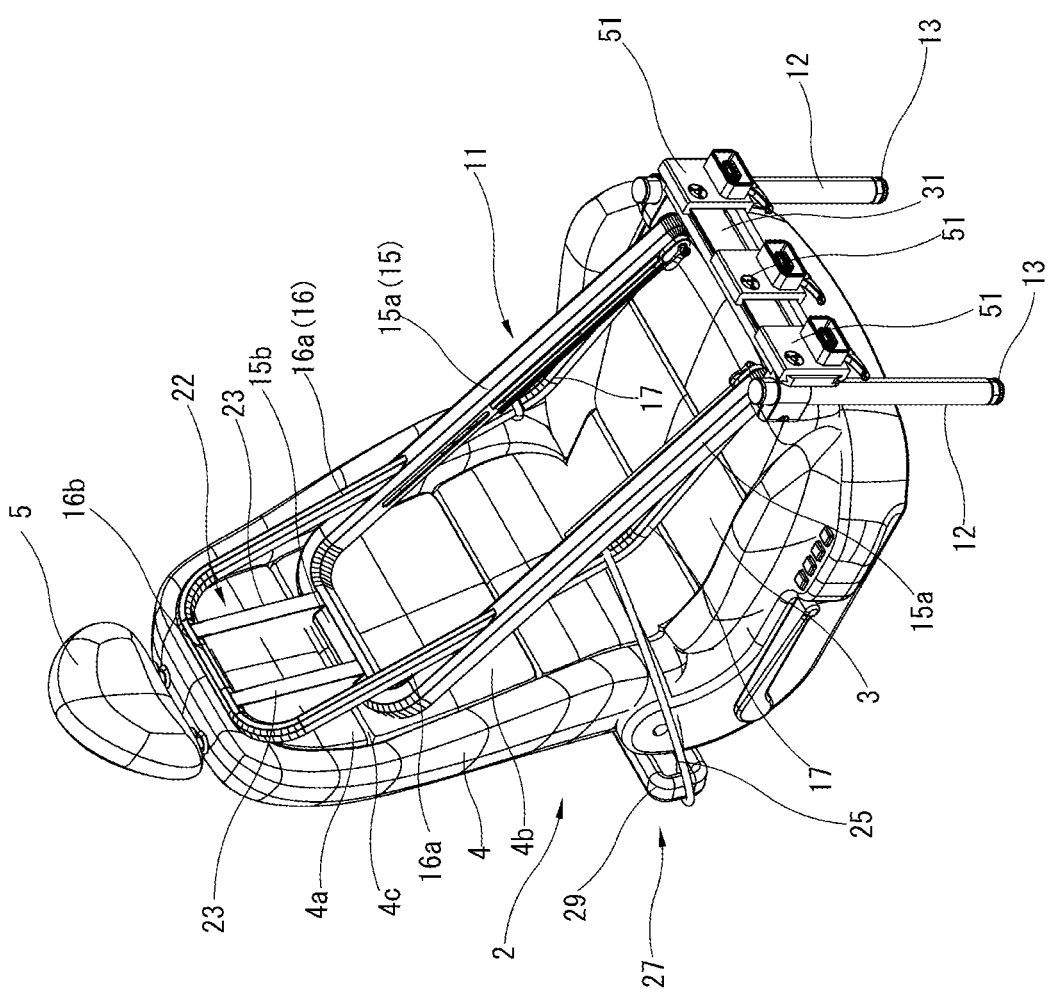
FIG. 9 is a perspective view showing a state in which the frame is mounted on the driver's seat.

FIGS. 9 and 10 show a state in which the frame 11 is mounted above the driver's seat 2. As described above, the belts 25 are wound (or bound) around the frame 11 and the seat support 27 provided at a back of the driver's seat 2, and by tightening these belts 25 using the belt tightening device (not shown), the frame 11 is fixed above the driver's seat 2. In this mounted state, as an attitude of the frame 11, the frame 11 extends obliquely or slantingly downward from the upper end part of the seat back 4 toward the front end of the seat cushion 3. More specifically, the main frame 15 linearly extends obliquely downward from a vicinity of the seams 4c of the seat back 4 toward the front end of the seat cushion 3, and the seat back abutting part 22 of the upper end (a rear end) of the frame 11, which is formed by the main frame 15 and the sub frame 16, abuts against the upper end part of the seat back 4.

The legs 12 extend downward along the front end of the seat cushion 3 from the front end of the frame 11, and their lower ends each having the height adjustment screw 13 abut against the vehicle body floor 6. Basically, each leg 12 is set to a vertical attitude on the vehicle body floor 6.

Arrows F1, F2 and F3 in FIG. 10 indicate loads that occur at support points by tightening of the belts 25. The frame 11 is drawn (or pulled) obliquely downward as indicated by the arrow F1 by tightening of the belts 25 that are linked to or engaged with the belt linkage beams 17 of the frame 11. By this tensile force (tension or tractive force), as indicated by the arrow F2, the legs 12 are pressed against the vehicle body floor 6. Further, as indicated by the arrow F3, the seat back abutting part 22 of the upper end (the rear end) of the frame 11 is pressed against the upper end part of the seat back 4. The frame 11 including the main frame 15 and the belt linkage beams 17 is not supported by the seat cushion 3. That is, the frame 11 is fixed by a total of three points, i.e. two points of each leg 12 and the seat back abutting part 22 and a point of application of the tension of each belt 25 (i.e. a vicinity of the vertex angle of each belt linkage beam 17) in the middle of these two points.

As is clear from FIG. 10, the tension application point of the belt 25 (the vertex angle of the belt linkage beam 17) is positioned in the substantially middle of a line (a virtual straight line) connecting the lower end of the leg 12 and the seat back abutting part 22 which are fixing points to the vehicle, and also the tensile force of the belt 25 is exerted in a direction substantially orthogonal to the line (the virtual straight line). The frame 11 is therefore efficiently and firmly supported and fixed.

The seat cushion 3 generally has a flexible structure to ensure ride comfort. In comparison to this, the seat back 4 has a firm structure to ensure load capacity (or withstand load) at a collision. Therefore, by adequately tightening the belts 25, a large tensile load can be applied. Further, as compared with a case where the frame 11 (the automatic vehicle driving device 1) is mounted on the seat cushion 3, the frame 11 can be firmly supported.

As shown in FIG. 3, a load of the whole automatic vehicle driving device 1 including the transmission actuator unit 131 and the pedal actuators 41 etc. is also exerted on two positions of each of the legs 12 and the seat back abutting part 22, but is not exerted on the seat cushion 3. In other words, the load of the automatic vehicle driving device 1 is supported or borne by and at two positions of the vehicle body floor 6 and the seat back 4. As mentioned above, since the seat back 4 has the firm structure, the automatic vehicle driving device 1 is surely supported, and vibrations of the automatic vehicle driving device 1 due to vibrations of the vehicle during the running test and shift (or movement or deviation) of position of the automatic vehicle driving device 1 due to reaction forces occurring when actuating the various actuators are suppressed. For instance, as can be understood from FIG. 3, since although the reaction forces of the pedal actuators 41 upon working of the pedal actuators 41 are exerted in an obliquely upward direction, the seat back abutting part 22 is substantially located on and along its reaction force exerting line, the reaction forces are surely borne by the firm seat back 4.

[Configuration and Sliding Mechanism of Connection Box Unit 101]

Figure 11:
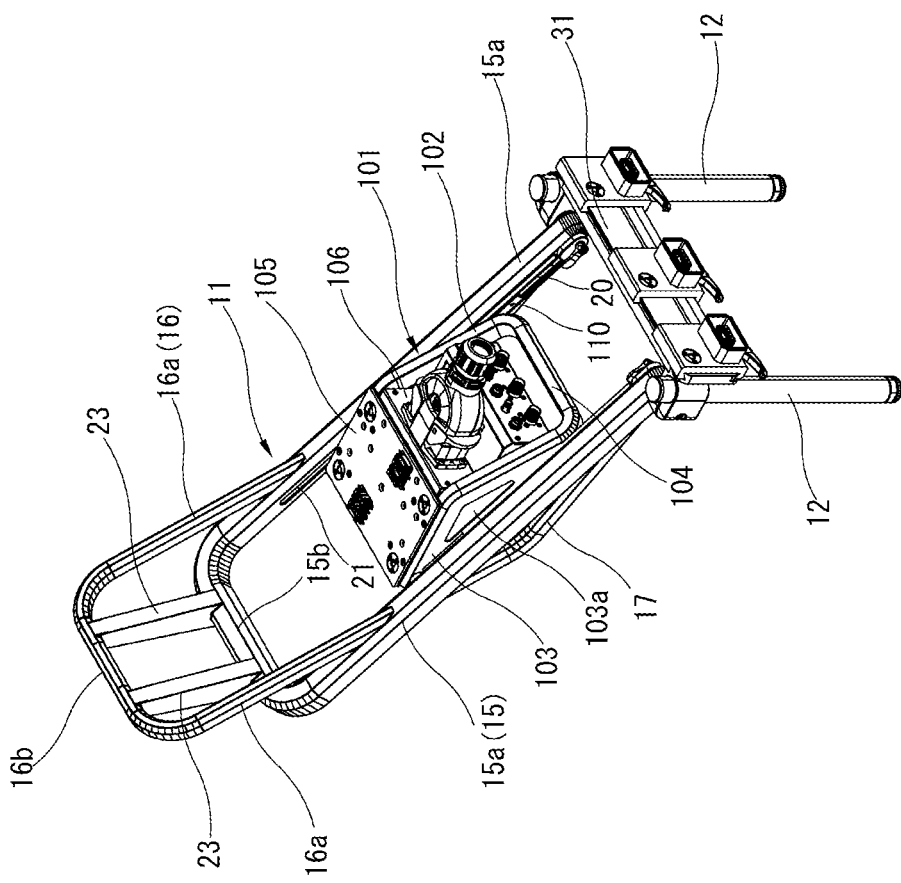
FIG. 11 is a perspective view showing a state in which a connection box unit is mounted on the frame.
Figure 12:
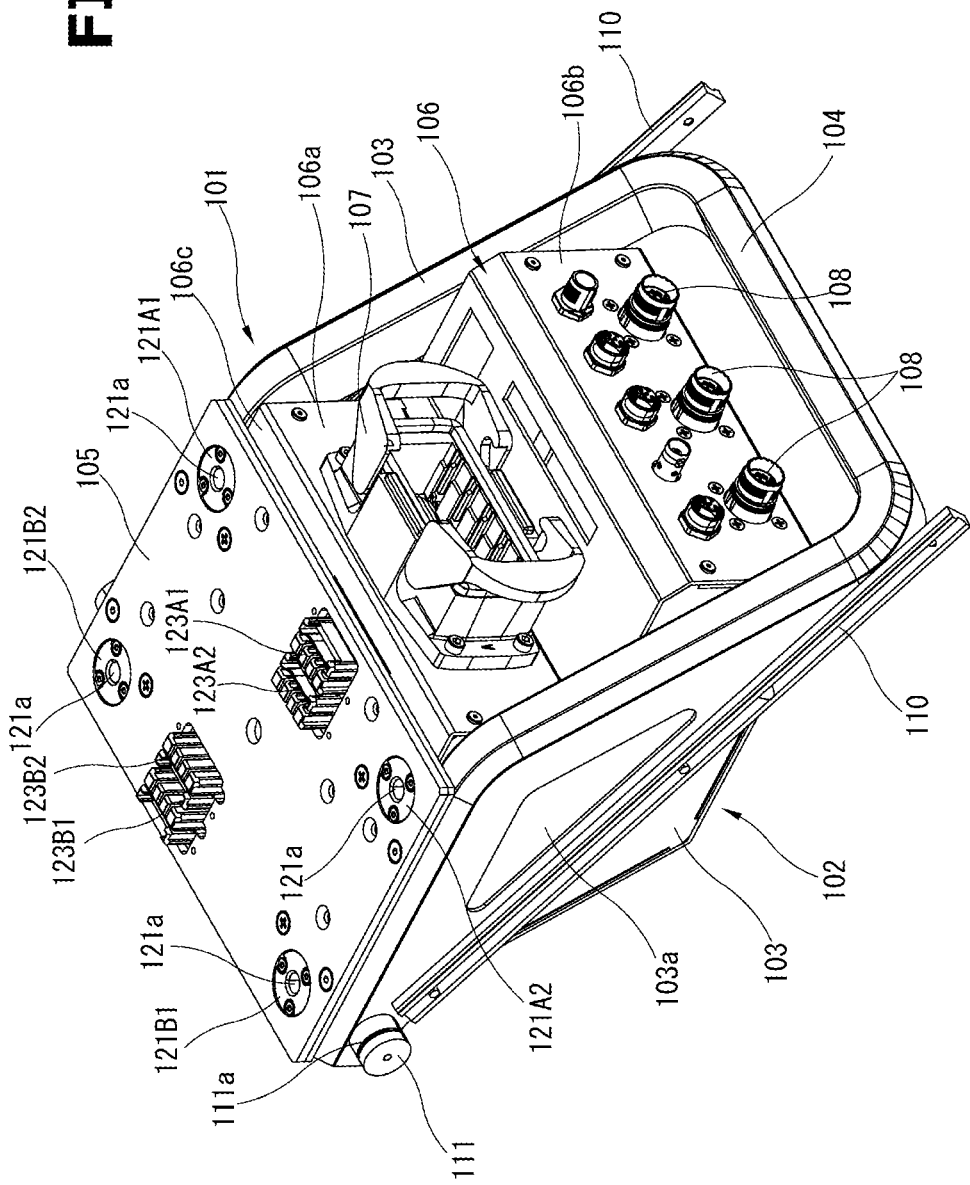
FIG. 12 is a perspective view showing the connection box unit alone.
Figure 13:
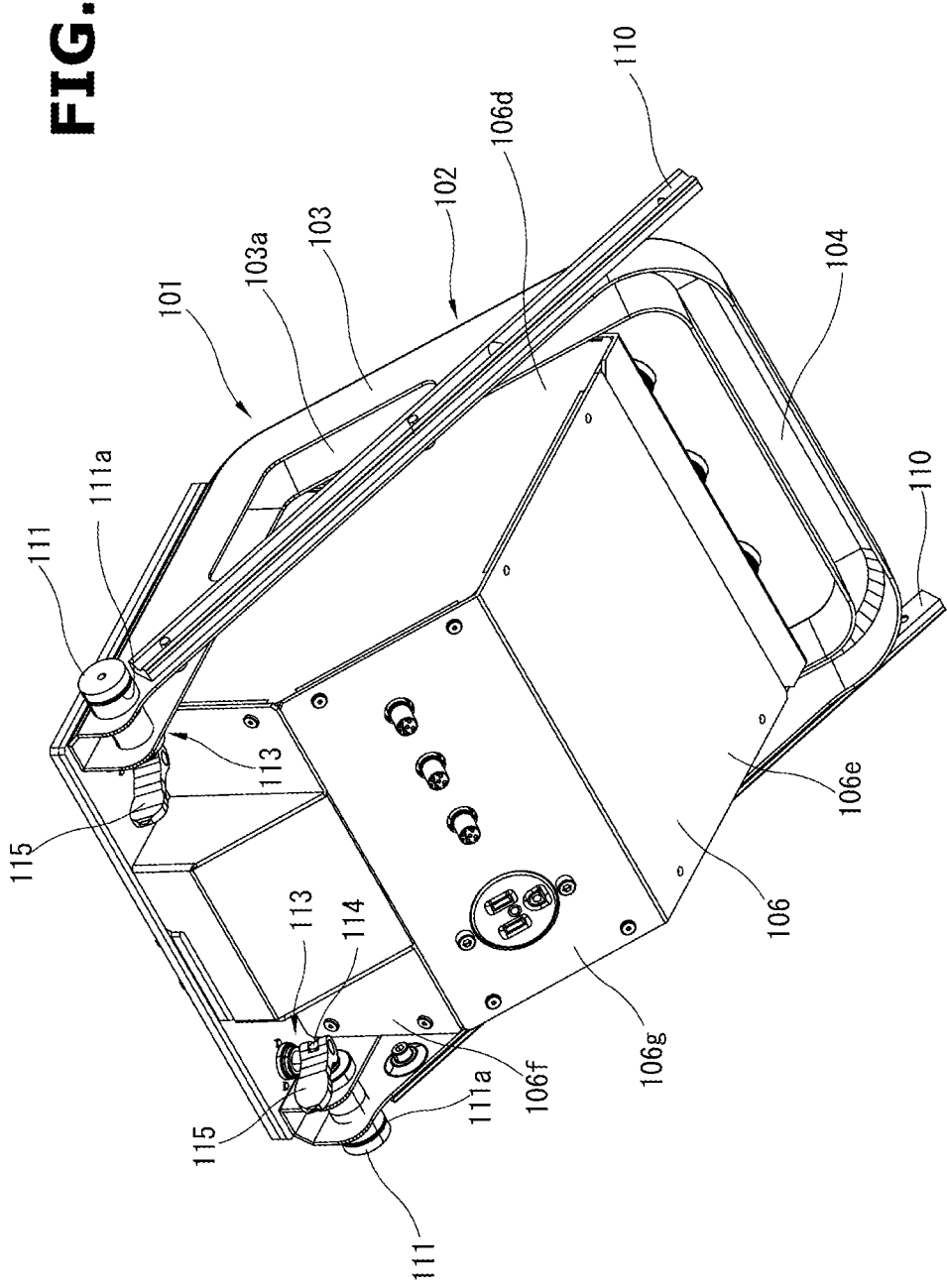
FIG. 13 is a perspective view, viewed from below, of the connection box unit.

FIG. 11 shows a state in which the connection box unit 101 is mounted on the frame 11. FIGS. 12 and 13 show the connection box unit 101 alone.

As shown in FIG. 11, the connection box unit 101 is placed at an inner side of the frame 11. More specifically, the connection box unit 101 is placed between the pair of parallel straight main beams 15a.

As shown in FIGS. 12 and 13, the connection box unit 101 has a connection box frame 102 supported by the pair of main beams 15a, a rigid actuator support plate 105 positioned at an upper end of this connection box frame 102 and a connection box 106 accommodated in a rectangular space defined by the connection box frame 102 and the actuator support plate 105.

The connection box frame 102 is a frame formed in whole as an integral component using e.g. carbon fiber reinforced plastics (CFRP), like the frame 11. The connection box frame 102 is formed from a pair of right and left side frames 103 forming side surfaces of the connection box frame 102 and a bar-shaped grip part 104 extending in the vehicle width direction so as to connect front ends of these two side frames 103. Each of the side frames 103 has a substantially triangular shape whose vertex angle is an obtuse angle in side view. That is, the side frame 103 has a substantially triangular shape having one side that is basically horizontal in the vehicle-mounted state, the other side that extends obliquely downward from a front end of this one side and a base that extends obliquely along the main beam 15a. Then, a triangular window 103a that is a similar figure of this triangle is open at each side frame 103. The grip part 104 has such a thickness that an operator or a workman can carry the connection box unit 101 by griping the grip part 104. Therefore, the connection box frame 102 has a substantially U-shape formed by connecting end portions of the pair of parallel-positioned side frames 103 through the grip part 104 in plan view.

Further, as shown in FIG. 13, the connection box frame 102 is molded such that each part of the side frames 103 and the grip part 104 has a substantially U-shape in cross section. In other words, each part of the connection box frame 102 has a hollow shape whose lower surface (back surface) side is open.

Sliders 110 extending straight along the base of the above-mentioned triangle are fixed to respective outer side surfaces of the pair of side frames 103. Each slider 110 has a cross section by which the slider 110 can be slidably combined with the guide rail 20 provided at the inner side surface of the main beam 15a.

Further, rollers 111 are provided at respective rear end portions of the pair of side frames 103 with the rollers 111 being adjacent to respective upper ends (respective rear ends) of the bar-shaped sliders 110. The roller 111 is a roller that is combined with the above-mentioned guide slit 21 provided at the inner side surface of the main beam 15a, and a groove 111a in the middle in an axial direction of the roller 111 is fitted in the guide slit 21. Each roller 111 has a lock mechanism 113 structured from a lock pin 114 serving as a rotation axis and a lock lever 115. When bringing this lock mechanism 113 to a locked state, a distance of the groove 111a of the roller 111 becomes narrow, and roller portions on both sides of the groove 111a tightly sandwich, in the axial direction, a side wall of the main beam 15a having the guide slit 21, then movement and rotation of the roller 111 with respect to the guide slit 21 are stopped. A position of the connection box frame 102, i.e. a position of the connection box unit 101, with respect to the frame 11 is fixed. On the other hand, when unlocking the lock mechanism 113, the roller 111 can move along the guide slit 21 while freely rotating, and the slider 110 is also guided by the guide rail 20, then the connection box unit 101 can be slid upward and downward (i.e. forward and backward). The lock levers 115 of the lock mechanisms 113 are provided at opposing inner sides of the pair of side frames 103. However, since the lock levers 115 are positioned at a rear end portion of the connection box frame 102 and at an upper side of the connection box frame 102, the operator or the workman can easily reach the lock levers 115 from the outside.

The actuator support plate 105 formed of metal plate has a rectangular shape in plan view. The actuator support plate 105 is set along the horizontal one sides of the triangular side frames 103. The actuator support plate 105 is fixed to upper surfaces of the side frames 103, and couples the pair of parallel-positioned side frames 103.

As described later, the transmission actuator unit 131 is detachably mounted on an upper surface of the actuator support plate 105. For mounting this transmission actuator unit 131, grommets 121 each having a lock hole 121a are embedded in the actuator support plate 105 at four corners of the rectangular actuator support plate 105. The grommets 121 include a pair of front side grommets 121A1 and 121A2 and a pair of rear side grommets 121B1 and 121B2. Since these grommets have the same structure, when there is no need to distinguish these grommets, they are collectively called the grommets 121.

The actuator support plate 105 is provided with transmission actuator unit connectors 123 for electrically connecting with the transmission actuator unit 131. The transmission actuator unit connectors 123 include front side connectors 123A1 and 123A2 formed by combination of the first connector 123A1 and the second connectors 123A2 and rear side connectors 123B1 and 123B2 formed by combination of the first connector 123B1 and the second connectors 123B2. The front side connectors 123A1 and 123A2 are located at a front side of the actuator support plate 105, and positioned between the pair of front side grommets 121A1 and 121A2. The rear side connectors 123B1 and 123B2 are located at a rear side of the actuator support plate 105, and positioned between the pair of rear side grommets 121B1 and 121B2. Since these connectors have the same structure, when there is no need to distinguish these connectors, they are collectively called the transmission actuator unit connectors 123. As the transmission actuator unit connector 123, a connector structured such that a terminal strip protrudes upward from the upper surface of the actuator support plate 105 (i.e. from a fixing surface of the transmission actuator unit 131) and the terminal strip is in a floating state to allow some position shift (or some deviation of position) from the other mating side is used.

The front side grommets 121A1 and 121A2 and the front side connectors 123A1 and 123A2 located at the front side of the actuator support plate 105 and the rear side grommets 121B1 and 121B2 and the rear side connectors 123B1 and 123B2 located at the rear side of the actuator support plate 105 are symmetrical about a center, as a symmetrical point, of the rectangular actuator support plate 105. That is, when the actuator support plate 105 is turned 180 degrees, arrangement and configuration of these grommets and connectors overlap each other.

The connection box 106 is a box that forms, as described above, the connection unit between the variety of actuators etc. and the variety of sensors etc. and the cable (including the power supply system and the signal system) drawn into the vehicle from the external controller placed outside the vehicle. The connection box 106 has an upper box 106a located immediately below the actuator support plate 105 and a lower box 106b overhanging forward from the upper box 106a so as to have a stepped shape at a front side of the connection box 106. Here, as shown in FIG. 13, the connection box 106 as a whole is one box-shaped casing. That is, the connection box 106 has a ceiling wall 106c, a pair of side walls 106d, a bottom wall 106e, a rear wall 106f corresponding to a back portion of the upper box 106a and a sloping wall 106g corresponding to a back portion of the lower box 106b. The ceiling wall 106c is secured to the actuator support plate 105, then the connection box 106 is supported by the connection box frame 102. Therefore, the ceiling wall 106c and the bottom wall 106e are basically on or along a horizontal plane.

On a front surface of the upper box 106a, a main connector 107 to which a relatively large-sized centralized connector (or a relatively large-sized integrated connector) (denoted by a reference sign 116 in FIG. 1 etc.) of a top end of the cable drawn into the vehicle from the external controller is connected is provided. On a front surface of the lower box 106b, a plurality of relatively small-sized connectors such as pedal connectors 108 to which the cables (not shown) leading to the pedal actuators 41 are connected are arranged. As shown in FIG. 13, several connecters are also provided on the back surface of the connection box 106. It is noted that in order to prevent interference with the cables connected to the connection box 106, the grip part 104 is located at a relatively lower side with respect to the bottom wall 106e of the connection box 106.

Figure 1:
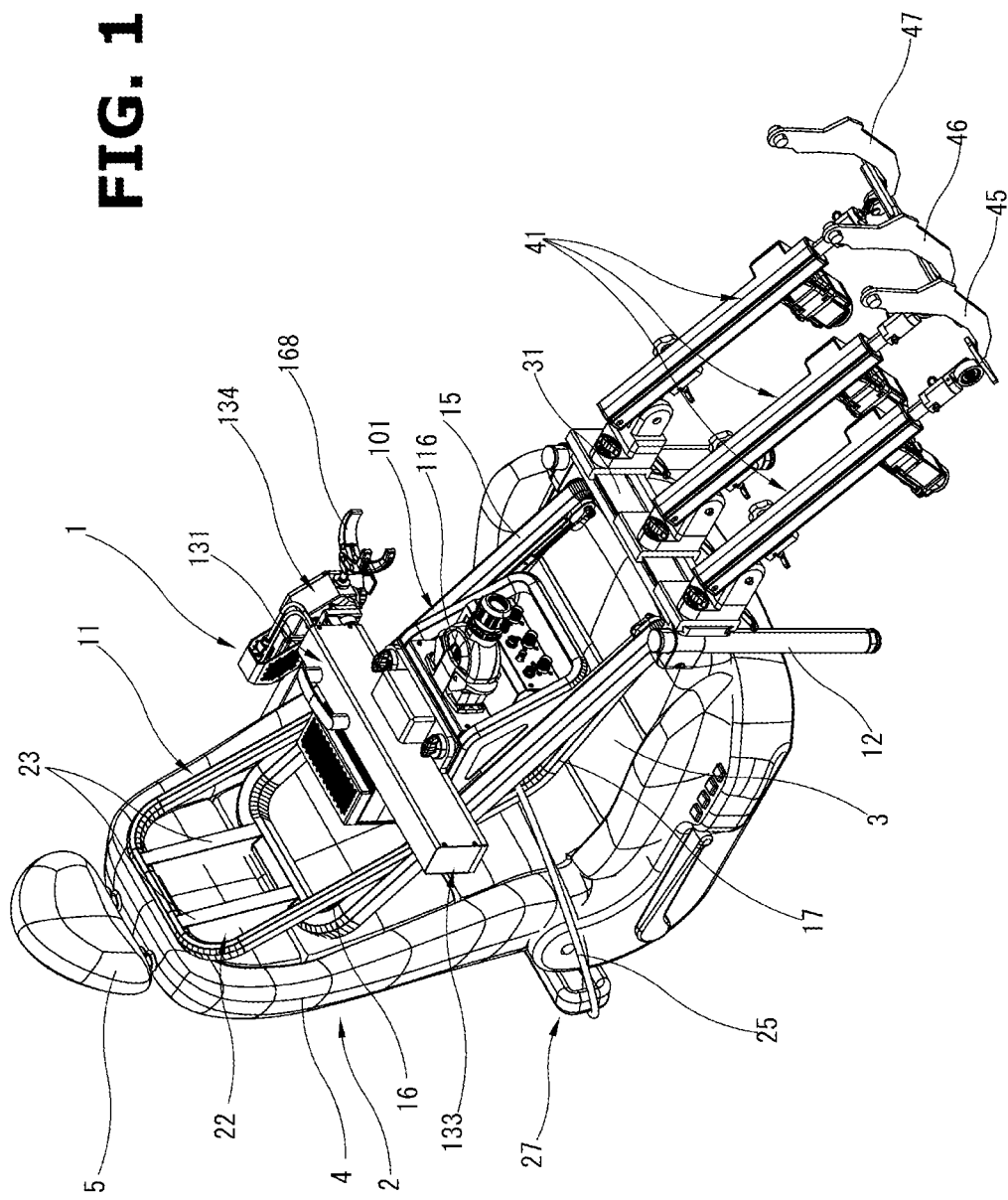
FIG. 1 is a perspective view showing a state in which an automatic vehicle driving device of the present invention is mounted on a driver's seat.
Figure 14:
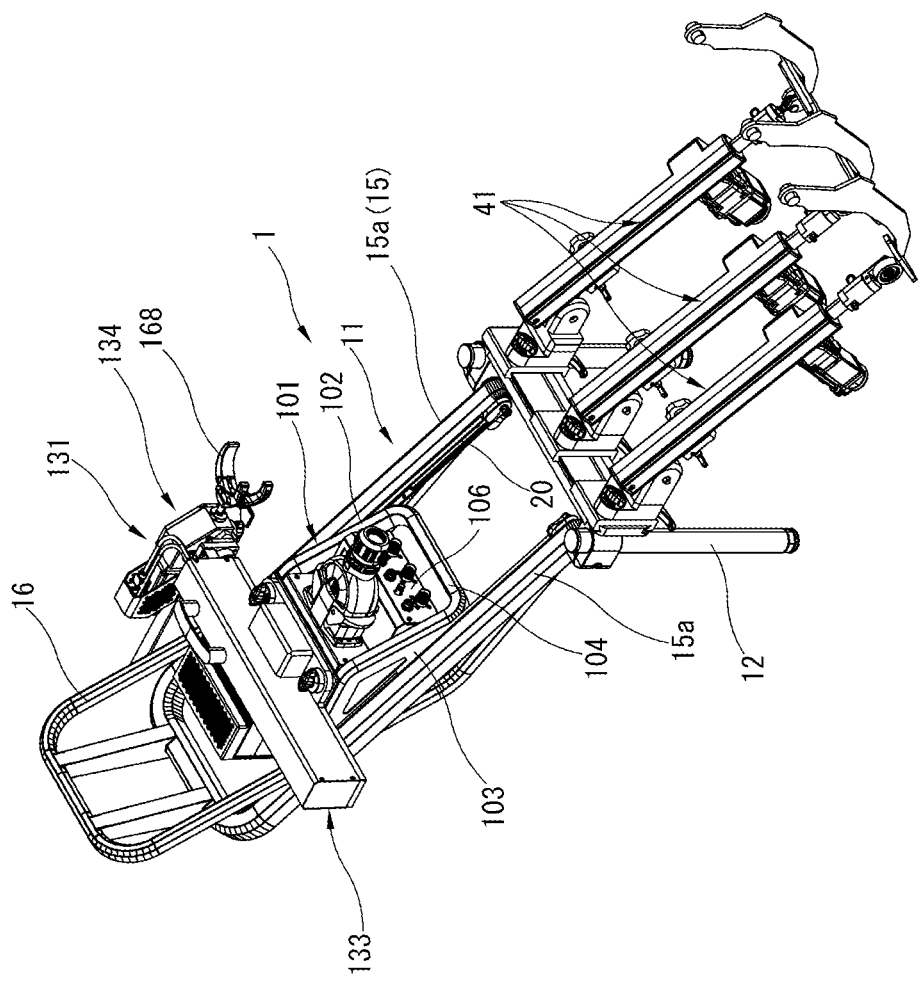
FIG. 14 is a perspective view of the automatic vehicle driving device when the connection box unit is located at a high position.
Figure 15:
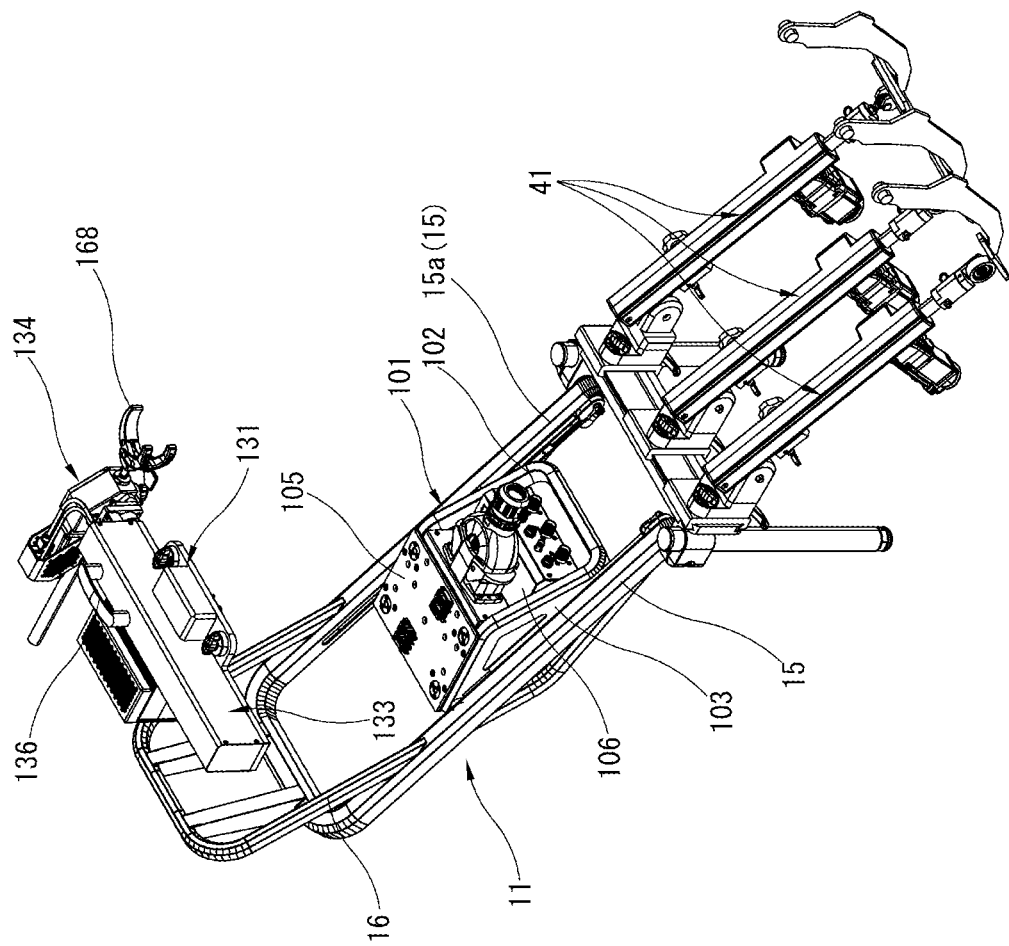
FIG. 15 is an exploded perspective view showing a state in which a transmission actuator unit is dismounted from the connection box unit.

FIG. 14 shows a state in which the transmission actuator unit 131 is mounted on the upper surface of the connection box unit 101. FIG. 14 is a drawing for describing a position adjustment of the connection box unit 101 with respect to the frame 11. As described above, the connection box unit 101 can be slid upward and downward (i.e. forward and backward) along the main beams 15a of the frame 11. FIG. 14 illustrates a state in which the connection box unit 101 is set to a relatively high position. FIGS. 1 and 15 illustrate a state in which the connection box unit 101 is set to a relatively low position. With such position adjustment of the connection box unit 101, a height position of the transmission actuator unit 131, i.e. a basic height position of the grip hand 168, is changed, thereby widely meeting the shift lever whose height and/or length are different depending on the vehicle types.

Here, when the position of the connection box unit 101 is set to be high as shown in FIG. 14, the transmission actuator unit 131 is located at a relatively backward position, whereas when the position of the connection box unit 101 is set to be low as shown in FIG. 1 etc., the transmission actuator unit 131 is located at a relatively forward position. However, such change of forward- and -backward direction can be absorbed by setting of an initial position of the shifting actuator 134 that moves (actuates) in the forward and backward directions. For instance, in a case where a fore-and-aft position of the shift lever in the vehicle in the case of FIG. 14 is the same as that in the case of FIG. 1, if the position of the connection box unit 101 is set to be high as shown in FIG. 14, a distance to the shift lever is relatively long. However, in this case, a position at which the grip hand 168 protrudes relatively long is set to a reference position of the control, thereby readily meeting such case.

As described later, in the shown embodiment, the shifting actuator 134 can pivot (or rotate or tilt) upward and downward relative to the selecting actuator 133. Therefore, also with this upward-and-downward rotation, it is possible to meet some difference in height position of the shift lever head.

The upward-and-downward and forward-and-backward position adjustment of the connection box unit 101 (i.e. the upward-and-downward and forward-and-backward position adjustment of the transmission actuator unit 131) described above can be performed with the automatic vehicle driving device 1 remaining mounted above the driver's seat 2 as shown in FIG. 1 etc. Therefore, work accompanied by trial and error can be eliminated, and the adjustment can be readily performed so as to optimize a positional relationship with the shift lever after mounting the automatic vehicle driving device 1 in the vehicle.

[Configuration and Attachable-and-Detachable Structure of Transmission Actuator Unit 131]

The transmission actuator unit 131 has a structure by which the transmission actuator unit 131 can be easily attached to and detached from the connection box unit 101. Further, by reversing a mounting attitude of the transmission actuator unit 131 (the orientation of the transmission actuator unit 131 in a fore-and-aft direction) 180 degrees with respect to the connection box unit 101, the transmission actuator unit 131 can readily meet the so-called right-hand drive vehicle and the so-called left-hand drive vehicle.

Figure 16:
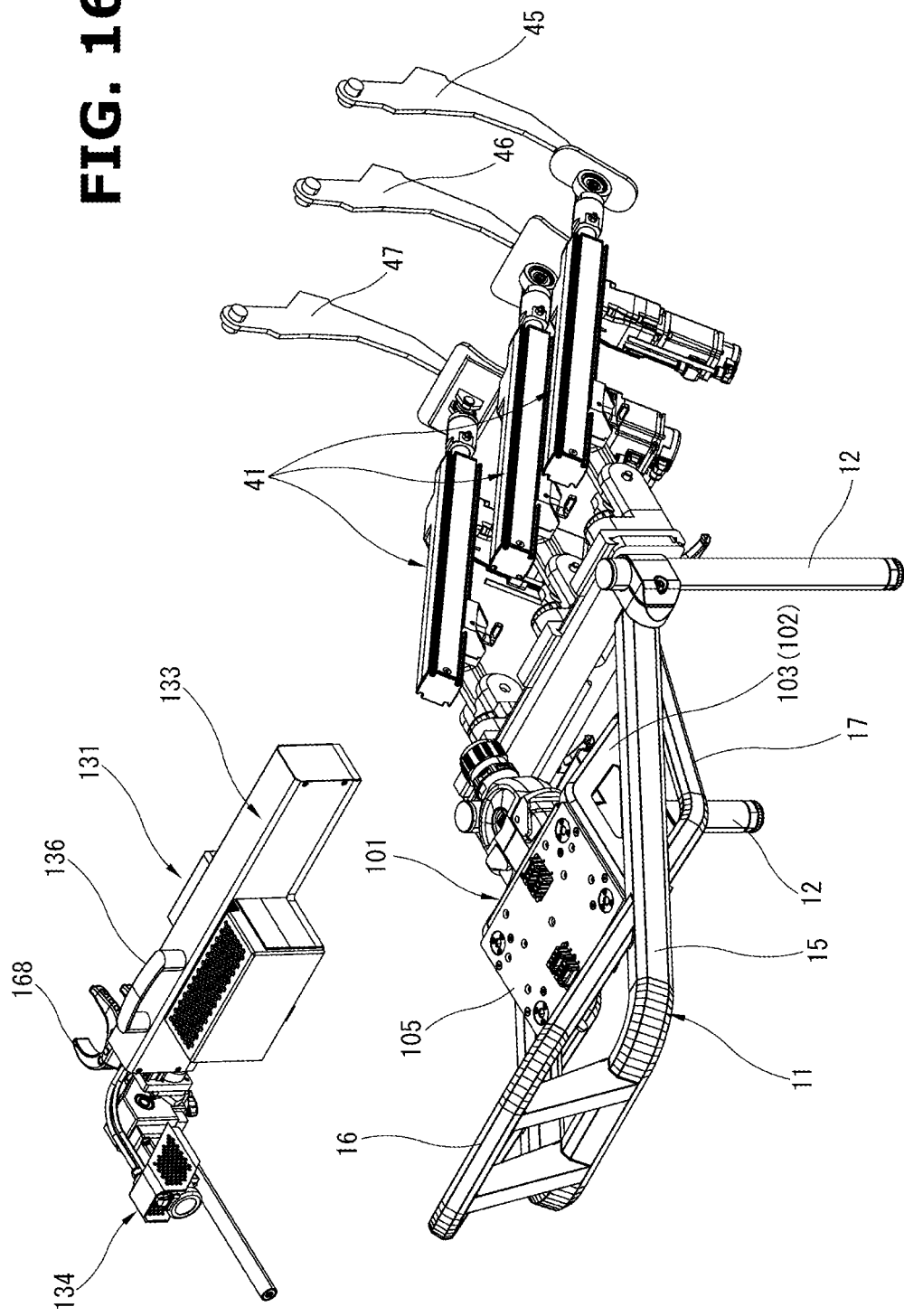
FIG. 16 is an exploded perspective view, viewed from a different direction from FIG. 15.
Figure 19:
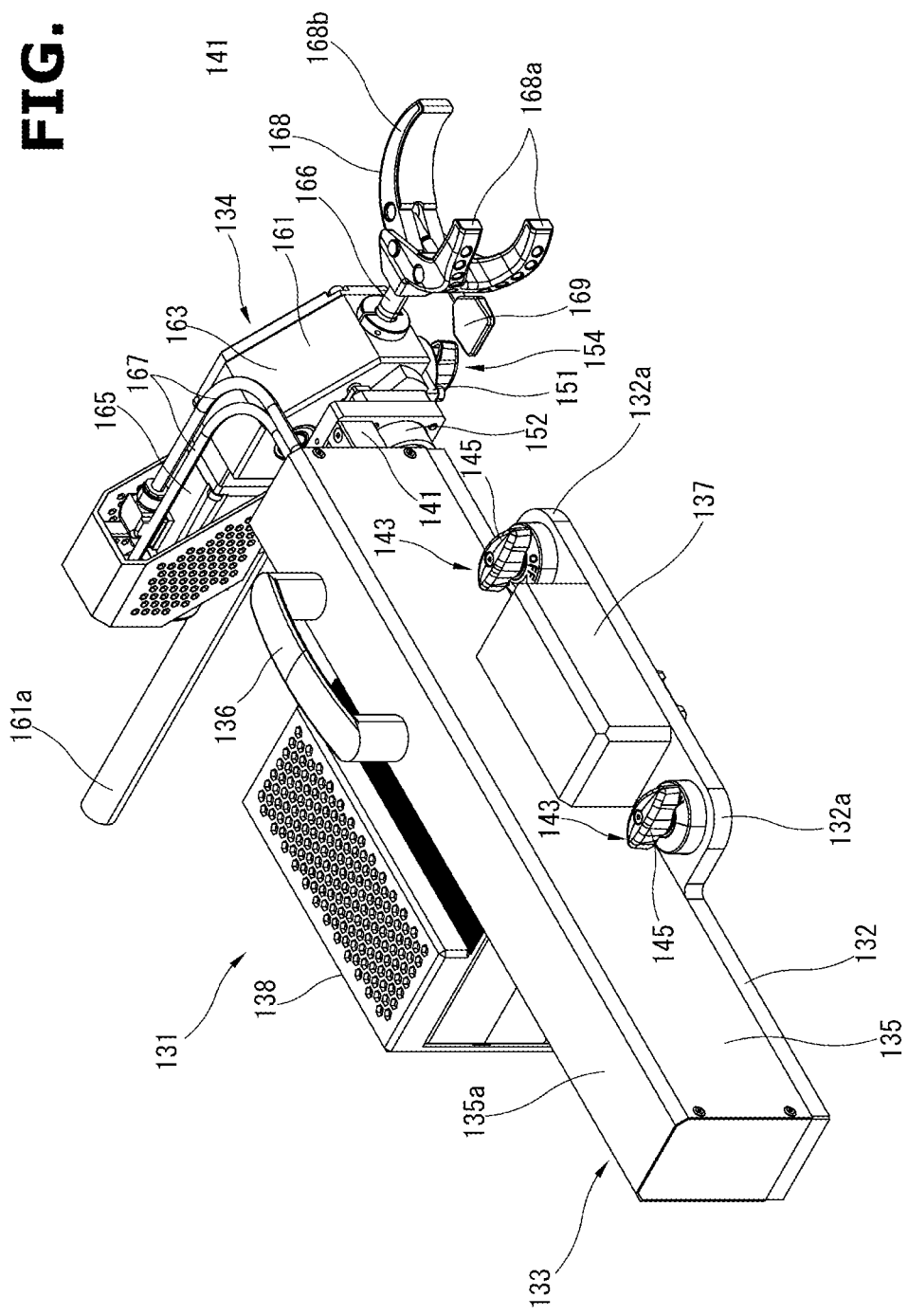
FIG. 19 is a perspective view of the transmission actuator unit.
Figure 20:
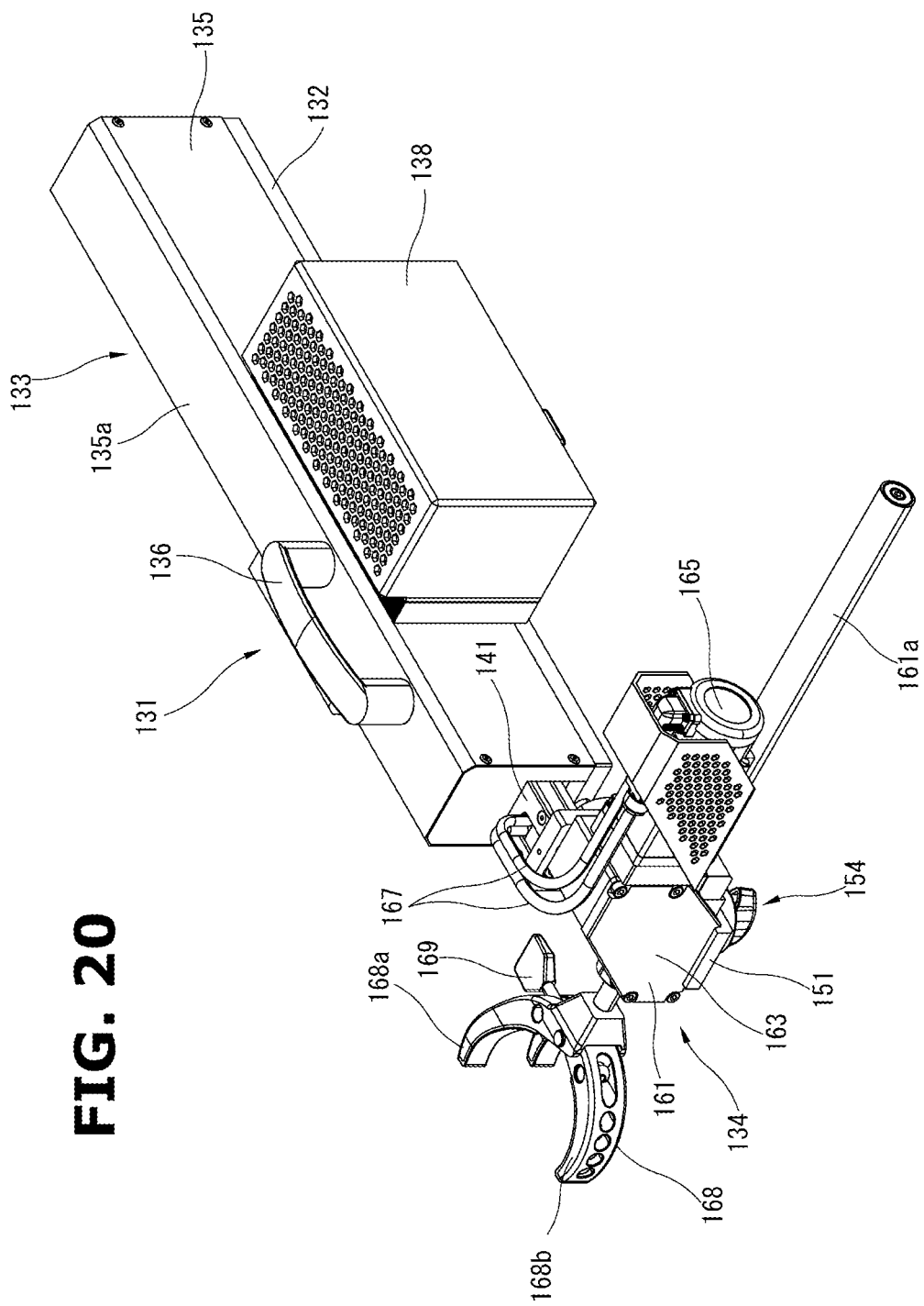
FIG. 20 is a perspective view, viewed from a different direction from FIG. 19.
Figure 21:
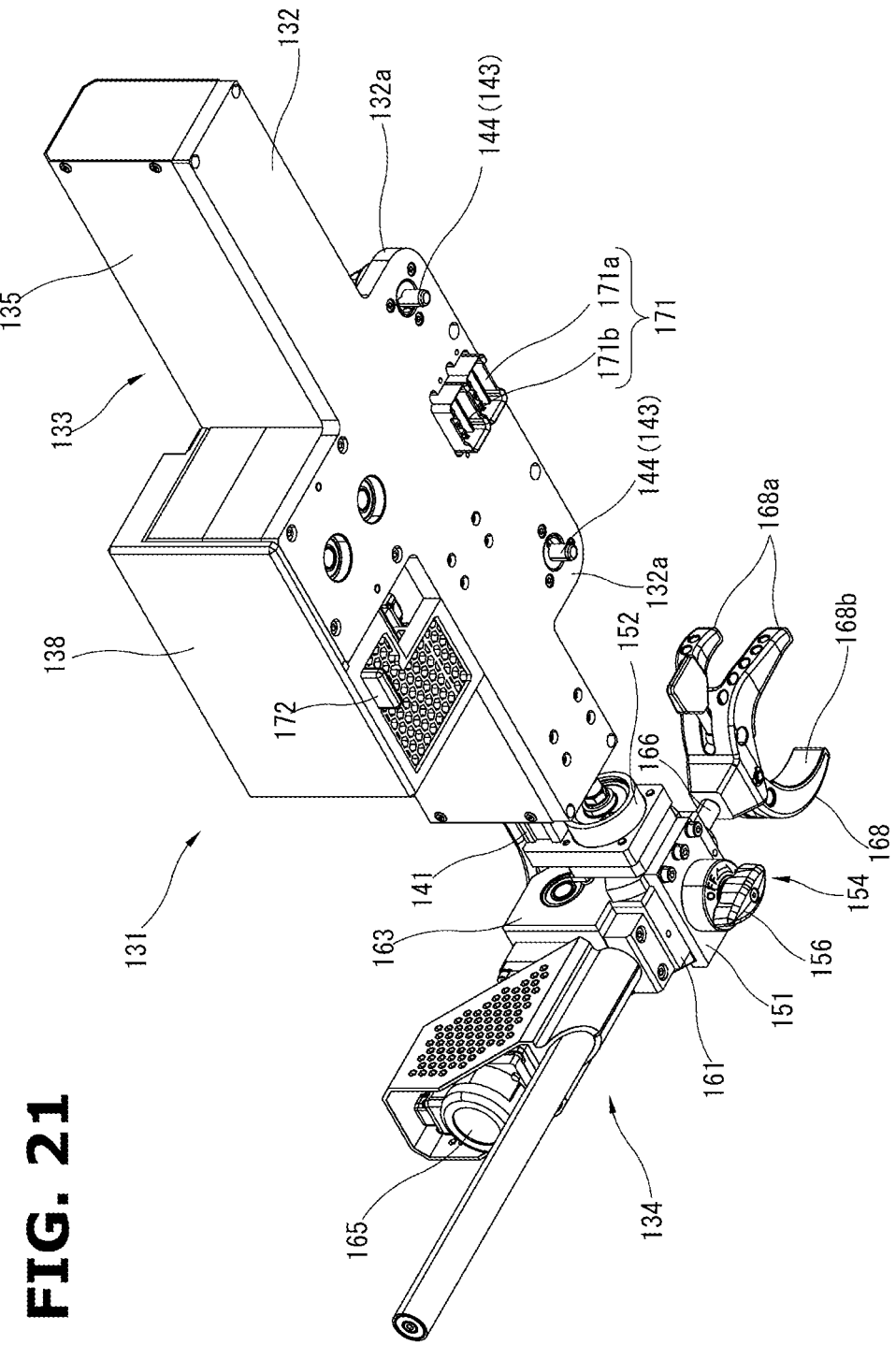
FIG. 21 is a perspective view, viewed from below, of the transmission actuator unit.

FIGS. 15 and 16 show a state in which the transmission actuator unit 131 is detached or dismounted from connection box unit 101. FIGS. 19 to 21 show the detached transmission actuator unit 131 alone.

As mentioned above, the transmission actuator unit 131 has the configuration of the combination of the selecting actuator 133 performing the selecting operation of the shift lever along the vehicle width direction and the shifting actuator 134 performing the shifting operation of the shift lever along the vehicle longitudinal direction.

The transmission actuator unit 131 has a relatively thick base plate 132 having high rigidity. The selecting actuator 133 is configured on this base plate 132. The selecting actuator 133 has an actuator housing 135 having a long narrow box shape extending along the vehicle width direction, and this actuator housing 135 is fixed onto the base plate 132. The selecting actuator 133 further has a box-shaped connector cover 137 on one side of the actuator housing 135, which is adjacent to the middle in a longitudinal direction of the actuator housing 135, and a box-shaped motor cover 138 on the other side of the actuator housing 135, which is also adjacent to the middle in the longitudinal direction of the actuator housing 135. The base plate 132 is shaped into a flat plate, and has, as shown in FIG. 21 etc., an outside shape that is drawn substantially along outlines of outer peripheries of three of the actuator housing 135, the connector cover 137 and the motor cover 138. That is, the base plate 132 has a shape whose both ends in its longitudinal direction are narrow in width (in size in the vehicle longitudinal direction) and whose middle is wide in width. Here, an electric motor and a geared speed reducer (both not shown) are accommodated in the motor cover 138, and as shown in FIG. 21, a part of the base plate 132 which corresponds to a lower surface of the electric motor is cut out, and a bottom surface of the motor cover 138 which is formed by a mesh structure having a number of air vents is exposed. A number of air vents are also provided and open on an upper surface of the motor cover 138.

The selecting actuator 133 is a rack-and-pinion type linear-motion actuator in which a rack shaft 141 serving as an actuator rod moves in the vehicle width direction by working of the electric motor and the speed reducer. In a retracting state of the rack shaft 141, almost entire rack shaft 141 is accommodated in the actuator housing 135, but only a top end portion of the rack shaft 141 protrudes from one end (which is on a left-hand side when the connector cover 137 faces toward the front side of the vehicle) of the actuator housing 135. As described later, the shifting actuator 134 is supported by this top end portion of the rack shaft 141. In the case of the so-called right-hand drive vehicle shown in FIG. 1 etc., the shifting actuator 134 is located on a left-hand side with respect to the frame 11 situated above the driver's seat 2 and connection box unit 101. It is noted that in order to achieve an accurate linear motion of the rack shaft 141 while bearing a load of the shifting actuator 134, the rack shaft 141 is guided by a guide mechanism (not shown) provided in the actuator housing 135.

Figure 17:
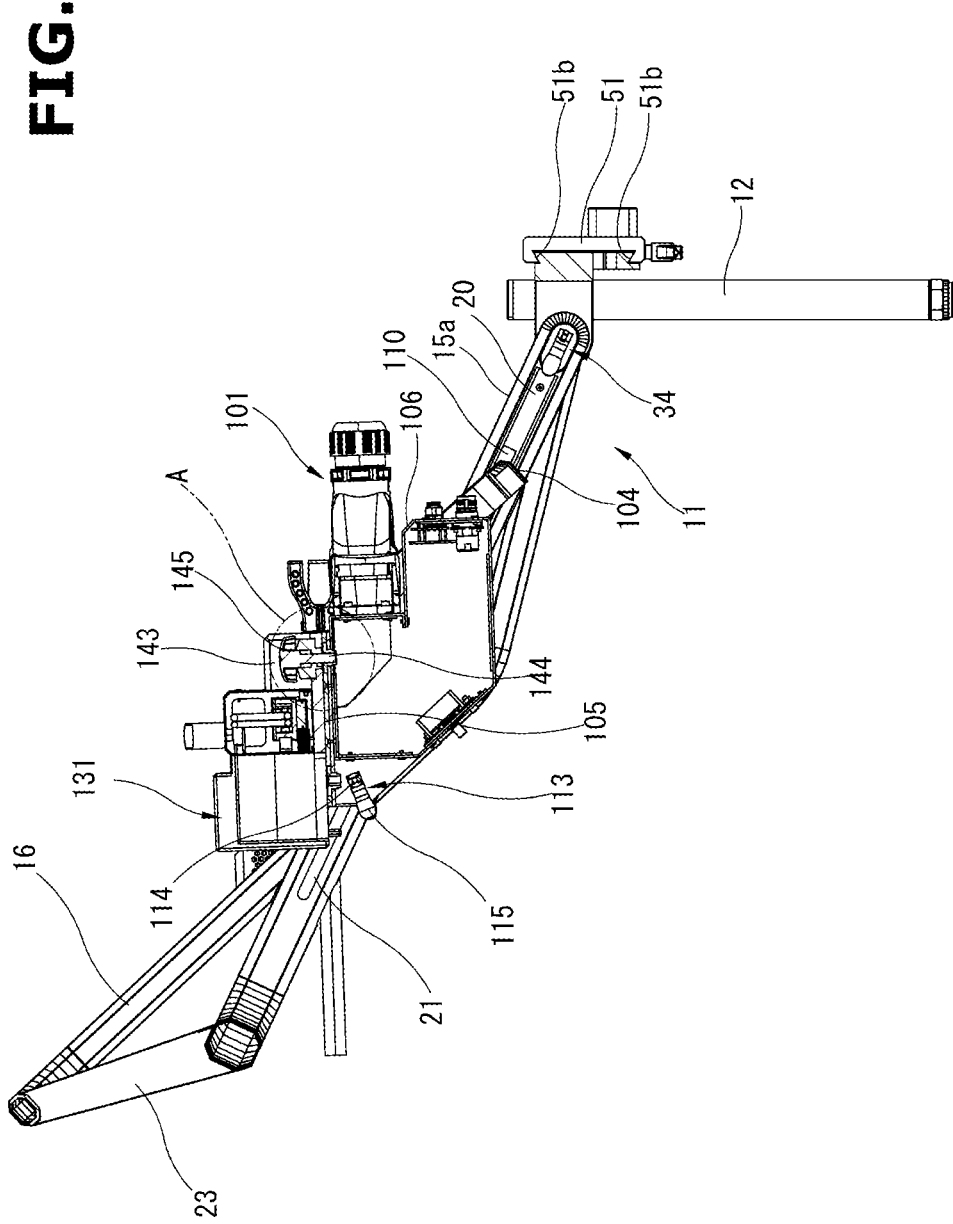
FIG. 17 is a sectional view of the transmission actuator unit and the connection box unit.
Figure 18:
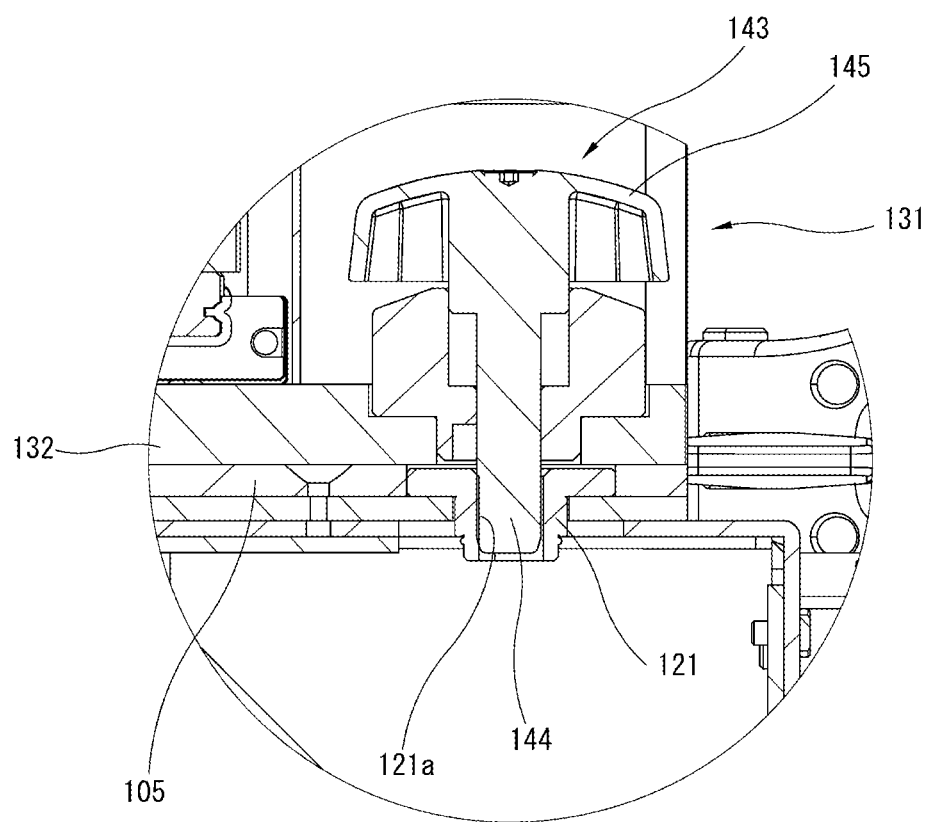
FIG. 18 is an enlarged sectional view of an A-part of FIG. 17.

As shown in FIGS. 19 and 21, at both sides (both sides in the vehicle width direction) of the connector cover 137, the base plate 132 extends or protrudes from the outlines of the actuator housing 135 and the connector cover 137, and a pair of extending parts 132a are formed. Then, each of the pair of extending parts 132a is provided with a lock pin 144 that forms a lock mechanism 143 together with the above-mentioned grommet 121 of the actuator support plate 105 on the connection box unit 101 side. A lower end portion of the lock pin 144 protrudes downward from the surface of the base plate 132. The lock pin 144 has, at an upper end portion thereof, a knob 145 for a turning operation by hand or with fingers. The lock mechanism 143 is a general-purpose screw type mechanism (see FIGS. 17 and 18) which, by turning the lock pin 144 inserted into the lock hole 121a of the grommet 121 certain degrees (e.g. 90 degrees or 180 degrees), performs locking accompanied by tightening in an axial direction of the lock pin 144.

As shown in FIGS. 15 and 16 etc., in case of the so-called right-hand drive vehicle, the pair of lock pins 144 are engaged with the front side grommets 121A1 and 121A2 located at the front side of the actuator support plate 105. When bringing the pair of lock mechanisms 143 to a locked state, the base plate 132 is tightened and firmly fixed to the actuator support plate 105.

As shown in FIG. 21, a connector 171 formed by combination of a first connector 171a and a second connector 171b is provided between the pair of lock pins 144. These first and second connectors 171a and 171b are connected to the transmission actuator unit connectors 123, more specifically, the front side connectors 123A1 and 123A2, of the actuator support plate 105 respectively. As described above, since the transmission actuator unit connector 123 on the actuator support plate 105 side has the structure in which the terminal strip is in the floating state, only by mounting the transmission actuator unit 131 on the actuator support plate 105 and tightening the base plate 132 and the actuator support plate 105 each other by the lock mechanisms 143, connecting of the both connectors 171 and 123 is completed.

Here, on an upper surface side of the base plate 132, this connector 171 portion is covered with the connector cover 137. Cables (not shown) leading to the connector 171 are also routed or wired through insides of the connector cover 137 and the actuator housing 135, then are not exposed to the outside.

Further, as shown in FIG. 21, on a bottom surface of the transmission actuator unit 131, a positioning tab 172 is provided at a position where the positioning tab 172 and the connector 171 (for instance, the first connector 171a) are symmetrical about a point. This positioning tab 172 is shaped like a tongue shape and protrudes downward from a lower surface of the base plate 132. Then, when the transmission actuator unit 131 is mounted in the case of the so-called right-hand drive vehicle, the positioning tab 172 is engaged with an inner side of the rear side connector 123B1 or 123B2 (for instance, the first connector 123B1) of the actuator support plate 105. With this engagement of the positioning tab 172 with the rear side connector 123B1, positioning of the transmission actuator unit 131 is further facilitated when performing mounting work of the transmission actuator unit 131, and also position shift etc. of the transmission actuator unit 131 in a mounted state are suppressed. In the shown example, the positioning tab 172 is formed at a lower surface part of the motor cover 138 formed by the mesh structure.

As shown in FIGS. 5 and 6 etc., in the state in which the transmission actuator unit 131 is mounted on the actuator support plate 105, an outside shape of a front edge (an edge portion on the connector cover 137 side) of the base plate 132 including the extending parts 132a substantially corresponds to a shape of a front edge of the actuator support plate 105. On a rear edge side of the actuator support plate 105, the rear side connectors 12331 and 12332, which are not used for the so-called right-hand drive vehicle, are covered with the base plate 132 of the motor cover 138 section. That is, the unused rear side connectors 12331 and 12332 are not exposed.

Both right and left end portions of the actuator housing 135, which protrude from the frame 11 in the vehicle width direction, including the base plate 132 positioned on a lower surface of the actuator housing 135 are located above the main beams 15a of the frame 11 (see FIGS. 1 and 3 etc.). It is therefore possible to slide the connection box unit 101 and the transmission actuator unit 131 upward and downward or forward and backward without interference of the main beams 15a with the actuator housing 135. It is noted that each part is set so that even at a maximum backward position of the connection box unit 101, the sub beams 16a do not interfere with the actuator housing 135.

The actuator housing 135 is provided, on an upper surface 135a thereof, with a substantially U-shaped handle 136 that can be grasped or gripped by the operator or the workman so that the operator or the workman can carry the detached transmission actuator unit 131. This handle 136 is provided at a position corresponding to a centroid position (a position of the center of mass) of the entirety of the transmission actuator unit 131 including the shifting actuator 134. Therefore, when lifting the transmission actuator unit 131 through the handle 136, the transmission actuator unit 131 does not greatly or heavily lean or tilt. This facilitates carrying work and attaching-and-detaching work of the transmission actuator unit 131 to and from the connection box unit 101.

As described above, the transmission actuator unit 131 can be detached from the connection box unit 101 only by loosening the pair of lock mechanisms 143. Conversely, the transmission actuator unit 131 can be attached (fixed) to the connection box unit 101 by mounting the transmission actuator unit 131 on the connection box unit 101 and bringing the lock mechanisms 143 to the locked state by turning the pair of lock pins 144 by hand or with fingers. Upon attaching the transmission actuator unit 131 to the connection box unit 101, electric connection by the connectors 123 and 171 is established without external cable connecting work.

Therefore, when mounting the automatic vehicle driving device 1 in the vehicle, in a state in which the transmission actuator unit 131 remains dismounted from the frame 11 (the connection box unit 101), the frame 11 is fixed and supported above the driver's seat 2, and after that, the transmission actuator unit 131 can be fixed to the connection box unit 101 in an interior of the vehicle. Conversely, when dismounting the automatic vehicle driving device 1 from the vehicle, the transmission actuator unit 131 can be easily detached on ahead. It is therefore possible to readily carry the automatic vehicle driving device 1 into and out of the vehicle interior through a door opening of the vehicle.

On the other hand, the transmission actuator unit 131 detached from the connection box unit 101 can be attached to the connection box unit 101 with the front and rear of the transmission actuator unit 131 being reversed 180 degrees (or with the transmission actuator unit 131 turned back to front by 180 degrees). This can readily meet the vehicle in which the shift-lever is on a right side of the driver's seat 2, i.e. the so-called left-hand drive vehicle.

Figure 24:
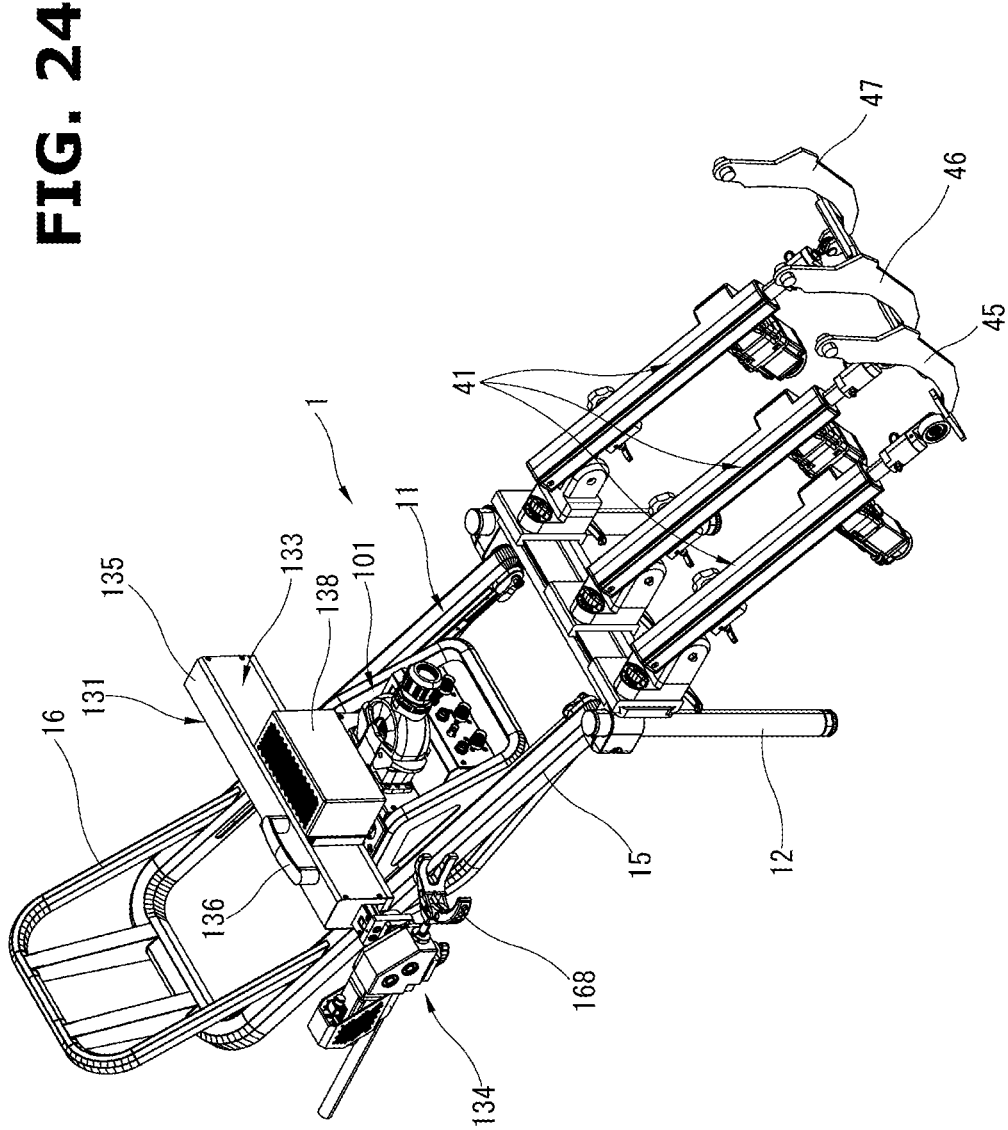
FIG. 24 is a perspective view of the automatic vehicle driving device for a left-hand drive vehicle.
Figure 25:
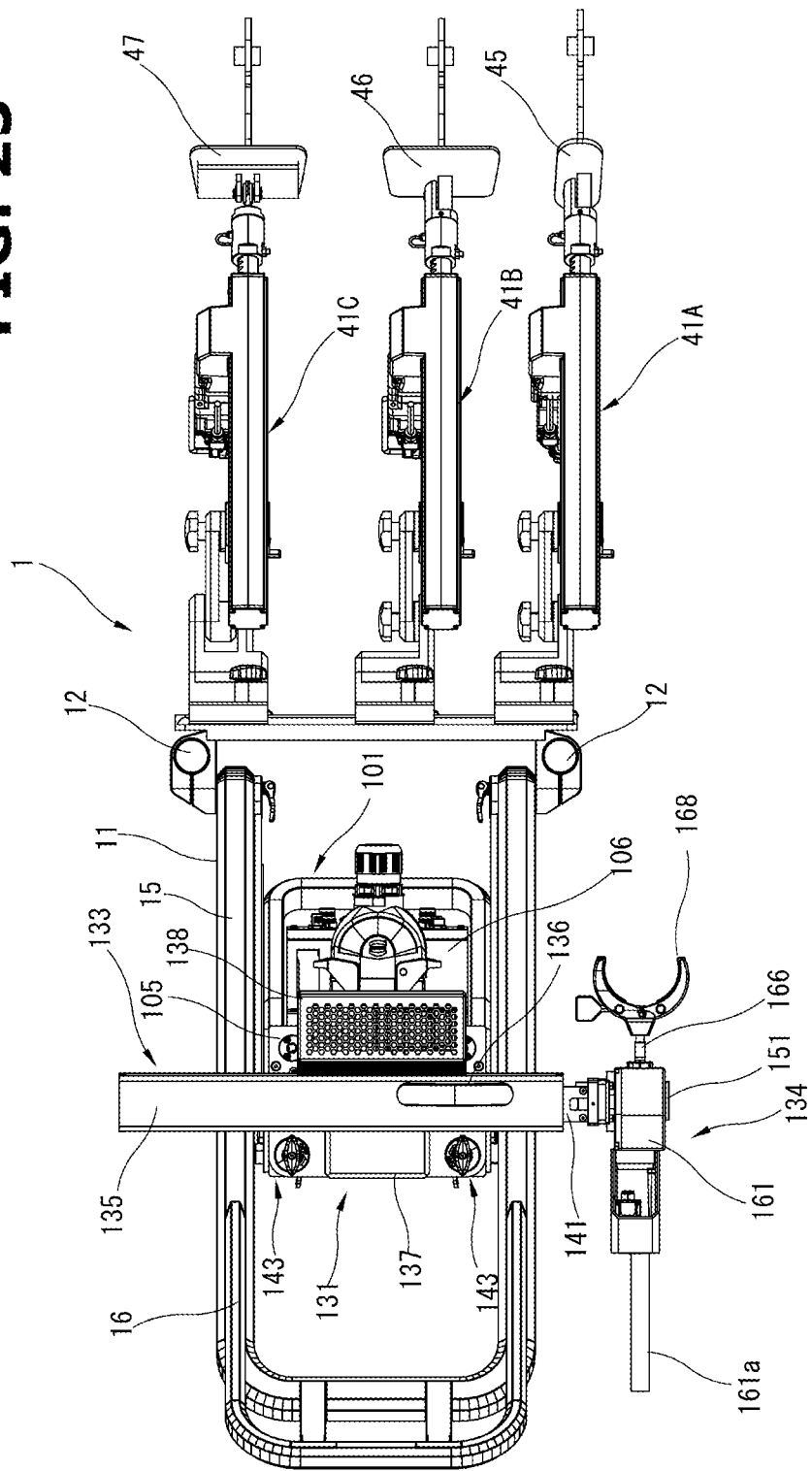
FIG. 25 is a top view of the automatic vehicle driving device for the left-hand drive vehicle.

In the case of the left-hand drive vehicle in which the mounting attitude of the transmission actuator unit 131 is reversed 180 degrees from the mounting attitude of the transmission actuator unit 131 for the right-hand drive vehicle, as shown in FIGS. 24 and 25, the motor cover 138 is located at the front side, and the connector cover 137 is located at the rear side. The pair of lock pins 144 of the transmission actuator unit 131 are engaged with the rear side grommets 121B1 and 121B2 located at the rear side of the actuator support plate 105, and locking and unlocking are done by the turning operation of the knobs 145. Further, the connector 171, i.e. the first connector 171a and the second connector 171b, on the transmission actuator unit 131 side are connected to the rear side connectors 123B1 and 123B2 of the actuator support plate 105 respectively. The positioning tab 172 protruding downward from the base plate 132 is engaged with unused front side connector 123A1 or 123A2 (for instance, the first connector 123A1) of the actuator support plate 105. These unused front side connectors 123A1 and 123A2 are covered with the base plate 132 of the motor cover 138 section, and are not exposed to the outside.

It is noted that even if the operator or the workman accidentally attempts to engage the lock mechanisms 143 of the transmission actuator unit 131 whose mounting attitude is set for the left-hand drive vehicle with the front side grommets 121A1 and 121A2, since positions of the both connectors 123 and 171 do not correspond to each other and the connectors 123 and 171 interfere with each other, mistakenly engaging the lock mechanisms 143 does not occur.

In the case of the mounting attitude of the transmission actuator unit 131 for the right-hand drive vehicle, the actuator housing 135 (the rack shaft 141) of the selecting actuator 133 is located at a rear side with respect to the pair of lock pins 144 (see FIG. 6), whereas in the case of the mounting attitude of the transmission actuator unit 131 for the left-hand drive vehicle, the actuator housing 135 (the rack shaft 141) of the selecting actuator 133 is located at a front side with respect to the pair of lock pins 144 (see FIG. 25). In the both cases of the mounting attitude, a position of a center of the rack shaft 141 of the selecting actuator 133 is the same, and does not change.

[Configuration and Attachable-and-Detachable Structure of Shifting Actuator 134]

As described above, although the shifting actuator 134 is supported by the top end portion of the rack shaft 141 of the selecting actuator 133, this shifting actuator 134 can be easily attached to and detached from the top end portion of the rack shaft 141. Further, the shifting actuator 134 is configured so that a mounting attitude of the shifting actuator 134 with respect to the selecting actuator 133 can be turned back to front. That is, in a case where the mounting attitude of the transmission actuator unit 131 is reversed 180 degrees according to a change from the case of the right-hand drive vehicle to the case of the left-hand drive vehicle or vice versa, since the position of the shift lever is located at a front side with respect to the rack shaft 141 of the selecting actuator 133 in many vehicle types, there is a need to change the orientation of the shifting actuator 134 (according to which side the grip hand 168 is positioned at a front side or a rear side). In the present embodiment, the reverse of the orientation of the shifting actuator 134 in the fore-and-aft direction is easily done.

Figure 22:
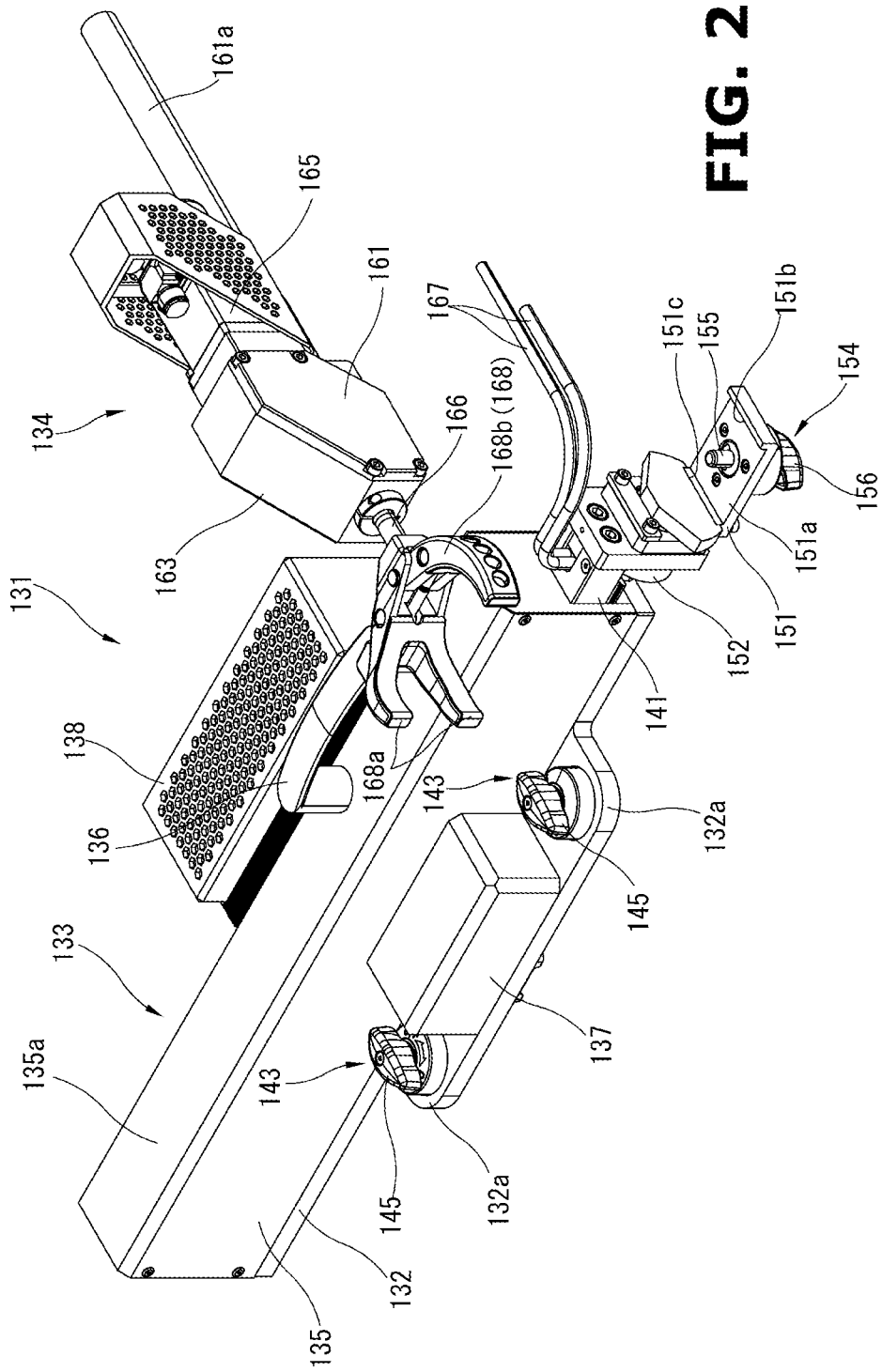
FIG. 22 is an exploded perspective view showing a state in which a shifting actuator is dismounted from a selecting actuator.
Figure 23:
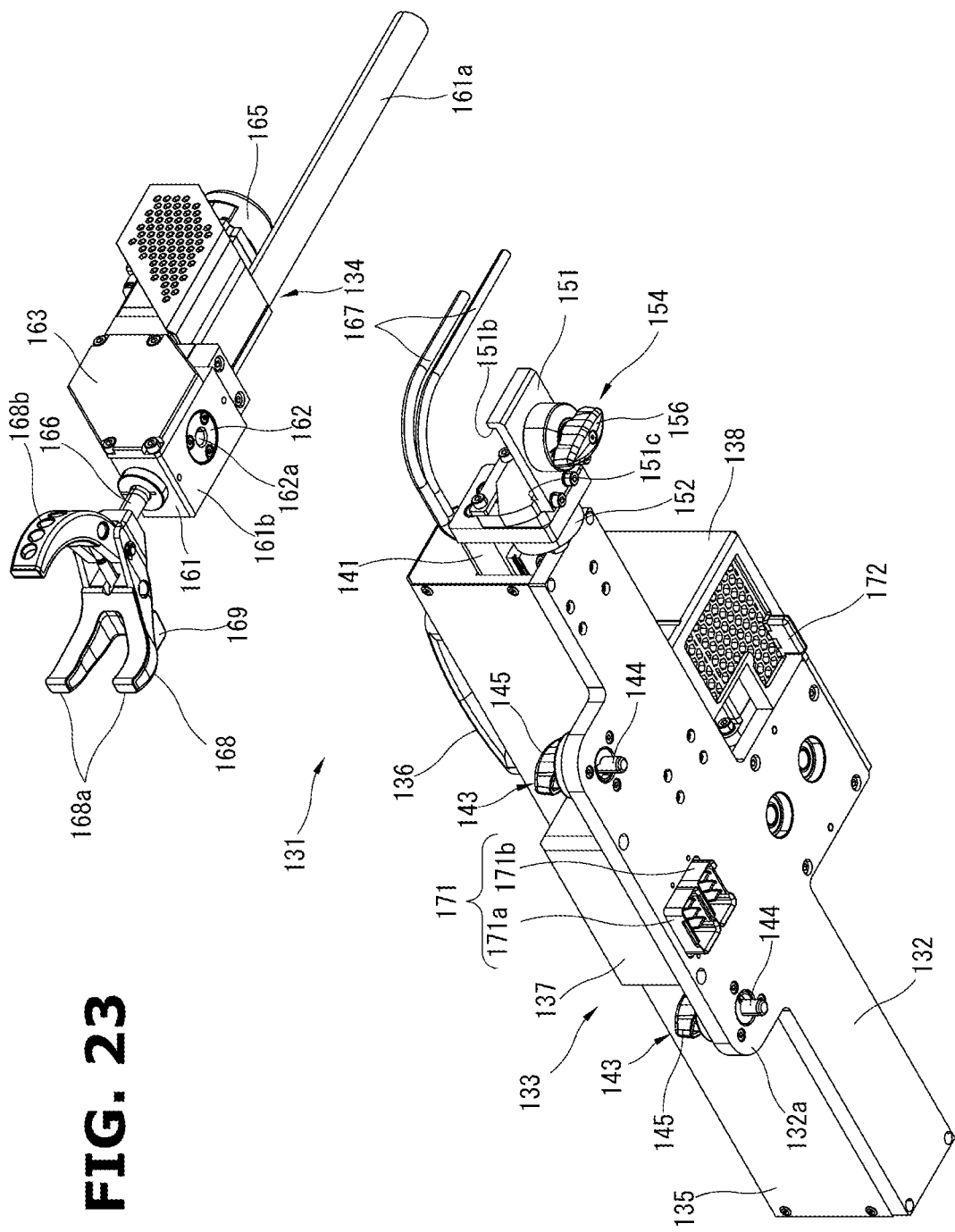
FIG. 23 is an exploded perspective view, viewed from below.

FIGS. 22 and 23 illustrate a state in which the shifting actuator 134 is detached from the selecting actuator 133. Here, the orientation of the shifting actuator 134 (the mounting attitude of the shifting actuator 134 with respect to the selecting actuator 133) in these drawings corresponds to the case of the so-called right-hand drive vehicle shown in FIG. 1 etc.

The rack shaft 141 protruding from and retracting into the actuator housing 135 of the selecting actuator 133 has a prismatic shape. An L-shaped bracket 151 is fixed to the top end portion of the rack shaft 141 through a rotatable joint 152. The joint 152 has a rotation axis that is parallel to a longitudinal direction of the rack shaft 141, and the L-shaped bracket 151 is supported so as to be able to pivot or rotate with this rotation axis of the joint 152 being a center (a pivot or a pivotal center). The L-shaped bracket 151 has a rectangular mounting surface 151a having a flat surface that is parallel to the rotation axis of the joint 152, and further has, at both sides of this mounting surface 151a, a first guide surface 151b and a second guide surface 151c which stand vertically from the mounting surface 151a.

The rotation axis of the joint 152 is positioned below the rack shaft 141, and a position of the mounting surface 151a is offset downward from the rotation axis of the joint 152. Therefore, the mounting surface 151a is positioned at a lower side with respect to an extension line of the rack shaft 141. The first guide surface 151b and the second guide surface 151c extend in a direction orthogonal to the rotation axis of the joint 152 (in other words, a direction orthogonal to the rack shaft 141), and are parallel to each other.

In the middle of the mounting surface 151a of the L-shaped bracket 151, a lock pin 155 that forms a lock mechanism 154 is formed. This lock mechanism 154 is a general-purpose screw type lock mechanism that is substantially the same as the above-described lock mechanism 143 to fix the transmission actuator unit 131. The lock mechanism 154 has, at a lower end of the lock pin 155, a knob 156 for a turning operation by hand or with fingers.

The shifting actuator 134 has a box-shaped actuator housing 161 having a rectangular bottom surface, a speed reducer 163 accommodated in this actuator housing 161, an electric motor 165 connected to the speed reducer 163 and a rack shaft 166, as an actuator rod, whose top end portion protrudes from an end portion of the actuator housing 161. The rack shaft 166 has a bar-shape whose cross section, except a teeth portion, is a circular shape as a basic shape. The actuator housing 161 has a cylindrical part 161a extending straight below the electric motor 165. When the rack shaft 166 is at a retracting position, most of the rack shaft 166 is accommodated in this cylindrical part 161a. A corner part of the box-shaped actuator housing 161, which is on an opposite side to the electric motor 165, is a slanting surface (or a sloping surface).

The grip hand 168 is connected to a top end of the rack shaft 166. This grip hand 168 has a bifurcated fixed finger 168a, a movable finger 168b that can open and close relative to the fixed finger 168a and a fixing screw 169 that performs an open-and-closure operation of the movable finger 168b relative to the fixed finger 168a and tightens and fixes the movable finger 168b to the fixed finger 168a. The grip hand 168 is a grip hand gripping the knob or the grip of the shift lever head (all not shown). By open-and-closure adjustment of the fingers 168a and 168b through the fixing screw 169, the grip hand 168 can grip a variety of knobs or grips having different shapes or sizes.

The bottom surface of the actuator housing 161 is formed by a bottom plate 161b that is relatively thick and has high rigidity. As shown in FIG. 23, this bottom plate 161b has a rectangular shape whose long side extends along a longitudinal direction of the rack shaft 166. A width of a short side of the bottom plate 161b is substantially equal to a width of the mounting surface 151a of the L-shaped bracket 151, i.e. a distance between the first guide surface 151b and the second guide surface 151c. That is, the bottom plate 161b has a size that can be relatively tightly fitted onto the mounting surface 151a between the first and second guide surfaces 151b and 151c of the L-shaped bracket 151. In the middle of the bottom plate 161b, a grommet 162 having a lock hole 162a with which the lock pin 155 is engaged is provided. This grommet 162 is the same as the above-mentioned grommet 121 of the actuator support plate 105. The grommet 162 forms the lock mechanism 154 together with the lock pin 155.

Therefore, by mounting the actuator housing 161 on the L-shaped bracket 151 and moving the lock pin 155 to a locking direction by a turning operation of the knob 156 by hand or with fingers, the bottom plate 161b is tightly fixed to the mounting surface 151a of the L-shaped bracket 151. The shifting actuator 134 is then fixed to the L-shaped bracket 151. In this fixing state, since right and left side edges of the bottom plate 161b are engaged with or fitted to the first and second guide surfaces 151b and 151c of the L-shaped bracket 151, the shifting actuator 134 does not lean or incline to a right side or a left side. That is, the rack shaft 141 of the selecting actuator 133 and the rack shaft 166 of the shifting actuator 134 are always properly maintained in an orthogonal state. It is noted that an axial center of the rack shaft 166 crosses the pivot (or a pivotal center) for the L-shaped bracket 151, i.e. the rotation axis of the joint 152. Therefore, the rack shaft 166 having the grip hand 168 at its top end can rotate (pivot or tilt) upward and downward with its rotation center positioned on the axial center of the rack shaft 166 being a center (a pivot or a pivotal center).

Figure 26:
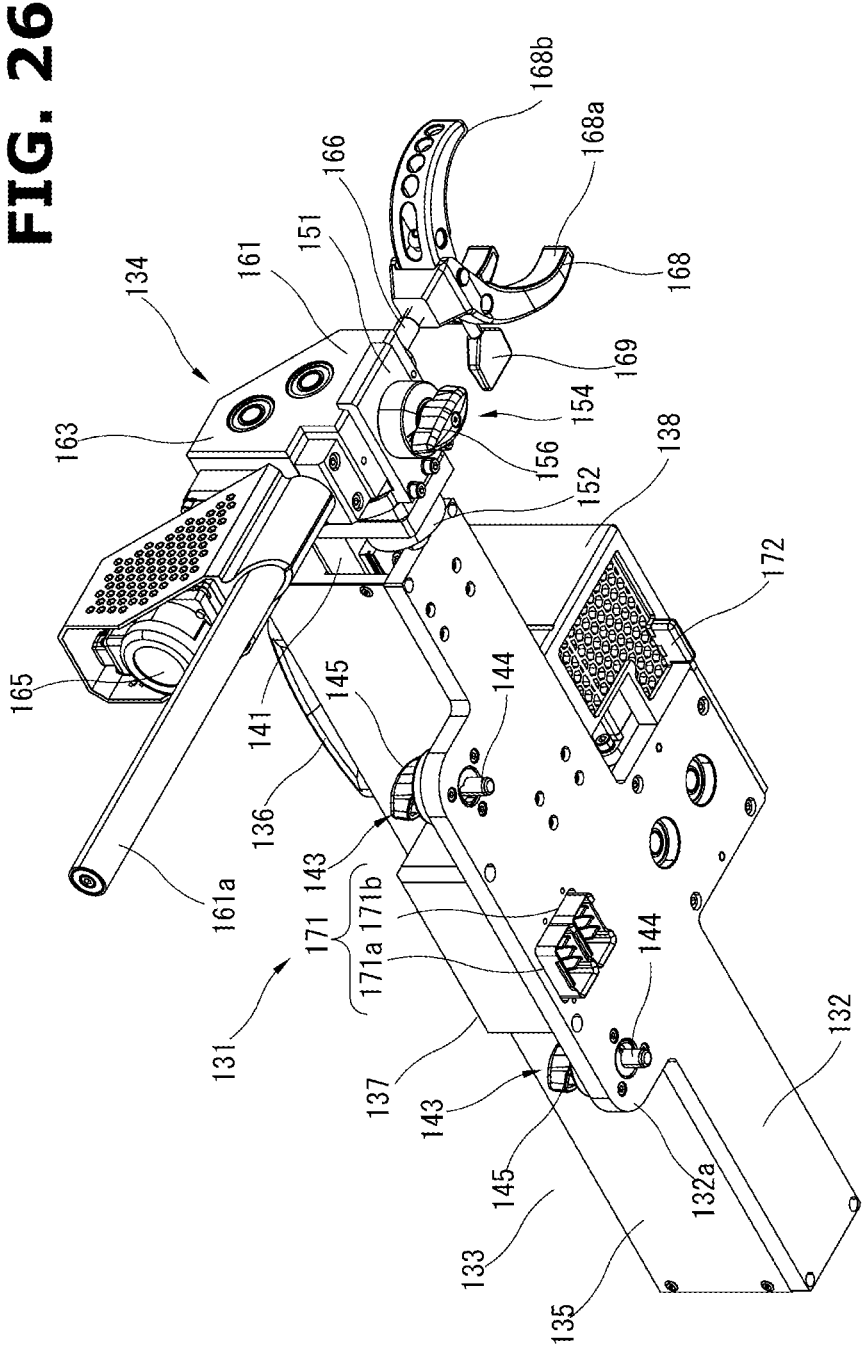
FIG. 26 is a perspective view, viewed from below, of the transmission actuator unit for the left-hand drive vehicle.
Figure 27:
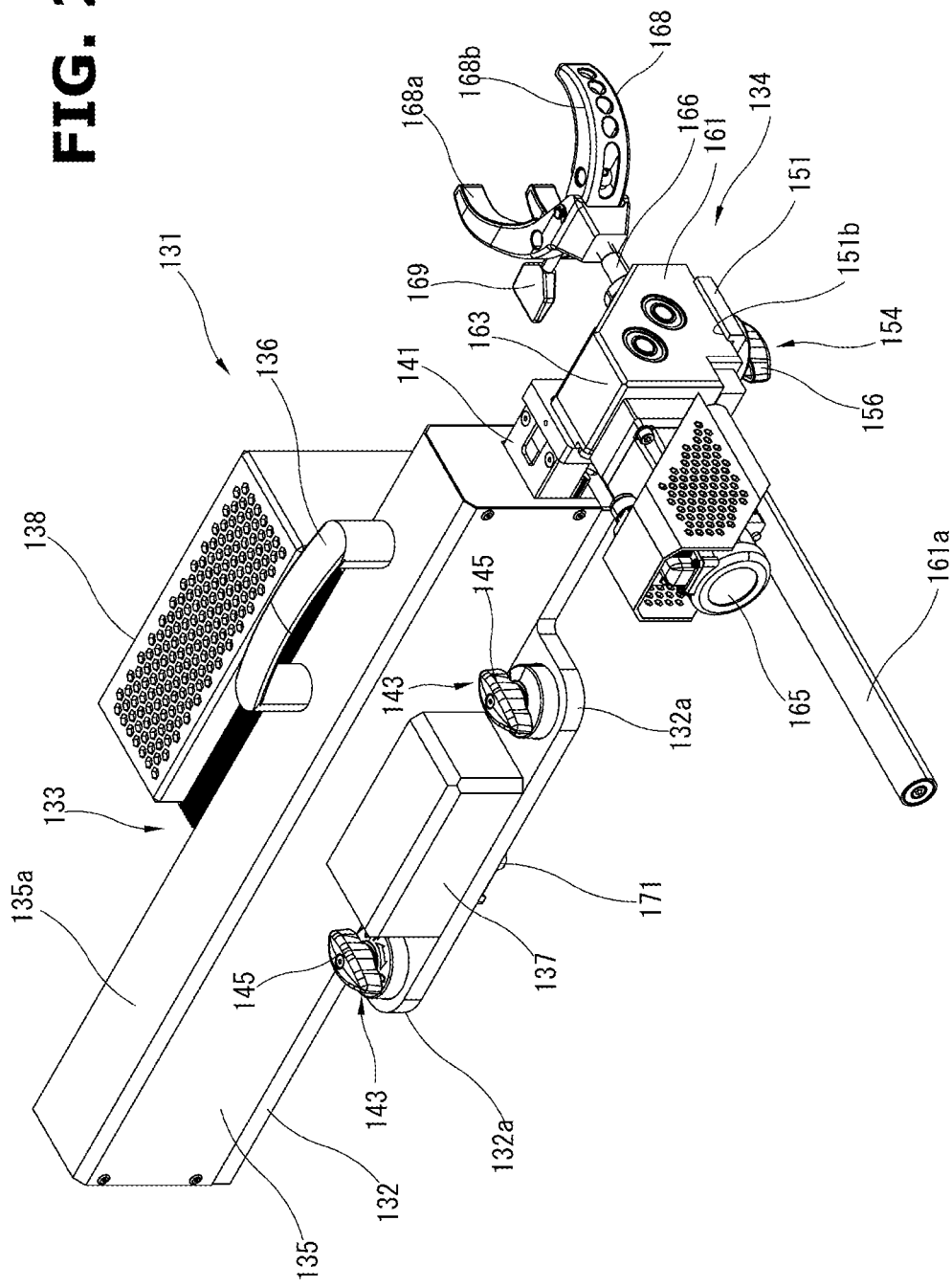
FIG. 27 is a perspective view, viewed from a different direction from FIG. 26, of the transmission actuator unit.

Further, by performing the turning operation of the knob 156 provided at a lower surface side of the L-shaped bracket 151 to an unlocking direction, the lock mechanism 154 is unlocked, and as shown in FIGS. 22 and 23, the shifting actuator 134 can be detached from the L-shaped bracket 151. Then, by turning the detached shifting actuator 134 back to front by 180 degrees and attaching the shifting actuator 134 to the L-shaped bracket 151 again, as shown in FIGS. 26 and 27, combination of the selecting actuator 133 with the shifting actuator 134 having a reverse mounting attitude becomes possible.

The lock hole 162a of the grommet 162 is positioned at a center of the bottom plate 161b of a lower surface of the actuator housing 161, at least at a center of the width along a direction of the short side of the bottom plate 161b. Therefore, also in the case of the reverse mounting attitude of the shifting actuator 134 which is set by turning the shifting actuator 134 back to front by 180 degrees, the bottom plate 161b is relatively tightly fitted onto the mounting surface 151a between the first and second guide surfaces 151b and 151c of the L-shaped bracket 151, and the lock pin 155 is engaged with the lock hole 162a.

Here, as shown in FIGS. 19 and 20 etc., the selecting actuator 133 and the shifting actuator 134 are electrically connected through two cables 167 leading from the top end portion of the rack shaft 141 of the selecting actuator 133 to the electric motor 165 of the shifting actuator 134. Each of the cables 167 has a minimum length required to detach the shifting actuator 134 from the L-shaped bracket 151 and reverse (or turn) the attitude of the shifting actuator 134. Therefore, basically, reversing work (or turning work) of the attitude of the shifting actuator 134 can be done without disconnecting the cables 167. In FIGS. 22 and 23, for convenience in drawing, the cables 167 are illustrated as if the cables 167 were cut. If necessary, the cables 167 could be disconnected from the shifting actuator 134.

As shown in FIG. 22, each of the cables 167 extends through an inside of the rack shaft 141 of the selecting actuator 133, then is connected to the connector 171 provided at the lower surface of the base plate 132. Therefore, a length of a part of the cable 167 which is exposed to the outside is kept to a minimum.

Figure 28:
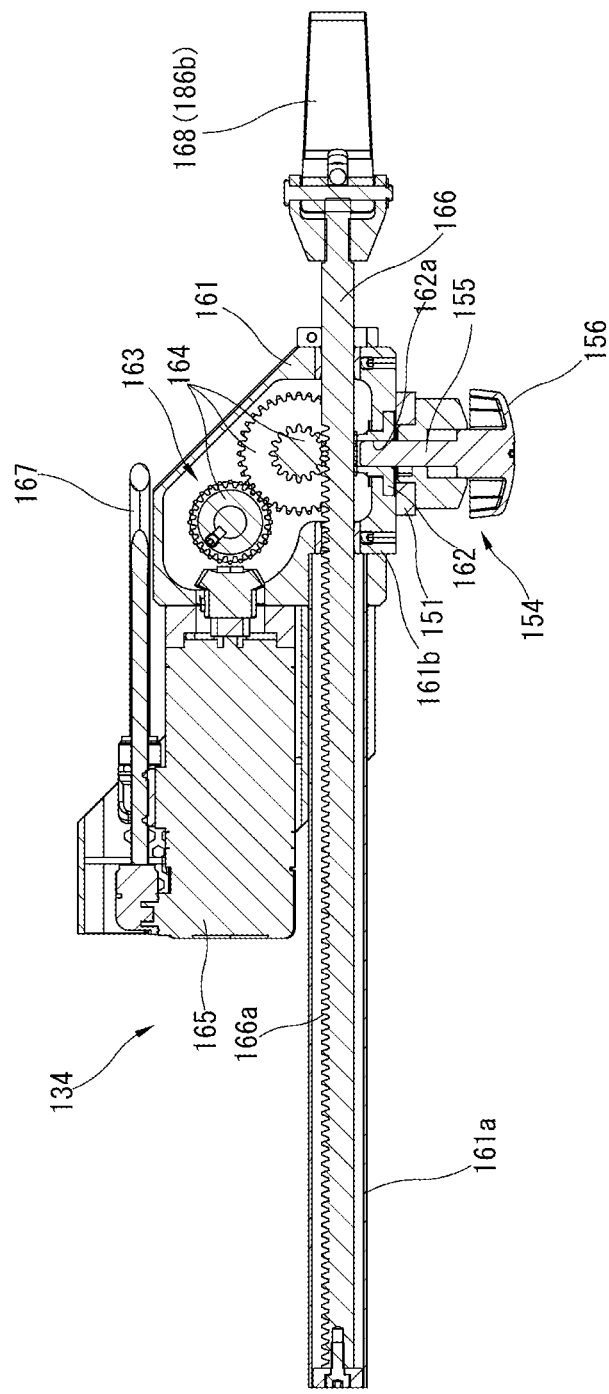
FIG. 28 is a longitudinal cross section of the shifting actuator.

FIG. 28 is a cross section of the shifting actuator 134, cut along the axial center of the rack shaft 166. More specifically, FIG. 28 shows a cross section of the shifting actuator 134 fixed to and supported by the L-shaped bracket 151 through the lock mechanism 154. The shifting actuator 134 is a rack-and-pinion type linear-motion actuator in which the rack shaft 166 serving as the actuator rod moves in the vehicle longitudinal direction by working of the electric motor 165 and the speed reducer 163. As shown in the drawings, the speed reducer 163 configured from a reduction gear train that is structured by combination of a plurality of gears 164 is accommodated in the box-shaped actuator housing 161. The speed reducer 163 reduces rotation speed of the electric motor 165. The rack shaft 166 is provided with a rack 166a meshing with a final pinion of the gear train.

As described above, by mounting the whole transmission actuator unit 131 on the connection box unit 101 selectively in either of the two mounting attitudes and by changing the mounting attitude of the shifting actuator 134 with respect to the selecting actuator 133 according to the mounting attitude of this the transmission actuator unit 131, the automatic vehicle driving device 1 of the present embodiment can readily meet the so-called right-hand drive vehicle in which the shift-lever is located on the left side with respect to the driver's seat 2 and the so-called left-hand drive vehicle in which the shift-lever is located on the right side with respect to the driver's seat 2.

FIGS. 5 and 6 illustrate the automatic vehicle driving device 1 for the right-hand drive vehicle, and the grip hand 168 is located at the left side of the frame 11. Further, the grip hand 168 is located at the front side with respect to the actuator housing 135 of the selecting actuator 133. The selecting actuator 133 and the shifting actuator 134 of the transmission actuator unit 131 are combined as shown in FIGS. 19 and 20.

In contrast to this, FIGS. 24 and 25 illustrate the automatic vehicle driving device 1 for the left-hand drive vehicle, and the grip hand 168 is located at the right side of the frame 11. Further, the grip hand 168 is located at the front side with respect to the actuator housing 135 of the selecting actuator 133. The selecting actuator 133 and the shifting actuator 134 of the transmission actuator unit 131 are combined as shown in FIGS. 26 and 27.

Figure 29:
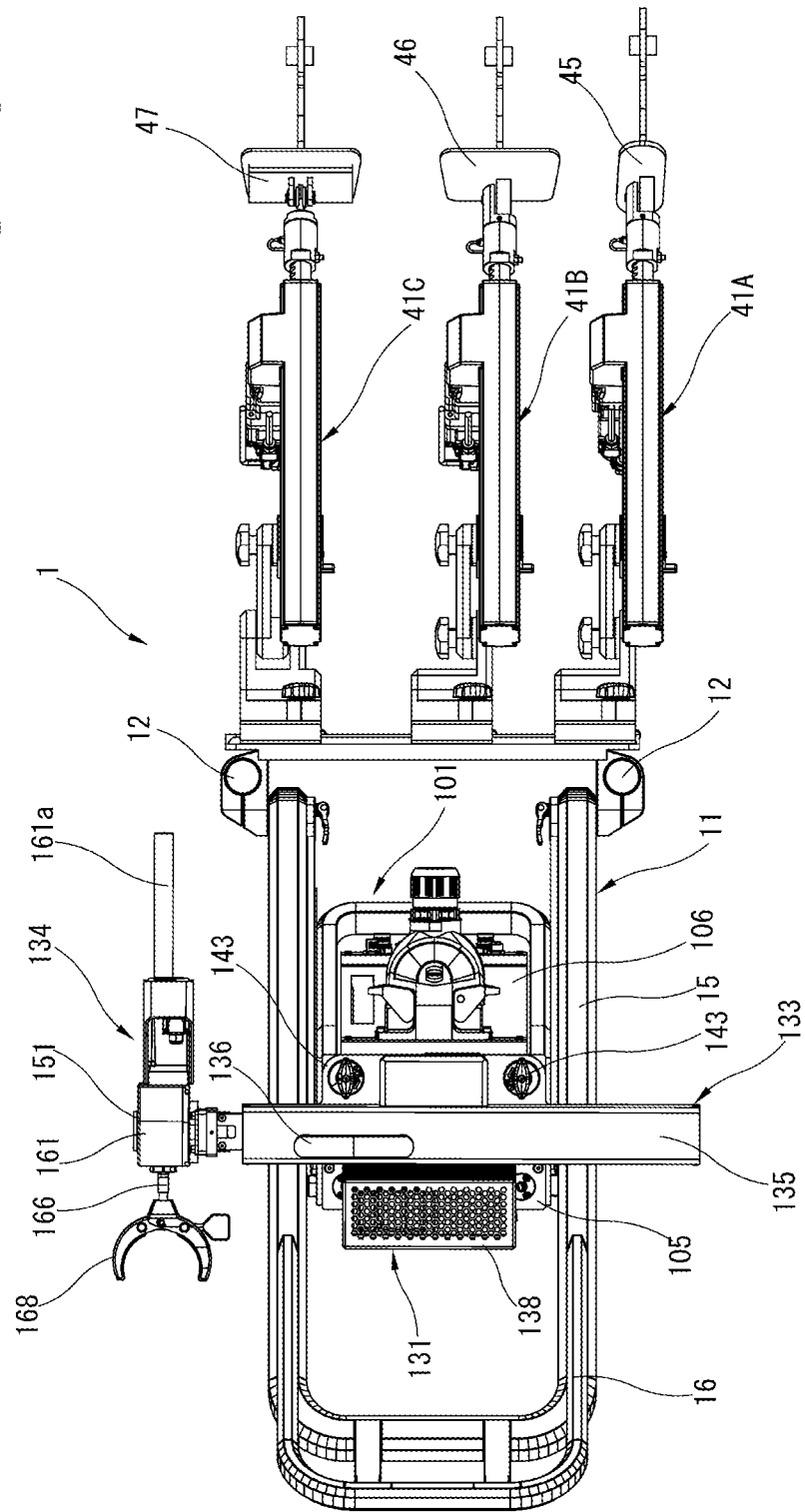
FIG. 29 is a top view showing a modified example for a right-hand drive vehicle.

Further, as shown in FIG. 29, it is also possible to select the mounting attitude of the shifting actuator 134 such that the grip hand 168 is located at the rear side with respect to the actuator housing 135 of the selecting actuator 133. FIG. 29 is an example of a case of the right-hand drive vehicle in which the shift lever is on the left side of the driver's seat 2 and the shift lever is located on a relatively rear side with respect to the driver's seat 2. That is, as compared with the case of the right-hand drive vehicle shown in FIG. 6, the shifting actuator 134 is combined with the selecting actuator 133 with the shifting actuator 134 turned (or reversed) back to front, and the grip hand 168 is located at a relatively rear position.

Such configuration is also applied to the case of the left-hand drive vehicle. For instance, the shifting actuator 134 can be combined with the selecting actuator 133 with the shifting actuator 134 turned (or reversed) back to front in the left-hand drive vehicle shown in FIG. 25.

As described above, a height position or a fore-and-aft position of the selecting actuator 133 can be changed by a slide position of the connection box unit 101 with respect to the frame 11. Therefore, by combination of the change of the orientation of the shifting actuator 134 in the fore-and-aft direction with the change of the height position or the fore-and-aft position of the selecting actuator 133, the shifting actuator 134 can meet a variety of shift lever positions.

Further, although the height position of the shift lever head generally changes in an up-and-down direction according to the shifting operation, the shifting actuator 134 can pivot or rotate upward and downward with the rotation axis of the joint 152 being the center (the pivot or the pivotal center). Thus, this allows the change of the height position of the shift lever head. A smooth shifting operation can therefore be performed.

[Configuration and Attachable-and-Detachable Structure of Pedal Actuator 41]

As described above, the automatic vehicle driving device 1 in the present embodiment has the three pedal actuators 41, i.e. the accelerator pedal actuator 41A, the brake pedal actuator 41B and the clutch pedal actuator 41C. These pedal actuators 41 are supported, through the pedal actuator supports 51, by the pedal actuator support slide rail 31 fixed to the front end of the frame 11.

Figure 30:
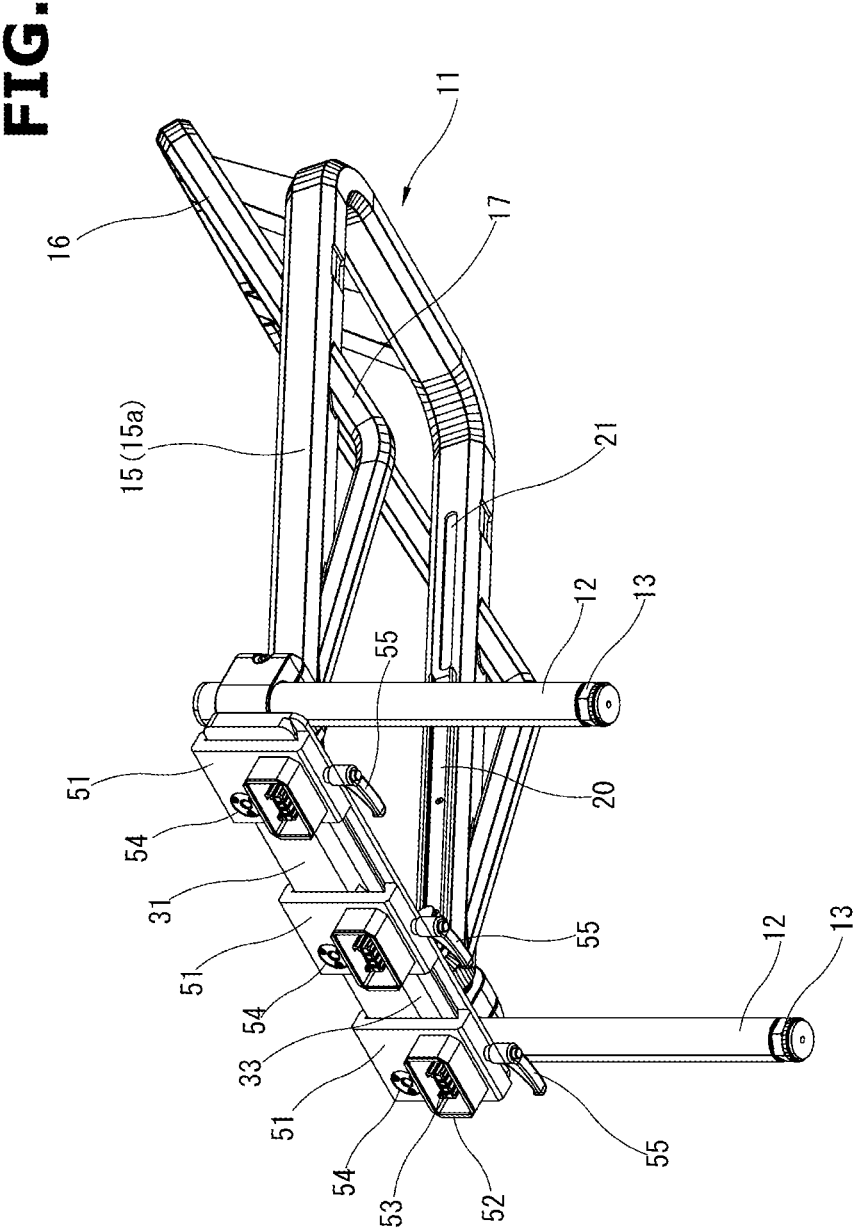
FIG. 30 is a perspective view showing a structure of a front end portion of the frame.

FIG. 30 shows details of the pedal actuator support slide rail 31 located at the front end of the frame 11 and the pedal actuator supports 51. FIGS. 31 to 34 show details of the accelerator pedal actuator 41A or the brake pedal actuator 41B, as a typical structure or configuration of the pedal actuator 41. In the present embodiment, the accelerator pedal actuator 41A and the brake pedal actuator 41B have the same structure or configuration.

Figure 31:
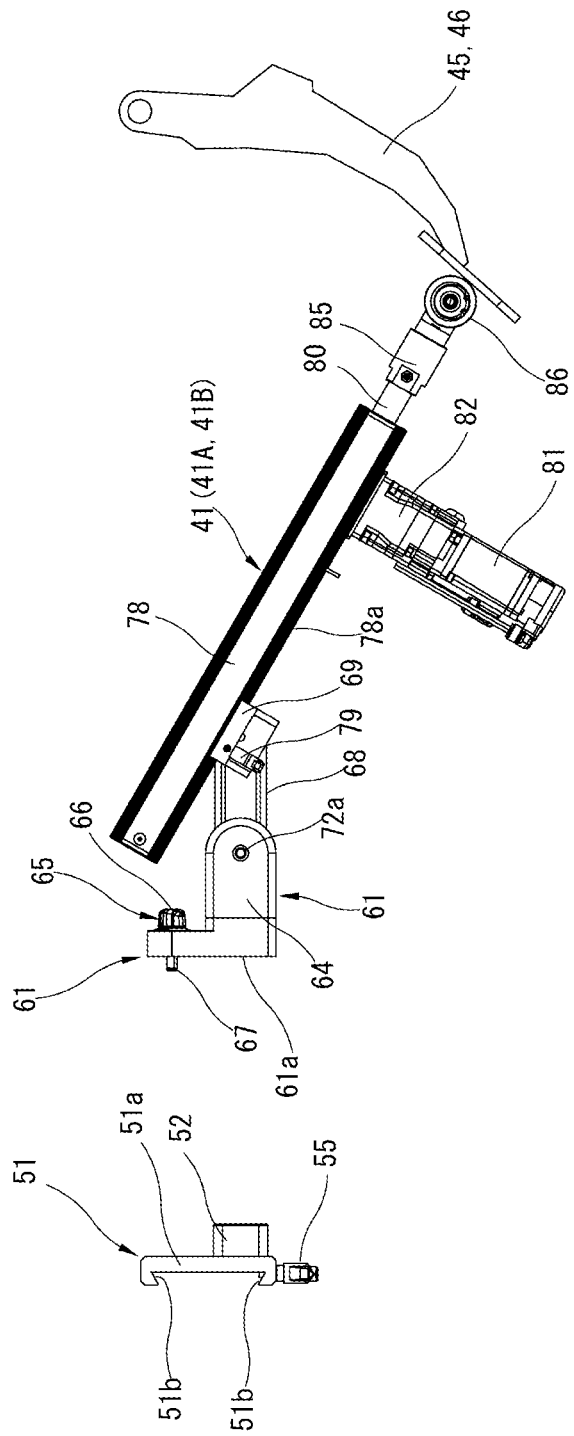
FIG. 31 is an exploded side view of a pedal actuator support and a pedal actuator.
Figure 32:
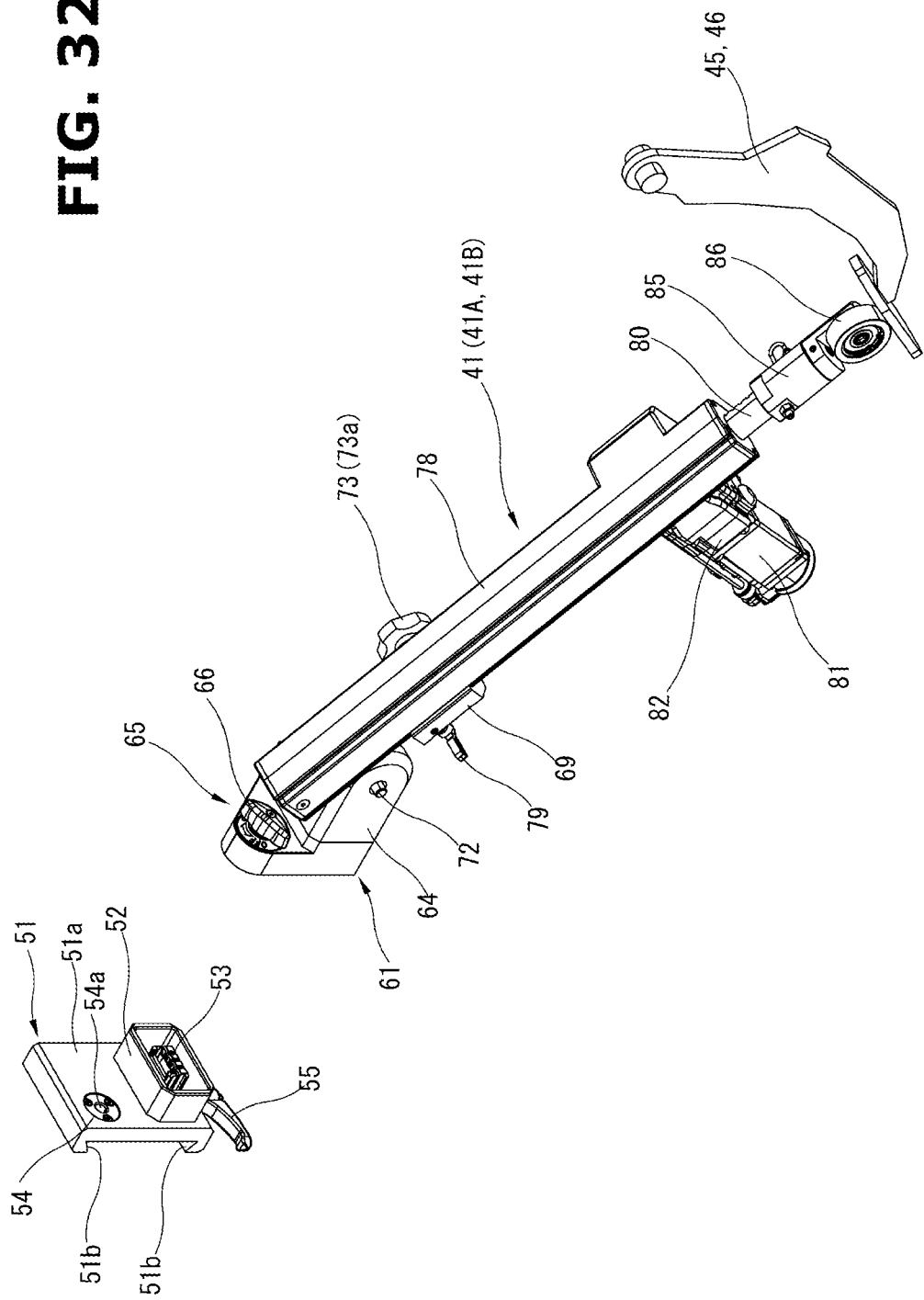
FIG. 32 is an exploded perspective view of the pedal actuator support and the pedal actuator.

The pedal actuator support slide rail 31 is shaped into a long narrow band shape extending in the vehicle width direction, and is formed of a relatively thick metal plate having rigidity. Each of the pedal actuator supports 51 has a longitudinal rectangular shape ranging in size from an upper side to a lower side of the slide rail 31 in front view (viewed from the vehicle front side). The pedal actuator support 51 has a plate part 51a, as a main body, which overlaps a front surface of the slide rail 31, and an upper edge and a lower edge of the plate part 51a extend to a vehicle rear side. Further, as shown in FIG. 31, inclined guide surfaces 51b are formed at inner sides of the upper and lower edges extending to the vehicle rear side. These pair of guide surfaces 51b are engaged with the guide surfaces 31a of the upper and lower edges of the slide rail 31. With this engagement of the guide surfaces 51b and 31a, the pedal actuator support 51 is supported slidably along the vehicle width direction by the slide rail 31. The pedal actuator support 51 can be inserted or fitted onto the slide rail 31 along a longitudinal direction (the vehicle width direction) of the slide rail 31 from either of the both ends of the slide rail 31 while engaging the both guide surfaces 51b and 31a with each other.

A fixing screw 55 to fix the pedal actuator support 51 having been adjusted at a proper position along the vehicle width direction to the slide rail 31 is provided at a lower portion of the pedal actuator support 51. This fixing screw 55 penetrates the lower portion of the pedal actuator support 51, and its screw top reaches the slide rail 31. The pedal actuator support 51 is then fixed to the slide rail 31 by tightening of this fixing screw 55. As shown in FIG. 30, the fixing screw 55 has, at a head portion thereof, an L-shaped lever part, and a tightening operation is possible by hand or with fingers. Therefore, it is possible to easily adjust positions, in the vehicle width direction, of the accelerator pedal actuator 41A, the brake pedal actuator 41B and the clutch pedal actuator 41C individually in the vehicle interior so as to correspond to positions of the respective pedals 45, 46 and 47 which are different depending on the vehicle types.

A tubular part 52 having a rectangular tubular shape and protruding forward is formed integrally with the plate part 51a of the pedal actuator support 51. A support-side connector 53 is provided at an inner side of this tubular part 52. The tubular part 52 stands in a direction perpendicular to a front surface of the plate part 51a toward the vehicle front side. As the support-side connector 53, a connector structured such that a terminal strip is in a floating state to allow some position shift (or some deviation of position) from the other mating side, like the transmission actuator unit connector 123 of the connection box unit 101, is used. The cable (not shown) is drawn out backward from the support-side connector 53, and this cable extends to the connection box 106 through the slit 33 of the slide rail 31.

A grommet 54, which is apart of an after-mentioned lock mechanism 65 for the pedal actuator 41, is provided at an upper portion of the plate part 51a, i.e. at an upper position with respect to the tubular part 52. This grommet 54 is the same as the above-mentioned grommet 121 of the actuator support plate 105 and the above-mentioned grommet 162 of the shifting actuator 134. The grommet 54 has a lock hole 54a that opens forward.

The pedal actuator 41 is also a rack-and-pinion type linear-motion actuator. The pedal actuator 41 has, as main bodies, a long narrow actuator housing 78 that slidably supports and accommodates therein a rack shaft 80 serving as an actuator rod, a speed reducer 82 and an electric motor 81 that are fixed to a lower surface side of the actuator housing 78. Here, in the case of the selecting actuator 133 and the shifting actuator 134, a rotation axis of the electric motor is arranged parallel to the rack shaft, whereas in the case of the pedal actuator 41, a direction of an axial center of the rack shaft 80 is different from that of a rotation axis of the electric motor 81 by 90 degrees. The speed reducer 82 and the electric motor 81 are arranged in series. Therefore, the speed reducer 82 and the electric motor 81 relatively greatly protrude downward at a position close to a top end portion of the actuator housing 78, and a substantially L-shaped arrangement of the speed reducer 82, the electric motor 81 and the actuator housing 78 is formed.

Since the pedals 45, 46 and 47 are located at relatively low positions as compared with a height of the seat cushion 3, the respective actuator housings 78 (in other words, the respective rack shafts 80) slope such that their top end sides facing to the pedals 45, 46 and 47 are located at low positions with respect to their base end sides located close to the frame 11. The rack shafts 80 have a bar-shape whose cross section is a circular shape, and top end portions, which protrude from the respective actuator housings 78, of the rack shafts 80 press the pedals 45, 46 and 47.

For the accelerator pedal actuator 41A and the brake pedal actuator 41B shown in FIGS. 31 to 34, a roller 86 is fixed to the top end of each rack shaft 80 through an after-mentioned load cell joint 85, and the rollers 86 of the accelerator pedal actuator 41A and the brake pedal actuator 41B press the pedals 45 and 46. Each of the rollers 86 has a rotation axis along the vehicle width direction, and the rollers 86 can press the pedals 45 and 46 while allowing angle change of pedal surfaces of the pedals 45 and 46 occurring by and according to swing or pivotal movement of the pedals 45 and 46.

As shown in FIG. 31, the actuator housing 78 is supported by the pedal actuator support 51 through a pedal actuator support bracket 61, a link arm 68 and a slide bracket 69.

Figure 33:
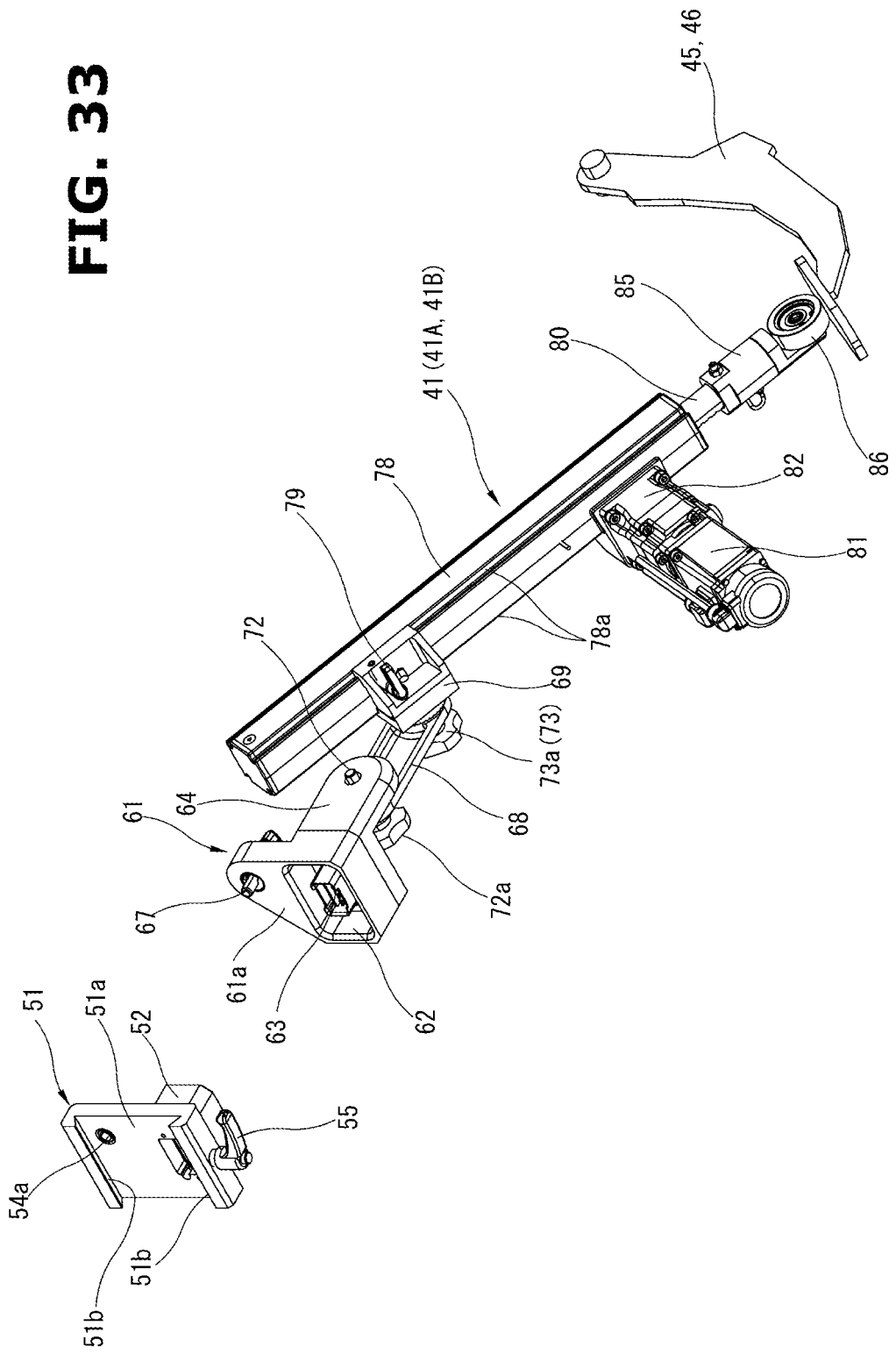
FIG. 33 is an exploded perspective view, viewed from a different direction from FIG. 32.
Figure 34:
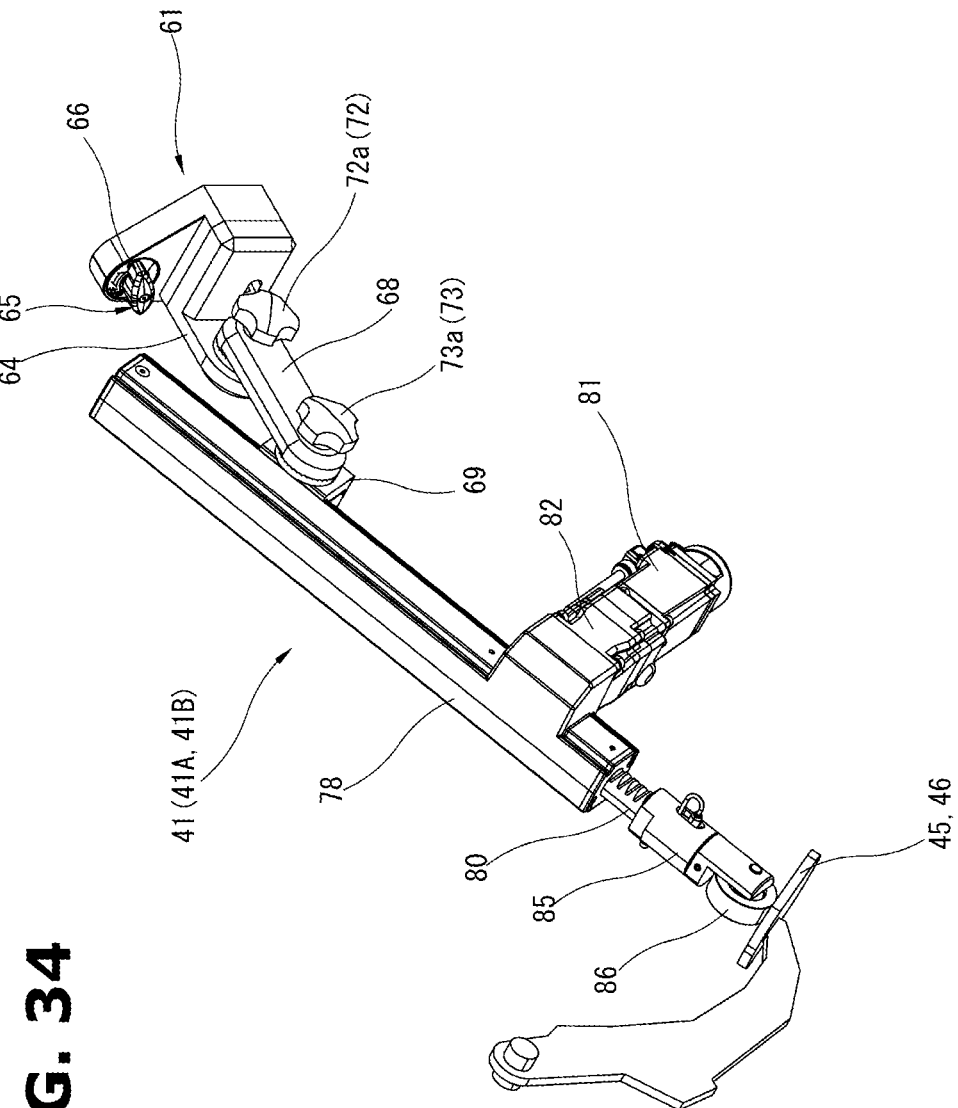
FIG. 34 is a perspective view of the pedal actuator.

The slide bracket 69 is a bracket that supports the actuator housing 78 at the lower surface side of the actuator housing 78 so as to be able to slide the actuator housing 78 forward and backward. That is, as shown in FIG. 33, the actuator housing 78 is rectangular (almost a square) in cross section, and has recessed slide grooves 78a at both side edges on the lower side of the actuator housing 78. The slide bracket 69 has a cross section that engages with or fits these pair of slide grooves 78a from both sides. With this engagement, the actuator housing 78 can be slid relative to the slide bracket 69. The slide bracket 69 has a fixing screw 79 to fix the actuator housing 78 having been slid and position-adjusted to the slide bracket 69. The fixing screw 79 has, at a head portion thereof, an L-shaped lever part, like the fixing screw 55 of the pedal actuator support 51, and a tightening operation is possible by hand or with fingers. Therefore, it is possible to easily adjust a fore-and-aft position of each actuator housing 78 according to the positions of the pedals 45, 46 and 47 in the vehicle.

The pedal actuator support bracket 61 is linked with the slide bracket 69 through the link arm 68. The pedal actuator support bracket 61 is detachably secured to the pedal actuator support 51. With this, each pedal actuator 41 is supported by the pedal actuator support slide rail 31 (see FIG. 5 etc.).

As shown in FIG. 33, the pedal actuator support bracket 61 has, on one surface of a thick plate member thereof, i.e. a mating surface 61a thereof with the pedal actuator support 51, a hollow part 62 that is fitted onto the tubular part 52 of the pedal actuator support 51. The pedal actuator support bracket 61 further has, at an upper position with respect to the hollow part 62, a lock pin 67 serving as the lock mechanism 65. The hollow part 62 has a shape that is complementary to the rectangular-tubular-shaped tubular part 52. The hollow part 62 is provided, at an inner side thereof, with a bracket-side connector 63 corresponding to the support-side connector 53. Therefore, by pressing the pedal actuator support bracket 61 to the pedal actuator support 51 in a direction perpendicular to the pedal actuator support 51 while fitting the hollow part 62 onto the tubular part 52, the hollow part 62 and the tubular part 52 are relatively tightly fitted together, and the mating surface 61a contacts the plate part 51a of the pedal actuator support 51. The support-side connector 53 and the bracket-side connector 63 are also electrically connected.

The lock pin 67 is provided at a position corresponding to a position of the lock hole 54a of the grommet 54 of the pedal actuator support 51. The lock pin 67 has, at ahead portion thereof, a knob 66 for allowing a turning operation by hand or with fingers. The lock mechanism 65 formed by the lock pin 67 and the grommet 54 has substantially the same structure as that of the lock mechanism 143 (the lock pin 144 and the grommet 121) for fixing the transmission actuator unit 131 and the lock mechanism 154 (the lock pin 155 and the grommet 162) for fixing the shifting actuator 134. With engagement (locking) of this lock mechanism 65, the pedal actuator support bracket 61 is surely fixed to the pedal actuator support 51. In other words, the whole pedal actuator 41 is fixed to and supported by the pedal actuator support Si. In particular, since the lock mechanism 65 is located at the upper side with respect to the tubular part 52 and the hollow part 62, the lock mechanism 65 surely bears the moment acting downward with a fitting portion of the tubular part 52 and the hollow part 62 being a supporting point. Further, since the tubular part 52 of the fitting portion has a closed sectional structure, a high bonding strength (or a high connecting strength) can be obtained.

The pedal actuator support bracket 61 has, on a surface opposite to the mating surface 61a, an arm part 64 that extends in the horizontal direction. One end portion of the long thin plate-shaped link arm 68 is linked with the arm part 64 through a fixing screw 72 serving as a rotation axis. The other end portion of the link arm 68 is linked with the slide bracket 69 through a fixing screw 73 serving as a rotation axis. The fixing screws 72 and 73 have, at head portions thereof, substantially cross-shaped grip portions 72a and 73a respectively for allowing a turning operation by hand or with fingers.

Figure 35:
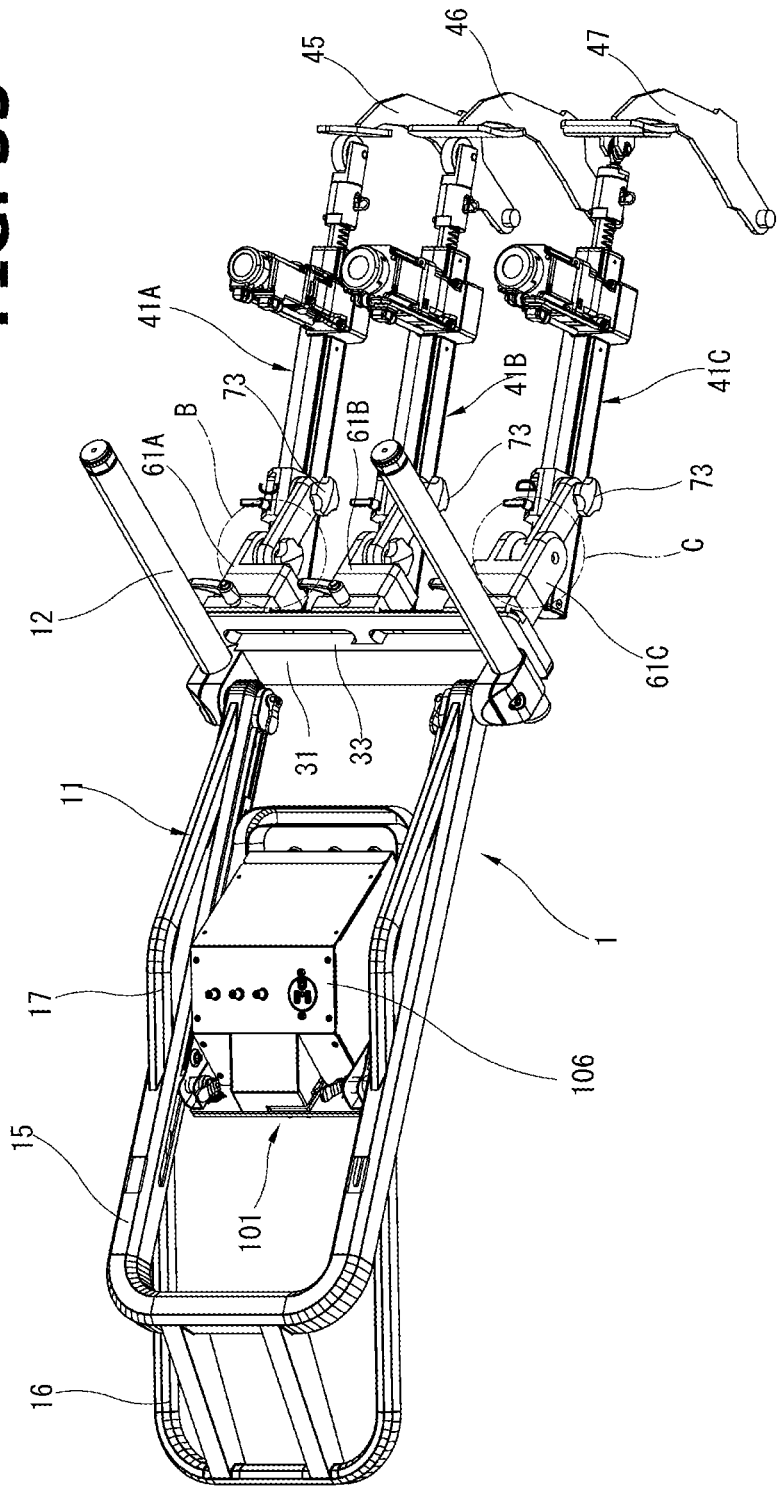
FIG. 35 is a perspective view of the automatic vehicle driving device with the device turned upside down.
Figure 36:
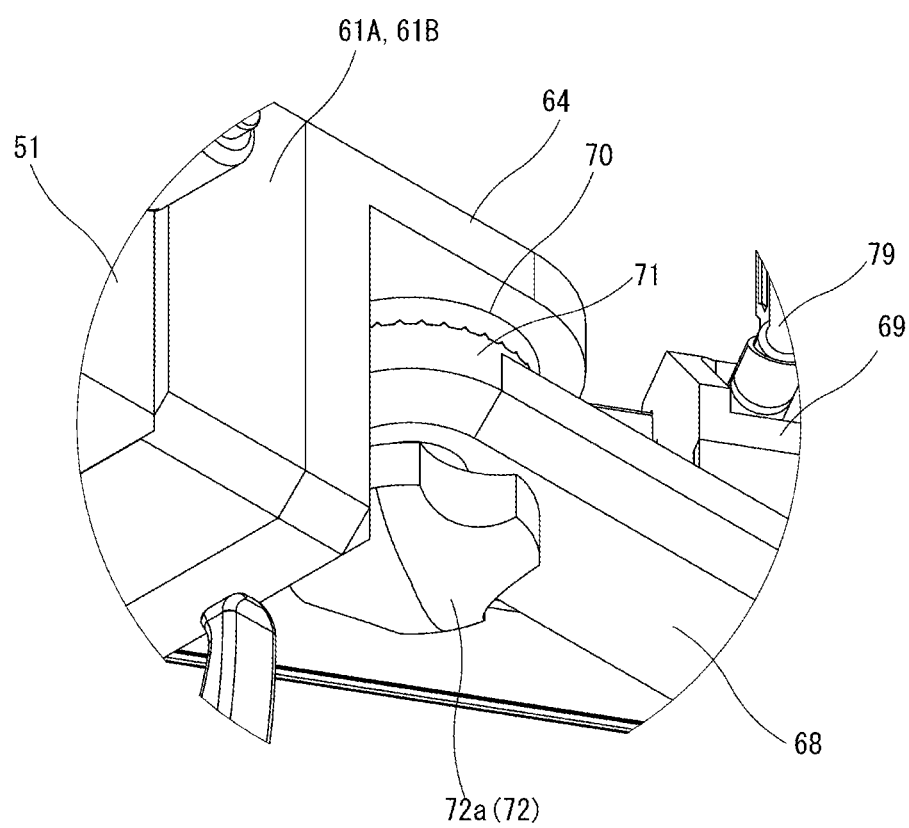
FIG. 36 is an enlarged view of a B-part of FIG. 35.

FIG. 36 is an enlarged perspective view of a B-part of FIG. 35. FIG. 36 illustrates details of the arm part 64 and the one end port ion of the link arm 68 linked together through the fixing screw 72. The arm part 64 is formed on one side, in the vehicle width direction, of the pedal actuator support bracket 61, and the link arm 68 is sandwiched between the grip portion 72a of the fixing screw 72 and the arm part 64. The arm part 64 and the link arm 68 can rotate (pivot) with the fixing screw 72 being a center (a pivot). On the other hand, a bracket-side engagement disk 70 is provided on an inner side surface (a surface facing to the link arm 68) of the arm part 64, and a link-side engagement disk 71 that faces to the bracket-side engagement disk 70 is provided at the link arm 68. Then, by engagement of these engagement disks 70 and 71, the rotation of the link arm 68 relative to the arm part 64 or vice versa is stopped or restrained. That is, facing surfaces of the opposing engagement disks 70 and 71 are convexo-concave surfaces having radially-extending engagement grooves (or radially-extending engagement protrusions), and by tightening the fixing screw 72 screwed into the arm part 64 side, the convexo-concave surfaces of the engagement disks 70 and 71 are pressed against each other, then the link arm 68 is firmly fixed to the arm part 64. When loosening the fixing screw 72, the engagement of the convexo-concave surfaces of the engagement disks 70 and 71 is loosened, then the link arm 68 can be rotated relative to the arm part 64 with the fixing screw 72 being the center (the pivot). With this, angle adjustment becomes possible.

A relationship between the other end portion of the link arm 68 and the slide bracket 69 is also the same as the configuration of the arm part 64 side shown in FIG. 36, and the link arm 68 and the slide bracket 69 have radial facing convexo-concave surfaces. Therefore, after adjusting an angle of the slide bracket 69 (in other words, an angle of the actuator housing 78) with respect to the link arm 68 in a state in which the fixing screw 73 is loosened, by tightening the fixing screw 73, the slide bracket 69, i.e. the actuator housing 78, can be fixed to the link arm 68.

Axial centers of the fixing screws 72 and 73 extend along the vehicle width direction. Therefore, a fixing attitude of the pedal actuator 41 can be adjusted along a surface orthogonal to the vehicle width direction. In particular, by combination of the adjustment in the forward-and-backward direction of the actuator housing 78 through the slide bracket 69 with the angle adjustment at the both end portions of the link arm 68, it is possible to meet the pedal position and an inclination or a gradient of the pedal which are different depending on the vehicle types.

The pedal actuator 41 can be attached to and detached from the pedal actuator support 51 with the pedal actuator 41 remaining combined with the link arm 68 and the pedal actuator support bracket 61. As described above, by fitting the hollow part 62 of the pedal actuator support bracket 61 onto the tubular part 52 of the pedal actuator support 51 and by turning the lock pin 67 by an angle of predetermined degrees by the turning operation, the whole pedal actuator 41 can be fixed to the pedal actuator support 51. Conversely, by turning the lock pin 67 to an opening position (an unlocked position) by the turning operation and by pulling out the pedal actuator support bracket 61 toward the vehicle front side, the pedal actuator 41 can be detached from the slide rail 31 (in other words, from the frame 11).

A cable leading to the electric motor 81 of the pedal actuator 41 is routed through an inside of the actuator housing 78, and its end is drawn out of the actuator housing 78 from an end portion, on the link arm 68 side, of the actuator housing 78 and connected to the bracket-side connector 63 through an inside of the pedal actuator support bracket 61, although this drawing is omitted.

Therefore, by attaching the pedal actuator support bracket 61 to the pedal actuator support 51, electrical connection through the connectors 53 and 63 is established at the same time. Because of this, there is no external cable and no connector between the pedal actuator support 51 and the pedal actuator 41.

As described above, since the pedal actuator 41 is easily attached (fixed) and detached (dismounted), when mounting the automatic vehicle driving device 1 in the vehicle, in a state in which the pedal actuator 41 remains dismounted from the frame 11 (the slide rail 31), the frame 11 is fixed and supported above the driver's seat 2, and after that, the pedal actuator 41 can be fixed in the interior of the vehicle. Conversely, when dismounting the automatic vehicle driving device 1 from the vehicle, the pedal actuator 41 is detached on ahead, then the frame 11 can be carried out of the vehicle. It is therefore possible to readily carry the automatic vehicle driving device 1 into and out of the vehicle interior through the door opening of the vehicle. In addition, each position adjustment of the pedal actuators 41 relative to the pedals 45, 46 and 47 can be easily performed in the vehicle interior after the pedal actuators 41 are fixed to the frame 11.

[Configuration of Clutch Pedal Actuator 41C]

In the vehicle with the manual transmission, in general, the clutch pedal 47 moves along an arc and its stroke (a depressing operation amount) is relatively large. In the present embodiment, by taking account of such characteristics of the clutch pedal 47, the clutch pedal actuator 41C differs from the other two pedal actuators 41A and 41B in details.

Figure 37:
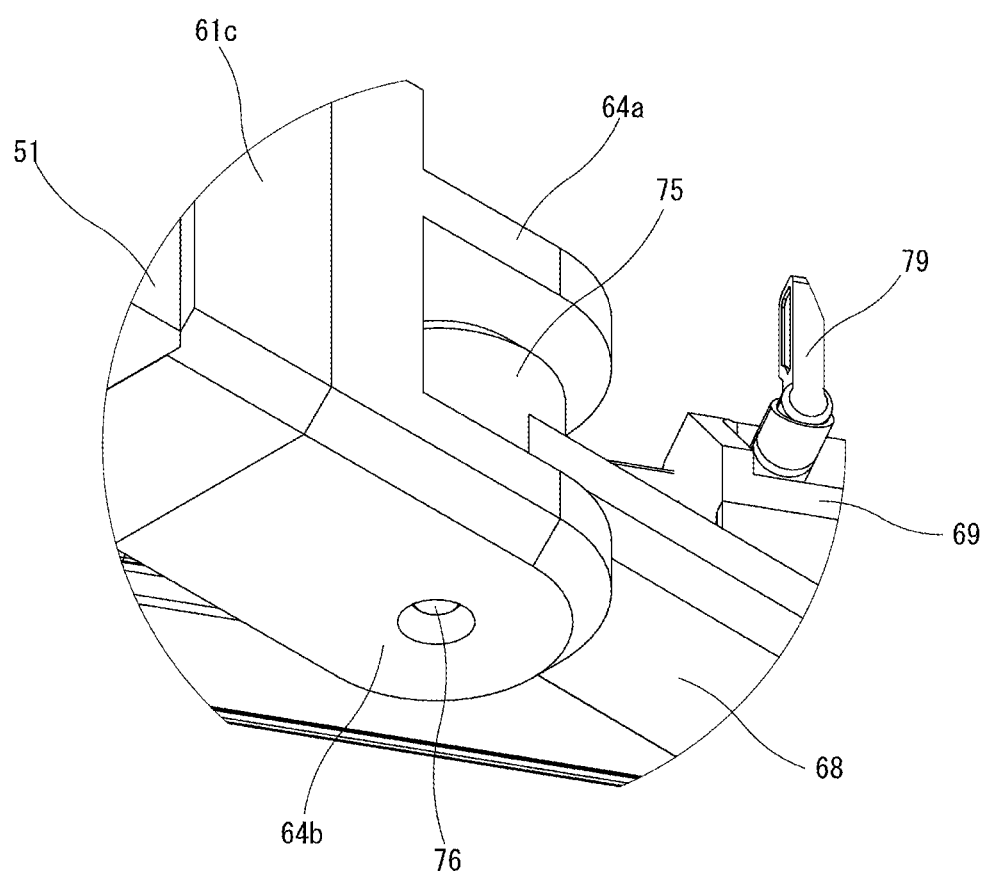
FIG. 37 is an enlarged view of a C-part of FIG. 35.

FIGS. 37 to 40 show the clutch pedal actuator 41C. FIG. 37 is an enlarged perspective view of a C-part of FIG. 35.

One of the different points is a structure of a linkage portion between the pedal actuator support bracket 61 and the link arm 68. For convenience in describing, as shown in FIG. 35, the pedal actuator support bracket 61 for the accelerator pedal actuator 41A and the pedal actuator support bracket 61 for the brake pedal actuator 41B are denoted by references 61A and 61B respectively, and the pedal actuator support bracket 61 for the clutch pedal actuator 41C is denoted by a reference 61C.

As mentioned above, the pedal actuator support bracket 61A for the accelerator pedal 45 and the pedal actuator support bracket 61B for the brake pedal 46 have the same structure. In the case of these pedal actuator support brackets 61A and 61B, the single arm part 64 and the link arm 68 are fixed together with the fixing screw 72 after the angle adjustment (see FIG. 36).

In contrast to this, the pedal actuator support bracket 61C for the clutch pedal 47 has, as shown in FIG. 37, a pair of arm parts 64a and 64b, and the link arm 68 is sandwiched between these pair of arm parts 64a and 64b. The link arm 68 for the clutch pedal 47 has, at one end thereof, a cylindrical bearing portion 75, and this bearing portion 75 is rotatably supported through a rotation shaft 76 whose both ends are fixed to the pair of arm parts 64a and 64b. That is, in the case of the clutch pedal actuator 41C, the pedal actuator support bracket 61C and the link arm 68 are rotatably or pivotably linked with each other.

A linkage portion between the link arm 68 and the slide bracket 69 for the clutch pedal actuator 41C is not different from those for the accelerator pedal actuator 41A and the brake pedal actuator 41B. That is, by tightening the fixing screw 73 after the angle adjustment, the slide bracket 69 is fixed to the link arm 68.

Figure 38:
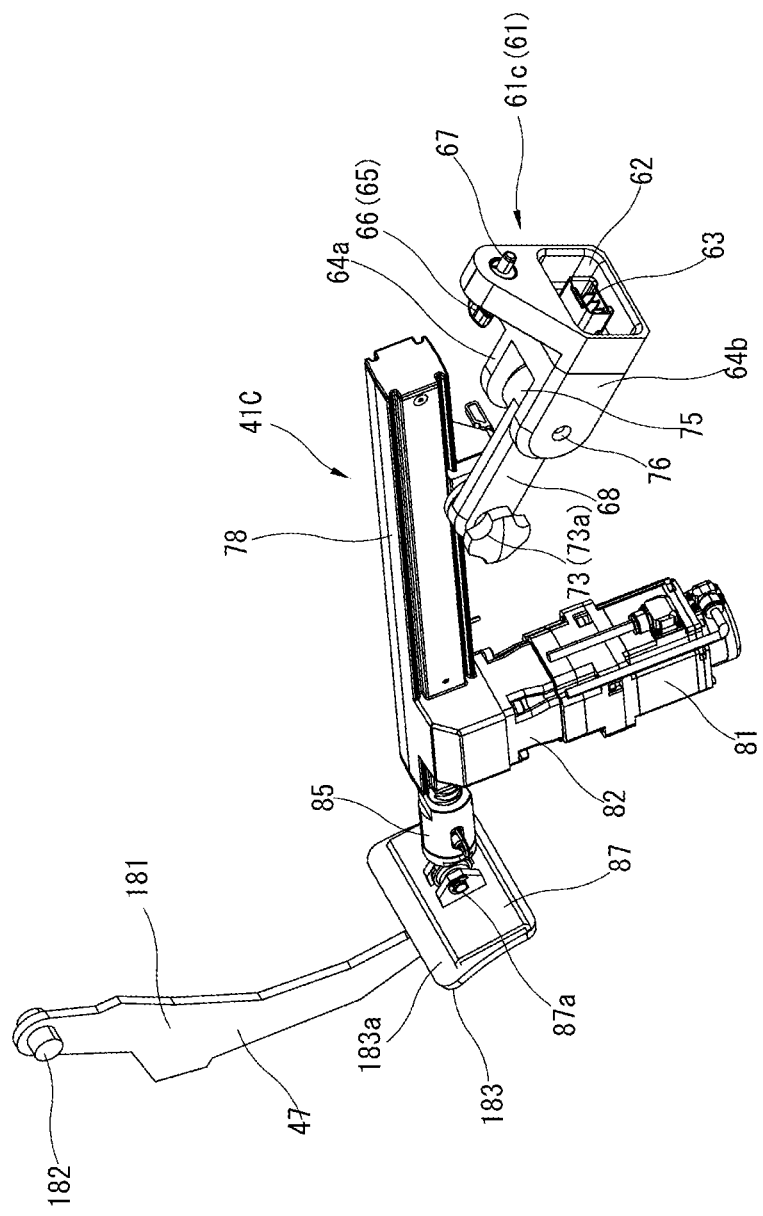
FIG. 38 is a perspective view of a clutch pedal actuator.
Figure 39:
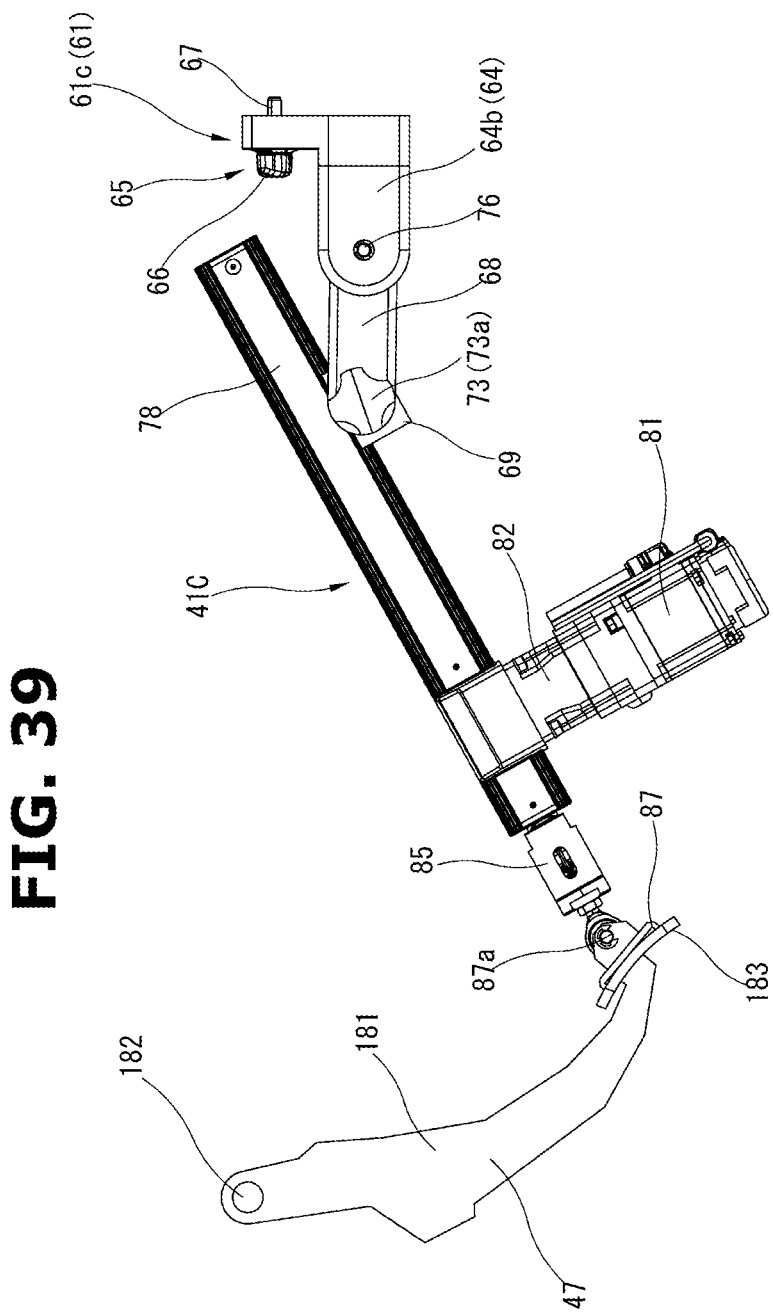
FIG. 39 is a side view of the clutch pedal actuator.

A second different point is that the clutch pedal actuator 41C has, at the top end of the rack shaft 80, a pivotal plate 87 instead of the aforementioned roller 86. That is, as shown in FIGS. 38 and 39, the pivotal plate 87 is connected to the top end of the rack shaft 80 so as to be able to tilt or rotate through the load cell joint 85. This pivotal plate 87 is placed on a pedal part 183 of the clutch pedal 47 so as to overlap the pedal part 183, and fixed to the pedal part 183 with a proper jig or a fixing tool (both not shown). The pivotal plate 87 is pivotably supported by a pin 87a so as to have a rotation axis (or a pivot) along the vehicle width direction, like the roller 86.

Figure 40:
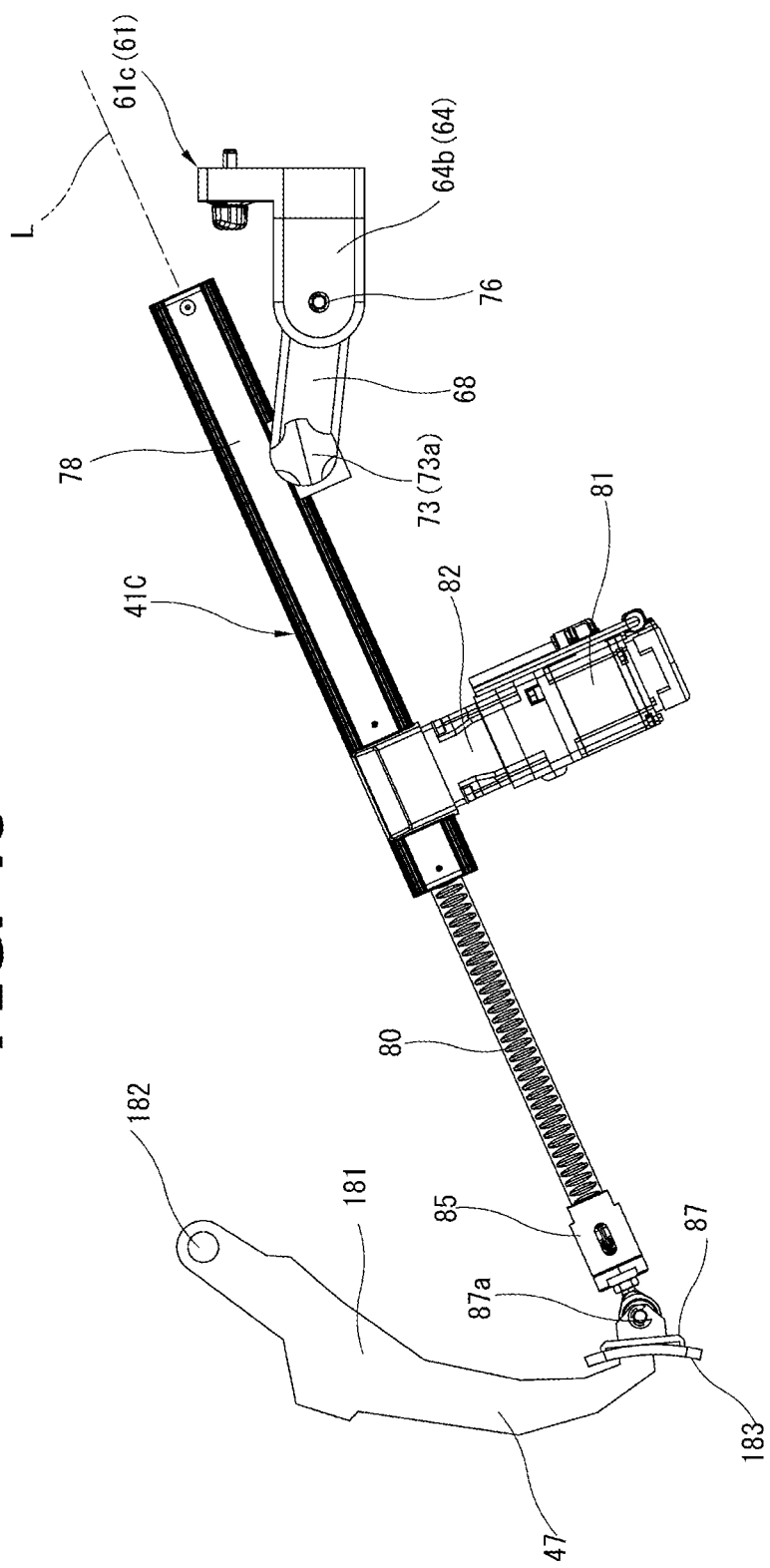
FIG. 40 is a side view of the clutch pedal actuator when its stroke is maximum.

FIGS. 39 and 40 are drawings for describing an extending-and-retracting movement of the clutch pedal actuator 41C. The clutch pedal 47 is generally rotatably or pivotably supported by the vehicle at an upper end of a lever 181 of the clutch pedal 47 through a lever pin 182, and the pedal part 183 is fixedly provided at a lower end of the lever 181. Therefore, an inclination of a pedal surface 183a changes according to the stroke (depression) of the clutch pedal 47. More specifically, as shown in FIG. 39, in a state in which the clutch pedal 47 is not depressed, the pedal surface 183a faces obliquely upward. Then, as the clutch pedal 47 is depressed, as shown in FIG. 40, the pedal surface 183a is almost vertical. Further, in extreme cases, conversely, the pedal surface 183a faces obliquely downward.

If the roller 86 contacts the pedal surface 183a in the same manner as the accelerator pedal actuator 41A and the brake pedal actuator 41B, there is a risk that the roller 86 will fall off the pedal surface 183a due to the angle change of the pedal surface 183a, and an accurate stroke cannot be obtained.

In contrast to this, in the case of the clutch pedal actuator 41C in the present embodiment, since the pivotal plate 87 provided at the top end of the rack shaft 80 is fixed to the pedal part 183, the clutch pedal actuator 41C can surely perform the pressing operation of the pedal part 183 regardless of the angle change of the pedal surface 183a.

Further, although a height position of the pedal part 183 changes according to the rotation or pivotal movement of the clutch pedal 47 on the lever pin 182 as a pivot, this change is absorbed by the link arm 68 and the pedal actuator support bracket 61C being linked so as to rotate or pivot. In the example illustrated in FIGS. 39 and 40, a slope of the actuator housing 78 relative to a horizontal plane when the clutch pedal 47 is not depressed (i.e. during no stroke of the clutch pedal 47) is relatively steep as shown in FIG. 39, whereas the slope of the actuator housing 78 relative to the horizontal plane when the clutch pedal 47 is depressed to the maximum is relatively gentle as shown in FIG. 40. Since such angle change of the actuator housing 78 is allowed, the rack shaft 80 can surely press the pedal part 183 to a limit of the stroke (a limit of the depression of the pedal part 183).

In other words, the accelerator pedal actuator 41A and the brake pedal actuator 41B press the accelerator pedal 45 and the brake pedal 46 respectively as the linear motion. In contrast, the clutch pedal actuator 41C presses the clutch pedal 47 while pivoting.

In the embodiment described above, the actuator housing 78 is supported from the lower side of the actuator housing 78 by the pedal actuator support bracket 61 through the slide bracket 69 and the link arm 68, and an extension line L of the rack shaft 80 passes or extends above the pedal actuator support bracket 61. Therefore, a direction of a load acting on the pivoting pedal part 183 becomes a proper direction. Further, the electric motor 81 part protruding downward from the actuator housing 78 is not excessively lowered during the stroke, then interference with the vehicle body floor 6 does not easily occur.

Further, a height position of the slide rail 31 supporting the pedal actuator 41 can be lowered, then as shown in FIG. 3 etc., the slide rail 31 can be set at a height position close to the front end of the seat cushion 3. This point is also applied to the accelerator pedal actuator 41A and the brake pedal actuator 41B.

It is noted that in a case where the stroke (a depression amount) of the clutch pedal 47 is small or where the roller 86 can press the pedal part 183 by a structure of the clutch pedal 47, the three pedal actuators 41 could have the same structure.

Conversely, the structure like the clutch pedal actuator 41C of the embodiment could also be applied to the accelerator pedal actuator 41A and/or the brake pedal actuator 41B.

[Application to Vehicle with Automatic Transmission]

As described above, the pedal actuators 41 can be fixed to the frame 11 in the vehicle interior after carrying the frame 11 into the vehicle interior. For instance, in a case where the automatic vehicle driving device 1 is applied to the vehicle with the automatic transmission having no clutch pedal 47, only the accelerator pedal actuator 41A and the brake pedal actuator 41B, except the clutch pedal actuator 41C, are attached.

Figure 41:
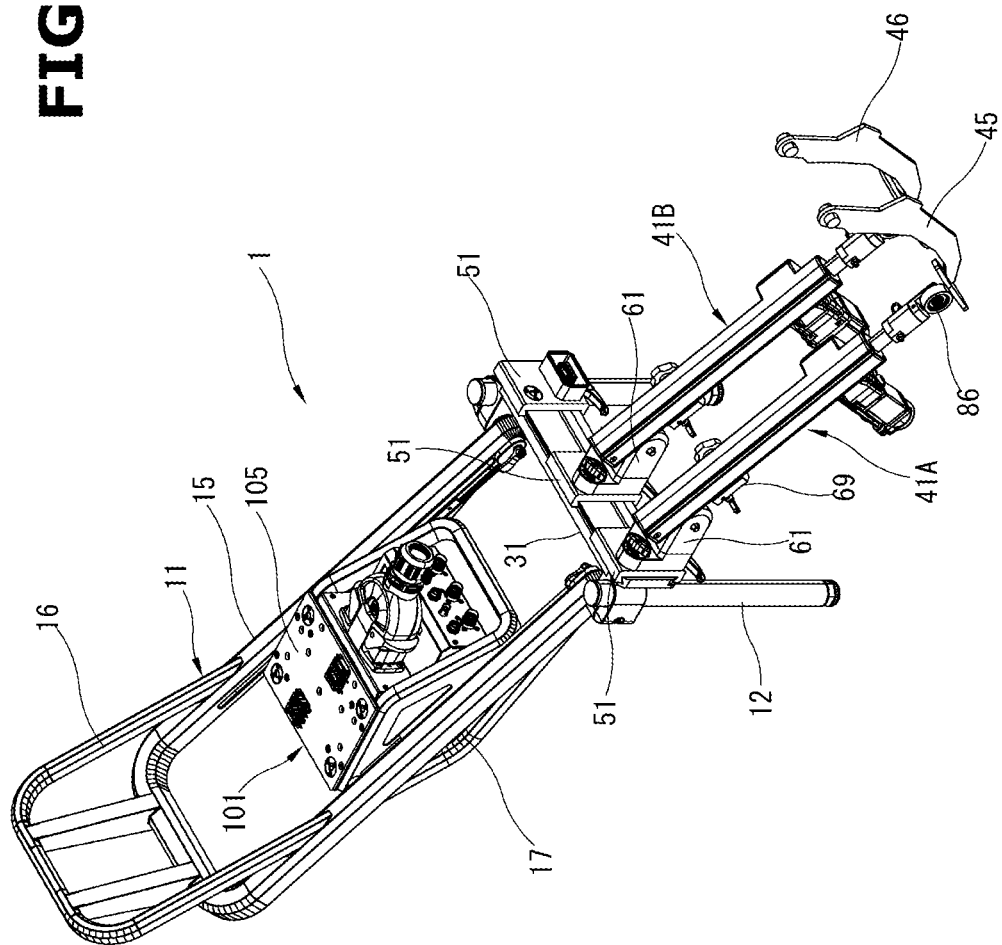
FIG. 41 is a perspective view of the automatic vehicle driving device applied to a vehicle with an automatic transmission.

With this, as shown in FIG. 41, the automatic vehicle driving device 1 used for the vehicle with the automatic transmission is obtained.

As described above, since the pedal actuator 41 is easily attached (fixed) and detached (dismounted), even when a test vehicle on the chassis dynamometer is changed from the vehicle with the manual transmission to the vehicle with the automatic transmission, the automatic vehicle driving device 1 can readily meet this change.

[Leg-Power Detecting Structure of Pedal Actuator 41]

The pedal actuators 41 in the embodiment each have a load cell 192 that detects a load acting on the rack shaft 80, then the pedal actuators 41 can detect leg-powers (or depression forces) (in other words, pedal reaction forces) acting on the pedals 45, 46 and 47.

The rack shaft 80 moves forward and backward along a longitudinal direction of the actuator housing 78 supported at the front end portion of the frame 11 supported at or by the driver's seat of the vehicle.

Figure 42:
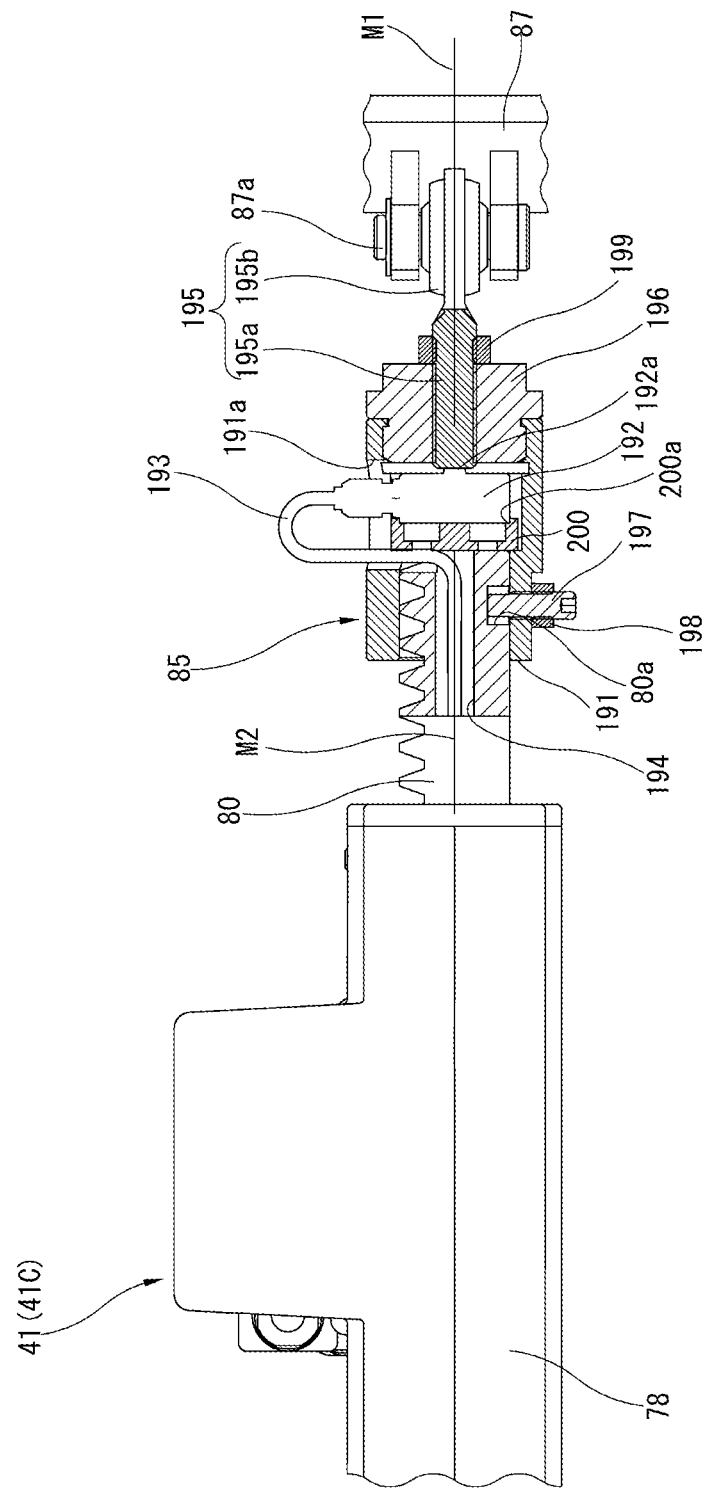
FIG. 42 is a sectional view of a load-cell joint part of the pedal actuator.

FIG. 42 is a sectional view of the load cell joint 85 provided at the top end portion of the rack shaft 80. As shown in the drawing, the load cell joint 85 has a cylindrical sleeve 191 that is fitted onto the top end of the rack shaft 80. An inside diameter of the sleeve 191 is greater than an outside diameter of the rack shaft 80.

The sleeve 191 is attached to the top end of the rack shaft 80 with a fixing screw 197 with the sleeve 191 being slidable along a longitudinal direction (in other words, an axial direction) of the rack shaft 80. A top end of the fixing screw 197 is engaged with a grooved portion 80a formed on an outer peripheral surface at the top end of the rack shaft 80. The grooved portion 80a is a recessed portion into which the fixing screw 197 can be inserted. For instance, the grooved portion 80a is shaped into an ellipse (an oval shape) along the longitudinal direction (in other words, the axial direction) of the rack shaft 80.

Therefore, by inserting the top end, penetrating the sleeve 191, of the fixing screw 197 into the grooved portion 80a, the sleeve 191 is attached to the top end of the rack shaft 80 with the slide of the sleeve 191 along the longitudinal direction of the rack shaft 80 according to a length of the grooved portion 80a being permitted. Further, by inserting the top end, penetrating the sleeve 191, of the fixing screw 197 into the grooved portion 80a, rotation of the sleeve 191 on the rack shaft 80 is stopped or restrained. The fixing screw 197 is provided with a nut 198 to prevent looseness of the fixing screw 197.

The sleeve 191 encloses an outer periphery of a boundary portion between the rack shaft 80 and a push rod 195, and accommodates the after-mentioned load cell 192. A top end of the sleeve 191 is sealed with a cap-shaped retaining member 196. The push rod 195 serving as a pedal-side rod is provided at this retaining member 196 with the push rod 195 penetrating a center of the retaining member 196.

The push rod 195 is, for instance, the so-called rod end bearing. The push rod 195 has a bar-shaped (or a rod-shaped) rod part 195a at a base end side of the push rod 195 and a cylindrical bearing part 195b at a top end side of the push rod 195. The rod part 195a is positioned on the rack shaft 80 side, and the bearing part 195b is positioned on the roller 86 side or the pivotal plate 87 side (in the drawing, on the pivotal plate 87 side). The rod part 195a is screwed into the retaining member 196. The bearing part 195b rotatably supports the pin 87a of the pivotal plate 87.

The push rod 195 is locked by a nut 199. The nut also has the function of performing positioning of the push rod 195. The push rod 195 is set at the top end side of the rack shaft 80 along the longitudinal direction of the rack shaft 80. That is, the push rod 195 is set so that an axial center M1 of the rod part 195a is aligned with an axial center M2 of the rack shaft 80. The axial center M1 is orthogonal to an axial center of the bearing part 195b. The aforementioned roller 86 or the aforementioned pivotal plate 87 is joined to the bearing part 195b of the push rod 195 protruding from the sleeve 191 (in the drawing, the pivotal plate 87 is joined to the bearing part 195b).

The load cell 192 is sandwiched between a top end surface (the top end) of the rack shaft 80 and a base end surface (the base end) of the push rod 195 inside the sleeve 191. A pressing force (a thrust) of the rack shaft 80 is thus transmitted to the push rod 195 through the load cell 192.

Therefore, a load that each of the rollers 86 or the pivotal plate 87 receives from the respective pedals 45, 46 and 47 when the respective rack shafts 80 extend and press the respective pedals 45, 46 and 47 acts on the load cell 192 through the push rod 195, and is detected as the pedal reaction force. It is noted that the slidable sleeve 191 does not bear a compressive load.

The load cell 192 is aligned with the rack shaft 80 and the push rod 195 along the longitudinal direction of these rack shaft 80 and push rod 195.

The load cell 192 is shaped into a disc shape. The load cell 192 has, in the middle thereof, a detection part 192a that detects the compressive load. The load cell 192 is set so that a center position of the detection part 192a is aligned with the axial center M1 of the push rod 195 and the axial center M2 of the rack shaft 80.

That is, the pedal actuator 41 is structured so that the center position of the detection part 192a, the axial center M1 of the push rod 195 and the axial center M2 of the rack shaft 80 are positioned on the same straight line.

The load cell 192 is retained at the top end of the rack shaft 80 through a load cell retaining member 200. The load cell retaining member 200 is fixed to the top end surface of the rack shaft 80 with a bolt (not shown). The load cell retaining member 200 has a recessed portion 200a that can retain an outer peripheral edge of one side surface of the load cell 192.

The load cell 192 is fitted into or engaged with an inner periphery of the recessed portion 200a of the load cell retaining member 200, thereby preventing the load cell 192 from falling off an opening 191a of the sleeve 191.

Here, since the sleeve 191 is attached so as to be slidable along the longitudinal direction of the rack shaft 80, in a no-operation state of the rack shaft 80, a minute gap exists between the detection part 192a of the load cell 192 and the base end of the push rod 195.

As illustrated in the drawing, a cable 193 of the load cell 192 is routed through a hollow part 194 that is formed at an inner side of the rack shaft 80 along the longitudinal direction of the rack shaft 80. That is, the cable 193 extends to the frame 11 side through the inner side of the rack shaft 80. The cable 193 is a cable including the power supply system and the signal system.

More specifically, the cable 193 of the load cell 192 is drawn out in a radial direction of the sleeve 191 using the opening 191a of the sleeve 191, and penetrates the sleeve 191. Then, the cable 193 of the load cell 192 bypasses the load cell retaining member 200 using the opening 191a of the sleeve 191, and is routed to the hollow part 194 of the rack shaft 80 from a back side of the load cell retaining member 200. This cable 193 is connected to the bracket-side connector 63 of the pedal actuator support bracket 61 together with the aforementioned cable (not shown) for the electric motor 81 of the pedal actuator 41.

[Working and Effect]

As described above, the clutch pedal actuator 41C of the automatic vehicle driving device 1 of the embodiment is configured so that the pivotal plate 87 is placed on a pressing surface of the clutch pedal 47 so as to overlap the pressing surface of the clutch pedal 47 and fixed to the pressing surface of the clutch pedal 47. Therefore, the pivotal plate 87 can surely perform the pressing operation of the clutch pedal 47 regardless of the angle change of the clutch pedal 47.

Further, the clutch pedal actuator 41C is configured so that the actuator housing 78 is supported by the pedal actuator support bracket 61 so as to be able to pivot (or rotate or tilt) upward and downward relative to the pedal actuator support bracket 61, and also the pivotal plate 87 fixed to the clutch pedal 47 is connected to the top end of the rack shaft 80 so as to be able to pivot (or rotate or tilt) upward and downward. Therefore, even if the clutch pedal 47 is pressed and its height position is changed, an attitude of the actuator housing 78 of the clutch pedal actuator 41C can follow the height position of the pedal.

That is, since the angle change of the actuator housing 78 is allowed, the clutch pedal actuator 41C can surely press the clutch pedal 47 to a limit of the stroke (a limit of the depression of the clutch pedal 47) even if the stroke of the rack shaft 80 becomes large. In other words, even if the clutch pedal 47 is the clutch whose depressing operation amount (depression amount) is large, the clutch pedal actuator 41C can surely perform the pressing operation to the limit of the stroke.

Further, the clutch pedal actuator 41C is configured so that the actuator housing 78 is supported from the lower side of the actuator housing 78 by the pedal actuator support bracket 61 through the slide bracket 69 and the link arm 68, and the extension line L of the rack shaft 80 passes or extends above the pedal actuator support bracket 61.

With this structure, the clutch pedal actuator 41C enables the direction of the load acting on the pivoting pedal part 183 of the clutch pedal 47 to be a proper direction. More specifically, the clutch pedal actuator 41C enables an angle of the direction of the load acting on the pedal part 183 of the clutch pedal 47 with respect to the horizontal plane to be increased. Further, the clutch pedal actuator 41C is configured so that the electric motor 81 part protruding downward from the actuator housing 78 is not excessively lowered during the stroke, then interference with the vehicle body floor 6 does not easily occur. Furthermore, it is possible to lower the height position of the slide rail 31 supporting the clutch pedal actuator 41C.

The clutch pedal actuator 41C is connected to the link arm 68 through the slide bracket 69 slidably fixed to the actuator housing 78, and is fixed to the slide bracket 69 with the fixing screw 79.

With this structure of the clutch pedal actuator 41C, it is possible to easily adjust the fore-and-aft position of the actuator housing 78 according to the position of the clutch pedal 47 in the vehicle.

Second Embodiment

Next, an automatic vehicle driving device 301 of a second embodiment will be described.

[General Configuration of Automatic Vehicle Driving Device 301 of Second Embodiment]

FIGS. 43 to 46 show a state in which the automatic vehicle driving device 301 of the second embodiment is mounted above a driver's seat 302 of a vehicle. FIGS. 47 to 51 show the automatic vehicle driving device 301 in its entirety with the device 301 dismounted from the vehicle. This automatic vehicle driving device 301 is used when carrying out a running test of the vehicle on a chassis dynamometer (not shown). The automatic vehicle driving device 301 performs a pedal operation of an accelerator pedal etc. and a shift-lever operation of a transmission by signals from an external controller placed outside the vehicle.

Here, as described later, the automatic vehicle driving device 301 of the present embodiment can be used for a vehicle with a manual transmission having a clutch pedal and for a vehicle with an automatic transmission having no clutch pedal. Further, the automatic vehicle driving device 301 of the present embodiment can be applied to both of the so-called right-hand drive vehicle in which the driver's seat is on a right side of the vehicle and the shift-lever operation is done by driver's left hand and the so-called left-hand drive vehicle in which the driver's seat is on a left side of the vehicle and the shift-lever operation is done by driver's right hand. The embodiment shown in FIGS. 43 to 51 illustrate an example of a configuration of the automatic vehicle driving device 301 applied to the right-hand drive vehicle with the manual transmission having an accelerator pedal 345, a brake pedal 346 and a clutch pedal 347.

The driver's seat 302 is supported on a vehicle body floor 306 (see FIG. 44) through a fore-and-aft slide mechanism and an up-and-down movement mechanism (both not shown). The driver's seat 302 has a seat cushion 303 forming a seat surface on which a driver is seated, a seat back 304 supporting driver's back and a headrest 305 supporting driver's head. The seat back 304 generally has the so-called reclining mechanism that allows adjustment of a tilt angle of the seat back 304 with respect to the seat cushion 303.

The automatic vehicle driving device 301 is configured mainly from a frame 311 extending obliquely or slantingly downward from a vicinity of an upper end part of the seat back 304 toward a vehicle front side, a pair of legs 312 positioned at a front end of the frame 311 and extending downward along a front end of the seat cushion 303, three pedal actuators 341 extending from the front end of the frame 311 to the vehicle front side and operating the three pedals 345, 346 and 347 respectively, a movable unit 401 supported with the movable unit 401 floating from the seat cushion 303 and the seat back 304 in the middle of the frame 311, a transmission actuator unit 431 mounted on an upper surface of the movable unit 401 and a connection box 406 located at a front end portion of the frame 311.

Figure 47:
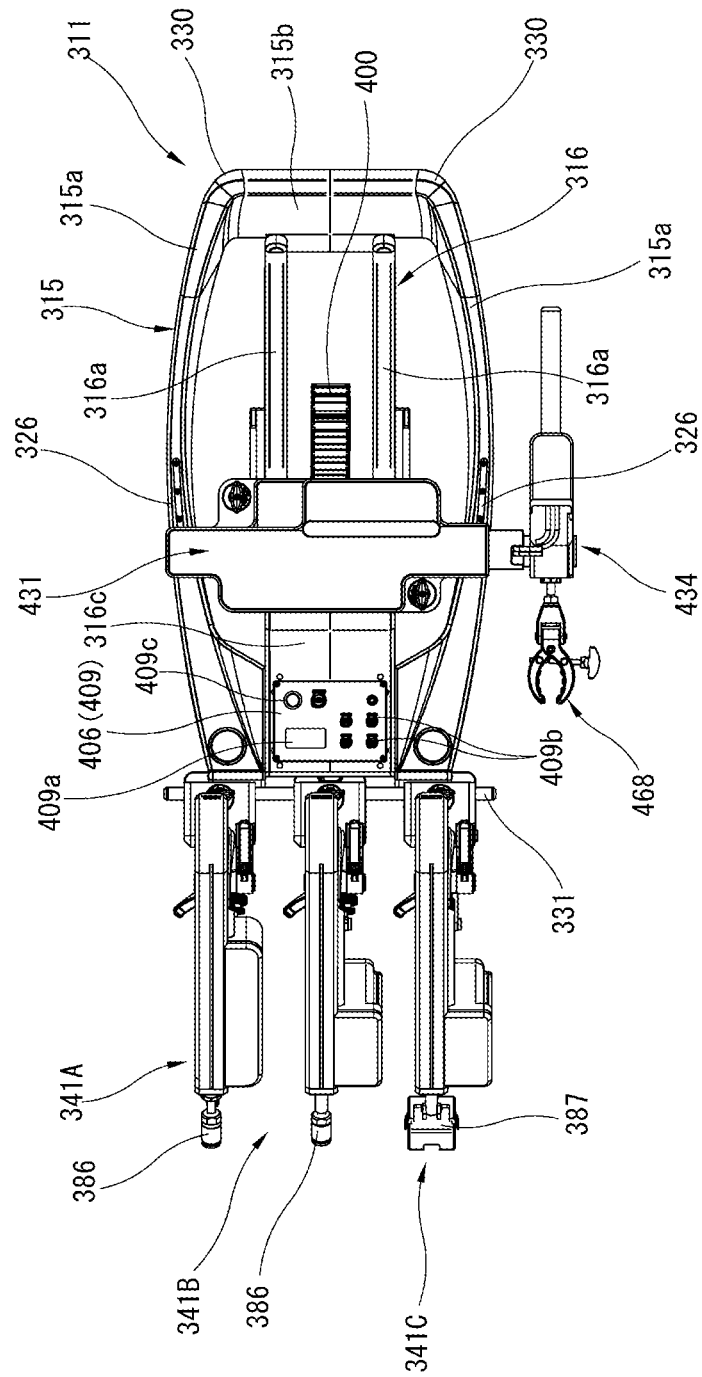
FIG. 47 is a top view of the automatic vehicle driving device of the second embodiment.
Figure 73:
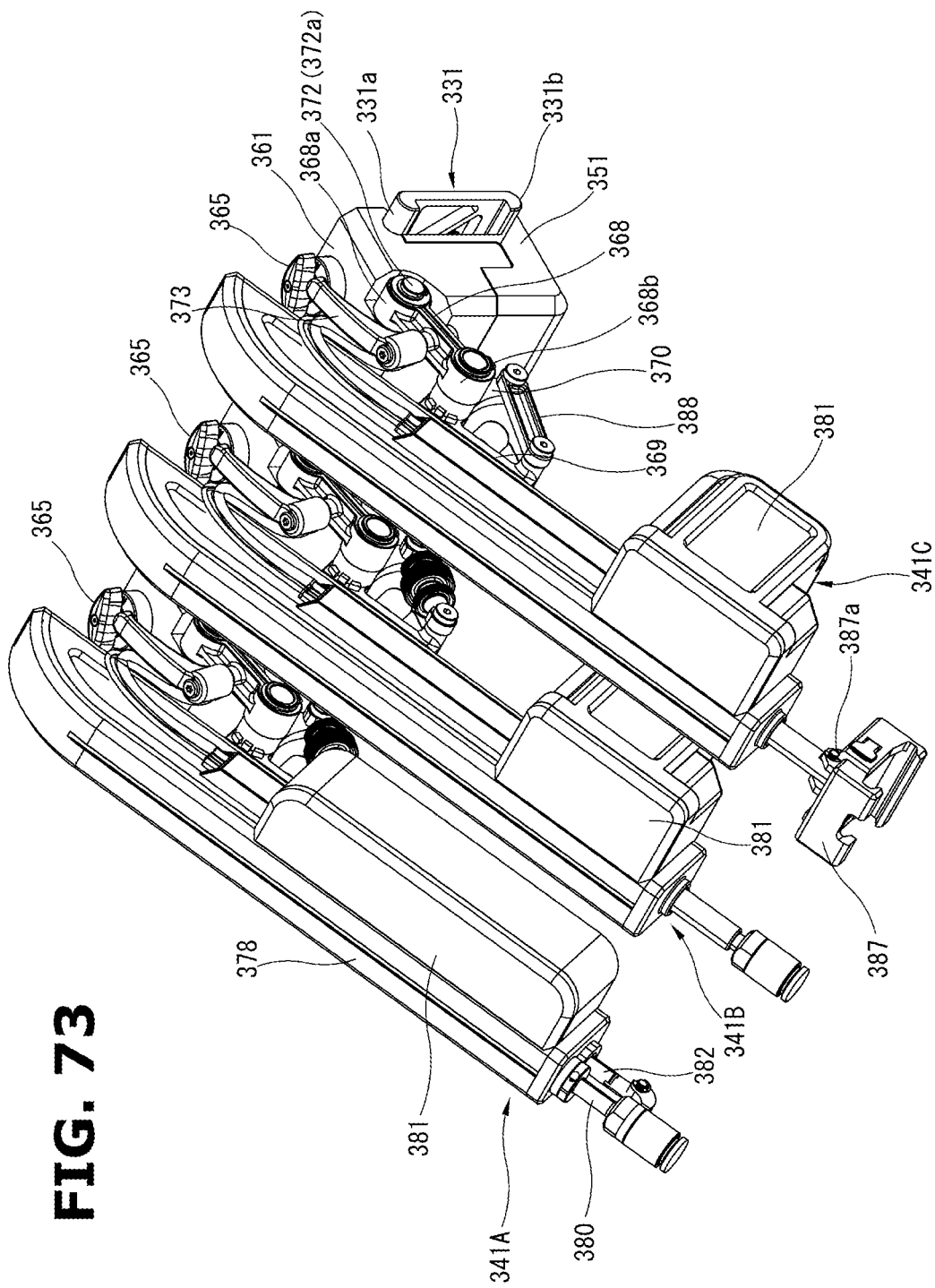
FIG. 73 is a perspective view of the pedal actuators with the pedal actuators fixed to a slide rail.

As the pedal actuators 341, they are an accelerator pedal actuator 341A that operates the accelerator pedal 345, a brake pedal actuator 341B that operates the brake pedal 346 and a clutch pedal actuator 341O that operates the clutch pedal 347 (see FIGS. 47 and 73). Although these three pedal actuators 341 could have exactly the same structure, in the present embodiment, by taking into account the fact that the clutch pedal 347 moves along an arc and its stroke (a depressing operation amount) is relatively large, the clutch pedal actuator 341O is different from the other two pedal actuators 341A and 341B in details of structure. The accelerator pedal actuator 341A and the brake pedal actuator 341B have substantially the same structure. Here, since a basic structure is common to the three pedal actuators 341, when there is no need to distinguish the three pedal actuators 341A, 341B and 341O, they are collectively called the pedal actuators 341.

The connection box 406 forms a connection unit between a variety of actuators etc. and a variety of sensors etc. provided at the automatic vehicle driving device 301 and a cable (including a power supply system and a signal system) drawn into the vehicle from the external controller placed outside the vehicle.

The movable unit 401 is configured so as to be able to slide relative to the frame 311 in a forward-and-backward direction. The movable unit 401 serves as a supporting stage of the transmission actuator unit 431. This movable unit 401 and the connection box 406 are electrically connected through a flat-band-shaped flexible cable 400. The cable 400 is formed by protecting a plurality of electric wires with a metal-chain-like flexible protective member. The cable 400 is bent into a U-shape or a J-shape, then regardless of a slide position of the movable unit 401, both of the movable unit 401 and the connection box 406 can be electrically connected.

The transmission actuator unit 431 is a unit that operates a shift lever, which is placed, in the example shown in the drawings, on a left side of the driver's seat 302. The transmission actuator unit 431 has a configuration in which a selecting actuator 433 that performs an operation (the so-called selecting operation) of the shift lever along a vehicle width direction and a shifting actuator 434 that performs an operation (the so-called shifting operation) of the shift lever along a vehicle longitudinal direction are combined. More specifically, the transmission actuator unit 431 has a grip hand 468 gripping a substantially spherical knob or grip of a head (not shown) of the shift lever, and this grip hand 468 moves forward and backward by a motion of the shifting actuator 434, and also the shifting actuator 434 moves as a whole along the vehicle width direction by a motion of the selecting actuator 433, then both of the selecting operation and the shifting operation are realized.

The automatic vehicle driving device 301 mounted above the driver's seat 302 of the vehicle is fixed to the vehicle by being drawn (or pulled) obliquely downward in a rear direction by a belt(s) 325 at both right and left sides of the driver's seat 302. More specifically, a seat support 327 having rigidity is provided at a rear end of the seat cushion 303 to protect the driver's seat 302 from damage, and the belts 325 are fastened (attached) to both ends of a laterally long narrow ring portion 329. The seat support 327 has a plate portion 328 extending, like a substantially L-shape, from the rear end of the seat cushion 303 to a lower end of the seat back 304, and is attached to a rear side of the driver's seat 302 such that the plate portion 328 is inserted from the rear side of the driver's seat 302 (i.e. from a rear seat side of the vehicle) along a lower surface of the driver's seat 302 (see FIG. 44). It is noted that each of right and left ends of the belt 325 is formed into a loop shape through a general-purpose belt tightening device (the so-called load tightening device), and a tightening operation is done by this belt tightening device. As described later, in a state in which the automatic vehicle driving device 301 is tightened and fixed with the belts 325, lower ends of the legs 312 abut against the vehicle body floor 306 and an upper end of the frame 311 abuts against an upper portion of the seat back 304.

Next, each part forming the automatic vehicle driving device 301 will be described in detail.

[Configurations of Frame 311 and Leg 312]

Figure 52:
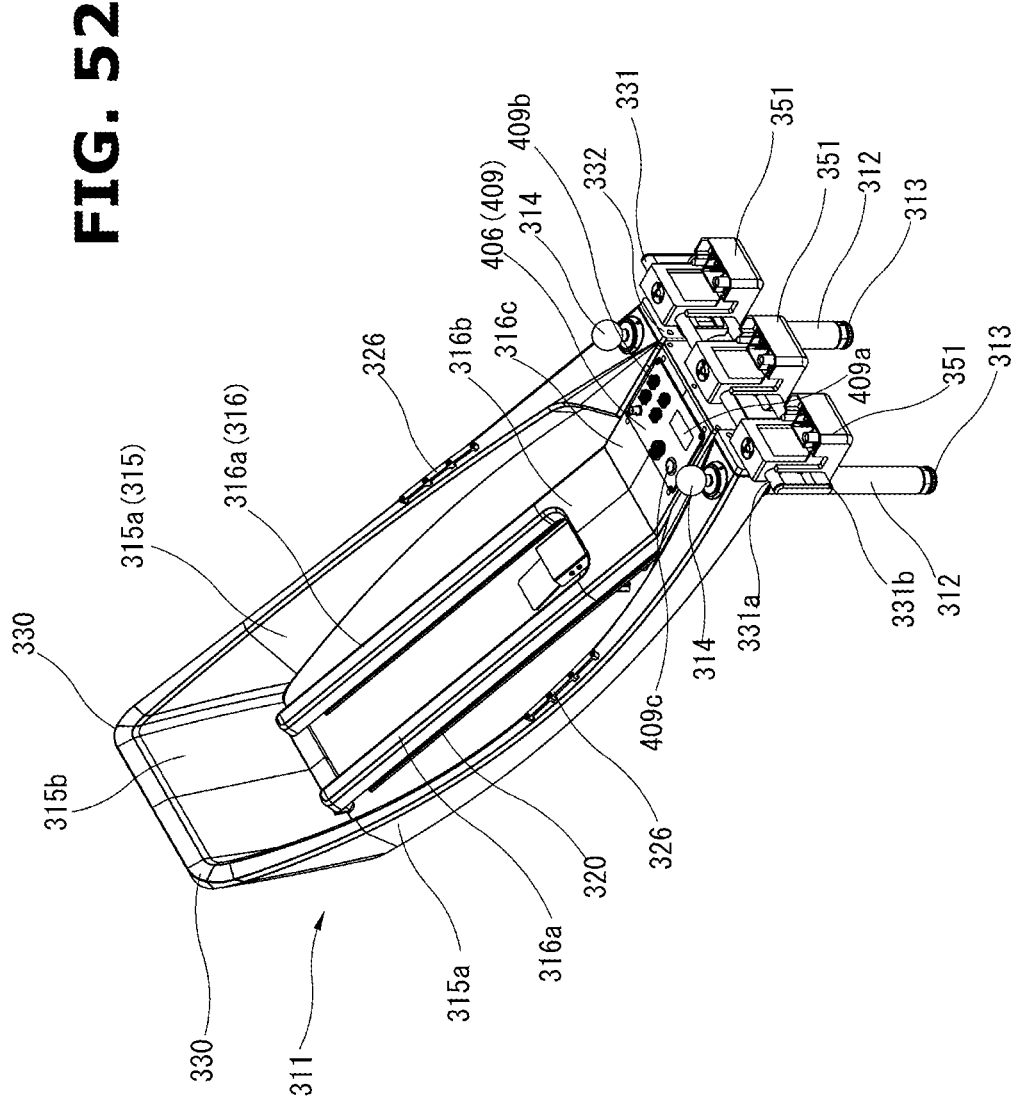
FIG. 52 is a perspective view of the frame and the legs.
Figure 53:
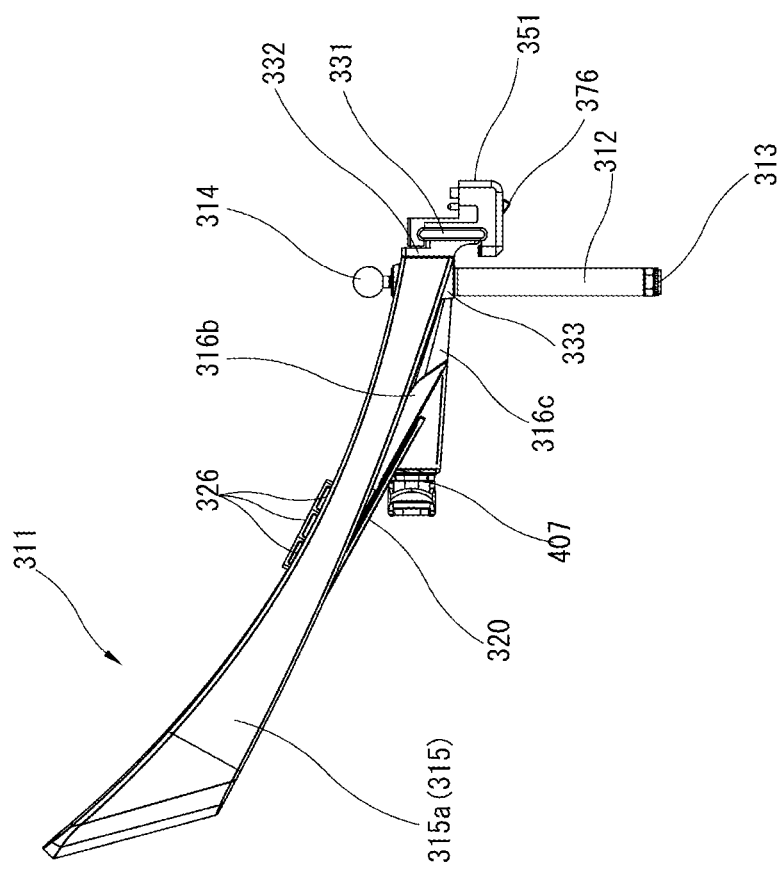
FIG. 53 is a side view of the frame and the legs.
Figure 54:
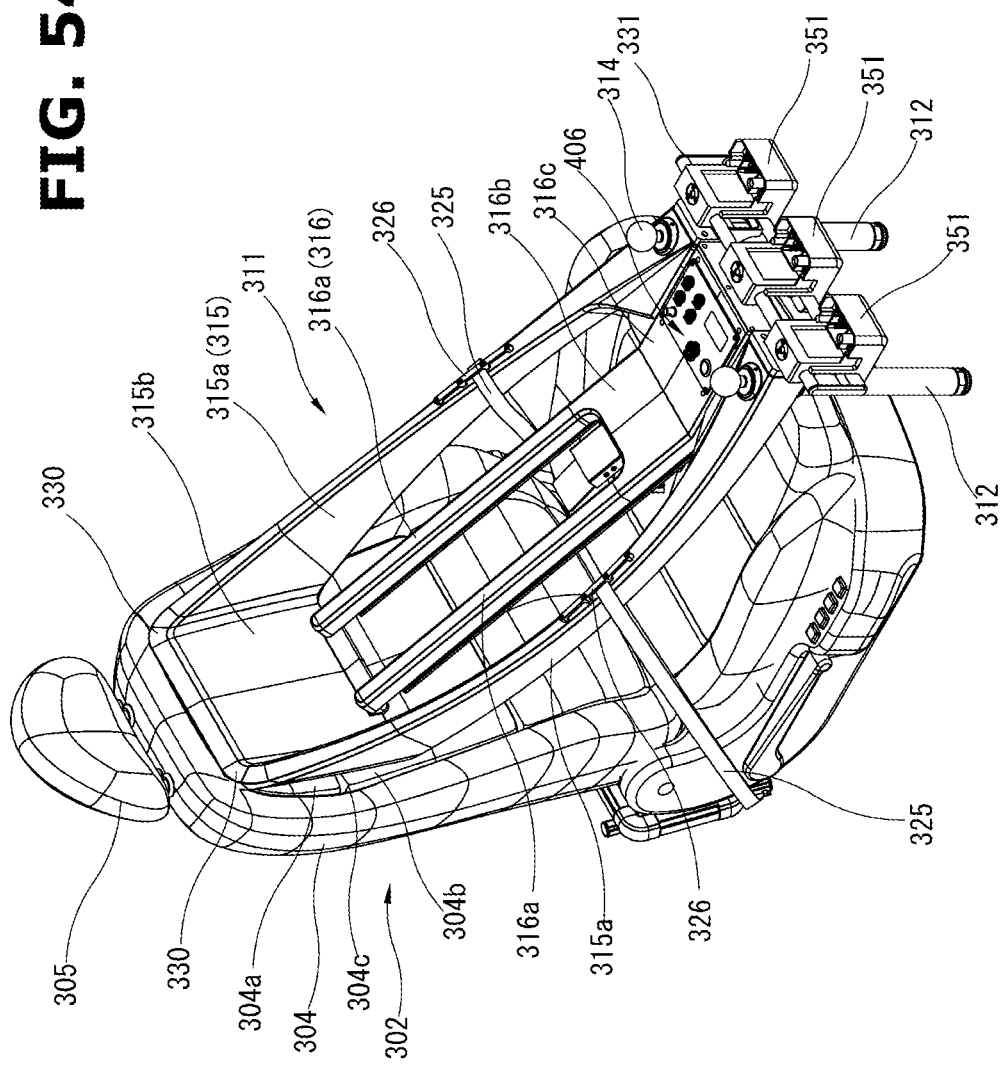
FIG. 54 is a perspective view showing a state in which the frame is mounted on the driver's seat.

FIGS. 52 to 54 show configurations or structures of the frame 311 and the leg 312. The frame 311 is formed into a hollow pipe shape using e.g. carbon fiber reinforced plastics (CFRP). The frame 311 has a main frame 315 and a sub frame 316, and these are formed as integral parts. More specifically, some parts are separately molded, and these molded parts are connected together as an integral frame.

The main frame 315 has a substantially U-shape in plan view (or top view, viewed from an upper side of the vehicle, as shown in FIG. 47). That is, the main frame 315 has a pair of main beams 315a extending obliquely in the vehicle longitudinal direction and a vertically-expanding band-shaped lateral beam 315b extending along a horizontal direction and connecting upper ends of the pair of main beams 315a. In a vehicle-mounted state, as an attitude of the main frame 315, the lateral beam 315b abuts against the upper portion of the seat back 304, and the main beams 315a linearly extend obliquely downward from this abutting portion of the lateral beam 315b toward the front end of the seat cushion 303.

The main beam 315a has a rectangular cross section. A size in a vertical direction of the main beam 315a is relatively small at a middle portion in a longitudinal direction (the vehicle longitudinal direction) of the main beam 315a, and the main beam 315a expands in the vertical direction toward a rear end portion of the main beam 315a and seamlessly continues to the lateral beam 315b at the rear end portion of the main beam 315a. The size in the vertical direction of the main beam 315a at a front end portion where the leg 312 is fixed is slightly larger than that at the middle portion of the main beam 315a.

A width-direction size of the rectangular cross section of the main beam 315a is almost constant at a region from the rear end portion to the middle portion. Then, the width-direction size of the rectangular cross section gradually increases from the middle portion toward the front end portion. The width-direction size of the rectangular cross section at the front end portion where the leg 312 is fixed is sufficiently large as compared with a projected area of the leg 312 so as to form a fixing part. Further, the front end portions of the pair of main beams 315a extend or expand inwards so as to continue to the sub frame 316.

The pair of main beams 315a have a symmetrical shape. In plan view of the main frame 315, as shown in FIG. 47, each of the main beams 315a is curved into an arch shape such that the pair of main beams 315a have a barrel shape as a whole. In other words, a distance between the pair of main beams 315a around the middle portion in the vehicle longitudinal direction is large, and distances between the pair of main beams 315a at the rear end portion (at the lateral beam 315b side) and at the front end portion are small as compared with that at the middle portion.

Further, in side view, the shape of the main beam 315a is not completely straight, but is curved gently into an arch shape so as to relatively resemble a shape formed by the seat back 304 and the seat cushion 303 (see FIG. 53).

Figure 44:
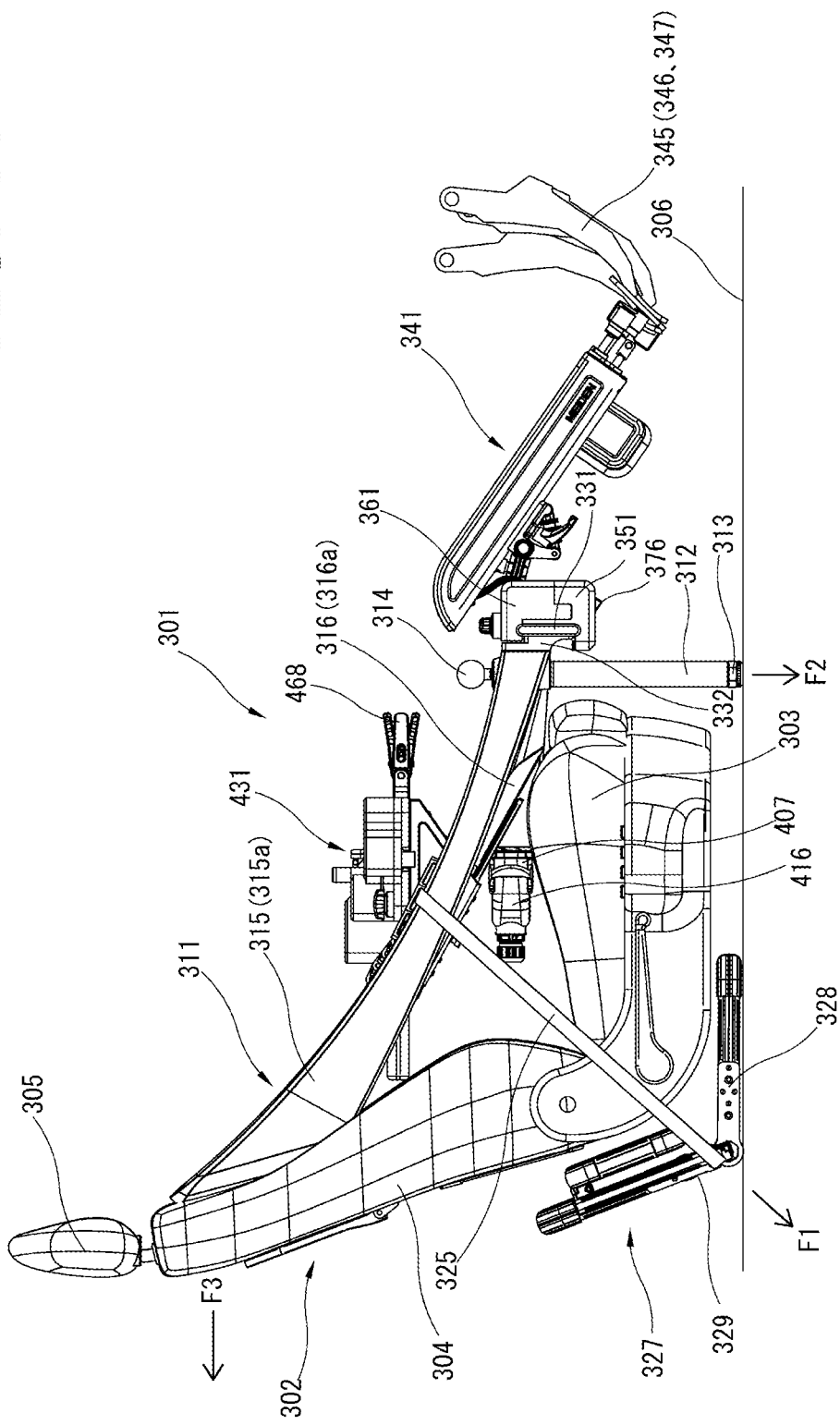
FIG. 44 is a side view showing the state in which the automatic vehicle driving device according to the second embodiment is mounted on the driver's seat.
Figure 45:
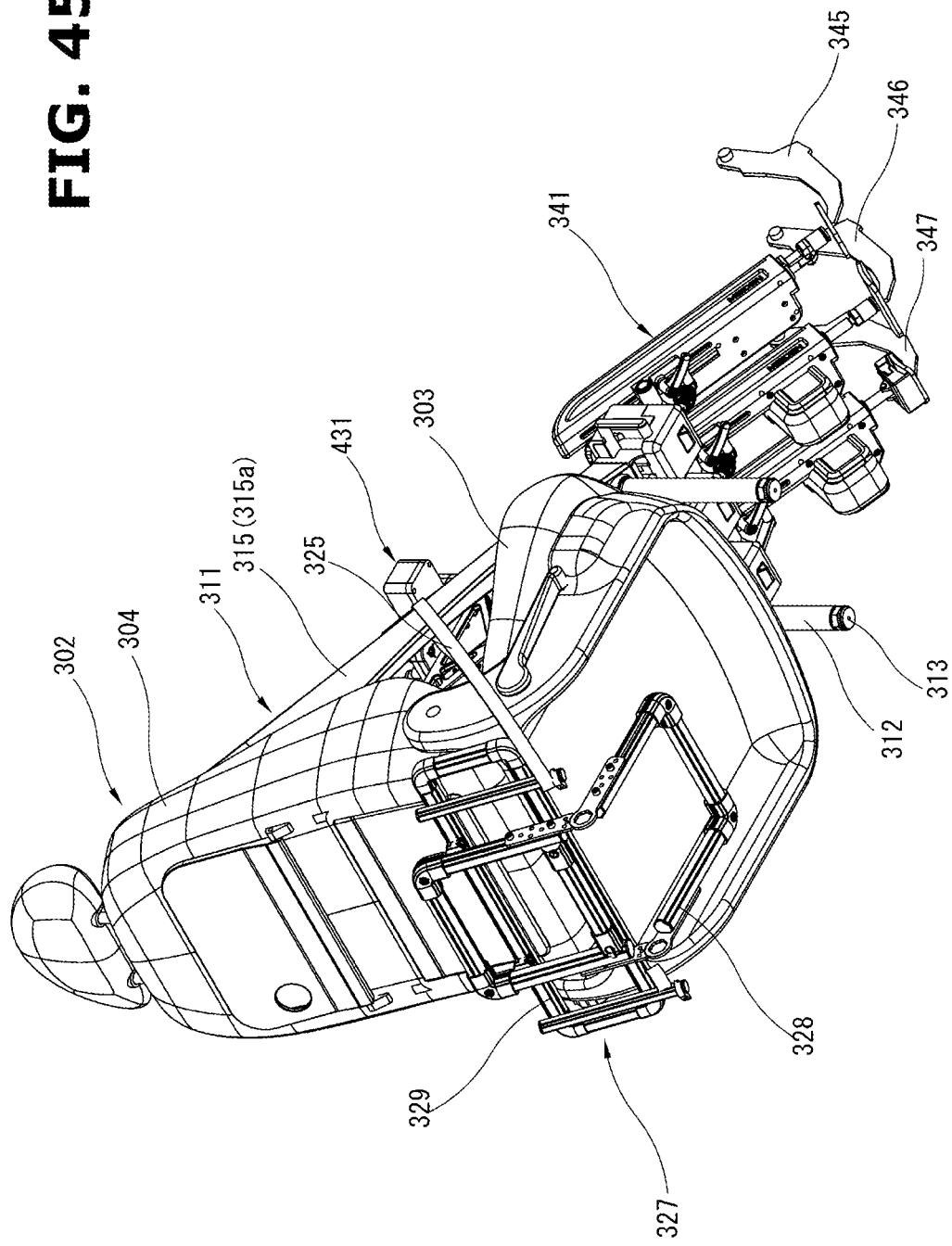
FIG. 45 is a perspective view, viewed from below, showing the state in which the automatic vehicle driving device according to the second embodiment is mounted on the driver's seat.
Figure 46:
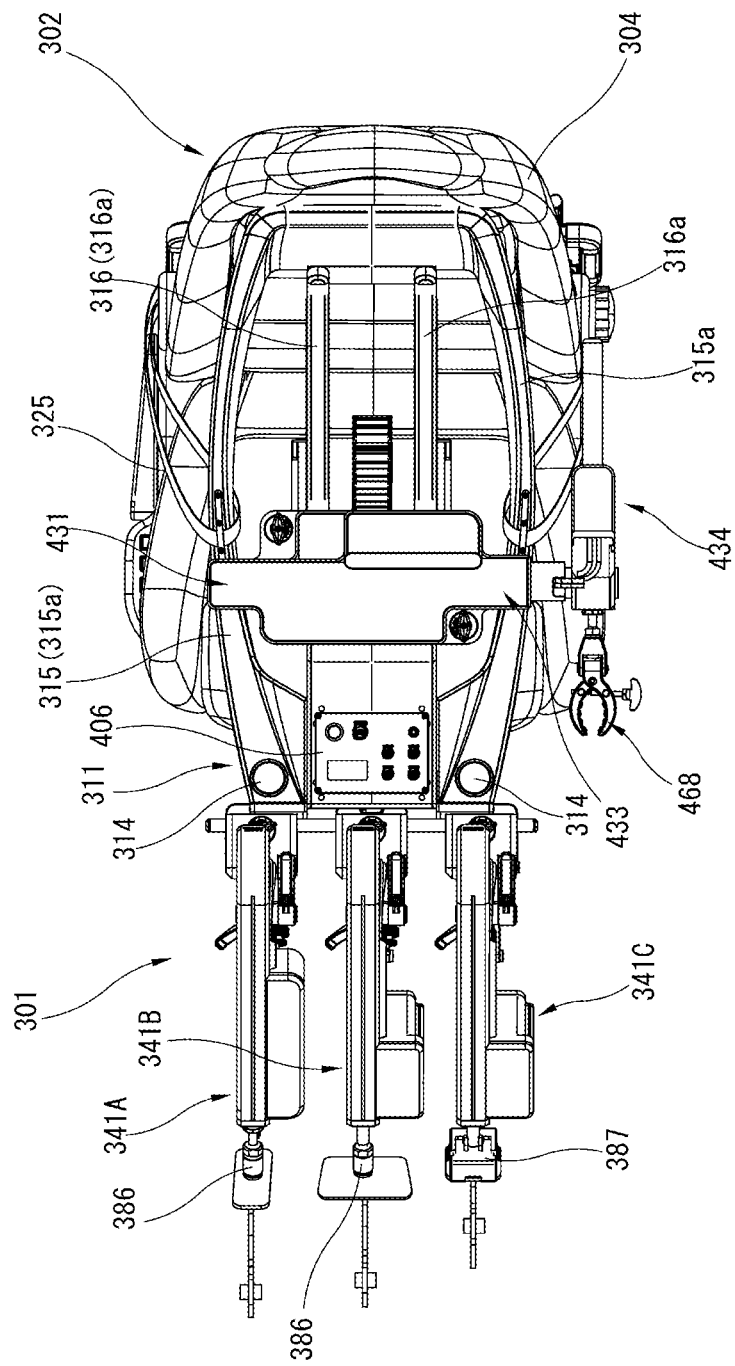
FIG. 46 is a top view showing the state in which the automatic vehicle driving device according to the second embodiment is mounted on the driver's seat.

The pair of main beams 315a each have, on upper surfaces at the middle portions thereof, a belt loop(s) 326 through which the band-shaped belt 325 passes. The belt loop 326 is formed of a flat U-shaped metal member. The belt 325 is attached to the main beam 315a with the belt 325 passing through a gap formed between the surface of the main beam 315a and the belt loop 326. The middle portion, where this belt loop 326 is located, of the main beam 315a is thinnest (a length of a circumference of the main beam 315a is shortest), and the distance between the pair of main beams 315a at the middle portion is largest. Since the pair of main beams 315a swell or curve outward in the width direction at portions where the belts 325 are attached in this manner, as shown in FIG. 44, the belts 325 extending from the seat support 327 are set relatively straight (i.e. without inclining relative to the vehicle longitudinal direction) without interfering with the seat cushion 303 etc. in a vehicle-mounted state. Therefore, the belt 325 does not bite side edges of the seat cushion 303 and the seat back 304, thereby suppressing damage to the seat cushion 303 and the seat back 304. Here, as an embodiment, in order to be able to adjust an attachment position of the belt 325, the plurality of belt loops 326 are arranged in series.

The lateral beam 315b of the main frame 315 has a slightly-tilted substantially rectangular plate shape so as to correspond to a basic tilt angle of the seat back 304, and forms a seat back abutting part that abuts against the vicinity of the upper end part of the seat back 304 in the vehicle-mounted state. By properly adjusting the tilt of the seat back 304 by the reclining mechanism, a substantially rectangular outer side surface of the lateral beam 315b comes into wide-surface-contact with the seat back 304. Here, rubber parts 330 made of elastomer having a proper elasticity are provided on surfaces at both shoulder portions, abutting against the seat back 304, of the frame 311, i.e. at both end portions of an upper edge of the lateral beam 315b (corner portions continuing or connecting to the main beams 315a).

When reaction forces in a fore-and-aft direction occurring due to working of the pedal actuators 341 and/or the shifting actuator 434 act on the frame 311, the both shoulder portions as a rear end of the frame 311 are pressed hard against the seat back 304. However, by providing the elastic rubber parts 330 at these shoulder portions, damage to the seat back 304 is suppressed. These rubber parts 330 also have the function of suppressing a slip relative to the seat skin of the seat back 304. Although the rubber parts 330 could be attached (or stuck) simultaneously upon final molding of the frame 311, the rubber parts 330 may be bonded in a later process.

The seat back 304 generally has an upper pad portion 304a and a lower pad portion 304b whose inside materials (also whose hardness) are different from each other. A basic size (dimensions) of each part of the main frame 315 is set so that a lower edge of the of the lateral beam 315b (i.e. a lower edge of the seat back abutting part) is substantially positioned along seams 304c of the seat skin which define a boundary between the upper pad portion 304a and the lower pad portion 304b (see FIG. 54). Although a concrete configuration of the seat back 304 is different depending on the vehicle types as a matter of course, in many cases, a position of the boundary between the upper pad portion 304a and the lower pad portion 304b is almost fixed. Since the seams 304c are relatively recessed, by mounting the automatic vehicle driving device 301 (the frame 311) in the vehicle with the lateral beam 315b of the main frame 315 being aligned with this position of the seams 304c, positioning of the automatic vehicle driving device 301 is facilitated, and also an attitude of the frame 311 becomes stable. Here, as a matter of course, the automatic vehicle driving device 301 can be mounted regardless of the position of the seams 304c depending on the vehicle types.

The sub frame 316 is located at an inner side of the barrel-shaped main frame 315 swelling or curving outward as described above. The sub frame 316 has a substantially U-shape as a whole in plan view. The sub frame 316 has a pair of straight sub beams 316a located parallel to each other, a hollow-plate-shaped lateral beam 316b connecting lower ends of the pair of sub beams 316a and a connection box supporting part 316c bent from a lower end of the lateral beam 316b and extending forward.

The pair of sub beams 316a and the lateral beam 316b extend along one slanting plane corresponding to a slope of the main frame 315. In other words, the pair of sub beams 316a and the lateral beam 316b are formed into a shape that is made by cutting off a cutting portion from an inclined band-shaped or long-narrow rectangular parent material into a U-shape. Each sub beam 316a has a rectangular cross section close to a square. The connection box supporting part 316c is formed so as to be on or along a horizontal plane relative to such slanting sub beams 316a and lateral beam 316b in the vehicle-mounted state. Therefore, these sub beams 316a and lateral beam 316b continue to the connection box supporting part 316c at predetermined angles.

The connection box supporting part 316c located on or along the horizontal plane is positioned with the connection box supporting part 316c sandwiched between the front end portions of the pair of main beams 315a of the main frame 315, and is fixedly connected to each other (or is formed integrally with each other). That is, the main frame 315 formed into the substantially U-shape in plan view has a closed structure through the connection box supporting part 316c. Rear ends (i.e. upper ends) of the sub beams 316a are connected to an inner side surface of the lower edge of the lateral beam 315b of the main frame 315. As mentioned above, the main frame 315 and the sub frame 316 are fixedly connected to each other (or formed integrally with each other) as a molded component using e.g. carbon fiber reinforced plastics (CFRP).

In side view, as shown in FIGS. 52 and 53, the slope of the sub frame 316 in its entirety and the slope of the main frame 315 in its entirety substantially correspond to each other. However, the main beams 315a gently curve, whereas the sub beams 316a extend straight. The sub frame 316 functions to reinforce the main frame 315 surrounding an outside of the sub frame 316, and also as described later, functions as a supporting member and as a guiding member that slidably support the movable unit 401.

Figure 51:
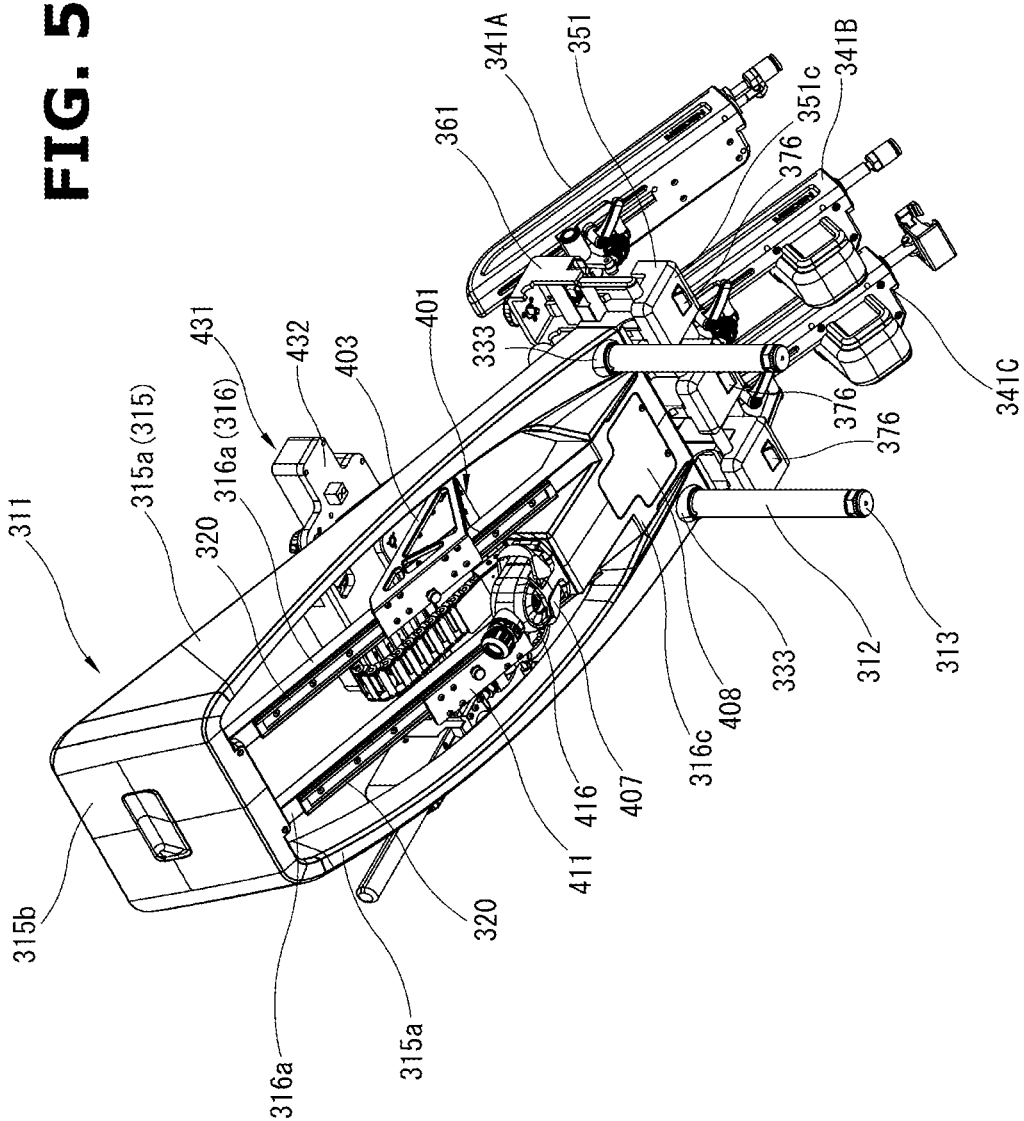
FIG. 51 is a perspective view, viewed from below, of the automatic vehicle driving device of the second embodiment with the transmission actuator unit and the accelerator pedal actuator being dismounted.

The connection box 406 is placed by being embedded in or fitted into the connection box supporting part 316*c* of the hollow-pipe-shaped sub frame 316. That is, a display panel 409 on an upper surface of the connection box 406 is placed along an upper surface of the connection box supporting part 316*c*, and its inside mechanism is accommodated in a hollow portion of the sub frame 316. The display panel 409 has a display part 409*a* formed of liquid crystal etc., and has a plurality of small-sized connectors 409*b*. Further, a light switch 409*c* for performing an ON/OFF operation of an after-mentioned LED light 376 is provided on the display panel 409. As shown in FIG. 51, a metal plate lower cover 408 of the connection box 406 is detachably attached to a lower surface of the connection box supporting part 316*c*.

Further, as shown in FIG. 51, a relatively large-sized main connector 407 is provided on a rear side of a lower portion of the connection box 406. This main connector 407 is located under (or below) the lateral beam 316*b* of the sub frame 316, and is set so as to be directed to a vehicle rear side. A relatively large-sized centralized connector (or a relatively large-sized integrated connector) 416 (see FIG. 51) of a top end of the cable (not shown) drawn into the vehicle from the external controller is connected the main connector 407.

The flat-band-shaped cable 400 for electrically connecting the movable unit 401 and the connection box 406 is connected to the connection box 406 above the main connector 407, and reaches the movable unit 401 through a space between the pair of sub beams 316*a* of the sub frame 316. This cable 400 is structured so as not to curve to its outer peripheral side by the chain-like protective member, and allows the movement of the movable unit 401 while holding the shape of letter U or letter J substantially along the slope of the sub beams 316*a*.

As illustrated in FIGS. 51 and 53, metal guide rails 320 for slidably guiding the movable unit 401, which will be described later, are fixed to lower surfaces of the pair of sub beams 316*a*. Each channel-shaped guide rail 320 is fixed with its rail surface facing toward the lower side. The channel-shaped guide rail 320 extends throughout the entire length of the sub beam 316*a* from a position close to the rear end (i.e. the upper end) of the sub beam 316*a* to a position where a part of the guide rail 320 overlaps an area of the lateral beam 316*b*.

On each of lower surfaces of lower ends (front ends) of the main frame 315 which are on an open end side of the U-shape and connected to each other through the connection box supporting part 316*c* of the sub frame 316, i.e. on each of lower surfaces of the front end portions of the pair of main beams 315*a*, a disc-shaped leg fixing seat portion 333 is formed. The cylindrical leg 312 is fixed to this leg fixing seat portion 333. The leg 312 is provided, at an upper end thereof, with a male screw protruding along a center line of the leg 312. On the other hand, the leg fixing seat portion 333 is provided, at a center thereof, with a metal nut portion (not shown). Then, by screwing the male screw of the leg 312 into the nut portion, the leg 312 is detachably connected to the leg fixing seat portion 333. For instance, when mounting the automatic vehicle driving device 301 in the vehicle, in a state in which the legs 312 are disconnected, the frame 311 is placed on the driver's seat 302. Then after that, the legs 312 can be easily connected to the respective leg fixing seat portions 333.

In the shown embodiment, each of the legs 312 is provided, at a lower end thereof, with a height adjustment screw 313. Then, fine adjustment is possible so that the legs 312 surely abut against the vehicle body floor 306 in the vehicle-mounted state.

The main beams 315*a* are each provided, on the upper surfaces of lower ends (the front end portions) thereof, with a spherical optional part mounting portion 314. This optional part mounting portion 314 is located at a position that overlaps the leg 312 in plan view. That is, the leg 312 and the optional part mounting port ion 314 are arranged at opposite sides of the main beam 315*a*, i.e. the leg 312 is located at the lower surface side of the main beam 315*a*, and the optional part mounting port ion 314 is located at the upper surface side of the main beam 315*a*. The optional part mounting portion 314 is used for mounting certain optional parts such as an air-conditioner actuator.

A pedal actuator support slide rail 331 extending in the vehicle width direction is fixed to front end surfaces of the pair of main beams 315*a*. The pair of main beams 315*a* are coupled together through this pedal actuator support slide rail 331.

The slide rail 331 has, at a back surface thereof, a pair of right and left rail supporting brackets 332. The slide rail 331 is then fixed to the front end surfaces of the main beams 315*a* through these brackets 332 so as to face toward the vehicle front side. The slide rail 331 is made of metal material in order to have sufficient rigidity, and is shaped into a long narrow plate. In the shown embodiment, the slide rail 331 is fixedly connected to or formed integrally with the rail supporting brackets 332. The open end of the substantially U-shape of the main frame 315 is closed by this pedal actuator support slide rail 331. That is, as shown in FIG. 47, a closed rectangle or a closed barrel shape in plan view is formed by the main frame 315 and the slide rail 331.

The pedal actuator support slide rail 331 has, at upper and lower edges on a front surface side thereof, a first guide surface 331*a* and a second guide surface 331*b* each having a semicircle in cross section. The slide rail 331 slidably supports pedal actuator supports 351 by these first and second guide surfaces 331*a* and 331*b*. In the example shown in FIGS. 43 to 54, three pedal actuator supports 351 are provided so as to correspond to the three pedal actuators 341 (the accelerator pedal actuator 341A, the brake pedal actuator 341B and the clutch pedal actuator 341C). Details of the pedal actuator support 351 and each pedal actuator 341 fixed to the pedal actuator support 351 will be described later. Here, in the shown example, for weight reduction, a number of openings are provided at the pedal actuator support slide rail 331 having the long narrow plate as a whole. Further, unnecessary portions are cut out for lightening. Then, the upper and lower edge portions forming the first and second guide surfaces 331*a* and 331*b* each have a bar-shape appearance which is semicircular in cross section.

FIG. 54 shows a state in which the frame 311 is mounted above the driver's seat 302. As described above, the belts 325 are wound (or bound) around the frame 311 and the seat support 327 provided at a back of the driver's seat 302, and by tightening these belts 25 using the belt tightening device (not shown), the frame 311 is fixed above the driver's seat 302. In this mounted state, as an attitude of the frame 311, the frame 311 extends obliquely or slantingly downward from the upper end part of the seat back 304 toward the front end of the seat cushion 303. More specifically, the band-shaped lateral beam 315*b*, serving as the seat back abutting part, of the main frame 315 comes into wide-surface-contact with the upper portion of the seat back 304, and the main beams 315*a* extend obliquely from this abutting portion of the lateral beam 315*b* toward the front end of the seat cushion 303. The front end portions of the main beams 315a slightly protrude from the front end of the seat cushion 303.

The legs 312 extend downward along the front end of the seat cushion 303 from the front end of the frame 311, and their lower ends each having the height adjustment screw 313 abut against the vehicle body floor 306. Basically, each leg 312 is set to a vertical attitude on the vehicle body floor 306.

Arrows F1, F2 and F3 in FIG. 44 indicate loads that occur at support points by tightening of the belts 325. The frame 311 is drawn (or pulled) obliquely downward as indicated by the arrow F1 by tightening of the belts 325 that are linked to or engaged with the belt loops 326 of the frame 311. By this tensile force (tension or tractive force), as indicated by the arrow F2, the legs 312 are pressed against the vehicle body floor 306. Further, as indicated by the arrow F3, the seat back abutting part of the upper end (the rear end) of the frame 311, i.e. the lateral beam 315b, is pressed against the upper end part of the seat back 304. The frame 311 including the main frame 315 and the sub frame 316 is not supported by the seat cushion 303. That is, the frame 311 is fixed by a total of three points, i.e. two points of each leg 312 and the seat back abutting part and a point of application of the tension of each belt 325 (i.e. a vicinity of each belt loop 326) in the middle of these two points.

As is clear from FIG. 44, the tension application point of the belt 325 (the belt loop 326) is positioned in the substantially middle of a line (a virtual straight line) connecting the lower end of the leg 312 and the seat back abutting part which are fixing points to the vehicle, and also the tensile force of the belt 325 is exerted in a direction substantially orthogonal to the line (the virtual straight line). The frame 311 is therefore efficiently and firmly supported and fixed.

The seat cushion 303 generally has a flexible structure to ensure ride comfort. In comparison to this, the seat back 304 has a firm structure to ensure load capacity (or withstand load) at a collision. Therefore, by adequately tightening the belts 325, a large tensile load can be applied. Further, as compared with a case where the frame 311 (the automatic vehicle driving device 301) is mounted on the seat cushion 303, the frame 311 can be firmly supported.

As shown in FIGS. 44 and 54, a load of the whole automatic vehicle driving device 301 including the transmission actuator unit 431 and the pedal actuators 341 etc. is also exerted on two positions of each of the legs 312 and the seat back abutting part, but is not exerted on the seat cushion 303. In other words, the load of the automatic vehicle driving device 301 is supported or borne by and at two positions of the vehicle body floor 306 and the seat back 304. As mentioned above, since the seat back 304 has the firm structure, the automatic vehicle driving device 301 is surely supported, and vibrations of the automatic vehicle driving device 301 due to vibrations of the vehicle during the running test and shift (or movement or deviation) of position of the automatic vehicle driving device 301 due to reaction forces occurring when actuating the various actuators are suppressed. For instance, as can be understood from FIG. 44, since although the reaction forces of the pedal actuators 341 upon working of the pedal actuators 341 are exerted in an obliquely upward direction, the seat back abutting part (the lateral beam 315b) is substantially located on and along its reaction force exerting line, the reaction forces are surely borne by the firm seat back 304.

Further, in the show example, since the rubber parts 330 are provided at the both shoulder portions of the frame 311, i.e. at the both end portions of the upper edge of the lateral beam 315b, damage to the seat skin of the seat back 304 is suppressed. Further, these rubber parts 330 also have the function of suppressing a slip of the frame 311 (the lateral beam 315b), then a displacement of the whole frame 311 in the forward and backward directions due to the reaction forces of the pedal actuators 341 upon working of the pedal actuators 341 is suppressed.

[Configuration and Sliding Mechanism of Movable Unit 401]

Figure 50:
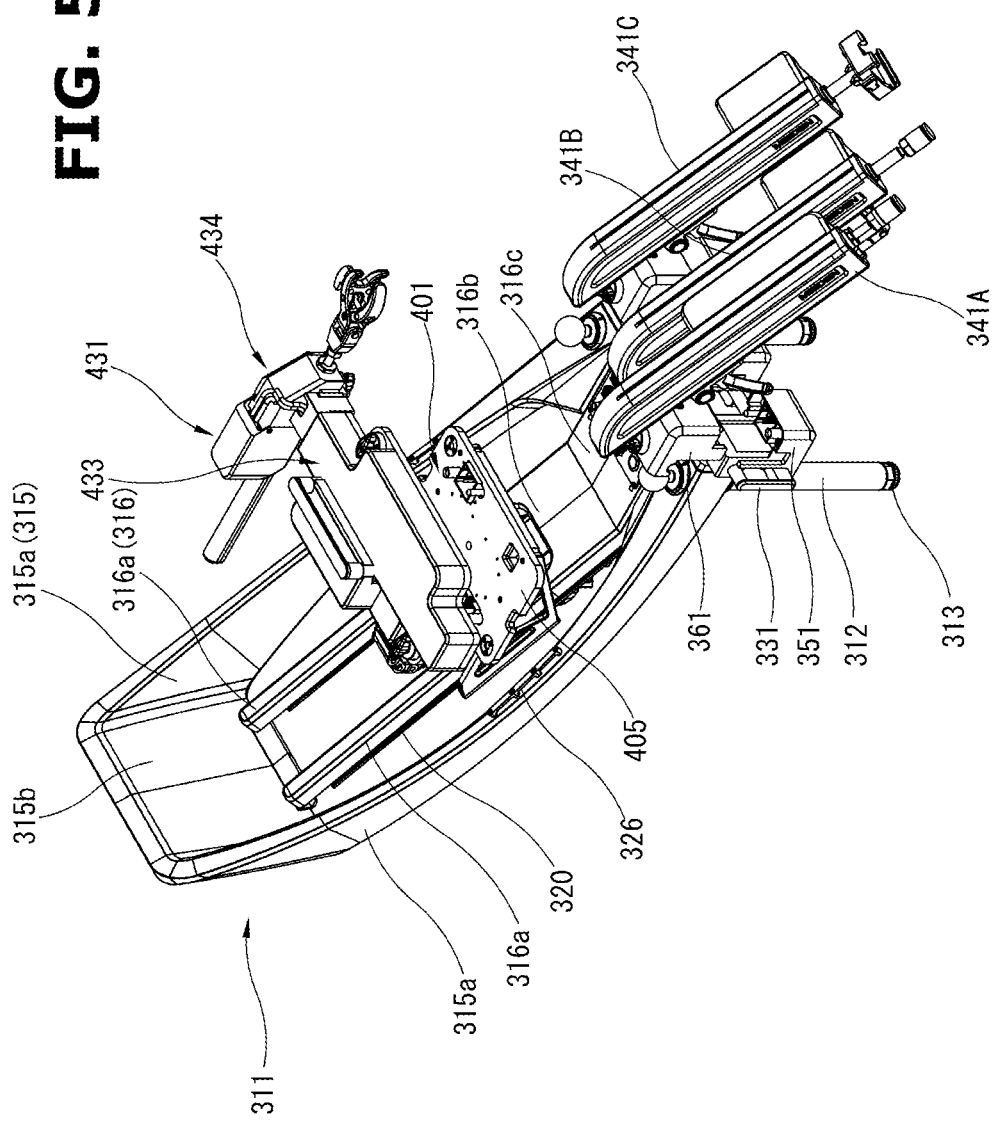
FIG. 50 is a perspective view of the automatic vehicle driving device of the second embodiment with the transmission actuator unit and an accelerator pedal actuator being dismounted.
Figure 55:
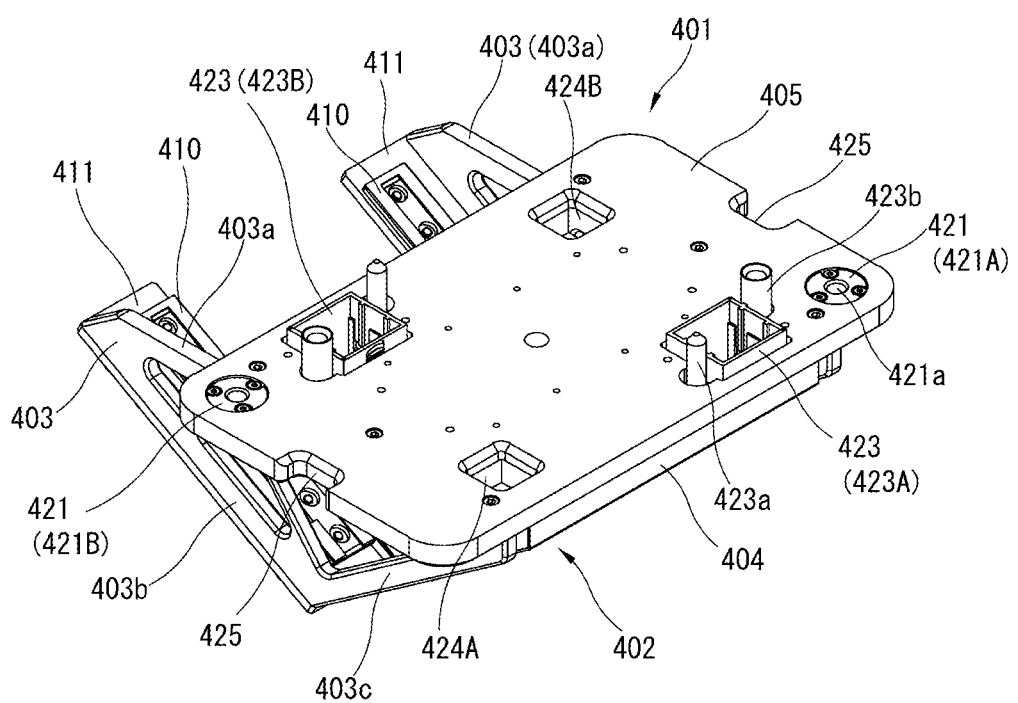
FIG. 55 is a perspective view of a movable unit.
Figure 56:
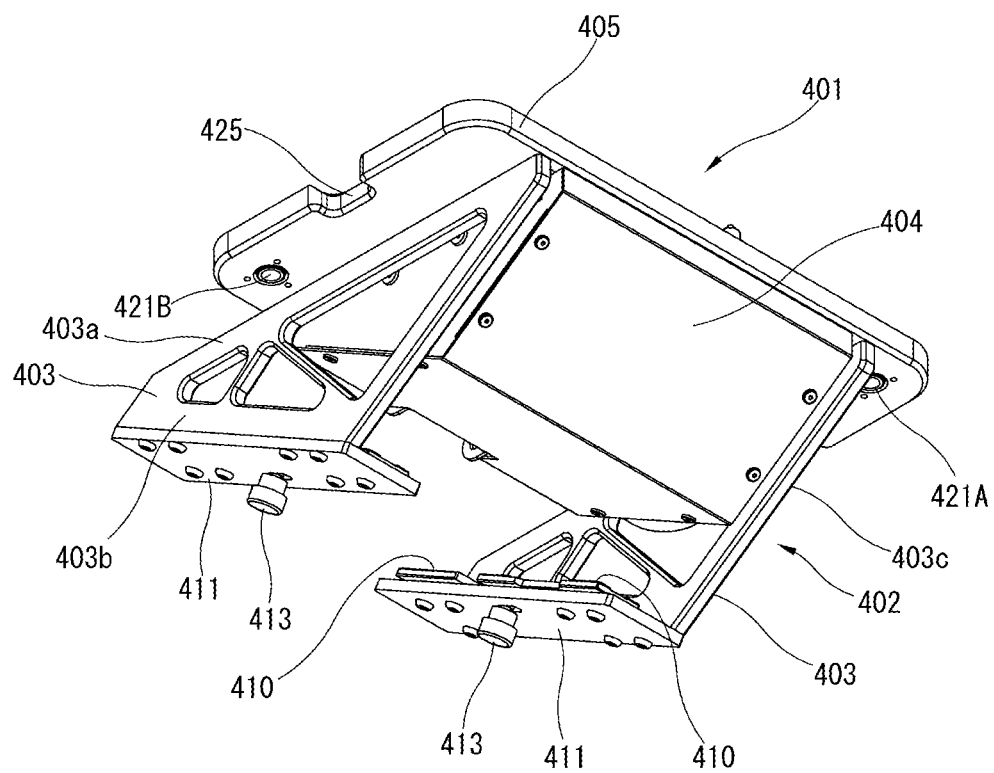
FIG. 56 is a perspective view, viewed from below, of the movable unit.

FIG. 50 shows a state in which the movable unit 401 is mounted on the frame 311. FIGS. 55 and 56 show the movable unit 401 alone.

As shown in FIG. 50, the movable unit 401 is placed at an inner side of the frame 311. More specifically, the movable unit 401 is placed between the pair of main beams 315a of the main frame 315.

As shown in FIGS. 55 and 56, the movable unit 401 has a movable frame 402 supported by the pair of sub beams 316a and a rigid actuator support plate 405 positioned at an upper end or on an upper surface of this movable frame 402.

The movable frame 402 has a pair of right and left side frames 403 forming side surfaces of the movable frame 402 and a box-shaped second connection box 404 having a triangular cross section and sandwiched between these pair of side frames 403.

Each side frame 403 is a frame formed as one member using e.g. carbon fiber reinforced plastics (CFRP), like the frame 311. The side frame 403 has a substantially triangular shape whose vertex angle is an obtuse angle in side view. That is, the side frame 403 has a substantially triangular shape having one side 403a that is basically horizontal in the vehicle-mounted state, the other side 403c that extends obliquely downward from a front end of this one side 403a and a base 403b that extends obliquely along the sub beam 316a. The side frame 403 has a plurality of opening window portions so as to have a truss structure.

The pair of side frames 403 are connected by the second connection box 404. The second connection box 404 has a front wall 404a extending along the other side 403c of the side frame 403, a rear wall 404b sloping so as to be parallel to the base 403b of the side frame 403 and a pair of side walls 404c adjacent to the respective side frames 403. The second connection box 404 accommodates wires etc. (not shown) in its inside space. A top end of the aforementioned flat-band-shaped cable 400 extending from the connection box 406 is connected to the second connection box 404 from the rear wall 404b side.

Substantially rectangular plate-shaped slider cover plates 411 are fixed to the respective bases 403b of the pair of side frames 403. The pair of slider cover plates 411 are provided so as to protrude inwards from the respective side frames 403. That is, the pair of side frames 403 are located at vehicle width direction outer sides of the respective sub beams 316a with the side frames 403 being adjacent to the respective sub beams 316a, and the slider cover plates 411 protrude from the respective bases 403b of the pair of side frames 403 so as to cover the lower surfaces of the sub beams 316a. Two front and rear sliders 410 corresponding to the aforementioned guide rail 320 provided at the lower surface of the sub beam 316a are fixed to an upper surface of each slider cover plate 411 which faces to the lower surface of the sub beam 316a (see FIG. 56). The sliders 410 are slidably engaged with the channel-shaped guide rail 320 of each sub beam 316a. With this engagement of the sliders 410 and the guide rail 320, a load of the movable unit 401 is supported or borne, and also the movable unit 401 is slidably guided in a direction along the sub beam 316a.

As the guide rail 320 and the slider 410, general-purpose parts that are available from market can be used. The two sliders 410 are provided at front and rear positions of each slider cover plate 411, and as the whole movable unit 401, the slider 410 is four in number in total at apexes of a rectangular shape, thereby achieving a smooth movement of the movable unit 401 (a smooth sliding operation when adjusting the position of the movable unit 401), and also thereby obtaining high rigidity against a reaction force acting on the movable unit 401 when actuating the transmission actuator unit 431. Further, generally, rigidity and guiding accuracy in a width direction (in a direction along a fixing surface) of the guide rail 320 in a guide mechanism structured by combination of the guide rail 320 and the slider 410 are high. Therefore, by the shown configuration in which the pair of guide rails 320 are arranged with attitudes of the guide rails 320 (or an attitude of the movable unit 401) facing downward in the vertical direction, rigidity of the support of the movable unit 401 in the vehicle width direction can be high.

Here, it is desirable to employ a structure in which at least one of the two front and rear sliders 410 is provided with friction against the guide rail 320 to such an extent that the movable unit 401 does not move by its own weight.

Each of the slider cover plates 411 is provided with a fixing screw 413 screwed into a screw hole that penetrates the slider cover plate 411. The fixing screw 413 has a structure allowing a turning operation by hand or with fingers, and a top end of the fixing screw 413 presses a pad or a shoe (both not shown) between the two front and rear sliders 410. That is, when screwing this fixing screw 413 toward the guide rail 320, the top end of the fixing screw 413 presses the guide rail 320 through the pad or the shoe, then a slide mechanism is locked so that the movable unit 401 does not move. The operator or the workman can easily reach the fixing screw 413 through a gap or a space between the seat cushion 303 or the seat back 304 and the main frame 315.

The actuator support plate 405 formed of metal plate has a rectangular shape in plan view. The actuator support plate 405 is set along the horizontal one sides 403a of the triangular side frames 403. The actuator support plate 405 is fixed to upper surfaces of the one sides 403a of the side frames 403, and couples the pair of parallel-positioned side frames 403. A size in the vehicle width direction of the actuator support plate 405 is greater than a size (a width or a length) in the vehicle width direction from one to the other of the pair of side frames 403. Therefore, side portions at both sides of the actuator support plate 405 protrude outwards from the respective side frames 403. The second connection box 404 is fixed so as to cover a lower surface of the actuator support plate 405. Here, in plan view, the actuator support plate 405 is positioned on a front side of the movable frame 402, and rear end portions of the side frames 403 protrude backward from the actuator support plate 405.

As described later, the transmission actuator unit 431 is detachably mounted on an upper surface of the actuator support plate 405 (see FIGS. 57 and 58). For mounting this transmission actuator unit 431, grommets 421 each having a lock hole 421a are embedded in the actuator support plate 405 at two of four corners of the rectangular actuator support plate 405. That is, the grommets 421 include a front side grommet 421A and a rear side grommet 421B, and these grommets are arranged on a diagonal line of the rectangular shape. Since these grommets have the same structure, when there is no need to distinguish these grommets, they are collectively called the grommets 421.

The actuator support plate 405 is provided with transmission actuator unit connectors 423 for electrically connecting with the transmission actuator unit 431. The transmission actuator unit connectors 423 include a front side connector 423A and a rear side connector 423B. The front side connector 423A is located at a front side of the actuator support plate 405, and is adjacent to the front side grommet 421A. The rear side connector 423B is located at a rear side of the actuator support plate 405, and is adjacent to the rear side grommet 421B. Since these connectors have the same structure, when there is no need to distinguish these connectors, they are collectively called the transmission actuator unit connectors 423. As the transmission actuator unit connector 423, a connector structured such that a terminal strip protrudes upward from the upper surface of the actuator support plate 405 (i.e. from a fixing surface of the transmission actuator unit 431) and the terminal strip is in a floating state to allow some position shift (or some deviation of position) from the other mating side is used. Further, each transmission actuator unit connector 423 is provided with a guide pin 423a and a guide sleeve 423b to perform positioning with the other mating-side connector and to guide the other mating-side connector when inserting the other mating-side connector into the transmission actuator unit connector 423. As the transmission actuator unit connector 423, general-purpose parts that are available from market can be used. Each terminal of the transmission actuator unit connector 423 is connected to the wire accommodated in the second connection box 404, then is connected to the connection box 406 from the second connection box 404 through the cable 400.

The front side grommet 421A and the front side connector 423A located at the front side of the actuator support plate 405 and the rear side grommet 421B and the rear side connector 423B located at the rear side of the actuator support plate 405 are symmetrical about a center, as a symmetrical point, of the rectangular actuator support plate 405. That is, when the actuator support plate 405 is turned 180 degrees, arrangement and configuration of these grommets and connectors overlap each other.

Further, the actuator support plate 405 has rectangular locating openings 424 for positioning of the transmission actuator unit 431. The locating openings 424 include a front side locating opening 424A and a rear side locating opening 424B. The front side locating opening 424A is provided at the front side of the actuator support plate 405 and positioned at an opposite side to the front side grommet 421A in the vehicle width direction. The rear side locating opening 424B is provided at the rear side of the actuator support plate 405 and positioned at an opposite side to the rear side grommet 421B in the vehicle width direction. The front side locating opening 424A and the rear side locating opening 424B are also symmetrical about a center, as a symmetrical point, of the rectangular actuator support plate 405.

The actuator support plate 405 further has, at right and left side edges thereof, substantially U-shaped locating cutting portions 425 for positioning of the transmission actuator unit 431. These two locating cutting portions 425 are located at middle portions of the respective right and left side edges, and are symmetric with respect to a line and also symmetrical about a center of the actuator support plate 405.

Figure 48:
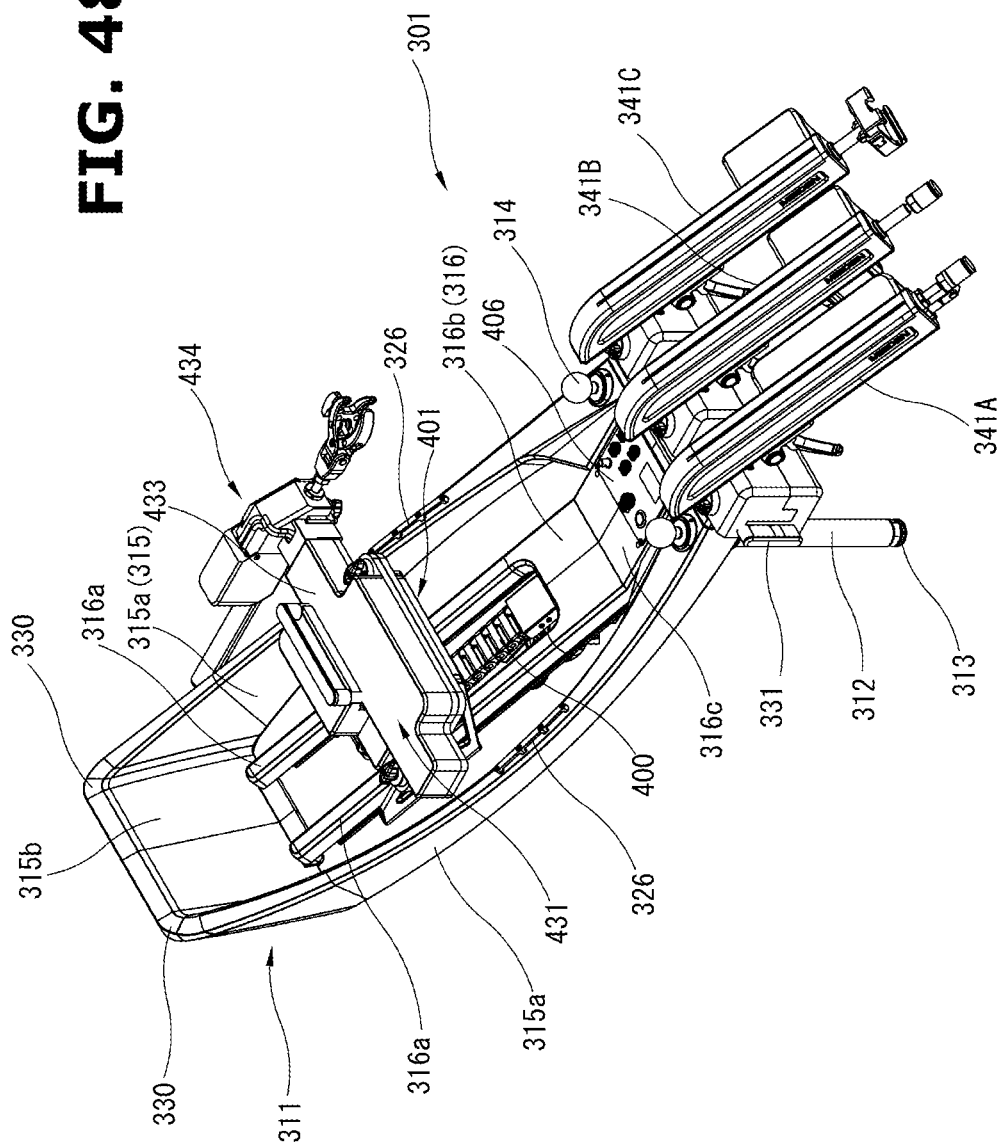
FIG. 48 is a perspective view of the automatic vehicle driving device of the second embodiment.
Figure 49:
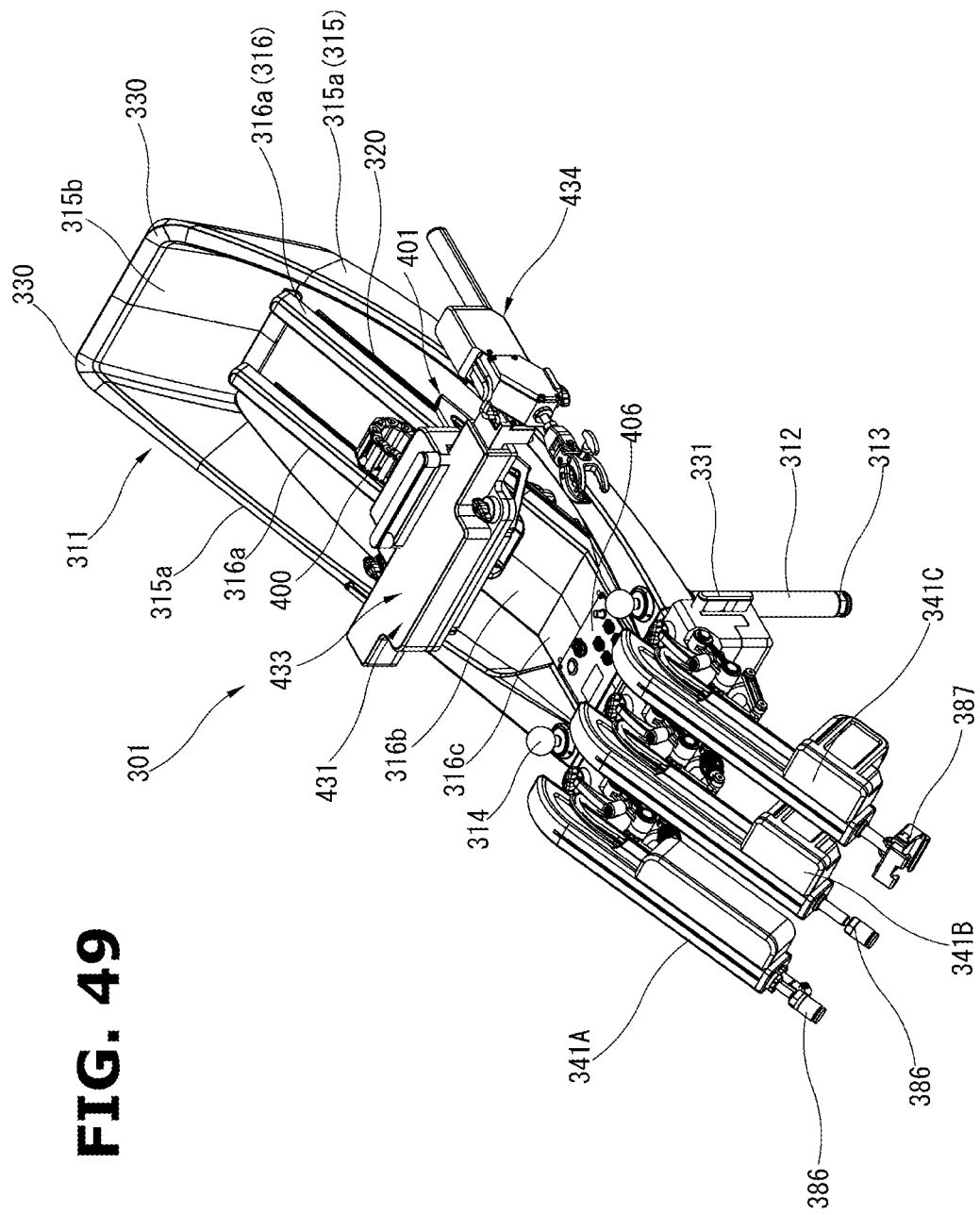
FIG. 49 is a perspective view, viewed from a different direction, of the automatic vehicle driving device of the second embodiment.

FIGS. 48 to 50 show a state in which the transmission actuator unit 431 is mounted on the upper surface of the movable unit 401. FIGS. 48 to 50 are drawings for describing a position adjustment of the movable unit 401 with respect to the frame 311. As described above, the movable unit 401 can be slid upward and downward (i.e. forward and backward) along the sub beams 316a of the frame 311. FIG. 48 illustrates a state in which the movable unit 401 is set to a relatively high position. FIGS. 49 and 50 illustrate a state in which the movable unit 401 is set to a relatively low position. With such position adjustment of the movable unit 401, a height position of the transmission actuator unit 431, i.e. a basic height position of the grip hand 468, is changed, thereby widely meeting the shift lever whose height and/or length are different depending on the vehicle types.

Here, when the position of the movable unit 401 is set to be high as shown in FIG. 48, the transmission actuator unit 431 is located at a relatively backward position, whereas when the position of the movable unit 401 is set to be low as shown in FIG. 49 etc., the transmission actuator unit 431 is located at a relatively forward position. However, such change of forward-and-backward direction can be absorbed by setting of an initial position of the shifting actuator 434 that moves (actuates) in the forward and backward directions. For instance, in a case where a fore-and-aft position of the shift lever in the vehicle in the case of FIG. 48 is the same as that in the case of FIG. 49, if the position of the movable unit 401 is set to be high as shown in FIG. 48, a distance to the shift lever is relatively long. However, in this case, a position at which the grip hand 468 protrudes relatively long is set to a reference position of the control, thereby readily meeting such case.

As described later, in the shown embodiment, the shifting actuator 434 can pivot (or rotate or tilt) upward and downward relative to the selecting actuator 433. Therefore, also with this upward-and-downward rotation, it is possible to meet some difference in height position of the shift lever head.

Figure 43:
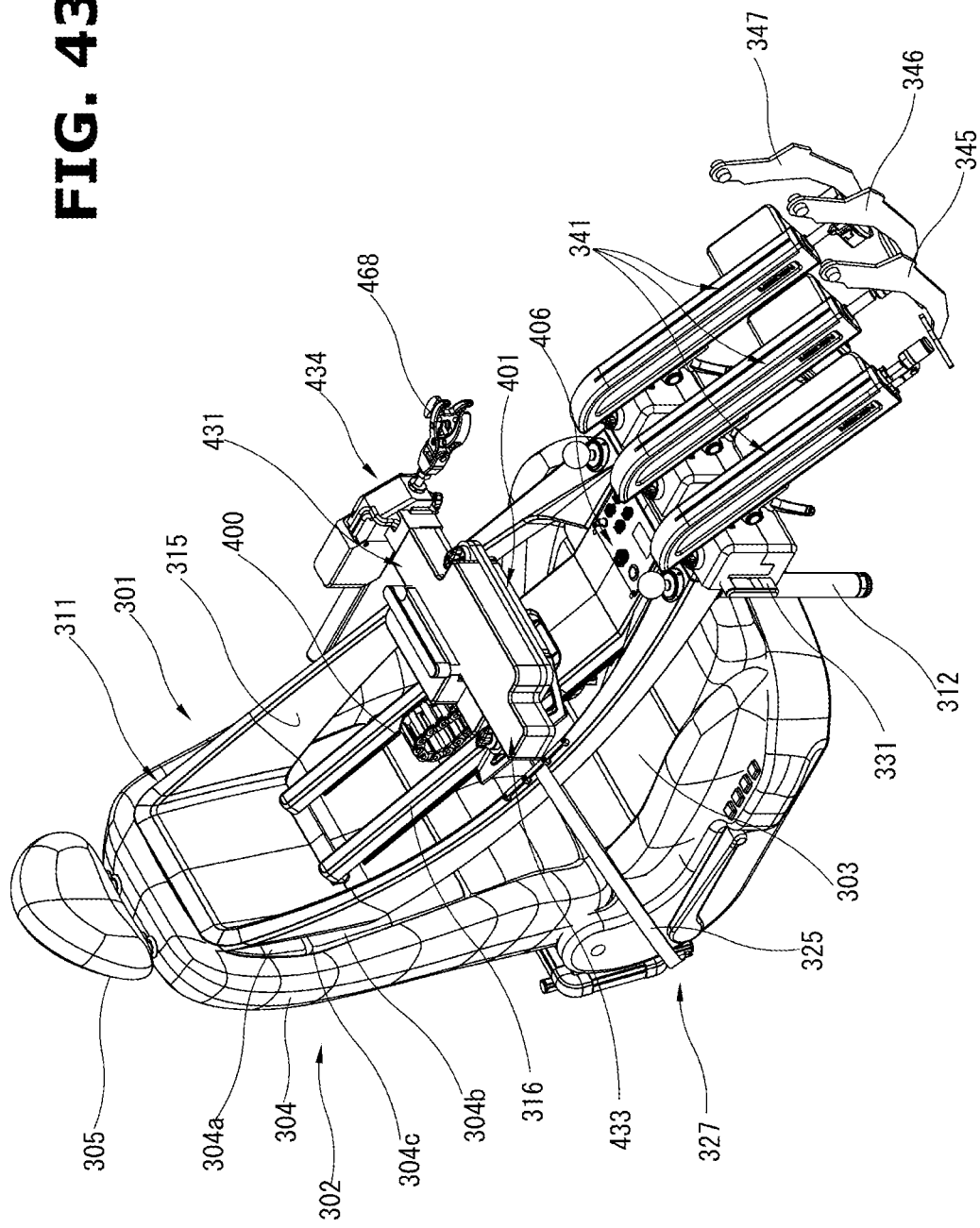
FIG. 43 is a perspective view showing a state in which the automatic vehicle driving device according to a second embodiment is mounted on the driver's seat.

The upward- and -downward and forward-and-backward position adjustment of the movable unit 401 (i.e. the upward-and-downward and forward-and-backward position adjustment of the transmission actuator unit 431) described above can be performed with the automatic vehicle driving device 301 remaining mounted above the driver's seat 302 as shown in FIG. 43 etc. Therefore, work accompanied by trial and error can be eliminated, and the adjustment can be readily performed so as to optimize a positional relationship with the shift lever after mounting the automatic vehicle driving device 301 in the vehicle.

[Configuration and Attachable-and-Detachable Structure of Transmission Actuator Unit 431]

The transmission actuator unit 431 has a structure by which the transmission actuator unit 431 can be easily attached to and detached from the movable unit 401. Further, by reversing a mounting attitude of the transmission actuator unit 431 (the orientation of the transmission actuator unit 431 in a fore-and-aft direction) 180 degrees with respect to the movable unit 401, the transmission actuator unit 431 can readily meet the so-called right-hand drive vehicle and the so-called left-hand drive vehicle.

Figure 57:
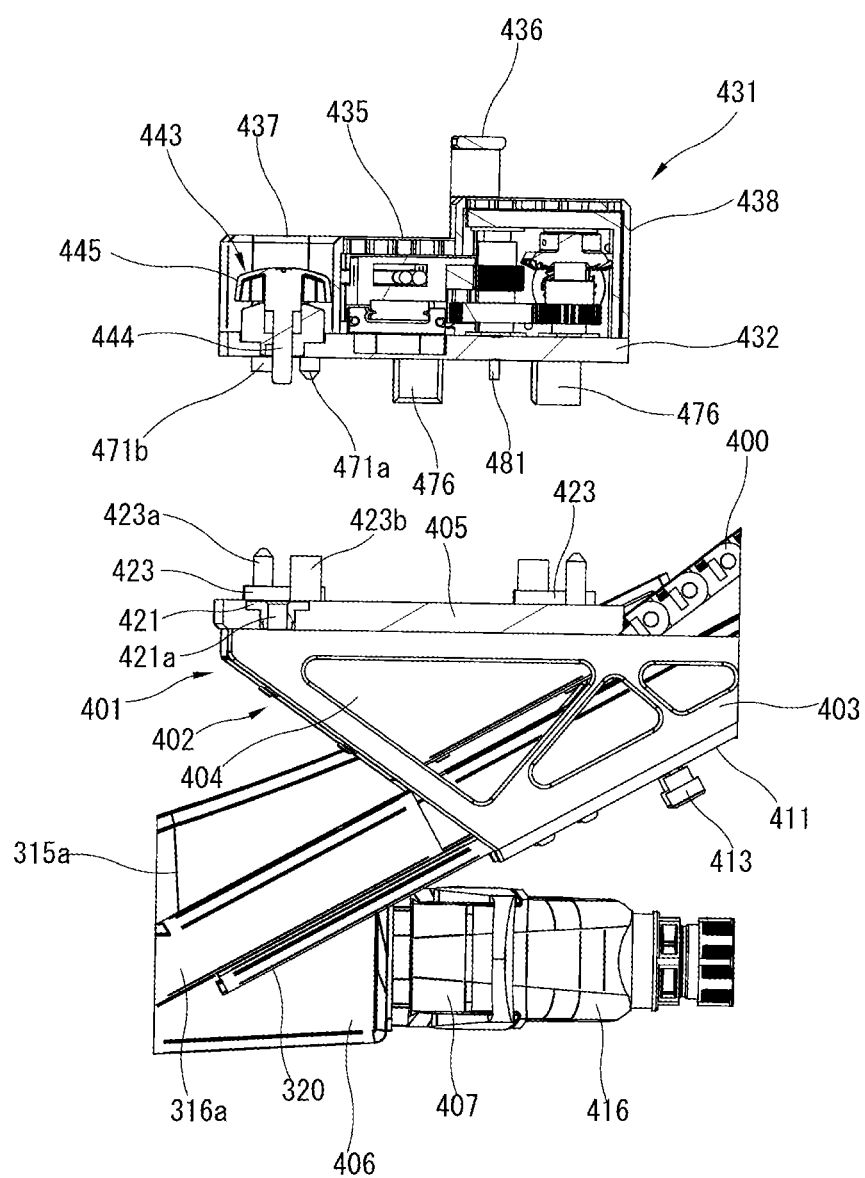
FIG. 57 is a local sectional view showing a state in which the transmission actuator unit is dismounted from the movable unit.
Figure 58:
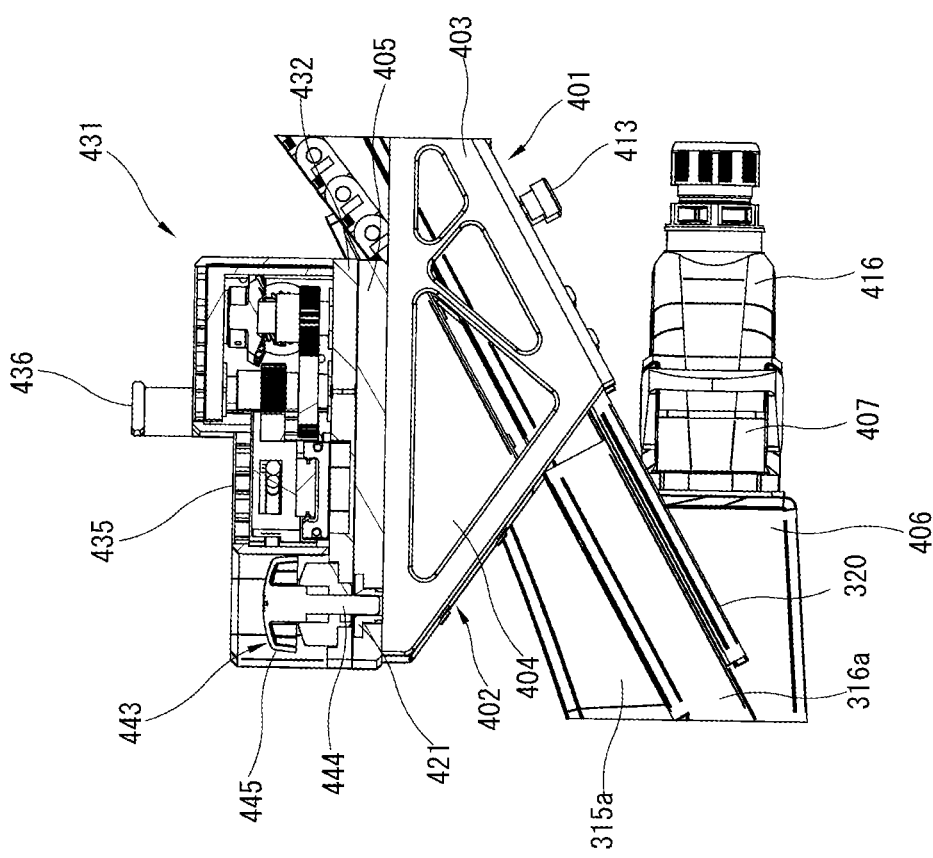
FIG. 58 is a local sectional view showing a state in which the transmission actuator unit is mounted on the movable unit.

FIGS. 50, 51 and 57 show a state in which the transmission actuator unit 431 is detached or dismounted from movable unit 401. FIGS. 59 to 64 show the detached transmission actuator unit 431 alone.

As mentioned above, the transmission actuator unit 431 has the configuration of the combination of the selecting actuator 433 performing the selecting operation of the shift lever along the vehicle width direction and the shifting actuator 434 performing the shifting operation of the shift lever along the vehicle longitudinal direction.

The transmission actuator unit 431 has a relatively thick base plate 432 having high rigidity. The selecting actuator 433 is configured on this base plate 432. The selecting actuator 433 has an actuator housing 435 having a long narrow box shape extending along the vehicle width direction, and this actuator housing 435 is fixed onto the base plate 432. The selecting actuator 433 further has a box-shaped connector cover 437 at one side in the middle in a longitudinal direction of the actuator housing 435 and a box-shaped motor cover 438 at the other side in the middle in the longitudinal direction of the actuator housing 435. In the shown example, the connector cover 437 is formed integrally with the actuator housing 435.

Figure 59:
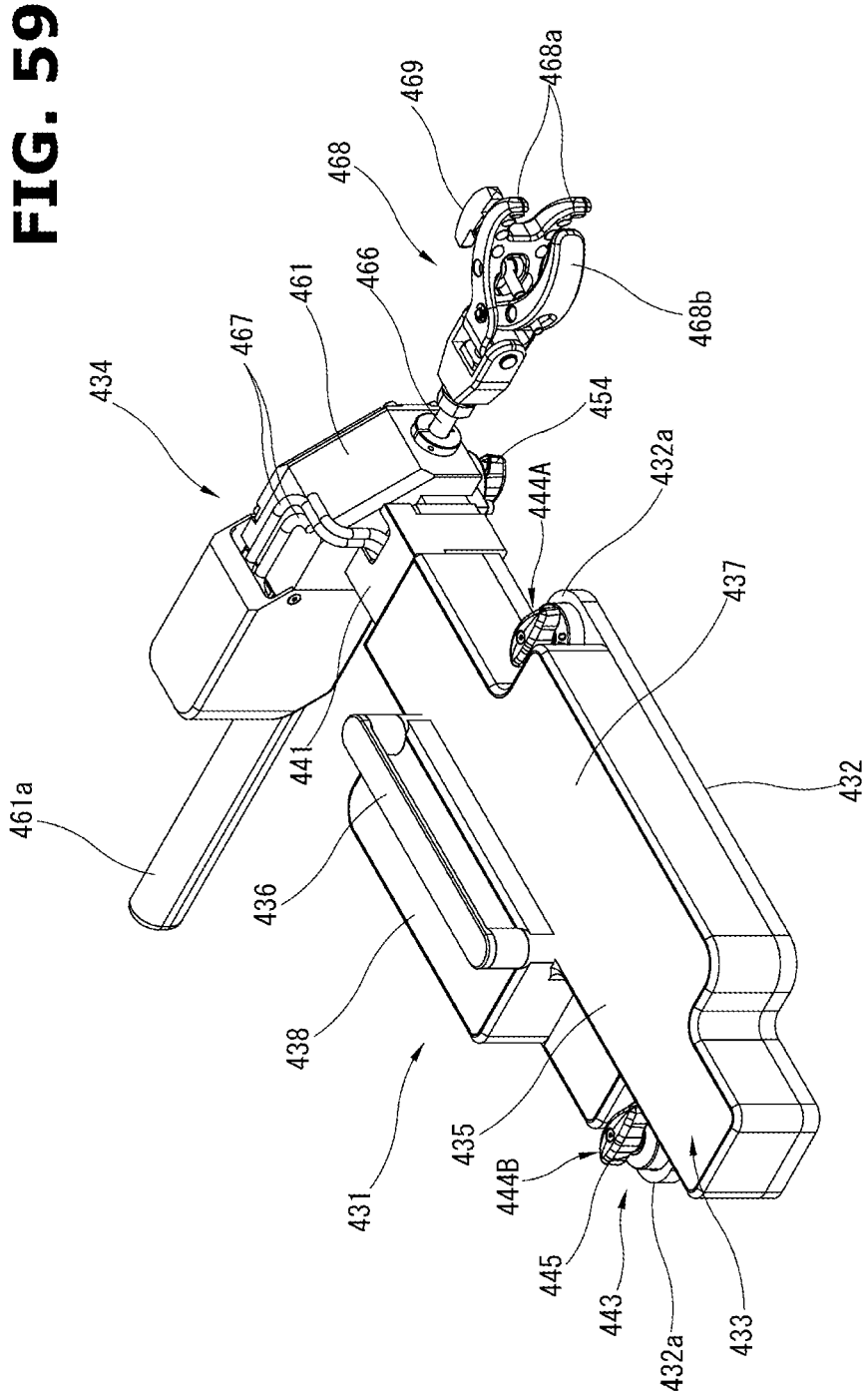
FIG. 59 is a perspective view of the transmission actuator unit.
Figure 60:
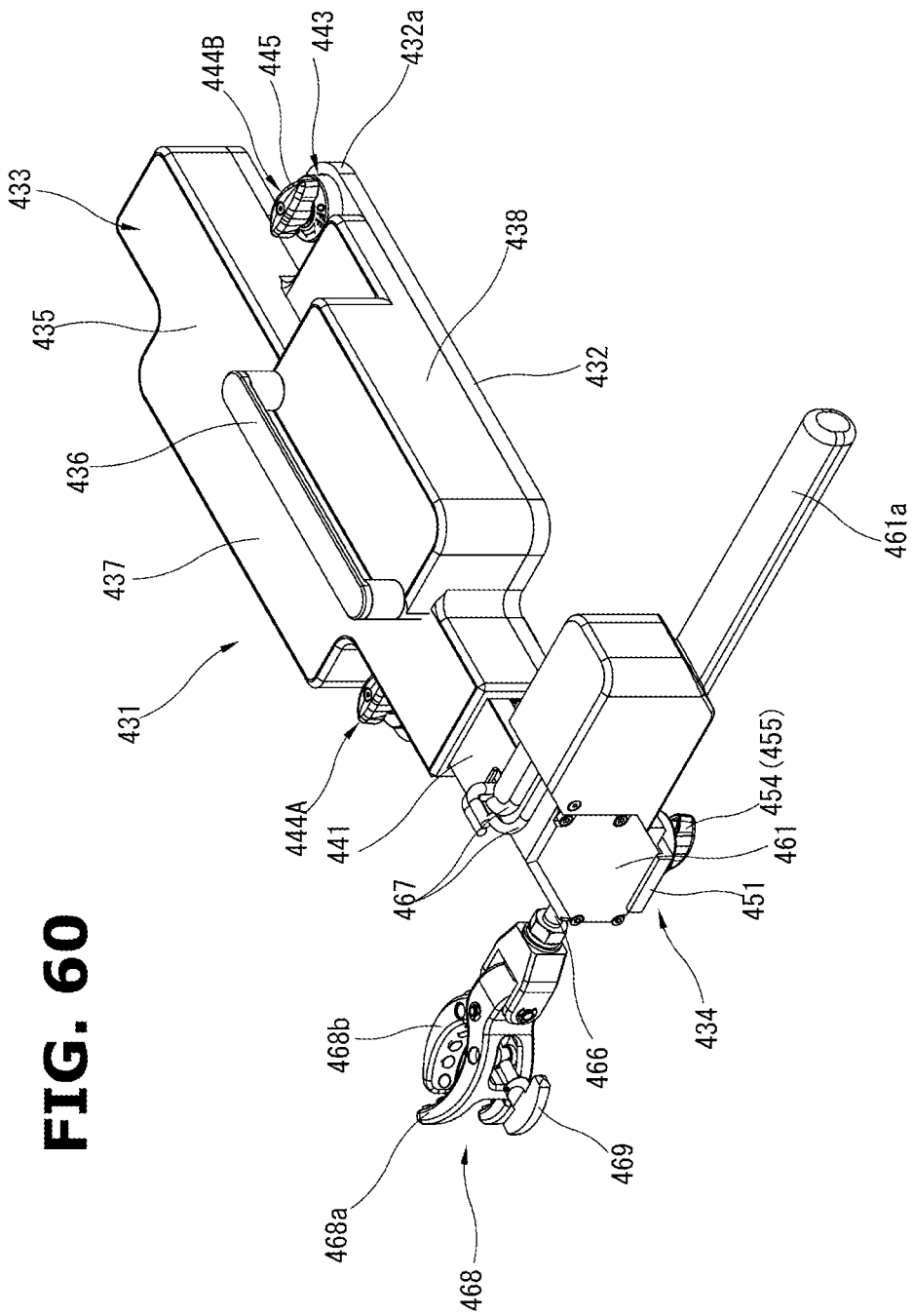
FIG. 60 is a perspective view, viewed from a different direction, of the transmission actuator unit.
Figure 61:
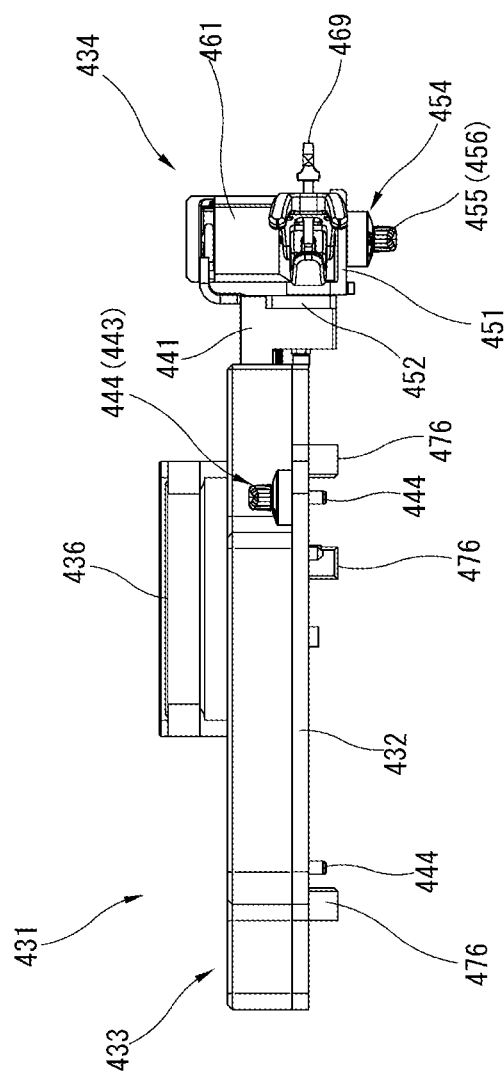
FIG. 61 is a front view of the transmission actuator unit.

The base plate 432 is shaped into a flat plate, and has, as shown in FIGS. 59 and 60 etc., an outside shape that is drawn substantially along outlines of outer peripheries of three of the actuator housing 435, the connector cover 437 and the motor cover 438. That is, the base plate 432 has a shape whose both ends in its longitudinal direction are narrow in width (in size in the vehicle longitudinal direction) and whose middle is wide in width.

The selecting actuator 433 is a rack-and-pinion type linear-motion actuator in which a rack shaft 441 serving as an actuator rod moves in the vehicle width direction by working of an electric motor and a speed reducer which are accommodated in the motor cover 438. In a retracting state of the rack shaft 441, almost entire rack shaft 141 is accommodated in the actuator housing 435, but only a top end portion of the rack shaft 441 protrudes from one end (which is on a left-hand side when the connector cover 437 faces toward the front side of the vehicle) of the actuator housing 435. As described later, the shifting actuator 434 is supported by this top end portion of the rack shaft 441. In the case of the so-called right-hand drive vehicle shown in FIG. 43 etc., the shifting actuator 434 is located on a left-hand side with respect to the frame 311 situated above the driver's seat 302 and the movable unit 401. It is noted that in order to achieve an accurate linear motion of the rack shaft 441 while bearing a load of the shifting actuator 434, the rack shaft 441 is guided by a guide mechanism (not shown) provided in the actuator housing 435.

As shown in FIGS. 59 and 60, at one side portion (one side portion in the vehicle width direction) of the connector cover 437 and at one side portion of the motor cover 438 which is on an opposite side to the one side portion of the connector cover 437, the base plate 432 extends or protrudes from the outlines of the actuator housing 435, the connector cover 437 and the motor cover 438, and a pair of extending parts 432a located on a diagonal are formed. A shape of a rectangular area in the middle of the base plate 432 including the extending parts 432a corresponds to an outside shape of the actuator support plate 405 of the movable unit 401. Then, each of the pair of extending parts 432a is provided with a lock pin 444 that forms a lock mechanism 443 together with the above-mentioned grommet 421 of the actuator support plate 405 on the movable unit 401 side. A lower end portion of the lock pin 444 protrudes downward from the surface of the base plate 432. The lock pin 444 has, at an upper end portion thereof, a knob 445 for a turning operation by hand or with fingers. The lock mechanism 443 is a general-purpose screw type mechanism (see FIGS. 57 and 58) which, by turning the lock pin 444 inserted into the lock hole 421a of the grommet 421 certain degrees (e.g. 90 degrees or 180 degrees), performs locking accompanied by tightening in an axial direction of the lock pin 444.

Here, for convenience in describing, when there is a need to distinguish the both lock pins 444, the lock pin 444 on the connector cover 437 side is called a first lock pin 444A, and the lock pin 444 on the motor cover 438 side is called a second lock pin 444B.

The pair of lock pins 444 are engaged with the respective grommets 421 of the actuator support plate 405. More specifically, as shown in FIG. 50 etc., in the case of the so-called right-hand drive vehicle, the first lock pin 444A is engaged with the front side grommet 421A located at the front side of the actuator support plate 405, and the second lock pin 444B is engaged with the rear side grommet 421B located at the rear side of the actuator support plate 405. When bringing the pair of lock mechanisms 443 to a locked state, the base plate 432 is tightened and firmly fixed to the actuator support plate 405.

Figure 62:
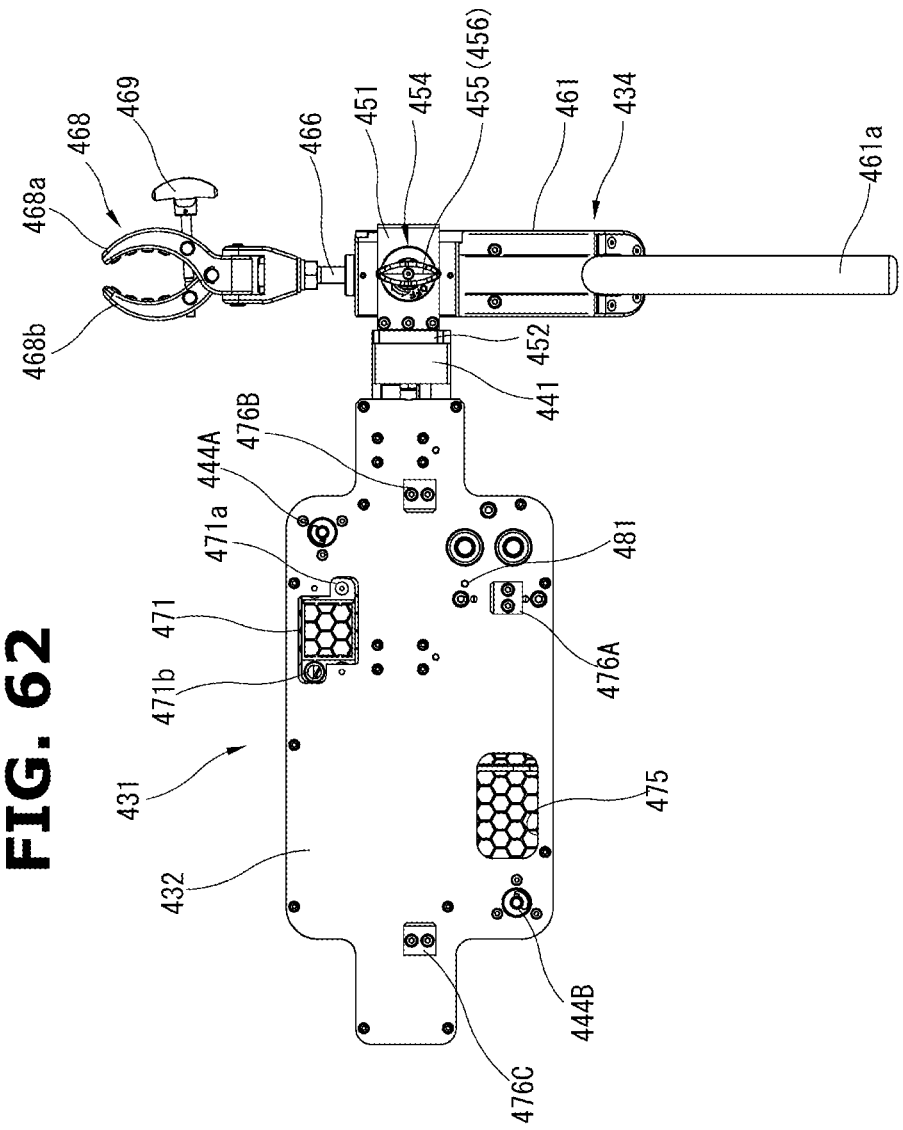
FIG. 62 is a bottom view of the transmission actuator unit.
Figure 64:
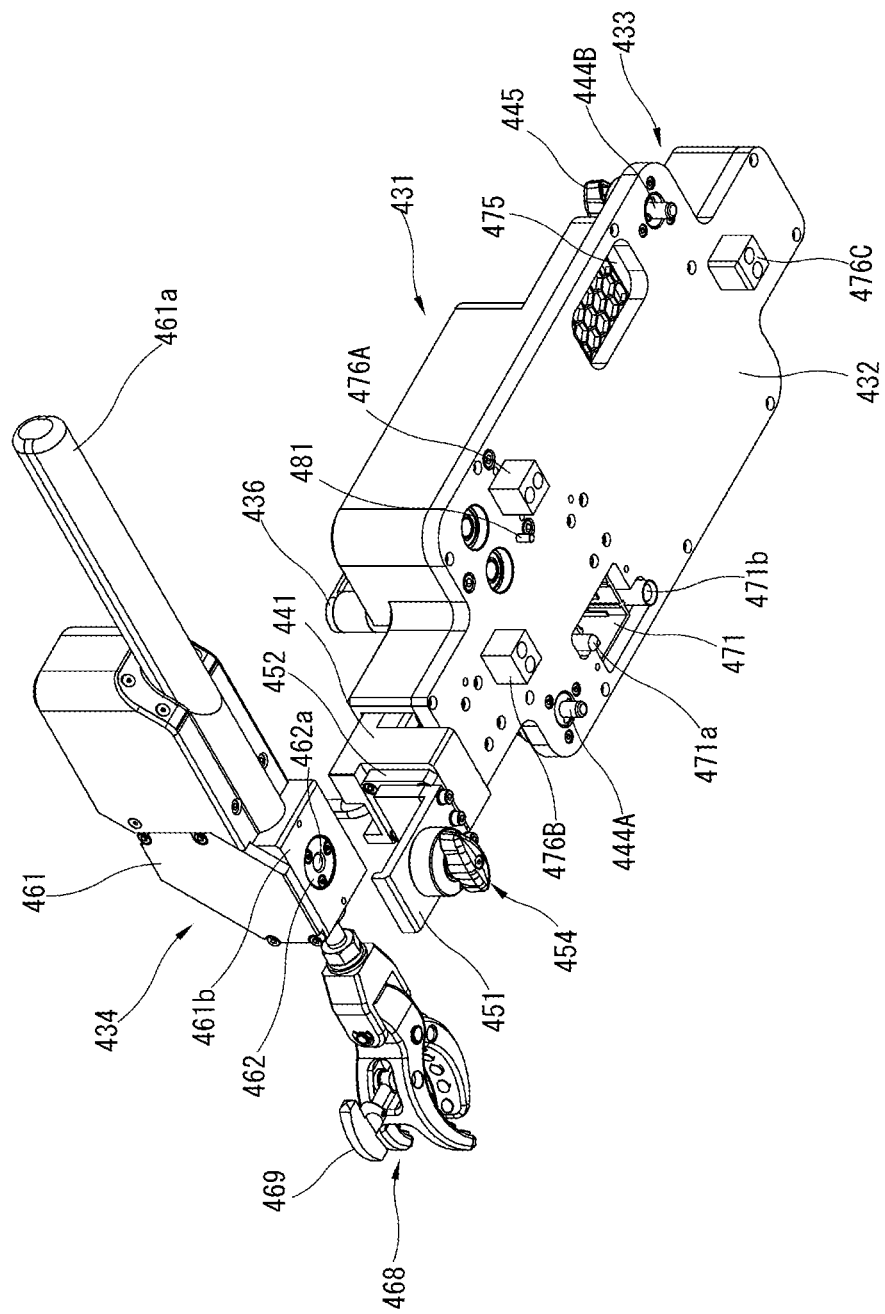
FIG. 64 is an exploded perspective view, viewed from below, of the transmission actuator unit.

As shown in FIGS. 62 and 64, on a bottom surface of the base plate 432, a transmission actuator-side connector 471 corresponding to the transmission actuator unit connector 423 of the actuator support plate 405 is provided. This connector 471 is located at a position that is covered with the connector cover 437. More specifically, the connector 471 is located at a position corresponding to the front side connector 423A when mounting the transmission actuator unit 431 on the actuator support plate 405 in the case of the right-hand drive vehicle. To meet the structure of the connector 423 on the actuator support plate 405 side, the connector 471 has a structure in which a terminal strip is in a floating state, and is provided with a guide pin 471a and a guide sleeve 471b. Therefore, mutual positions of the connectors 471 and 423 are guided, and only by mounting the transmission actuator unit 431 on the actuator support plate 405 and tightening the base plate 432 and the actuator support plate 405 each other by the lock mechanisms 443, connecting of the both connectors 471 and 423 is completed.

Here, on an upper surface side of the base plate 432, this connector 471 portion is covered with the connector cover 437. Cables (not shown) leading to the connector 471 are also routed or wired through insides of the connector cover 437 and the actuator housing 435, then are not exposed to the outside.

On the base plate 432, an opening 475 having a rectangular shape whose size is similar to that of the transmission actuator-side connector 471 is formed at a position where the opening 475 and the connector 471 are symmetrical about a point. Protruding portions including the guide pin 423a of the rear side connector 423B, which are not used when mounting the transmission actuator unit 431 on the actuator support plate 405 for the right-hand drive vehicle, are accepted or accommodated in the opening 475. That is, the unused rear side connector 423B does not interfere with the base plate 432.

Further, on the bottom surface of the base plate 432, prismatic-shaped protruding leg portions 476 to protect the connector 471 are provided. The leg portions 476 include a first leg portion 476A positioned under the motor cover 438, a second leg portion 476B and a third leg portion 476C located separately from each other at right and left sides on a center line of the base plate 432. More specifically, the first leg portion 476A is arranged at a position corresponding to the rear side locating opening 424B of the actuator support plate 405 when mounting the transmission actuator unit 431 on the actuator support plate 405 for the right-hand drive vehicle, and is relatively tightly fitted into this rear side locating opening 424B. The second leg portion 476B and the third leg portion 476C are arranged at positions corresponding to the pair of locating cutting portions 425 provided at the right and left side edges of the actuator support plate 405 when mounting the transmission actuator unit 431 on the actuator support plate 405 for the right-hand drive vehicle, and are relatively tightly engaged with these locating cutting portions 425.

With the fitting and engagement of these three leg portions 476 and the rear side locating opening 424B and the locating cutting portions 425 of the actuator support plate 405, positioning of the transmission actuator unit 431 with respect to the actuator support plate 405 is surely performed. That is, the leg portions 476 serve as guides when mounting the transmission actuator unit 431 on the actuator support plate 405, and also contribute to improvement in rigidity of the support against the actuator support plate 405 after mounting the transmission actuator unit 431 on the actuator support plate 405. Since the leg portions 476 are relatively tightly fitted into and engaged with the rear side locating opening 424 and the locating cutting portions 425, shift (or movement or deviation) of position of the transmission actuator unit 431 due to reaction forces occurring when actuating the transmission actuator unit 431 is suppressed.

Here, it is desirable to set a protruding length of the leg portion 476 so that when mounting the transmission actuator unit 431 on the actuator support plate 405, before the connector 423 and the connector 471 contact or are engaged with each other, a fixing position of the transmission actuator unit 431 is guided by the leg portions 476 getting into the rear side locating opening 424 and the locating cutting portions 425.

The three leg port ions 476 have the same protruding length, and this protruding length is greater than a protruding length of the lock pin 444 and protruding lengths of the guide pin 471a and the guide sleeve 471b of the connector 471 on the bottom surface of the base plate 432. Therefore, when putting or placing the detached transmission actuator unit 431 on an appropriate table or stand, the transmission actuator unit 431 can be supported by these three leg portions 476. In addition, the lock pin 444 and the connector 471 do not hit against the stand.

Furthermore, on the bottom surface of the base plate 432, a stopper pin 481 (see FIG. 64) forming a stopper mechanism 482 (see FIG. 67) to lock the selecting actuator 433 is provided at a position adjacent to the first leg portion 476A. This stopper pin 481 is set so as to be able to protrude and retract along a direction orthogonal to the bottom surface of the base plate 432, but is normally forced in a protruding direction by a coil spring 485 (see FIG. 66) set inside the stopper mechanism 482. In a state in which the transmission actuator unit 431 is mounted on the actuator support plate 405, the stopper pin 481 contacts the upper surface of the actuator support plate 405 and retracts by being pressed by the actuator support plate 405. That is, the stopper pin 481 has a protruding position in a free state when the transmission actuator unit 431 is detached and a retracting position when the transmission actuator unit 431 is attached to the actuator support plate 405 and the stopper pin 481 is pressed by the actuator support plate 405. When the stopper pin 481 is at the protruding position, the internal stopper mechanism 482 locks the selecting actuator 433, i.e. fixes the selecting actuator 433. When the stopper pin 481 is at the retracting position, the stopper mechanism 482 releases the selecting actuator 433, i.e. brings the selecting actuator 433 to the free state.

Figure 66:
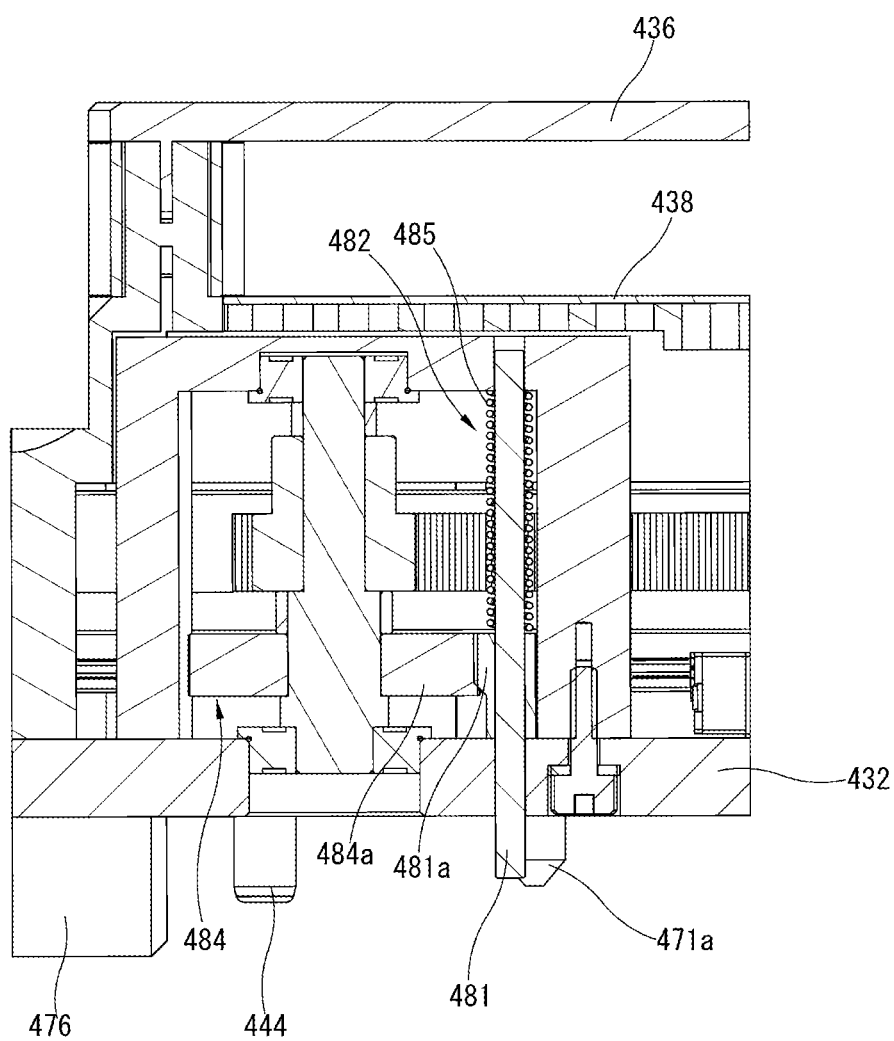
FIG. 66 is a sectional view of a principal part of the transmission actuator unit, showing a stopper mechanism.
Figure 67:
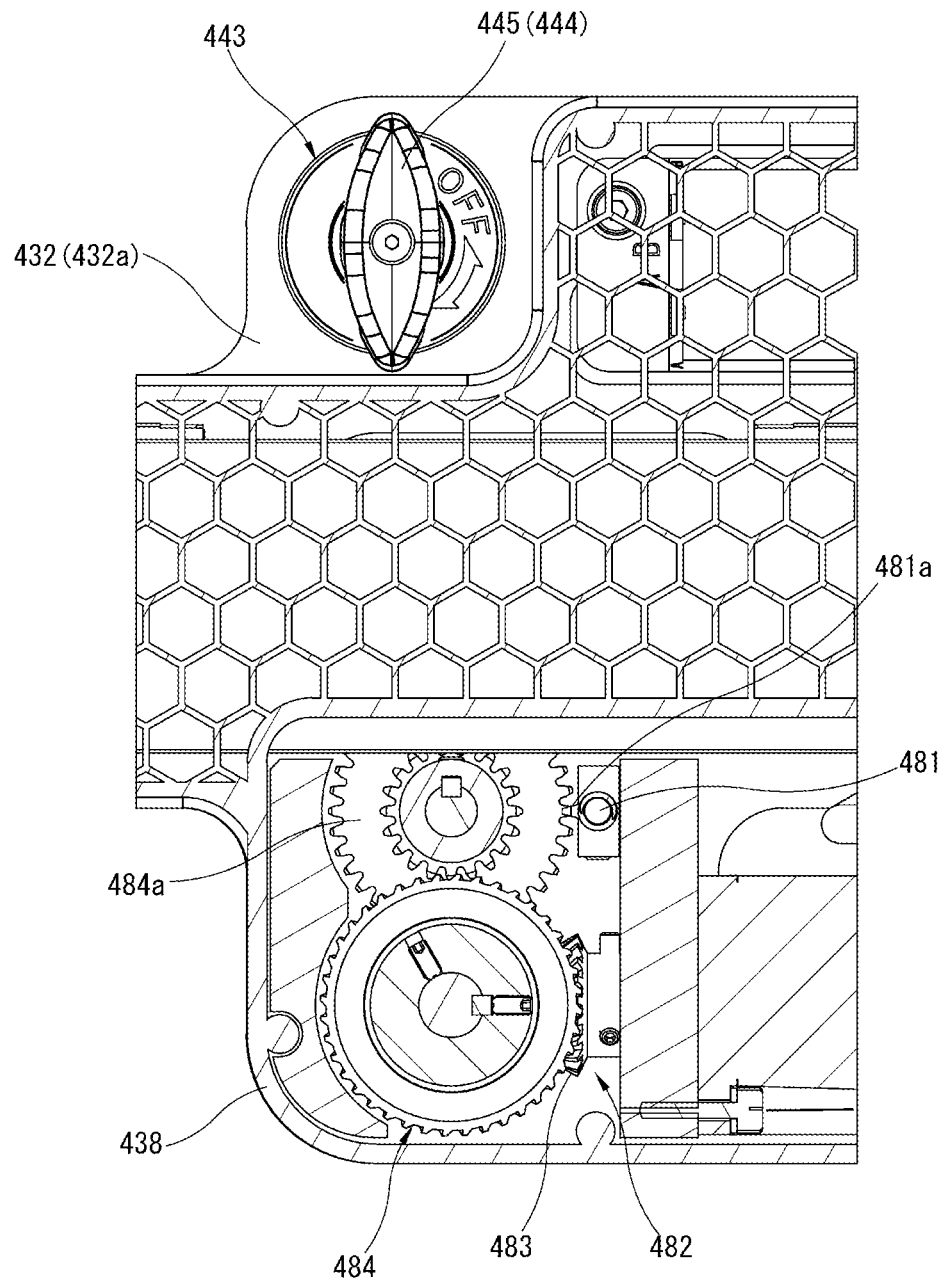
FIG. 67 is a sectional view, taken along a plane orthogonal to a stopper pin, of the principal part of the transmission actuator unit.

FIGS. 66 and 67 illustrate one example of the stopper mechanism 482. Although the electric motor of the selecting actuator 433 drives a speed reducer 484 configured from a gear train through a bevel gear 483 then the rack shaft 441 moves forward and backward, as the stopper mechanism 482, a gear 484a in the speed reducer 484 and a nail portion 481a of the stopper pin 481 are engaged. That is, when the stopper pin 481 is at the protruding position, the nail portion 481a of the stopper pin 481 is engaged with the gear 484a, then rotation of the speed reducer 484 becomes impossible. On the other hand, when the stopper pin 481 is at the retracting position, the nail portion 481a of the stopper pin 481 moves to a position that is separate from the gear 484a in an axial direction of the stopper pin 481, then free rotation of the gear 484a becomes possible.

Therefore, when dismounting the transmission actuator unit 431 from the actuator support plate 405 and lifting the transmission actuator unit 431, the stopper pin 481 protrudes by the coil spring 485, then the selecting actuator 433 is locked. Thus, the rack shaft 441 does not protrude by gravitation. On the other hand, when mounting the transmission actuator unit 431 on the actuator support plate 405, the locking is automatically released, then the movement of the selecting actuator 433 becomes possible.

A protruding length of the stopper pin 481 when the stopper pin 481 is at the protruding position is set to be shorter than the protruding length of the three leg portions 476 on the bottom surface of the base plate 432. Therefore, even if the dismounted transmission actuator unit 431 is putted or placed on a floor etc., the locking is not released. Further, unnecessary or unintentional damage to the stopper pin 481 due to a collision with the floor etc. is prevented.

As shown in FIGS. 48 and 49 etc., in the state in which the transmission actuator unit 431 is mounted on the actuator support plate 405, an outside shape of a front edge (an edge portion on the connector cover 437 side) of the base plate 432 including the extending part 432a substantially corresponds to a shape of a front edge of the actuator support plate 405. Likewise, on a rear edge side of the actuator support plate 405, an outside shape of a rear edge (an edge portion on the motor cover 438 side) of the base plate 432 including the extending part 432a substantially corresponds to a shape of a rear edge of the actuator support plate 405. The rear side connector 423B, which is not used for the so-called right-hand drive vehicle, is covered with the base plate 432 of the motor cover 438 section. That is, the unused rear side connector 423B is not exposed.

Further, in plan view, the actuator support plate 405 is located at the inner side of the main frame 315. On the other hand, both right and left end portions of the actuator housing 435, which protrude from the sub frame 316 in the vehicle width direction, are located at height positions that are above the main beams 315a of the main frame 315 (see FIG. 44 etc.). It is therefore possible to slide the movable unit 401 and the transmission actuator unit 431 upward and downward or forward and backward without interference of the main beams 315a with the actuator housing 435. It is noted that each part is set so that even at a maximum backward position of the movable unit 401 and at a maximum forward position of the movable unit 401, the main beams 315a do not interfere with the actuator housing 435.

The actuator housing 435 is provided, on an upper surface 435a thereof, with a substantially U-shaped handle 436 that can be grasped or gripped by the operator or the workman so that the operator or the workman can carry the detached transmission actuator unit 431. This handle 436 is provided at a position corresponding to a centroid position (a position of the center of mass) of the entirety of the transmission actuator unit 431 including the shifting actuator 434. Therefore, when lifting the transmission actuator unit 431 through the handle 436, the transmission actuator unit 431 does not greatly or heavily lean or tilt. This facilitates carrying work and attaching-and-detaching work of the transmission actuator unit 431 to and from the movable unit 401.

As described above, the transmission actuator unit 431 can be detached from the movable unit 401 only by loosening the pair of lock mechanisms 443. Conversely, the transmission actuator unit 431 can be attached (fixed) to the movable unit 401 by mounting the transmission actuator unit 431 on the movable unit 401 and bringing the lock mechanisms 443 to the locked state by turning the pair of lock pins 444 by hand or with fingers. Upon attaching the transmission actuator unit 431 to the movable unit 401, electric connection by the connectors 423 and 471 is established without external cable connecting work.

Therefore, when mounting the automatic vehicle driving device 301 in the vehicle, in a state in which the transmission actuator unit 431 remains dismounted from the frame 311 (the movable unit 401), the frame 311 is fixed and supported above the driver's seat 302, and after that, the transmission actuator unit 431 can be fixed to the movable unit 401 in an interior of the vehicle. Conversely, when dismounting the automatic vehicle driving device 301 from the vehicle, the transmission actuator unit 431 can be easily detached on ahead. It is therefore possible to readily carry the automatic vehicle driving device 301 into and out of the vehicle interior through a door opening of the vehicle. In the state in which the transmission actuator unit 431 is detached (dismounted), since the rack shaft 441 of the selecting actuator 433 is fixed by the stopper mechanism 482 using the stopper pin 481, handling of the dismounted transmission actuator unit 431 becomes easy. Further, since the rack shaft 441 does not protrude by its own weight, for instance, there is no risk that the rack shaft 441 will unintentionally protrude and this will damage the door opening.

On the other hand, the transmission actuator unit 431 detached from the movable unit 401 can be attached to the movable unit 401 with the front and rear of the transmission actuator unit 431 being reversed 180 degrees (or with the transmission actuator unit 431 turned back to front by 180 degrees). This can readily meet the vehicle in which the shift-lever is on a right side of the driver's seat 302, i.e. the so-called left-hand drive vehicle.

Figure 68:
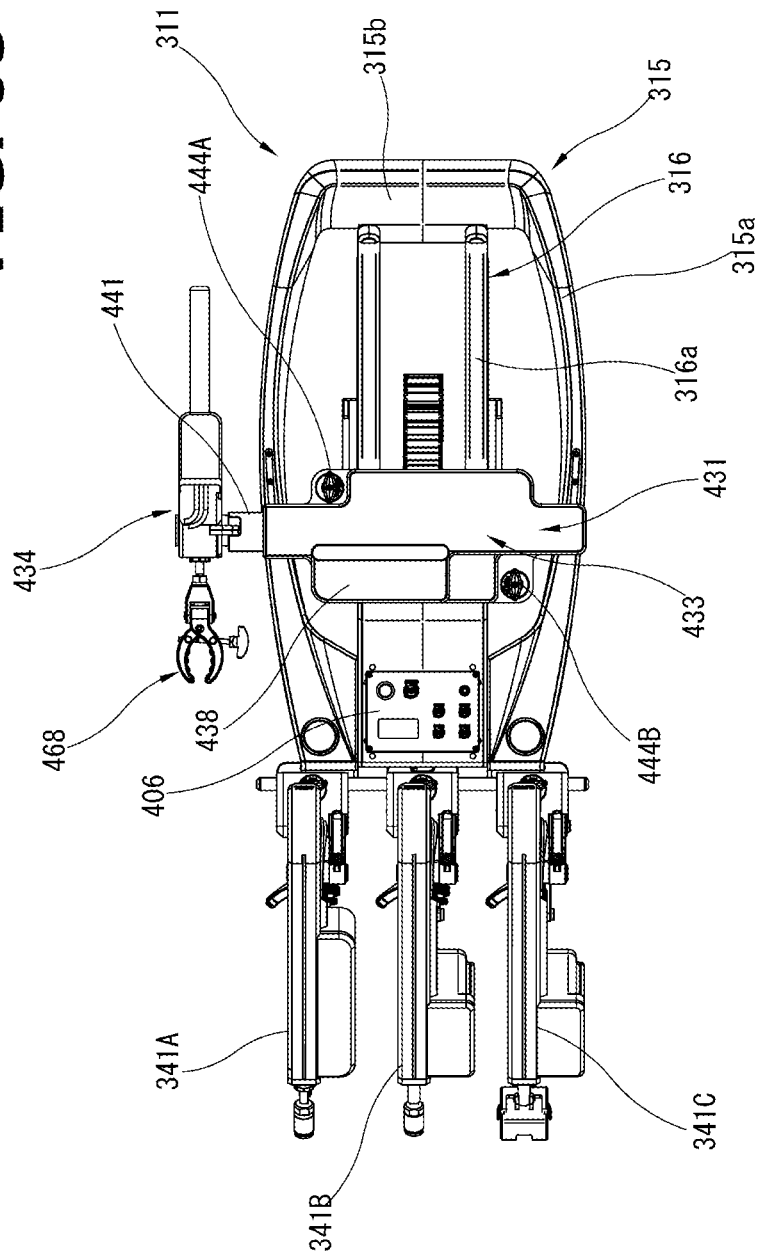
FIG. 68 is a top view of the automatic vehicle driving device of the second embodiment for the left-hand drive vehicle.
Figure 69:
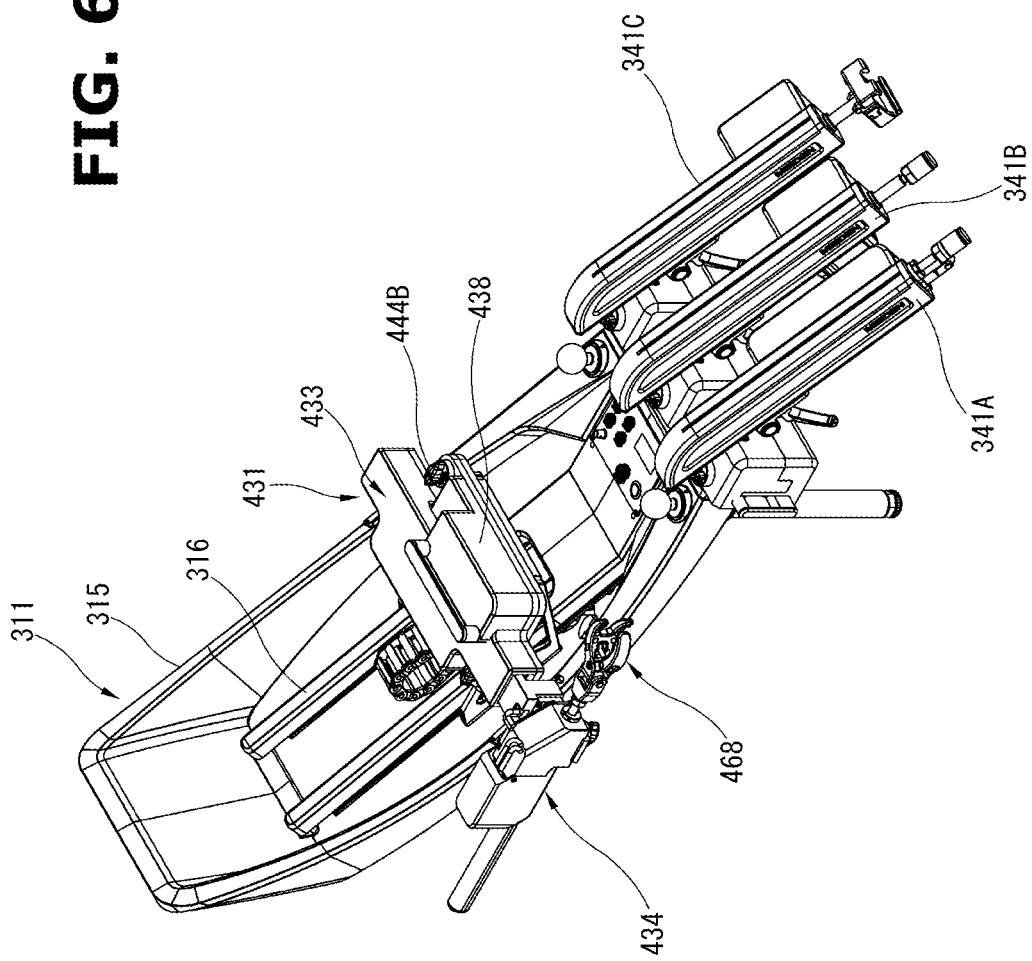
FIG. 69 is a perspective view of the automatic vehicle driving device of the second embodiment for the left-hand drive vehicle.

In the case of the left-hand drive vehicle in which the mounting attitude of the transmission actuator unit 431 is reversed 180 degrees from the mounting attitude of the transmission actuator unit 431 for the right-hand drive vehicle, as shown in FIGS. 68 and 69, the motor cover 438 is located at the front side, and the connector cover 437 is located at the rear side. The pair of diagonally-arranged lock pins 444 of the transmission actuator unit 431 are engaged with the diagonally-arranged grommets 421 which are different from those for the right-hand drive vehicle, and locking is done by the turning operation of the knobs 445. That is, the second lock pin 444B is engaged with the front side grommet 421A, and the first lock pin 444A is engaged with the rear side grommet 421B.

Further, the transmission actuator-side connector 471 is connected to the rear side connector 423B of the actuator support plate 405. At this time, the unused front side connector 423A is accepted or accommodated in the opening 475 of the base plate 432. Thus, the unused front side connector 423A does not interfere with the base plate 432, and is not exposed to the outside. Also, the three leg portions 476 provided under the base plate 432 are relatively tightly fitted into and engaged with the front side locating opening 424A and the pair of right and left locating cutting portions 425 of the actuator support plate 405 respectively.

Here, in either case of the mounting attitudes for the right-hand drive vehicle and for the left-hand drive vehicle, a center of the rack shaft 441 of the selecting actuator 433 is located at the same position without change. That is, the rack shaft 441 is always located at the middle in a front-to-back direction of the actuator support plate 405.

[Configuration and Attachable-and-Detachable Structure of Shifting Actuator 434]

As described above, although the shifting actuator 434 is supported by the top end portion of the rack shaft 441 of the selecting actuator 433, this shifting actuator 434 can be easily attached to and detached from the top end portion of the rack shaft 441. Further, the shifting actuator 434 is configured so that a mounting attitude of the shifting actuator 434 with respect to the selecting actuator 433 can be turned back to front. That is, in a case where the mounting attitude of the transmission actuator unit 431 is reversed 180 degrees according to a change from the case of the right-hand drive vehicle to the case of the left-hand drive vehicle or vice versa, since the position of the shift lever is located at a front side with respect to the rack shaft 441 of the selecting actuator 433 in many vehicle types, there is a need to change the orientation of the shifting actuator 434 (according to which side the grip hand 468 is positioned at a front side or a rear side). In the present embodiment, the reverse of the orientation of the shifting actuator 434 in the fore-and-aft direction is easily done.

Figure 63:
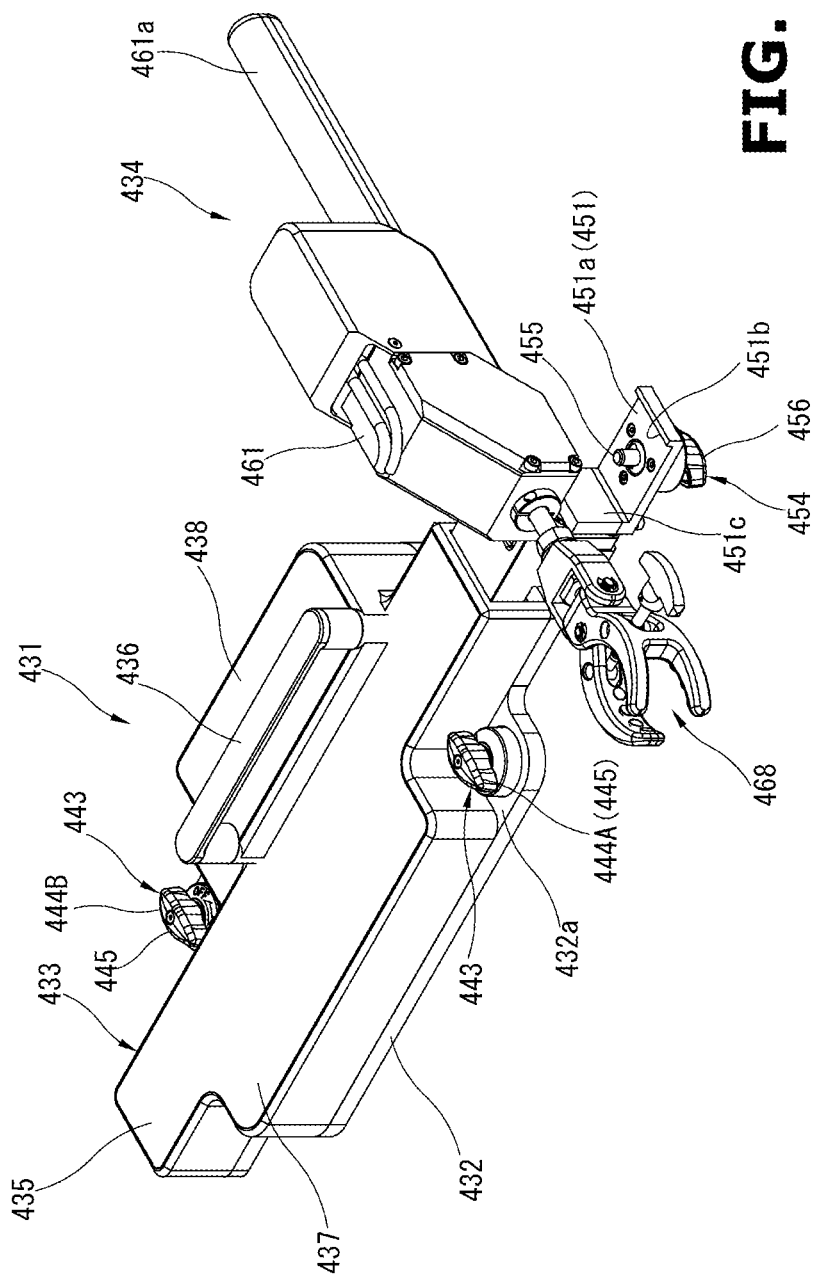
FIG. 63 is an exploded perspective view of the transmission actuator unit.

FIGS. 63 and 64 illustrate a state in which the shifting actuator 434 is detached from the selecting actuator 433. Here, the orientation of the shifting actuator 434 (the mounting attitude of the shifting actuator 434 with respect to the selecting actuator 433) in these drawings corresponds to the case of the so-called right-hand drive vehicle shown in FIG. 43 etc.

The rack shaft 441 protruding from and retracting into the actuator housing 435 of the selecting actuator 433 has a prismatic shape. An L-shaped bracket 451 is fixed to the top end portion of the rack shaft 441 through a rotatably-supported joint 452. The joint 452 has a rotation axis that is parallel to a longitudinal direction of the rack shaft 441, and the L-shaped bracket 451 is supported so as to be able to pivot or rotate with this rotation axis of the joint 452 being a center (a pivot or a pivotal center). The L-shaped bracket 451 has a rectangular mounting surface 451*a* having a flat surface that is parallel to the rotation axis of the joint 452, and further has, at both sides of this mounting surface 451*a*, a first guide surface 451*b* and a second guide surface 451*c* which stand vertically from the mounting surface 451*a*.

The rotation axis of the joint 452 is positioned below the rack shaft 441, and a position of the mounting surface 451*a* is offset downward from the rotation axis of the joint 452. Therefore, the mounting surface 451*a* is positioned at a lower side with respect to an extension line of the rack shaft 441. The first guide surface 451*b* and the second guide surface 451*c* extend in a direction orthogonal to the rotation axis of the joint 452 (in other words, a direction orthogonal to the rack shaft 441), and are parallel to each other.

In the middle of the mounting surface 451*a* of the L-shaped bracket 451, a lock pin 455 that forms a lock mechanism 454 is formed. This lock mechanism 454 is a general-purpose screw type lock mechanism that is substantially the same as the above-described lock mechanism 443 to fix the transmission actuator unit 431. The lock mechanism 454 has, at a lower end of the lock pin 455, a knob 456 for a turning operation by hand or with fingers.

As illustrated in FIGS. 62 to 65, the shifting actuator 434 has a box-shaped actuator housing 461 having a rectangular bottom surface, a speed reducer 463 accommodated in this actuator housing 461, an electric motor 465 connected to the speed reducer 463 and a rack shaft 466, as an actuator rod, whose top end portion protrudes from an end portion of the actuator housing 461. The rack shaft 466 has a bar-shape whose cross section, except a teeth portion, is a circular shape as a basic shape. The actuator housing 461 has a cylindrical part 461*a* extending straight backward. When the rack shaft 466 is at a retracting position, most of the rack shaft 466 is accommodated in this cylindrical part 461*a*. A corner part of the box-shaped actuator housing 461, which is on an opposite side to the electric motor 465, is a slanting surface (or a sloping surface).

The grip hand 468 is connected to a top end of the rack shaft 466. This grip hand 468 has a bifurcated fixed finger 468*a*, a movable finger 468*b* that can open and close relative to the fixed finger 468*a* and a fixing screw 469 that performs an open-and-closure operation of the movable finger 468*b* relative to the fixed finger 468*a* and tightens and fixes the movable finger 468*b* to the fixed finger 468*a*. The grip hand 468 is a grip hand gripping the knob or the grip of the shift lever head (all not shown). By open-and-closure adjustment of the fingers 468*a* and 468*b* through the fixing screw 469, the grip hand 468 can grip a variety of knobs or grips having different shapes or sizes.

The bottom surface of the actuator housing 461 is formed by a bottom plate 461*b* that is relatively thick and has high rigidity. As shown in FIG. 64, this bottom plate 461*b* has a rectangular shape whose long side extends along a longitudinal direction of the rack shaft 466. A width of a short side of the bottom plate 461*b* is substantially equal to a width of the mounting surface 451*a* of the L-shaped bracket 451, i.e. a distance between the first guide surface 451*b* and the second guide surface 451*c*. That is, the bottom plate 461*b* has a size that can be relatively tightly fitted onto the mounting surface 451*a* between the first and second guide surfaces 451*b* and 451*c* of the L-shaped bracket 451. In the middle of the bottom plate 461*b*, a grommet 462 having a lock hole 462*a* with which the lock pin 455 is engaged is provided. This grommet 462 is the same as the above-mentioned grommet 421 of the actuator support plate 405. The grommet 462 forms the lock mechanism 454 together with the lock pin 455.

Therefore, by mounting the actuator housing 461 on the L-shaped bracket 451 and moving the lock pin 455 to a locking direction by a turning operation of the knob 456 by hand or with fingers, the bottom plate 461*b* is tightly fixed to the mounting surface 451*a* of the L-shaped bracket 451. The shifting actuator 434 is then fixed to the L-shaped bracket 451. In this fixing state, since right and left side edges of the bottom plate 461*b* are engaged with or fitted to the first and second guide surfaces 451*b* and 451*c* of the L-shaped bracket 451, the shifting actuator 434 does not lean or incline to a right side or a left side. That is, the rack shaft 441 of the selecting actuator 433 and the rack shaft 466 of the shifting actuator 434 are always properly maintained in an orthogonal state. It is noted that an axial center of the rack shaft 466 crosses a center of swing (or rotation) of the L-shaped bracket 451, i.e. the rotation axis of the joint 452. Therefore, the rack shaft 466 having the grip hand 468 at its top end can rotate (pivot or tilt) upward and downward with its rotation center positioned on the axial center of the rack shaft 466 being a center (a pivot or a pivotal center).

Further, by performing the turning operation of the knob 456 provided at a lower surface side of the L-shaped bracket 451 to an unlocking direction, the lock mechanism 454 is unlocked, and as shown in FIGS. 63 and 64, the shifting actuator 434 can be detached from the L-shaped bracket 451. Then, by turning the detached shifting actuator 434 back to front by 180 degrees and attaching the shifting actuator 434 to the L-shaped bracket 451 again, as shown in FIGS. 68 and 69, combination of the selecting actuator 433 with the shifting actuator 434 having a reverse mounting attitude becomes possible.

The lock hole 462a of the grommet 462 is positioned at a center of the bottom plate 461b of a lower surface of the actuator housing 461, at least at a center of the width along a direction of the short side of the bottom plate 461b. Therefore, also in the case of the reverse mounting attitude of the shifting actuator 434 which is set by turning the shifting actuator 434 back to front by 180 degrees, the bottom plate 461b is relatively tightly fitted onto the mounting surface 451a between the first and second guide surfaces 451b and 451c of the L-shaped bracket 451, and the lock pin 455 is engaged with the lock hole 462a.

Here, as shown in FIGS. 59 and 60 etc., the selecting actuator 433 and the shifting actuator 434 are electrically connected through two cables 467 leading from the top end portion of the rack shaft 441 of the selecting actuator 433 to the electric motor 465 of the shifting actuator 434. Each of the cables 467 has a minimum length required to detach the shifting actuator 434 from the L-shaped bracket 451 and reverse (or turn) the attitude of the shifting actuator 434. Therefore, basically, reversing work (or turning work) of the attitude of the shifting actuator 434 can be done without disconnecting the cables 467. If necessary, the cables 467 could be disconnected from the shifting actuator 434.

Each of the cables 467 extends through an inside of the rack shaft 441 of the selecting actuator 433, then is connected to the connector 471 provided at the lower surface of the base plate 432. Therefore, a length of a part of the cable 467 which is exposed to the outside is kept to a minimum.

Figure 65:
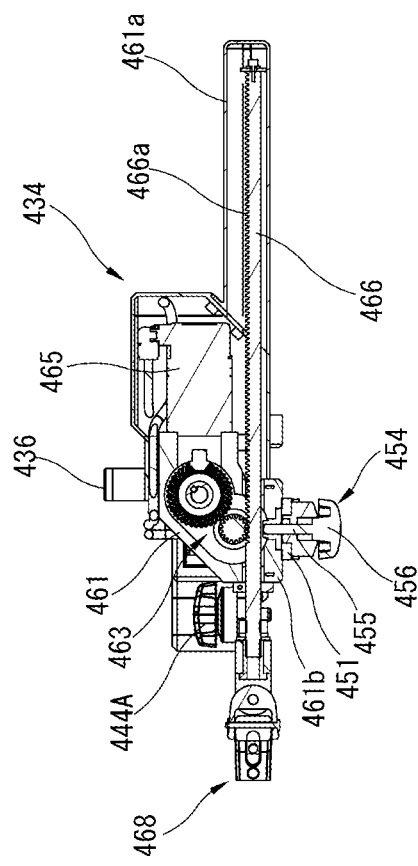
FIG. 65 is a longitudinal cross section of the shifting actuator.

FIG. 65 is a cross section of the shifting actuator 434, cut along the axial center of the rack shaft 466. More specifically, FIG. 65 shows a cross section of the shifting actuator 434 fixed to and supported by the L-shaped bracket 451 through the lock mechanism 454. The shifting actuator 434 is a rack-and-pinion type linear-motion actuator in which the rack shaft 466 serving as the actuator rod moves in the vehicle longitudinal direction by working of the electric motor 465 and the speed reducer 463. As shown in the drawings, the speed reducer 463 configured from a reduction gear train that is structured by combination of a plurality of gears 464 is accommodated in the box-shaped actuator housing 461. The speed reducer 463 reduces rotation speed of the electric motor 465. The rack shaft 466 is provided with a rack 466a meshing with a final pinion of the gear train.

As described above, by mounting the whole transmission actuator unit 431 on the movable unit 401 selectively in either of the two mounting attitudes and by changing the mounting attitude of the shifting actuator 434 with respect to the selecting actuator 433 according to the mounting attitude of this the transmission actuator unit 431, the automatic vehicle driving device 301 of the present embodiment can readily meet the so-called right-hand drive vehicle in which the shift-lever is located on the left side with respect to the driver's seat 302 and the so-called left-hand drive vehicle in which the shift-lever is located on the right side with respect to the driver's seat 302.

FIGS. 47 and 48 illustrate the automatic vehicle driving device 301 for the right-hand drive vehicle, and the grip hand 468 is located at the left side of the frame 311. Further, the grip hand 468 is located at the front side with respect to the actuator housing 435 of the selecting actuator 433. The selecting actuator 433 and the shifting actuator 434 of the transmission actuator unit 431 are combined as shown in FIGS. 59 and 60.

In contrast to this, FIGS. 68 and 69 illustrate the automatic vehicle driving device 301 for the left-hand drive vehicle, and the grip hand 468 is located at the right side of the frame 311. Further, the grip hand 468 is located at the front side with respect to the actuator housing 435 of the selecting actuator 433. The selecting actuator 433 and the shifting actuator 434 of the transmission actuator unit 431 are combined with the shifting actuator 434 being set at an inverse position as shown in the drawings.

Further, it is also possible to select the mounting attitude of the shifting actuator 434 such that the grip hand 468 is located at the rear side with respect to the actuator housing 435 of the selecting actuator 433, although this drawing is omitted. For instance, the transmission actuator unit 431 is mounted in the right-hand drive vehicle in which the shift lever is on the left side of the driver's seat 302 as shown in FIG. 43, then the shift lever is located on a relatively rear side with respect to the driver's seat 302. In this case, the shifting actuator 434 is combined with the selecting actuator 433 with the shifting actuator 434 turned (or reversed) back to front, and the grip hand 468 is located at a relatively rear position.

Such configuration is also applied to the case of the left-hand drive vehicle. For instance, the shifting actuator 434 can be combined with the selecting actuator 433 with the shifting actuator 434 turned (or reversed) back to front in the left-hand drive vehicle shown in FIG. 68.

As described above, a height position or a fore-and-aft position of the selecting actuator 433 can be changed by a slide position of the movable unit 401 with respect to the frame 311. Therefore, by combination of the change of the orientation of the shifting actuator 434 in the fore-and-aft direction with the change of the height position or the fore-and-aft position of the selecting actuator 433, the shifting actuator 434 can meet a variety of shift lever positions.

Further, although the height position of the shift lever head generally changes in an up-and-down direction according to the shifting operation, the shifting actuator 434 can pivot or rotate upward and downward with the rotation axis of the joint 452 being the center (the pivot or the pivotal center). Thus, this allows the change of the height position of the shift lever head. A smooth shifting operation can therefore be performed.

[Modified Example of Movable Unit 401]

Figure 81:
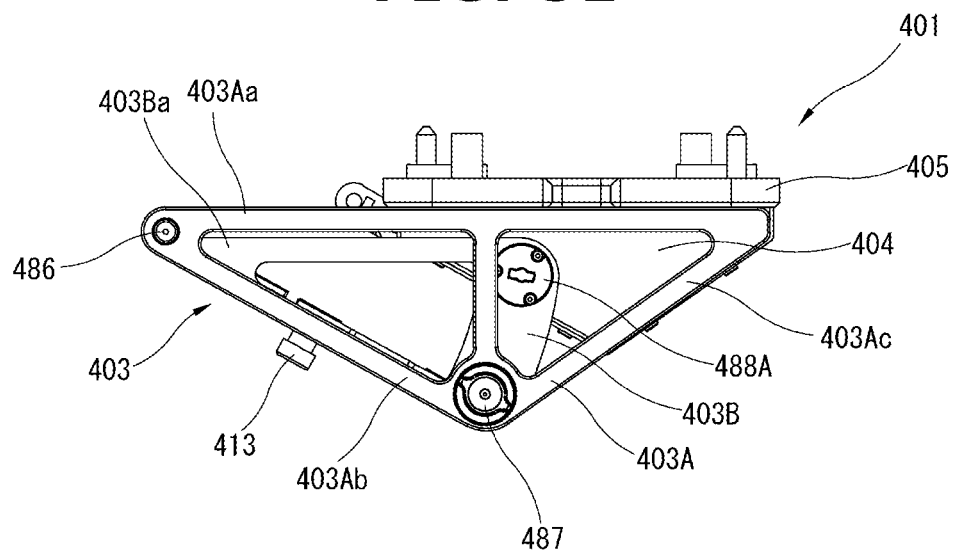
FIG. 81 is a side view showing a modified example of the movable unit.
Figure 82:
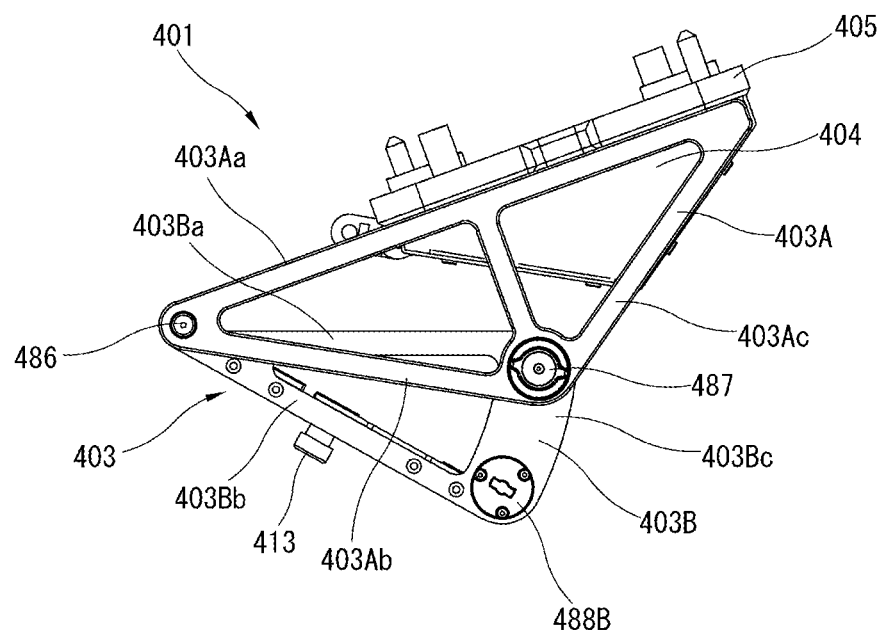
FIG. 82 is a side view showing a tilted state of the movable unit of the modified example.
Figure 83:
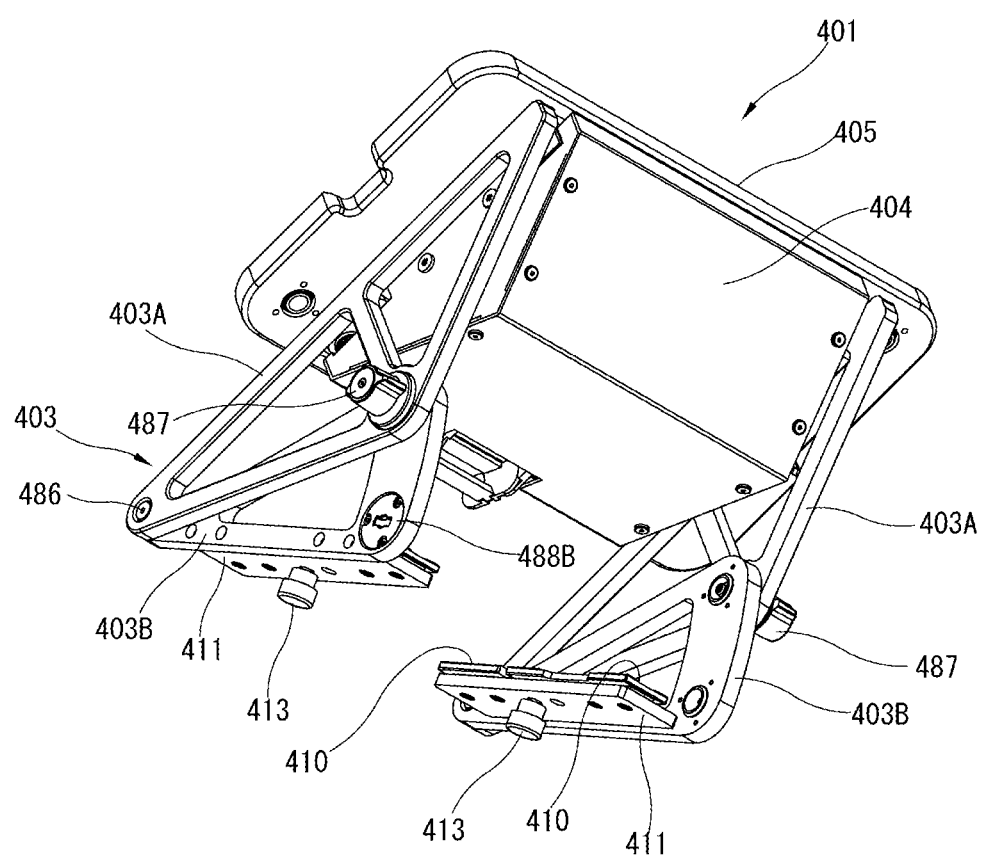
FIG. 83 is a perspective view, viewed from below, of the tilted state of the movable unit.

FIGS. 81 to 83 show, as a modified example of the movable unit 401, the movable unit 401 having a tilt mechanism so as to be able to meet a case where the height position of the head of the shift lever is relatively high then there is a need to operate the shift lever in an oblique direction (for instance, a case where a short shift lever is provided on the dashboard in front of the driver's seat).

As a structure of this movable unit 401, each of the pair of side frames 403 is configured by combination of an outer side frame 403A and an inner side frame 403B. The outer side frame 403A is located at an outer side in the vehicle width direction. The outer side frame 403A has, like the aforementioned side frame 403, a substantially triangular shape having three sides of 403Aa, 403Ab and 403Ac, and the upper side 403Aa is fixed to the actuator support plate 405.

The inner side frame 403B is provided so as to overlap the outer side frame 403A along an inner side surface in the vehicle width direction of the outer side frame 403A. The inner side frame 403B has a relatively small substantially triangular shape having three sides of 403Ba, 403Bb and 403Bc. The slider cover plate 411 (including the two front and rear sliders 410 and the fixing screw 413) is fixed to the base 403Bb of the inner side frame 403B. Therefore, the inner side frame 403B is slidably guided in the forward-and-backward direction by the sub beam 316a.

The outer side frame 403A and the inner side frame 403B are pivotably connected at their rear vertexes through a hinge pin 486. A lock screw 487 is provided at a lower vertex of the outer side frame 403A. This lock screw 487 is screwed into a first grommet 488A or a second grommet 4888 that are provided at two upper and lower positions of the front side 403Bc of the inner side frame 403B. That is, by selecting either one of the two grommets 488 into which the lock screw 487 is screwed, a tilt angle of the outer side frame 403A with respect to the sliders 410 (in other words, the sub beams 316a guiding the movable unit 401) can be changed.

In a state in which the lock screw 487 is screwed into the second grommet 488B provided at the lower side, the actuator support plate 405 is basically in a horizontal attitude. Therefore, the shifting actuator 434 is basically in the horizontal attitude.

In contrast to this, in a state in which the lock screw 487 is screwed into the first grommet 488A, the actuator support plate 405 is in a tilting attitude in which a height position of the front edge side of the actuator support plate 405 is relatively high. Therefore, the shifting actuator 434 is also in the tilting attitude. As an example, the actuator support plate 405 can be tilted to an angle of e.g. about 30 degrees. With this, for instance, even in the case where the shift lever is provided on the dashboard, a shifting operation in obliquely upward and obliquely downward directions can be realized.

Here, in the shown example, the tilt angle can be changed to two angle levels. However, by arranging a number of the grommets 488, the tilt angle can be further changed to multi-angle levels.

[Modified Example of Supporting Part of Shifting Actuator 434]

As described above, in the case of the transmission actuator unit 431 of the above embodiment, a height position of the shifting actuator 434 with respect to the height position of the selecting actuator 433 is fixed. However, in order to readily meet the head positions of a variety of shift levers, the height position of the shifting actuator 434 with respect to the selecting actuator 433 can be changed.

Figure 84:
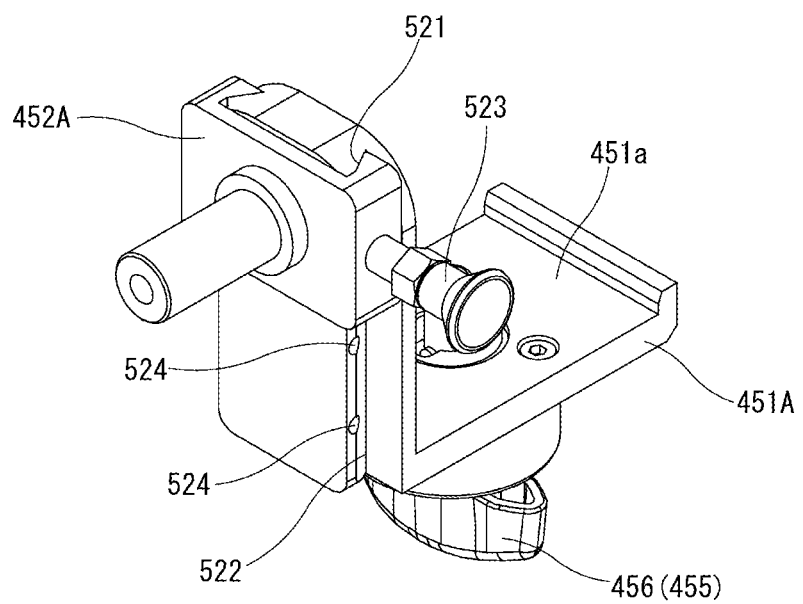
FIG. 84 is a perspective view showing a modified example of a supporting part of the shifting actuator.
Figure 85:
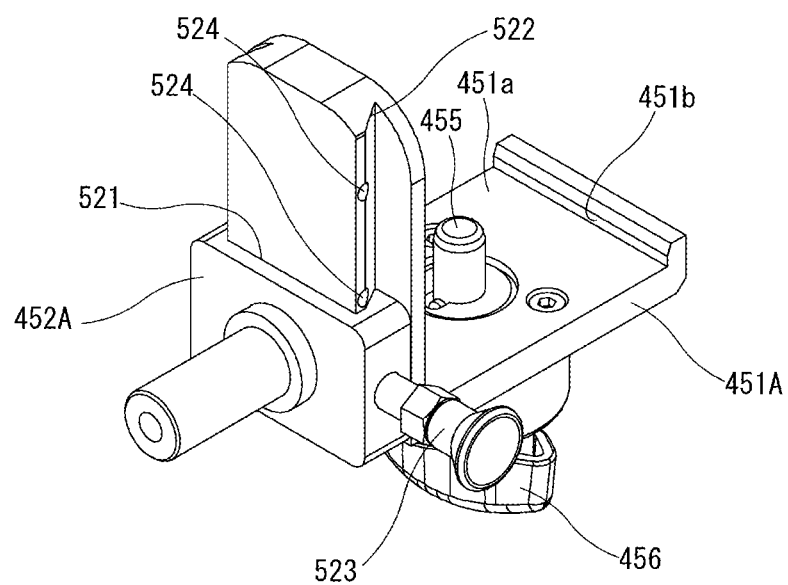
FIG. 85 is a perspective view when the supporting part of the shifting actuator is set to a high position.

FIGS. 84 to 86 illustrate a modified example of a supporting part of the shifting actuator 434. In the same manner as the above embodiment, an L-shaped bracket 451A is fixed to the top end portion of the rack shaft 441 of the selecting actuator 433 through a rotatably-supported joint 452A, and as shown in FIG. 84, both of the L-shaped bracket 451A and the joint 452A are combined so as to be able to slide upward and downward. For instance, the joint 452A has guide grooves 521 extending along the vertical direction, and the L-shaped bracket 451A is provided with guide rail portions 522 extending along the vertical direction which correspond to the guide grooves 521. The guide rail portions 522 are slidably engaged with the guide grooves 521, then the L-shaped bracket 451A can move upward and downward relative to the joint 452A.

Further, a plunger 523 is attached to a front end surface of the joint 452A, and engaging holes 524 which a tip of the plunger 523 gets into are formed at a plurality of positions, e.g. three positions of a front edge of the guide rail portion 522. That is, the engaging holes 524 are arranged at the three positions that are different in height position. The plunger 523 is normally forced in a direction in which the plunger 523 is engaged with the engaging hole 524 by an inside spring (not shown).

FIG. 84 illustrates a state in which the L-shaped bracket 451A is at the lowest position, and the plunger 523 is engaged with the engaging hole 524 arranged at the highest position. At this position, the axial center of the rack shaft 466 of the shifting actuator 434 crosses a rotation axis of the joint 452A. By pulling the plunger 523 with fingers of the operator or the workman and releasing the engagement with the engaging hole 524 from this state, a height position of the L-shaped bracket 451A can be easily changed to an upper second position or an upper third position. FIG. 85 illustrates a state in which the L-shaped bracket 451A is at the highest position, and the plunger 523 is engaged with the engaging hole 524 arranged at the lowest position.

Hence, the height position of the shifting actuator 434 with respect to the height position of the selecting actuator 433 can be readily changed to three height levels.

[Attachable-and-Detachable Structure of Pedal Actuator 341]

As described above, the automatic vehicle driving device 301 in the embodiment has the three pedal actuators 341, i.e. the accelerator pedal actuator 341A, the brake pedal actuator 341E and the clutch pedal actuator 341C. These pedal actuators 341 are supported, through the pedal actuator supports 351, by the pedal actuator support slide rail 331 fixed to the front end of the frame 311.

Figure 70:
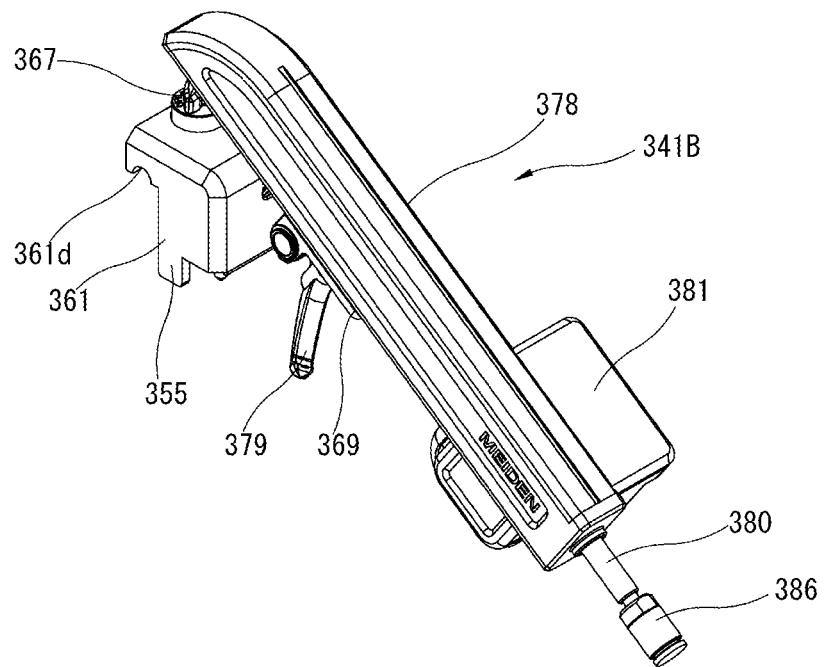
FIG. 70 is a perspective view of a brake pedal actuator.
Figure 71:
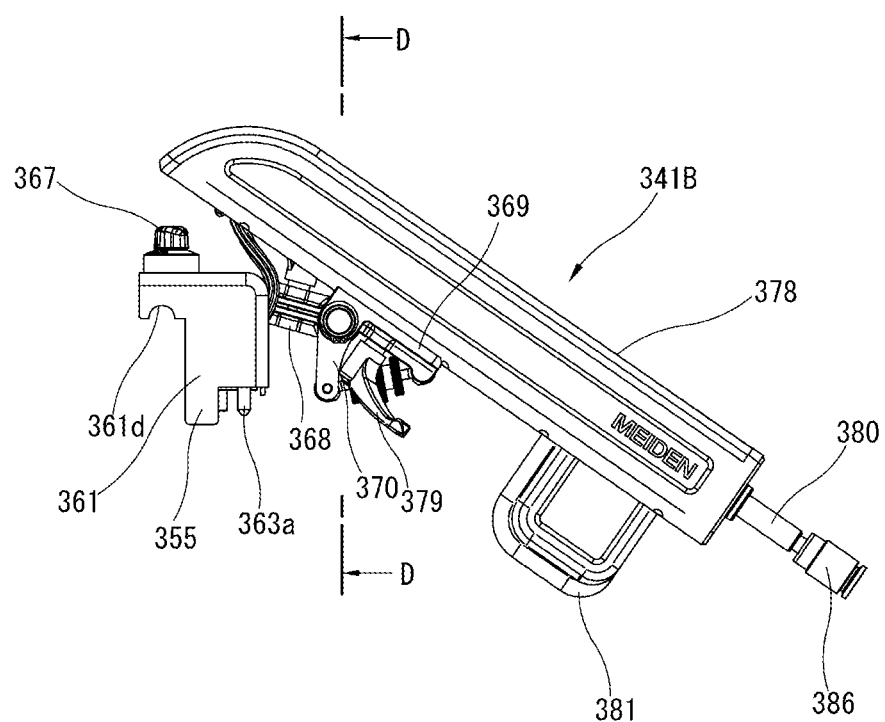
FIG. 71 is a side view of the brake pedal actuator.
Figure 72:
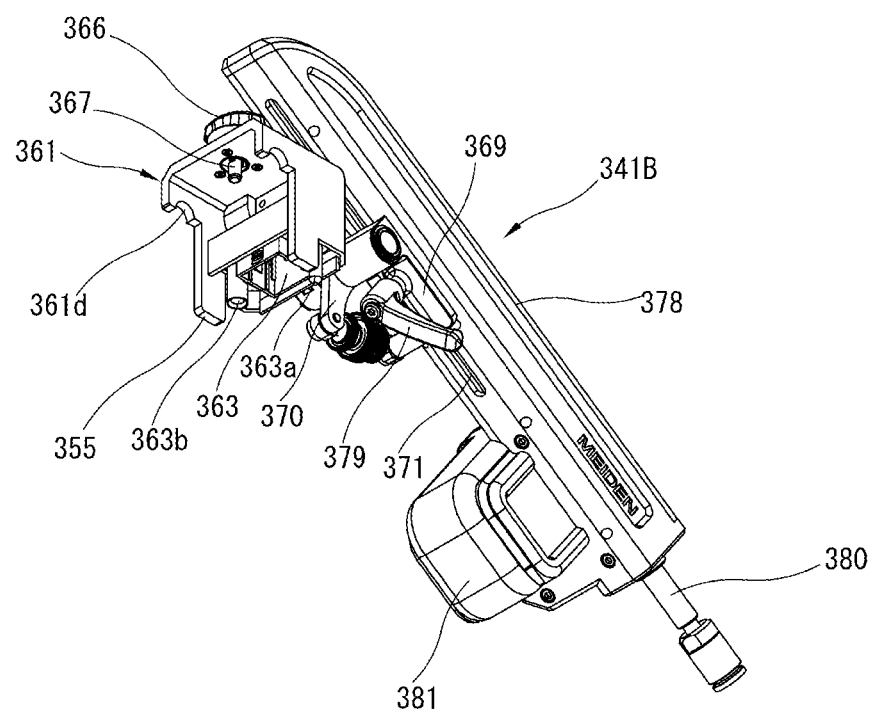
FIG. 72 is a perspective view, viewed from below, of the brake pedal actuator.
Figure 74:
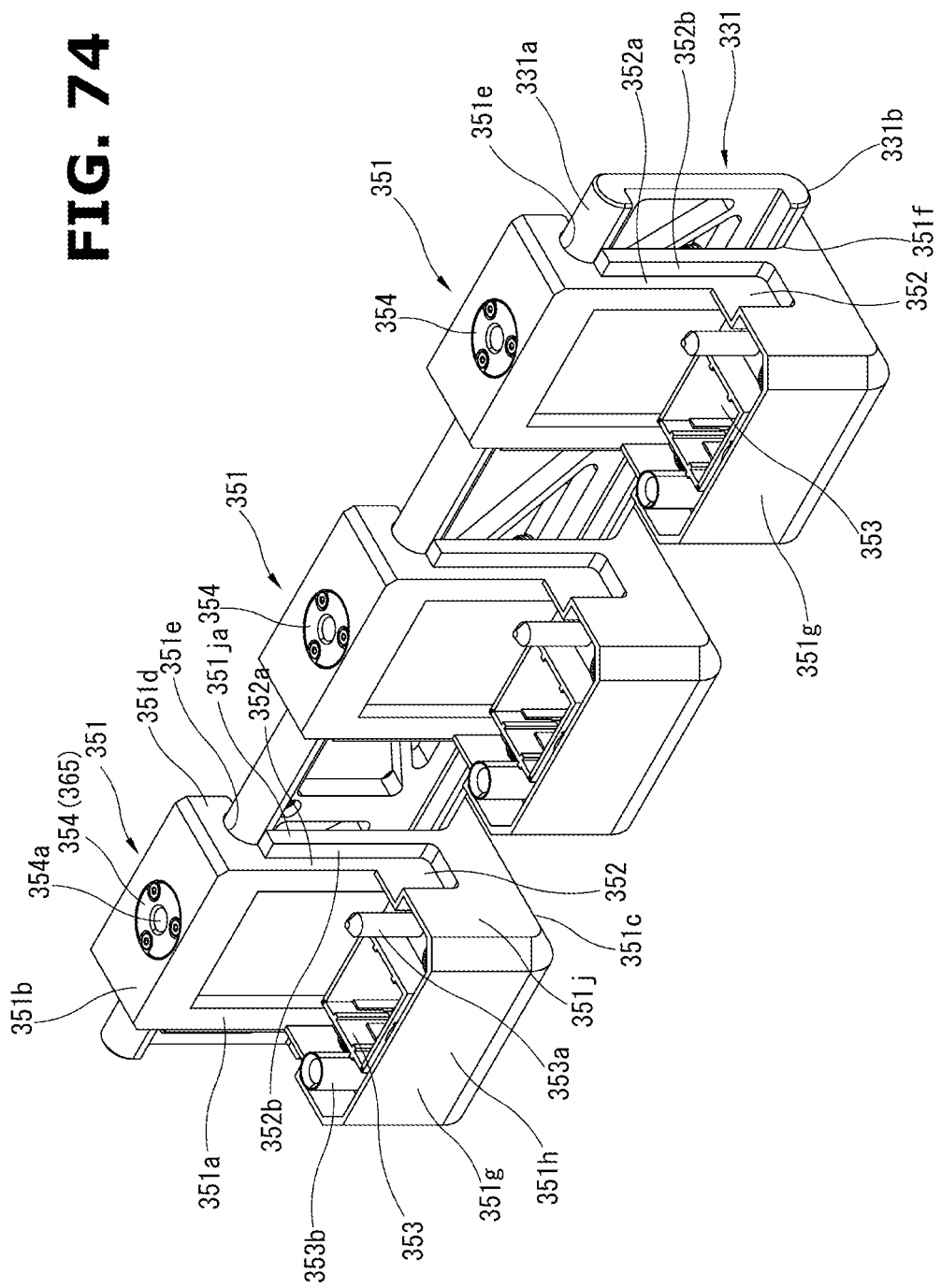
FIG. 74 is a perspective view of the slide rail and the pedal actuator supports.

FIG. 74 shows details of the pedal actuator support slide rail 331 located at the front end of the frame 311 and the pedal actuator supports 351. FIGS. 70 to 72 show details of the brake pedal actuator 341B, as a typical structure or configuration of the pedal actuator 341.

The pedal actuator support slide rail 331 is shaped into a long narrow band shape extending in the vehicle width direction, and is formed of a relatively thick metal plate having rigidity. Further, for weight reduction, the unnecessary portions are cut out, and the openings are formed. The upper and lower edge portions of the pedal actuator support slide rail 331 each have the bar-shape appearance which is semicircular in cross section. On the upper edge portion of the slide rail 331, a first guide surface 331a shaped into a semicylinder surface (or a half-round surface) and extending in the vehicle width direction is formed. On the lower edge portion of the slide rail 331, a second guide surface 331b shaped into a semicylinder surface (or a half-round surface) and extending in the vehicle width direction is formed. The first guide surface 331a and the second guide surface 331b have semicircular cross sections that face oppositely.

Each of the pedal actuator support 351 is molded as integral parts using e.g. hard synthetic resin. The pedal actuator support 351 has a longitudinal rectangular shape ranging in size from an upper side to a lower side of the slide rail 331 in front view (viewed from the vehicle front side). The pedal actuator support 351 has a rectangular base portion 351a that overlaps a front surface of the slide rail 331, an upper wall 351b that extends to the vehicle rear side at an upper side of the first guide surface 331a, a lower wall 351c that extends to the vehicle rear side at a lower side of the second guide surface 331b and a pair of right and left side walls 351d. In other words, the pedal actuator support 351 is formed into a box shape whose back surface facing to the slide rail 331 is open. The pair of side walls 351d each have a semicircular upper cutting portion 351e that is slidably engaged with the first guide surface 331a and a semicircular lower cutting portion 351f that is slidably engaged with the second guide surface 331b. These cutting portions 351e and 351f are engaged with the first and second guide surfaces 331a and 331b respectively, then the pedal actuator support 351 is slidably supported by the pedal actuator support slide rail 331.

Therefore, it is possible to easily adjust positions, in the vehicle width direction, of the accelerator pedal actuator 341A, the brake pedal actuator 341B and the clutch pedal actuator 341C individually in the vehicle interior so as to correspond to positions of the respective pedals 345, 346 and 347 which are different depending on the vehicle types. Here, the pedal actuator support 351 can be inserted or fitted onto the slide rail 331 along a longitudinal direction (the vehicle width direction) of the slide rail 331 from either of the both ends of the slide rail 331 while engaging the cutting portions 351e and 351f and the guide surfaces 331a and 331b with each other.

At a lower portion of the box-shaped pedal actuator support 351, a connector accommodating part 351g is formed integrally with the base portion 351a so as to protrude forward from the base portion 351a. The lower wall 351c on the base portion 351a side extends forward, and the connector accommodating part 351g has a front wall 351h that stands upward from a front end of this lower wall 351c and a pair of right and left side walls 351j. The connector accommodating part 351g is formed into an open box whose upper surface is open to an upper side by these lower wall 351c, front wall 351h and pair of side walls 351j. A support-side connector 353 is accommodated in an inside space of this connector accommodating part 351g. The support-side connector 353 has a similar configuration to the aforementioned transmission actuator unit connector 423 etc., and is structured such that a terminal strip is in a floating state to allow some position shift (or some deviation of position) from the other mating side. Further, the support-side connector 353 is provided with a guide pin 353a and a guide sleeve 353b to guide the other mating-side connector when inserting the other mating-side connector. As shown in FIG. 74, the support-side connector 353 is placed so as to face upward, namely that, as inserting directions, the guide pin 353a and the guide sleeve 353b extend along the vertical direction.

A cable (not shown) is drawn out backward from the support-side connector 353, and this cable extends to the connection box 406 through the opening of the slide rail 331.

The side wall 351j of the connector accommodating part 351g is located at a slightly outer side in the vehicle width direction with respect to the side wall 351d that extends along a side edge of the base portion 351a. That is, there is a certain step between the side wall 351d and the side wall 351j, and by using this step, a recessed groove 352 extending along the vertical direction is formed on a side surface of the pedal actuator support 351. In other words, the recessed groove 352 is formed into a shape that is recessed in the vehicle width direction from a surface of the side wall 351j of the connector accommodating part 351g. The recessed groove 352 is formed so as to extend downward from an upper edge of the connector accommodating part 351g and get into a side surface of the connector accommodating part 351g. Further, at an upper side with respect to the connector accommodating part 351g, a relatively-recessed guide portion 352a is formed so as to continue to the recessed groove 352 by a protrusion column 351ja that is formed by extending the side wall 351j of the connector accommodating part 351g in the upward direction into a long narrow shape. A bottom surface of the recessed groove 352 and a bottom surface of this guide portion 352a which continues to the bottom surface of the recessed groove 352 form a part of the side wall 351d of the pedal actuator support 351. Further, by a side surface of the protrusion column 351ja adjacent to the guide portion 352a, a guide surface 352b that continues to a side surface of the recessed groove 352 is formed.

The semicircular lower cutting portion 351f slidably engaged with the second guide surface 331b of the slide rail 331 is formed at the side wall 351j of the connector accommodating part 351g, to be exact.

A grommet 354, which is apart of an after-mentioned lock mechanism 365 for the pedal actuator 341, is provided at a middle portion on the upper wall 351b of the pedal actuator support 351. This grommet 354 is the same as the grommet 421 of the actuator support plate 405 and the grommet 462 of the shifting actuator 434. The grommet 354 has a lock hole 354a that opens upward.

Figure 76:
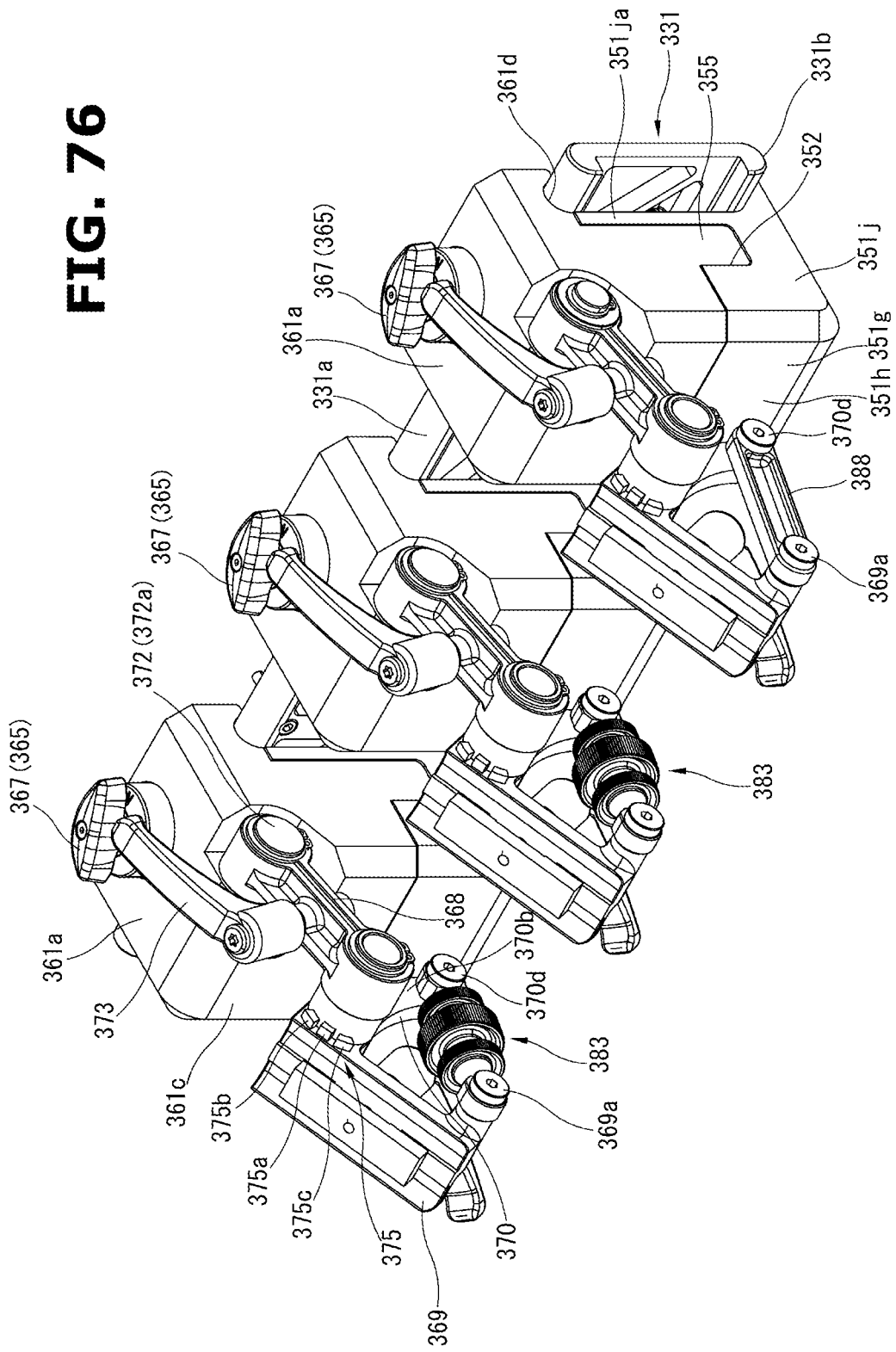
FIG. 76 is a perspective view showing a state in which the pedal actuator support brackets are fixed to the pedal actuator supports.

As illustrated in in FIGS. 73 and 76, pedal actuator support brackets 361 for the pedal actuators 341 are detachably secured to the respective pedal actuator supports 351, and the pedal actuators 341 are supported through the pedal actuator support brackets 361.

Figure 75:
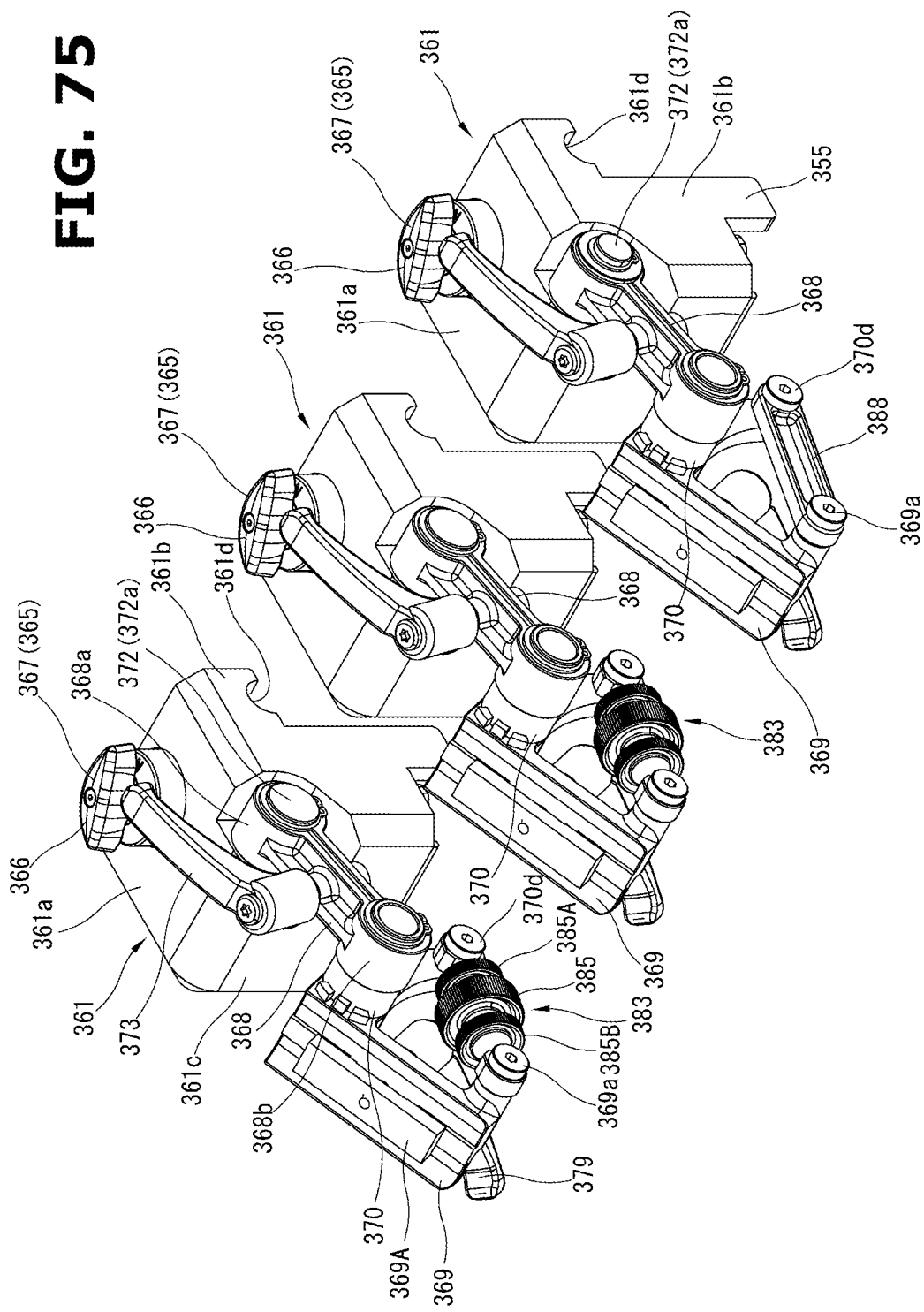
FIG. 75 is a perspective view of pedal actuator support brackets.

The pedal actuator support bracket 361 is shown in FIGS. 70 to 72 and 75. In the same way as the pedal actuator support 351, the pedal actuator support bracket 361 is molded as integral parts using e.g. hard synthetic resin. The pedal actuator support bracket 361 has a longitudinal rectangular shape ranging in size from the upper side to the lower side of the slide rail 331 in front view (viewed from the vehicle front side). Basically, the pedal actuator support bracket 361 has a shape that is complementary to the pedal actuator support 351 so as to form a substantially rectangular parallelepiped when the both are combined together. As shown in FIGS. 75 and 72, the pedal actuator support bracket 361 has an upper wall 361a that is fitted onto the upper wall 351b of the pedal actuator support 351, a pair of right and left side walls 361b that are fitted onto the respective side walls 351d of the pedal actuator support 351 and extend on the same planes as the respective side walls 351j of the connector accommodating part 351g and a front wall 361c that connects with these upper wall 361a and side walls 361b. The pedal actuator support bracket 361 is shaped into an open box whose rear side (back surface) and lower side (lower surface) are open. The front wall 361c is formed so as to extend on the same plane as the front wall 351h of the connector accommodating part 351g of the pedal actuator support 351 (so as to continue to the front wall 351h of the connector accommodating part 351g of the pedal actuator support 351).

The side wall 361b has a shape that covers the side wall 351d of the pedal actuator support 351 which is recessed in the vehicle width direction with respect to the side wall 351j of the connector accommodating part 351g, i.e. a shape that corresponds to the side wall 351d of the pedal actuator support 351. In particular, the side wall 361b has a substantially rectangular protruding portion 355 formed into a shape that protrudes downward and is complementary to the recessed groove 352 of the pedal actuator support 351. Further, an upper portion of the side wall 361b is formed so as to extend to the rear side on or above the slide rail 331, and at this upper portion of the side wall 361b, a semicircular rail fitting portion 361d that can be fitted onto the first guide surface 331a of the slide rail 331 from above is formed by cutting. In the shown example, the rail fitting portion 361d has the same shape as that of the upper cutting portion 351e of the pedal actuator support 351.

At a middle portion of the upper wall 361a, fitted onto the upper wall 351b of the pedal actuator support 351, of the pedal actuator support bracket 361, a lock pin 367 corresponding to the grommet 354 of the pedal actuator support 351 is fixed. The lock pin 367 is provided at a position corresponding to a position of the lock hole 354a of the grommet 354 of the pedal actuator support 351. The lock pin 367 has, at a head portion thereof, a knob 366 for allowing a turning operation by hand or with fingers. The lock mechanism 365 formed by the lock pin 367 and the grommet 354 has substantially the same structure as those of the lock mechanism 443 (the lock pin 444 and the grommet 421) for fixing the transmission actuator unit 431 and the lock mechanism 454 (the lock pin 455 and the grommet 462) for fixing the shifting actuator 434.

A metal support pin 372 to which the pedal actuator 341 is connected as described later is embedded in a corner portion at a front upper side of the pedal actuator support bracket 361. This support pin 372 is located at a position that does not interfere with the pedal actuator support 351, and arranged along the vehicle width direction. A head 372a positioned on one end of the support pin 372 and having a cylindrical surface is exposed at the one corner portion in the vehicle width direction of the pedal actuator support bracket 361.

A bracket-side connector 363 corresponding to the support-side connector 353 of the pedal actuator support 351 is accommodated in an inside space of the pedal actuator support bracket 361. This bracket-side connector 363 has the same configuration as those of the aforementioned connectors, and is structured such that a terminal strip is in a floating state to allow some position shift (or some deviation of position) from the other mating side. Further, the bracket-side connector 363 is provided with a guide pin 363a and a guide sleeve 363b to guide the other mating-side connector when inserting the other mating-side connector. The bracket-side connector 363 is set so as to face downward and face to the support-side connector 353.

FIG. 76 illustrates a state in which the pedal actuator support bracket 361 is combined with the pedal actuator support 351. In this combined state, a substantially rectangular parallelepiped box-shaped appearance is formed by the pedal actuator support bracket 361 and the pedal actuator support 351. That is, a lower edge of the front wall 361c of the pedal actuator support bracket 361 and an upper of the front wall 351h of the connector accommodating part 351g are fitted to each other, and the side walls 361b of the pedal actuator support bracket 361 are fitted onto the side walls 351d of the pedal actuator support 351, and further the upper wall 361a of the pedal actuator support bracket 361 is fitted onto the upper wall 351b of the pedal actuator support 351. An outer edge of each side wall 361b of the pedal actuator support bracket 361 is fitted to an upper edge of the side wall 351j of the connector accommodating part 351g of the pedal actuator support 351, a periphery of the recessed groove 352 and a side edge of the protrusion column 351ja serving as the guide portion 352a. Also, the rail fitting portion 361d at the upper portion of the side wall 361b is fitted onto the first guide surface 331a of the slide rail 331.

By engaging (locking) the upper-side lock mechanism 365 formed by the lock pin 367 and the grommet 354, the pedal actuator support bracket 361 and the pedal actuator support 351 are tightened relatively in the vertical direction, and the both that are complementary to each other in shape firmly and closely contact each other. Therefore, with engagement (locking) of the lock mechanism 365, the pedal actuator support bracket 361, i.e. the pedal actuator 341, is firmly supported by the pedal actuator support 351.

It is noted that a position and a size of each rail fitting portion 361d of the pedal actuator support bracket 361 are set so that when the pedal actuator support bracket 361 is pulled relatively downward by the locking of the lock mechanism 365, the rail fitting portion 361d is pressed hard against the first guide surface 331a of the slide rail 331. With this, slide of the pedal actuator support bracket 361 and the pedal actuator support 351 along the slide rail 331 becomes impossible, and the pedal actuator support bracket 361 and the pedal actuator support 351 are fixed in the vehicle width direction. In other words, sizes of the upper cutting portion 351e and the lower cutting portion 351f of the pedal actuator support 351 are set so that the slide of the pedal actuator support 351 with respect to the slide rail 331 is allowed. In contrast thereto, each size is set so that in a state in which the pedal actuator support bracket 361 and the pedal actuator support 351 are fixedly connected by the locking of the lock mechanism 365, the first and second guide surface 331a and 331b of the slide rail 331 are tightened in the vertical direction by and between the rail fitting portion 361d and the lower cutting portion 351f. Therefore, after connecting the pedal actuator 341 to the pedal actuator support 351 together with or through the pedal actuator support bracket 361, a position of the pedal actuator 341 (the pedal actuator support bracket 361) is adjusted to a proper position along the vehicle width direction, and the lock mechanism 365 is locked, then the pedal actuator support bracket 361 and the pedal actuator support 351 are fixed together, and at the same time, the whole pedal actuator 341 is fixed to the slide rail 331.

That is, the one lock mechanism 365 has two functions; one is a lock mechanism to fix the position of the pedal actuator 341 that is slidable in the vehicle width direction, and the other is a lock mechanism to fixedly connect the pedal actuator support 351 and the pedal actuator support bracket 361 that are detachable and separated into two.

When mounting the automatic vehicle driving device 301 above the driver's seat 302, the pedal actuators 341 are previously connected to the respective pedal actuator support brackets 361, and these pedal actuators 341 including the pedal actuator support brackets 361 are fixed to the frame 311 in the vehicle interior. In a case of the above configuration or structure, since the pedal actuator support brackets 361 are temporarily supported by the respective pedal actuator supports 351, fixing or connecting work is easily done in the narrow vehicle interior.

The pedal actuator support bracket 361 and the pedal actuator support 351 are configured to be combined with each other in the up-and-down direction (the vertical direction), and the operator or the workman mounts the pedal actuator support bracket 361 on the pedal actuator support 351 from above by or while fitting the pair of protruding portions 355 of the pedal actuator support bracket 361 into the respective recessed grooves 352 of the pedal actuator support 351 along the guide portions 352a. Basically, the pedal actuator support bracket 361 is mounted on the pedal actuator support 351, and the protruding portions 355 get into (or are fitted into) the recessed grooves 352 from above, also the rail fitting portions 361d at the upper portion of the pedal actuator support bracket 361 are fitted onto the first guide surface 331a of the slide rail 331. At the almost same time, the lock pin 367 of the lock mechanism 365 is inserted into the lock hole 354a of the grommet 354, and these are temporarily engaged with each other.

Since a load of the heavy weight pedal actuator 341 acts on the support pin 372 provided at the upper portion of the pedal actuator support bracket 361, in the state in which each protruding portion 355 provided at a lower portion of the pedal actuator support bracket 361 is fitted into the recessed groove 352, the moment acting forward with an engagement portion (a first engagement portion) of the protruding portion 355 and the recessed groove 352 being a supporting point occurs. This moment is borne at the upper side by an engagement portion of the rail fitting portion 361d and the first guide surface 331a or an engagement portion of the lock pin 367 and the lock hole 354a as a second engagement portion. Therefore, even if the operator or the workman mounts the pedal actuator support bracket 361 on the pedal actuator support 351 and takes his/her hands off the pedal actuator 341, the pedal actuator 341 does not fall, but is temporarily supported by the slide rail 331. Hence, the operator or the workman can easily fix the pedal actuator 341 to the slide rail 331, i.e. the frame 311, while adjusting the position of the pedal actuator 341 in the narrow vehicle interior.

Figure 77:
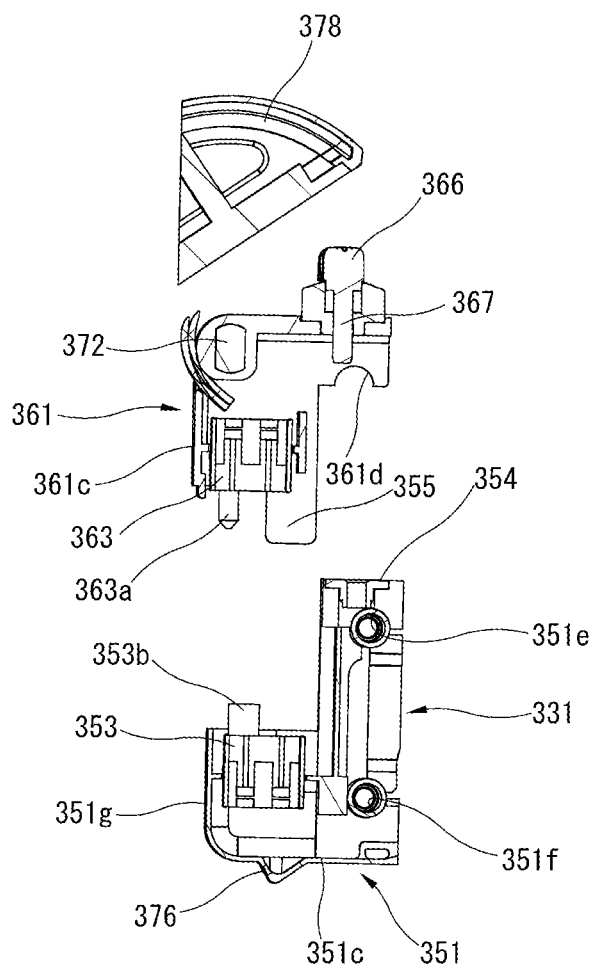
FIG. 77 is an exploded sectional view of the pedal actuator support and the pedal actuator support bracket.

By mounting the pedal actuator support bracket 361 on the pedal actuator support 351 along the vertical direction as described above, the support-side connector 353 of the pedal actuator support 351 and the bracket-side connector 363 of the pedal actuator support bracket 361 are connected. Although positioning of the both connectors 353 and 363 is performed by fitting of the guide pins 353a and 363a and the guide sleeves 353b and 363b, it is preferable to set a protruding length of each protruding portion 355 so that before the both connectors 353 and 363 contact each other, i.e. before the guide pins 353a and 363a and the guide sleeves 353b and 363b contact each other, a tip of the protruding portion 355 is inserted into the recessed groove 352 (see FIG. 77). With this, the guide pins 353a and 363a and the guide sleeves 353b and 363b are engaged in a state in which the positioning is already done to some extent, thereby surely preventing damage to the connectors 353 and 363.

[Configuration and Attitude Adjustment Mechanism of Pedal Actuator 341]

A configuration and an attitude adjustment mechanism of the pedal actuator 341 will be described with reference to FIGS. 70 to 73. The pedal actuator 341 is also a rack-and-pinion type linear-motion actuator. The pedal actuator 341 has a long narrow actuator housing 378 that slidably supports and accommodates therein a rack shaft 380 serving as an actuator rod and a motor housing 381 that is fixed to a side surface of a top end portion of the actuator housing 378. A speed reducer and an electric motor are accommodated in the motor housing 381. Here, since a required output capacity of the electric motor is different depending on the pedal actuators 341, a size of the motor housing 381 is also different depending on the pedal actuators 341. In the shown embodiment, the accelerator pedal actuator 341A has a return spring 382 formed from a coil spring and arranged parallel to the rack shaft 380. With this, for instance, upon a power cut, there is no occurrence of unnecessary or unintentional depression of the accelerator pedal. The brake pedal actuator 341B is not provided with the return spring 382. Except for this different point, the accelerator pedal actuator 341A and the brake pedal actuator 341B have substantially the same structure. As described later, a structure of the clutch pedal actuator 341C is different from those of the accelerator pedal actuator 341A and the brake pedal actuator 341B in some points.

Since the pedals 345, 346 and 347 are located at relatively low positions as compared with a height of the seat cushion 303, the respective actuator housings 378 (in other words, the respective rack shafts 380) slope such that their top end sides facing to the pedals 345, 346 and 347 are located at low positions with respect to their base end sides located close to the frame 311. The rack shafts 380 have a bar-shape whose cross section is a circular shape, and top end portions, which protrude from the respective actuator housings 378, of the rack shafts 380 press the pedals 345, 346 and 347.

For the accelerator pedal actuator 341A and the brake pedal actuator 341B, a cylindrical pressing member 386 (or a cylindrical columnar pressing member 386) is fixed to the top end of each rack shaft 380, and the pressing members 386 of the accelerator pedal actuator 341A and the brake pedal actuator 341B press the pedals 345 and 346.

As shown in FIGS. 72, 73 and 75, the actuator housing 378 is supported by the pedal actuator support 351 through the above-described pedal actuator support bracket 361, a link arm 368, a slide bracket 369 and a support arm 370.

The slide bracket 369 is a bracket that supports the actuator housing 378 at the lower surface side of the actuator housing 378 so as to be able to slide the actuator housing 378 forward and backward. The slide bracket 369 has a fixing screw 379 to fix the actuator housing 378 having been slid and position-adjusted to the slide bracket 369. That is, the actuator housing 378 has a guide slit 371 formed so as to be open along an axial direction (the forward-and-backward direction) of the pedal actuator 341 on the lower surface of the actuator housing 378, and a shaft portion of the fixing screw 379 penetrates the guide slit 371 and is screwed into a pad 369A provided inside the actuator housing 378. Therefore, in a loosened state of the fixing screw 379, the pad 369A is loosened, and the actuator housing 378 can be slid relative to the slide bracket 369. On the other hand, by tightening the fixing screw 379, the actuator housing 378 is fixed to the slide bracket 369. The fixing screw 379 has, at a head portion thereof, an L-shaped lever part, and a tightening operation is possible by hand or with fingers. Therefore, it is possible to easily adjust a fore-and-aft position of each actuator housing 378 according to the positions of the pedals 345, 346 and 347 in the vehicle.

Figure 78:
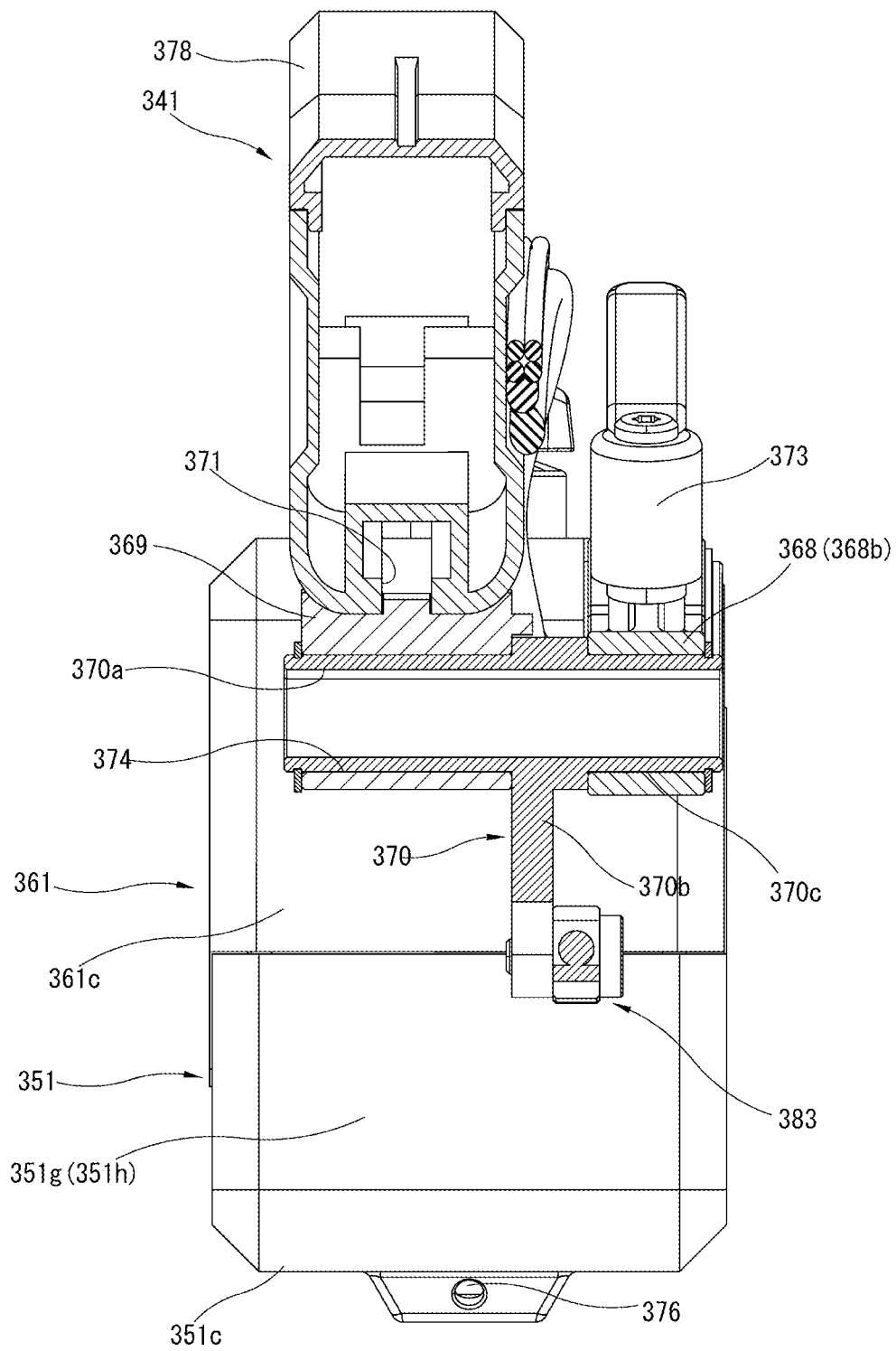
FIG. 78 is a sectional view taken along a plane (a D-D line in FIG. 71) passing through a pivotal center of a support arm.

As shown by a sectional view (a sectional view taken along a D-D line in FIG. 71) of FIG. 78, a cylindrical bearing portion 374 is formed at a rear end portion of the slide bracket 369, and the support arm 370 is rotatably or pivotably connected through the bearing portion 374. That is, the support arm 370 has a first cylindrical portion 370a rotatably fitted in the bearing portion 374, a lever portion 370b extending from the first cylindrical portion 370a to a lower side of the slide bracket 369 and a second cylindrical portion 370c extending in an axial direction at an opposite side to the first cylindrical portion 370a with respect to the lever portion 370b. In the shown embodiment, the first cylindrical portion 370a and the second cylindrical portion 370c are formed so that their axial centers are aligned and the both cylindrical portions 370a and 370c have the same diameter.

The link arm 368 is a member having, at both end portions thereof, cylindrical shaft linkage portions. Cylindrical one end portion 368a is pivotably connected to (or fitted onto) an outer periphery of the head 372a of the support pin 372 of the pedal actuator support bracket 361, and cylindrical other end portion 368b is pivotably connected to (or fitted onto) an outer periphery of the second cylindrical portion 370c of the support arm 370. More specifically, as illustrated in FIG. 78, the link arm 368 is adjacent to an axial direction outer side of the lever portion 370b of the support arm 370, and the other end portion 368b of the link arm 368 is fitted onto the outer periphery of the second cylindrical portion 370c.

A rod portion 368c in the middle of the link arm 368 is formed into a shape (a half-separate shape) that can be divided into two. In the same way as the rod portion 368c, the cylindrical end portions 368a and 368b are each divided along their radial lines, more specifically, into a substantially C-shape. At a middle portion of the rod portion 368c, a fixing screw 373 is provided so as to tighten the both C-shaped end portions 368a and 368b in their diameter directions. The fixing screw 373 has, like the fixing screw 379 of the slide bracket 369, an L-shaped lever part for a tightening operation by hand or with fingers.

In a loosened state of the fixing screw 373, the pair of end portions 368a and 368b of the link arm 368 can pivot or rotate with respect to the respective shaft members (the head 372a of the support pin 372 and the second cylindrical portion 370c of the support arm 370) placed at inner sides of the end portions 368a and 368b. Therefore, a pivotal height position of the slide bracket 369 with the support pin 372 being a center can be freely changed, and also the support arm 370 freely pivots or rotates relative to the link arm 368.

In contrast thereto, in a tightened state of the fixing screw 373, the pair of end portions 368a and 368b of the link arm 368 are fixed to the respective shaft members (the head 372a of the support pin 372 and the second cylindrical portion 370c of the support arm 370) placed at the inner sides of the end portions 368a and 368b. Therefore, an angle of the link arm 368 with respect to the pedal actuator support bracket 361 is fixed, and also an angle of the support arm 370 with respect to the link arm 368 is fixed. At this time, a tightening force is not exerted on the first cylindrical portion 370a placed at an inner periphery of the bearing portion 374 of the support arm 370. Therefore, the slide bracket 369 is pivotably connected to the support arm 370 and the link arm 368.

An angle of the slide bracket 369 (i.e. a tilting attitude of the pedal actuator 341) with respect to the support arm 370 and the link arm 368 is finally adjusted and fixed by a variable-length rod 383 using a screw mechanism provided between a top end of the lever portion 370b of the support arm 370 and a front end portion of the slide bracket 369 (see FIG. 76).

Figure 79:
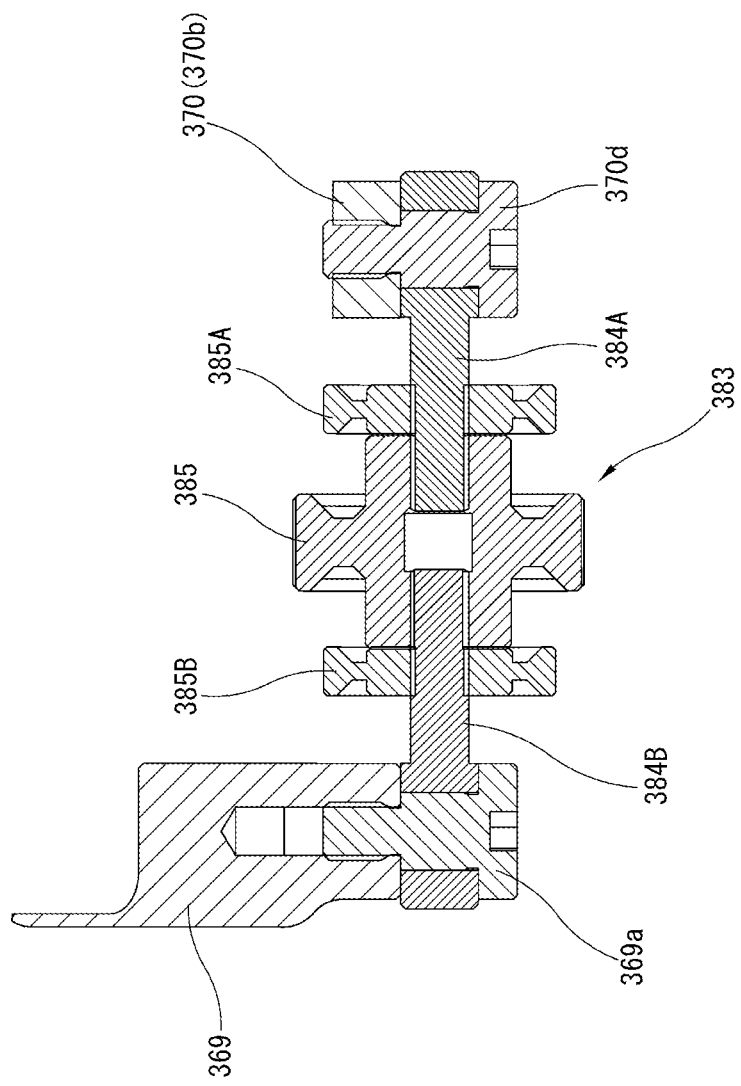
FIG. 79 is a sectional view taken along a plane passing through an axial center of a variable-length rod.

Also as illustrated by a sectional view of FIG. 79, the variable-length rod 383 has a pair of screw rods 384A and 384B having screw threads whose directions are opposite to each other, an adjustment nut 385 having, at a center thereof, a screw hole into which top end portions of the two screw rods 384A and 384B are screwed and a pair of locknuts 385A and 385B adjacent to both end surfaces of the adjustment nut 385. A base end of the screw rod 384A is pivotably linked with a linkage portion 370d of the top end of the lever portion 370b, and a base end of the screw rod 384B is pivotably linked with a linkage portion 369a of the front end portion of the slide bracket 369. The adjustment nut 385 and the lock nuts 385A and 385B are each formed into a disc shape having a knurled periphery for allowing a turning operation by hand or with fingers. The variable-length rod 383 is a mechanism that is similar to the so-called turnbuckle. By combining the pair of opposing screws, an entire length of the variable-length rod 383 (i.e. a distance between the two linkage portions 370d and 369a) changes according to the turning operation of the adjustment nut 385. After adjusting the angle by the adjustment nut 385, by tightening the lock nuts 385A and 385B so that the lock nuts 385A and 385B are contiguous to the adjustment nut 385, an unintentional rotation of the adjustment nut 385, i.e. an unintentional loosening of the adjustment nut 385, is stopped or restrained.

As can easily be understood, since the variable-length rod 383 corresponds to one side of a triangle, if the entire length of the variable-length rod 383 is increased, a tilt angle of the pedal actuator 341 becomes gentle (i.e. a position of the top end of the rack shaft 380 becomes high). On the other hand, if the entire length of the variable-length rod 383 is decreased, the tilt angle of the pedal actuator 341 becomes steep (i.e. the position of the top end of the rack shaft 380 becomes low) Since the length of the variable-length rod 383 can be continuously changed by the screw mechanism, the tilt angle of the pedal actuator 341 can also be continuously variably adjusted.

Here, a relative angle of the slide bracket 369 with respect to the support arm 370 changes according to change in length (extending-and-retracting change) of the variable-length rod 383. At a cylindrical base portion of the support arm 370, a stopper mechanism 375 formed from a stopper piece 375a provided at the support arm 370 side and a pair of stopper pieces 375b and 375c provided at the slide bracket 369 side so as to be arranged on opposite sides of the stopper piece 375a (so as to sandwich the stopper piece 375a) is provided. This stopper mechanism 375 limits change of the angle of the slide bracket 369 relative to the support arm 370 to within a predetermined range.

As described above, the pedal actuator 341 is detachably connected to the frame 311 of the automatic vehicle driving device 301, more specifically, the pedal actuator support slide rail 331, through the pedal actuator support bracket 361. The position adjustment of the pedal actuator 341 along the vehicle width direction is done by the slide rail 331. Then, by the adjustment of a tilt angle of the link arm 368, a height position of a rear end portion side of the pedal actuator 341 can be changed, and by the variable-length rod 383, the tilting attitude of the pedal actuator 341 can be adjusted along a plane orthogonal to the vehicle width direction, and further the adjustment in the forward-and-backward direction of the pedal actuator 341 through the slide bracket 369 can be possible. Accordingly, by these combination, it is possible to meet the pedal position and an inclination or a gradient of the pedal which are different depending on the vehicle types.

Here, a cable leading to the electric motor of the pedal actuator 341 is routed through an inside of the actuator housing 378, and its end is drawn out of the actuator housing 378 from an end portion, on the link arm 368 side, of the actuator housing 378 and connected to the bracket-side connector 363 through an inside of the pedal actuator support bracket 361.

Therefore, by attaching the pedal actuator support bracket 361 to the pedal actuator support 351, electrical connection through the connectors 353 and 363 is established at the same time. Because of this, there is no external cable and no connector between the pedal actuator support 351 and the pedal actuator 341.

As described above, since the pedal actuator 341 is easily attached (fixed) and detached (dismounted), when mounting the automatic vehicle driving device 301 in the vehicle, in a state in which the pedal actuator 341 remains dismounted from the frame 311 (the slide rail 331), the frame 311 is fixed and supported above the driver's seat 302, and after that, the pedal actuator 341 can be fixed in the interior of the vehicle. Conversely, when dismounting the automatic vehicle driving device 301 from the vehicle, the pedal actuator 341 is detached on ahead, then the frame 311 can be carried out of the vehicle. It is therefore possible to readily carry the automatic vehicle driving device 301 into and out of the vehicle interior through the door opening of the vehicle. In addition, each position adjustment of the pedal actuators 341 relative to the pedals 345, 346 and 347 can be easily performed in the vehicle interior after the pedal actuators 341 are fixed to the frame 311.

As shown in FIG. 51, on a lower surface of each pedal actuator support 351, i.e. a lower surface of the lower wall 351c, the relatively small LED light 376 is provided. The LED light 376 is set so as to be directed obliquely downward. In other words, the LED light 376 is configured so as to light an area around a top end portion of the pedal actuator 341 supported by the pedal actuator support 351.

The LED light 376 is basically a light used when connecting the pedal actuator 341 and doing the position adjusting work of the pedal actuator 341 after carrying the automatic vehicle driving device 301 into the vehicle interior. The LED light 376 is powered by a secondary battery mounted inside the connection box 406, more specifically, by a capacitor as a power supply. The capacitor serving as the secondary battery is automatically recharged through a charge circuit in the connection box 406 when an external power supply is connected to the connection box 406 via the main connector 407. In other words, the capacitor is repeatedly recharged during test drive using the automatic vehicle driving device 301 without requiring any specific operation.

During the mounting work of the automatic vehicle driving device 301 into the vehicle interior, generally, the cable from the external power supply is not connected to the main connector 407. However, in this condition, by turning on the LED light 376 using the secondary battery, an area around the pedal located at a front side of the driver's seat where it is darkest can be lit. This thus improves workability and operability.

As mentioned above, the light switch 409c is provided on the display panel 409 on the upper surface of the connection box 406, and an ON/OFF operation of the LED light 376 is performed by this light switch 409c. Since the LED light 376 is located close to the support-side connector 353 of the pedal actuator support 351, wiring routing at the pedal actuator support 351 is simple.

[Modified Example of Pedal Actuator Support Slide Rail 331]

As described above, a height position of a rear end portion (a base portion) of the pedal actuator 341 can be changed by the angle adjustment of the link arm 368. However, if a height position of the pedal actuator support slide rail 331 with respect to the frame 311 is variably adjustable, it is possible to meet a variety of vehicle types more flexibly.

FIGS. 87 to 89 show a modified example in which the height position of the pedal actuator support slide rail 331 is adjustable. In this structure, a substantially rectangular metal rail supporting bracket plate 332A whose vertical size is greater than that of the slide rail 331 is provided as a separate member from a base body part of the pedal actuator support slide rail 331 instead of the aforementioned rail supporting brackets 332. The rail supporting bracket plate 332A is fixed to the front ends of the main frame 315, more specifically, the front end surfaces of the main beams 315a, then the open end at the front ends of the main frame 315 is closed (see FIGS. 88 and 89).

The pedal actuator support slide rail 331 is fixed to the rail supporting bracket plate 332A with a plurality of screws 377A. On the rail supporting bracket plate 332A, in order to be able to vertically change the height position (a fixing position) of the pedal actuator support slide rail 331, screw holes 377B are arranged at a plurality of positions whose height positions are different. Therefore, if necessary, the slide rail 331 is detached, and the height position of the slide rail 331 can be changed.

FIGS. 87 to 89 illustrate a state in which the slide rail 331 is fixed to a lowest position.

[Configuration of Clutch Pedal Actuator 341C]

In the vehicle with the manual transmission, in general, the clutch pedal 347 moves along an arc and its stroke (a depressing operation amount) is relatively large. In the present embodiment, by taking account of such characteristics of the clutch pedal 347, the clutch pedal actuator 341C differs from the other two pedal actuators 341A and 341B in details. Different points will be described below with reference to FIGS. 73 and 75.

One of the different points is structures of linkage portions by the link arm 368 and the support arm 370 between the pedal actuator support bracket 361 and the pedal actuator 341. In the case of the clutch pedal actuator 341C as well, its actuator housing 378 is supported by the pedal actuator support 351 through the pedal actuator support bracket 361, the link arm 368, the slide bracket 369 and the support arm 370. Main components such as the pedal actuator support bracket 361, the link arm 368, the slide bracket 369 and the support arm 370 are not different from those of the accelerator pedal actuator 341A and the brake pedal actuator 341B.

However, in the case of the clutch pedal actuator 341C, a sleeve (not shown) is interposed between an inner peripheral surface of the one end portion 368a of the link arm 368 and the head 372a of the support pin 372 of the pedal actuator support bracket 361. Because of this, even if the fixing screw 373 of the link arm 368 is tightened, the link arm 368 is not fixed to the support pin 372, but remains pivotable relative to the support pin 372. That is, the pedal actuator support bracket 361 and the link arm 368 of the clutch pedal actuator 341C are pivotably connected. The other end portion 368b of the link arm 368 and the support arm 370 are fixed by the tightening of the fixing screw 373, as mentioned above. That is, an angle between the link arm 368 and the lever portion 370b is maintained at a fixed angle.

Further, as shown in FIG. 76 etc., between the linkage portion 370d of the top end of the lever portion 370b and the linkage portion 369a of the slide bracket 369, instead of the aforementioned variable-length rod 383, a fixed-length rod member 388 is connected. With this, the angle between the support arm 370 and the slide bracket 369, i.e. an angle between the support arm 370 and the actuator housing 378, is always constant.

Therefore, the clutch pedal actuator 341C is pivotably supported as a whole with the support pin 372 of the pedal actuator support bracket 361 being a center. Further, by the adjustment through the fixing screw 373, a position of the other end portion 368b of the link arm 368, i.e. a position (mainly, a height position) of a connecting point between the link arm 368 and the actuator housing 378, can be changed.

In the present embodiment, commonality of the main components such as the link arm 368 is realized between the clutch pedal actuator 341C and the other two pedal actuators 341A and 341B.

A second different point is that the clutch pedal actuator 341C has, at the top end of the rack shaft 380, a pivotal plate 387 instead of the aforementioned pressing member 386. That is, as shown in FIGS. 73 and 47, the pivotal plate 387 is connected to the top end of the rack shaft 380 so as to be able to tilt or rotate. This pivotal plate 387 is placed on a pedal part of the clutch pedal 347 so as to overlap the pedal part, and fixed to the pedal part with a proper jig or a fixing tool (both not shown). The pivotal plate 387 is pivotably supported by a pin 387a so as to have a rotation axis (or a pivot) along the vehicle width direction.

In general, an inclination of a pedal surface of the clutch pedal 347 relatively considerably changes according to the stroke (depression) of the clutch pedal 347. More specifically, in a state in which the clutch pedal 347 is not depressed, the pedal surface faces obliquely upward. Then, as the clutch pedal 347 is depressed, the pedal surface is almost vertical. Further, in extreme cases, conversely, the pedal surface faces obliquely downward.

If the pressing member 386 merely contacts the pedal surface in the same manner as the accelerator pedal actuator 41A and the brake pedal actuator 41B, there is a risk that the pressing member 386 will fall off the pedal surface due to the angle change of the pedal surface, and an accurate stroke cannot be obtained.

In contrast to this, in the case of the clutch pedal actuator 341C in the present embodiment, since the pivotal plate 387 provided at the top end of the rack shaft 380 is fixed to the pedal part, the clutch pedal actuator 341C can surely perform the pressing operation of the pedal part regardless of the angle change of the pedal surface.

Further, although a height position of the pedal part changes according to the rotation or pivotal movement of the clutch pedal 347 with a lever pin provided at an upper portion of the clutch pedal 347 being a center (a pivot), this change is absorbed by the link arm 368 and the pedal actuator support bracket 361 being linked so as to rotate or pivot. Since the free angle change of the actuator housing 378 is allowed, the rack shaft 380 can surely press the pedal part to a limit of the stroke (a limit of the depression of the pedal part).

In other words, the accelerator pedal actuator 341A and the brake pedal actuator 341B press the accelerator pedal 345 and the brake pedal 346 respectively as the linear motion. In contrast, the clutch pedal actuator 341C presses the clutch pedal 347 while pivoting.

In the embodiment described above, the actuator housing 378 is supported from the lower side of the actuator housing 378 by the pedal actuator support bracket 361 through the slide bracket 369 and the link arm 368, and an extension line of the rack shaft 380 passes or extends above the pedal actuator support bracket 361. Therefore, a direction of a load acting on the pivoting pedal part becomes a proper direction. Further, the motor housing 381 protruding downward from the actuator housing 378 is not excessively lowered during the stroke, then interference with the vehicle body floor 306 does not easily occur.

Further, the height position of the slide rail 331 supporting the pedal actuator 341 can be lowered, then as shown in FIG. 44 etc., the slide rail 331 can be set at a height position close to the front end of the seat cushion 303. This point is also applied to the accelerator pedal actuator 341A and the brake pedal actuator 341B.

It is noted that in a case where the stroke (a depression amount) of the clutch pedal 347 is small or where the pressing member 386 can press the pedal part by a structure of the clutch pedal 347, the three pedal actuators 341 could have the same structure.

Conversely, the structure like the clutch pedal actuator 3410 of the embodiment could also be applied to the accelerator pedal actuator 341A, and/or the brake pedal actuator 341B.

[Application to Vehicle with Automatic Transmission]

As described above, the pedal actuators 341 can be fixed to the frame 311 in the vehicle interior after carrying the frame 311 into the vehicle interior. For instance, in a case where the automatic vehicle driving device 301 is applied to the vehicle with the automatic transmission having no clutch pedal 347, only the accelerator pedal actuator 341A and the brake pedal actuator 341B, except the clutch pedal actuator 341C, are attached.

Figure 80:
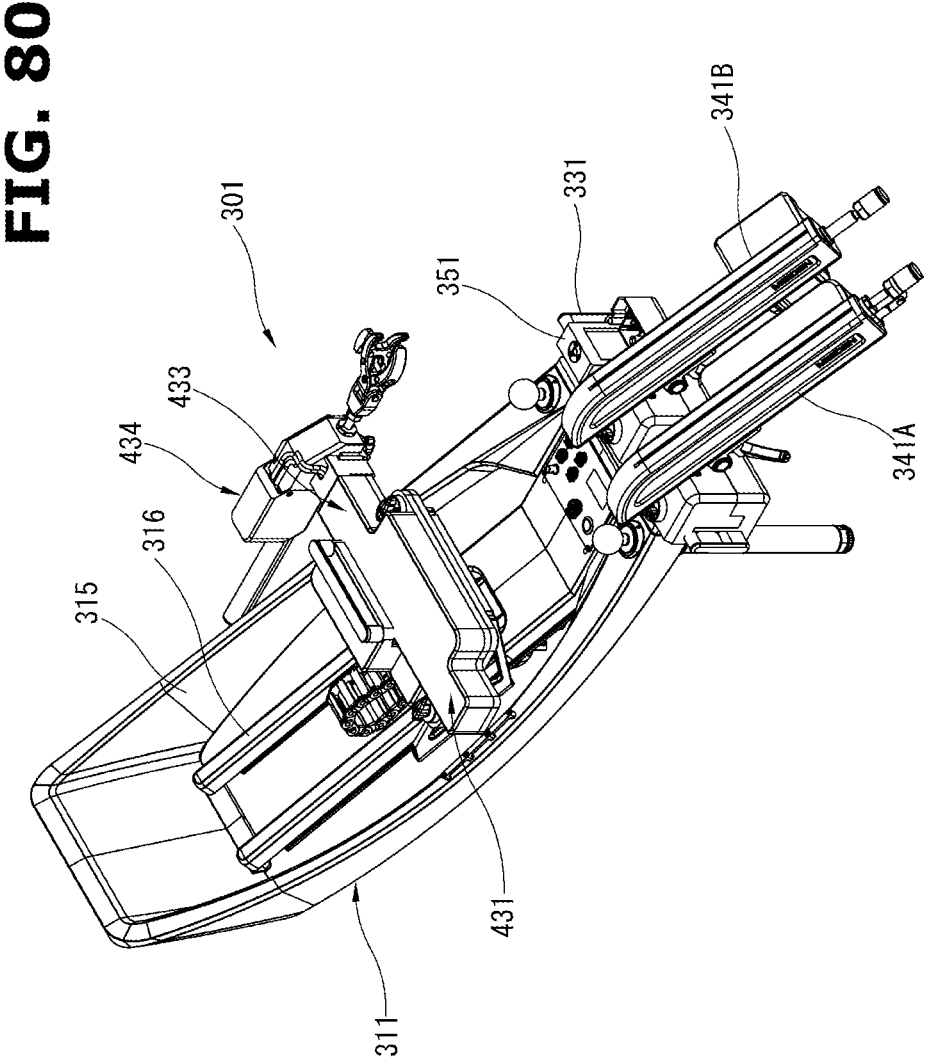
FIG. 80 is a perspective view of the automatic vehicle driving device of the second embodiment applied to the vehicle with the automatic transmission.

With this, as shown in FIG. 80, the automatic vehicle driving device 301 used for the vehicle with the automatic transmission is obtained.

As described above, since the pedal actuator 341 is easily attached (fixed) and detached (dismounted), even when a test vehicle on the chassis dynamometer is changed from the vehicle with the manual transmission to the vehicle with the automatic transmission, the automatic vehicle driving device 301 can readily meet this change.

[Working and Effect]

As described above, the clutch pedal actuator 341C of the automatic vehicle driving device 301 of the second embodiment is configured so that the pivotal plate 387 is placed on a pressing surface of the clutch pedal 347 so as to overlap the pressing surface of the clutch pedal 347 and fixed to the pressing surface of the clutch pedal 347. Therefore, the pivotal plate 387 can surely perform the pressing operation of the clutch pedal 347 regardless of the angle change of the clutch pedal 347.

Further, the clutch pedal actuator 341C is configured so that the actuator housing 378 is supported by the pedal actuator support bracket 361 so as to be able to pivot (or rotate or tilt) upward and downward relative to the pedal actuator support bracket 361, and also the pivotal plate 387 fixed to the clutch pedal 347 is connected to the top end of the rack shaft 380 so as to be able to pivot (or rotate or tilt) upward and downward. Therefore, even if the clutch pedal 347 is pressed and its height position is changed, an attitude of the actuator housing 378 of the clutch pedal actuator 341C can follow the height position of the pedal.

That is, since the angle change of the actuator housing 378 is allowed, the clutch pedal actuator 341C can surely press the clutch pedal 347 to a limit of the stroke (a limit of the depression of the clutch pedal 347) even if the stroke of the rack shaft 380 becomes large. In other words, even if the clutch pedal 347 is the clutch whose depressing operation amount (depression amount) is large, the clutch pedal actuator 341C can surely perform the pressing operation to the limit of the stroke.

Further, the clutch pedal actuator 341C is configured so that the actuator housing 378 is supported from the lower side of the actuator housing 378 by the pedal actuator support bracket 361 through the slide bracket 369 and the link arm 368, and the extension line L of the rack shaft 380 passes or extends above the pedal actuator support bracket 361.

With this structure, the clutch pedal actuator 341C enables the direction of the load acting on the pivoting pedal part of the clutch pedal 347 to be a proper direction. More specifically, the clutch pedal actuator 341C enables an angle of the direction of the load acting on the pedal part of the clutch pedal 347 with respect to the horizontal plane to be increased. Further, the clutch pedal actuator 341C is configured so that the motor housing 381 protruding downward from the actuator housing 378 is not excessively lowered during the stroke, then interference with the vehicle body floor 306 does not easily occur. Furthermore, it is possible to lower the height position of the slide rail 331 supporting the clutch pedal actuator 341C.

The clutch pedal actuator 341C is connected to the link arm 368 through the slide bracket 369 slidably fixed to the actuator housing 378, and is fixed to the slide bracket 369 with the fixing screw 379.

With this structure of the clutch pedal actuator 341C, it is possible to easily adjust the fore-and-aft position of the actuator housing 378 according to the position of the clutch pedal 347 in the vehicle.

The pedal actuator 341 could be configured to have the height adjustment mechanism that can variably adjust the height position of the pedal actuator support bracket 361 with respect to the frame 311. This height adjustment mechanism has, for instance, the rail supporting bracket plate 332A fixed to the front end portion of the frame 311 and the pedal actuator support slide rail 331 to which the pedal actuator support bracket 361 is mounted. The rail supporting bracket plate 332A is structured so that the pedal actuator support slide rail 331 can be fixed to positions of different height.

By adjusting the height position of the pedal actuator support bracket 361 with respect to the frame 311, the height position of the rear end portion of the actuator housing 378 of the pedal actuator 341 can be adjusted.

With this, even in a case where a space in the vehicle interior is narrow, it is possible to prevent the actuator housing 378 of the pedal actuator 341 from interfering with a vehicle interior wall surface such as a lower portion of an instrument panel.

The pedal actuator support bracket 361 of the pedal actuator 341 is mounted to the pedal actuator support 351 by being slid from above to the downward direction. Because of this, the actuator housing 378 of the pedal actuator 341 tends to interfere with the vehicle interior wall surface when mounting the pedal actuator support bracket 361 to the pedal actuator support 351.

However, since the height position of the rear end portion of the actuator housing 378 can be adjusted by adjusting the height position of the pedal actuator support bracket 361 with respect to the frame 311, it is possible to prevent the actuator housing 378 from interfering with the vehicle interior wall surface when mounting the pedal actuator support bracket 361 to the pedal actuator support 351.

Here, the pedal actuator support slide rail 331 could be structured so that the rail supporting bracket plate 332A can be fixed to positions of different height. That is, the pedal actuator 341 could be configured so that screw holes for fixing the rail supporting bracket plate 332A are provided at a plurality of positions by which the height position of the pedal actuator support slide rail 331 is changed.

The invention claimed is:

1. A pedal actuator of an automatic vehicle driving device comprising:
   a pedal actuator support bracket provided at a front end portion of a frame supported at a driver's seat of a vehicle;
   an actuator housing whose base end side is supported by the pedal actuator support bracket so as to be able to pivot upward and downward relative to the pedal actuator support bracket;
   an actuator rod protruding from a top end side of the actuator housing and moving forward and backward along a longitudinal direction of the actuator housing;
   a pivotal plate connected to a top end of the actuator rod so as to be able to pivot upward and downward and placed on a pressing surface of a pedal so as to overlap the pressing surface of the pedal and fixed to the pedal;
   a link arm whose one end is pivotably linked with the pedal actuator support bracket and whose other end fixedly supports the actuator housing at a predetermined angle;
   a slide bracket connected to the other end of the link arm and slidably fixed to the actuator housing; and
   a fixing screw fixing the slide bracket to the actuator housing.

2. The pedal actuator of the automatic vehicle driving device as claimed in claim 1, wherein
   the link arm is structured to allow adjustment of an angle between the link arm and the actuator housing, and an extension line of the actuator rod passes above the pedal actuator support bracket.

3. The pedal actuator of the automatic vehicle driving device as claimed in claim 1, further comprising:
   a height adjustment mechanism that can variably adjust a height position of the pedal actuator support bracket with respect to the frame.

4. The pedal actuator of the automatic vehicle driving device as claimed in claim 3, wherein
   the height adjustment mechanism has
   a rail supporting bracket plate fixed to the front end portion of the frame; and
   a pedal actuator support slide rail to which the pedal actuator support bracket is mounted, wherein
   the rail supporting bracket plate is structured so that the pedal actuator support slide rail can be fixed to positions of different height.

* * * * *